US007111201B2

(12) United States Patent
Largman et al.

(10) Patent No.: US 7,111,201 B2
(45) **Date of Patent: *Sep. 19, 2006**

(54) SELF REPAIRING COMPUTER DETECTING NEED FOR REPAIR AND HAVING SWITCHED PROTECTED STORAGE

(75) Inventors: Kenneth Largman, San Francisco, CA (US); Anthony B. More, Oakland, CA (US); Jeffrey Blair, San Francisco, CA (US)

(73) Assignee: Self Repairing Computers, Inc., San Francisco, CA (US)

( * ) Notice: Subject to any disclaimer, the term of this patent is extended or adjusted under 35 U.S.C. 154(b) by 424 days.

This patent is subject to a terminal disclaimer.

(21) Appl. No.: 10/090,480

(22) Filed: Feb. 27, 2002

(65) Prior Publication Data

US 2002/0194535 A1 Dec. 19, 2002

Related U.S. Application Data

(63) Continuation-in-part of application No. 09/862,898, filed on May 21, 2001, now Pat. No. 6,880,110, and a continuation-in-part of application No. 10/075,136, filed on Nov. 19, 2001, and a continuation-in-part of application No. 10/074,686, filed on Feb. 11, 2002.

(60) Provisional application No. 60/291,767, filed on May 17, 2001, provisional application No. 60/220,282, filed on Jul. 24, 2000, provisional application No. 60/205,531, filed on May 19, 2000.

(51) Int. Cl.
*G06F 11/00* (2006.01)

(52) U.S. Cl. ............................................ 714/36; 713/2

(58) Field of Classification Search .................. 714/23, 714/36, 57; 713/2, 100

See application file for complete search history.

(56) References Cited

U.S. PATENT DOCUMENTS

| | | | | |
|---|---|---|---|---|
| 4,464,747 | A | | 8/1984 | Groudan et al. |
| 4,939,694 | A | | 7/1990 | Eaton et al. |
| 5,434,562 | A | | 7/1995 | Reardon |
| 5,655,069 | A | | 8/1997 | Ogawara et al. |
| 5,704,031 | A | | 12/1997 | Mikami et al. |
| 5,732,268 | A | | 3/1998 | Bizzarri |
| 5,737,118 | A | | 4/1998 | Sugaya et al. |
| 5,764,878 | A | | 6/1998 | Kablanian et al. |
| 5,826,012 | A | | 10/1998 | Lettvin |
| 5,841,712 | A | | 11/1998 | Wendell et al. |
| 5,860,001 | A | * | 1/1999 | Cromer et al. ................. 713/1 |
| 5,920,515 | A | | 7/1999 | Shaik et al. |
| 6,016,553 | A | | 1/2000 | Schneider et al. |
| 6,067,618 | A | | 5/2000 | Weber |
| 6,088,794 | A | * | 7/2000 | Yoon et al. .................... 713/2 |

(Continued)

FOREIGN PATENT DOCUMENTS

CA 2197502 A1 8/1998

(Continued)

*Primary Examiner*—Robert Beausoliel
*Assistant Examiner*—Christopher McCarthy
(74) *Attorney, Agent, or Firm*—Dorsey & Whitney LLP

(57) ABSTRACT

The invention may backup, maintain backups, or recover data associated with a computing system. The computing system may include any number of components including hardware and software, and any memory accessible to the computing system. The computing system may focus on a user computing system and potentially the supporting environment which stabilizes the functionality of the user computing system (e.g., operating system, BIOS, etc.). Typically data associated with the computing system is identified by a variety of characteristics, the data is stored as a backup, and subsequently data within the backup may be restored or used to evaluate an existing computing system.

21 Claims, 13 Drawing Sheets

U.S. PATENT DOCUMENTS

| | | | | |
|---|---|---|---|---|
| 6,178,452 | B1 | 1/2001 | Miyamoto | |
| 6,199,178 | B1 | 3/2001 | Schneider et al. | |
| 6,205,527 | B1 * | 3/2001 | Goshey et al. | 711/162 |
| 6,289,426 | B1 | 9/2001 | Maffezzoni et al. | |
| 6,301,657 | B1 * | 10/2001 | Jones et al. | 713/2 |
| 6,317,845 | B1 | 11/2001 | Meyer et al. | |
| 6,327,653 | B1 * | 12/2001 | Lee | 713/100 |
| 6,347,375 | B1 | 2/2002 | Reinert et al. | |
| 6,367,042 | B1 | 4/2002 | Phan et al. | |
| 6,374,366 | B1 * | 4/2002 | Maffezzoni | 714/27 |
| 6,381,694 | B1 * | 4/2002 | Yen | 713/2 |
| 6,421,792 | B1 * | 7/2002 | Cromer et al. | 714/36 |
| 6,754,818 | B1 * | 6/2004 | Lee et al. | 713/2 |
| 2002/0087855 | A1 * | 7/2002 | Dykes et al. | 713/2 |

FOREIGN PATENT DOCUMENTS

| | | | |
|---|---|---|---|
| EP | 0 978 785 | A1 | 2/2000 |
| WO | WO 95/22794 | A1 | 8/1995 |
| WO | WO 01/11449 | A1 | 2/2001 |

* cited by examiner

SELF REPAIRING COMPUTER DETECTING NEED FOR REPAIR AND HAVING SWITCHED PROTECTED STORAGE

BENEFIT APPLICATIONS

This application is a continuation-in-part and claims the benefit of priority under 35 U.S.C. 119(e) and/or 35 U.S.C. 120 to:

U.S. patent application Ser. No. 09/862,898, entitled, "A Computer with Switchable Components," filed May 21, 2001, now U.S. Pat. No. 6,880,110 naming Kenneth Largman and Anthony B. More and Jeffrey Blair as inventors, and commonly assigned to Self Repairing Computers, Inc., San Francisco, Calif.;

U.S. patent application Ser. No. 10/075,136, entitled, "On-The-Fly Repair Of A Computer," filed Nov. 19, 2001, naming Kenneth Largman and Anthony B. More and Jeffrey Blair as inventors, and under an obligation of assignment to Self Repairing Computers, Inc., San Francisco, Calif.;

U.S. patent application Ser. No. 10/074,686, entitled, "External Repair Of A Computer," filed Feb. 11, 2002, naming Kenneth Largman and Anthony B. More and Jeffrey Blair as inventors, and under an obligation of assignment to Self Repairing Computers, Inc., San Francisco, Calif.;

U.S. Provisional Patent Application No. 60/291,767, entitled, "A Self-Repairing Computer," filed May 17, 2001, naming Kenneth Largman and Anthony B. More as inventors, and commonly assigned to Self Repairing Computers, Inc., San Francisco, Calif.;

U.S. Provisional Patent Application No. 60/205,531, entitled, "Scalable, Diagnostic, Repair and Multi-Use System for Computing Hardware & Devices that Utilize Computer Hardware," filed May 19, 2000, naming Kenneth Largman and Anthony More as inventors, and commonly assigned to Self-Repairing Computers, Inc. of San Francisco, Calif.;

U.S. Provisional Patent Application No. 60/220,282, entitled, "Scalable, Diagnostic, Repair and Multi-Use System for Computing Hardware & Devices That Utilize Computer Hardware," filed Jul. 24, 2000, naming Kenneth Largman and Anthony More as inventors, and commonly assigned to Self-Repairing Computers, Inc. of San Francisco, Calif.

FIELD OF THE INVENTION

This invention relates to computers, computer repair and computer architecture. More particularly, the invention relates to a computer architecture and software that enables the computer to repair itself.

BACKGROUND

Personal-computer manufacturers and sellers often offer via-telephone and on-site repair services. Yet purchasers—particularly home, home-office and small-office purchasers—readily complain that their service contract offers less service than they expected. For example, a computer seller may dispatch a technician only after the purchaser calls the help center, performs a number of tests under the direction of the help center, escalates the problem at the telephone help center and performs redundant or additional tests under the direction of a putatively more knowledgeable telephone-help staff. The purchaser may have to escalate the problem still further and perform additional redundant tests before a repair technician is dispatched.

Frequently, the help center directs the customer to cycle the power on the computer, to re-boot the computer, to detach and reattach peripherals in question and to re-install application and operating-system software. Each call to the help center and each level of escalation may require the purchaser to cycle, re-boot, detach and reattach.

Detaching and reattaching peripherals can be extremely inconvenient. USB devices, for example, typically attach at the back of a computer in a location difficult to reach. In any event, the non-digerati purchaser may fear disassembling his computer, worrying that he may damage the computer further.

Help centers even direct a customer to reformat the boot drive of the computer and re-install operating-system and application software. Re-formatting is an onerous task for several reasons. Firstly, the home, home-office and small-office user rarely reformats a drive in the normal operation of his computer and is unfamiliar with the process itself. Secondly, reformatting destroys all the data on the drive, and such a user understandably becomes anxious on finding out that he will lose all of his data. Thirdly, such a user may not retain the application or operating-system installation media, especially where the seller pre-installs the software. The user may have been unsure which media to keep, or intending to keep a particular media, is in fact unable to locate that media later when needed.

Fourthly, the user typically does not back up his drives as often as an information technologist would recommend. That he will have to rely on his back ups (if any) if he is to have any hope of restoring his application is then not a comforting thought.

Accordingly, the art evinces a need for a computer that reduces or even eliminates the need for a user to call a help line, to keep installation media, to attach and reattach peripherals at the port, etc. Indeed, a computer that reduces or eliminates the technical savvy its user needs to effect repairs is desirable.

These and other goals of the invention will be readily apparent to one of ordinary skill in the art on reading the background above and the description below.

BRIEF DESCRIPTION OF THE DRAWINGS

FIG. 6A illustrates the enabling of a data store in conjunction with the defeat of access to a communications link. FIG. 6B illustrates the enabling of a data store in order to support access to the communications link.

FIG. 7A illustrates the computer in its Network Disconnected state, while FIG. 7B illustrates the computer in its Network Connected state.

SUMMARY

Herein are taught apparatus and methods for a computer to repair itself.

A method or system for supporting a computer systems self repair, including the computer executed steps for booting from a first boot device, and booting from a second boot device in response to a signal indicating a need for repair. While booted from the second boot device the computer system is capable of repairing software on the first boot device. The signal may effect a logical or physical switch. Repairing software may be performed in part by copying, template, backup or archive software from a device other than the first boot device. Repairing software may be performed automatically without direction by a user or according to preset preferences.

DESCRIPTION OF THE INVENTION

Overview

An example of the invention in use follows: A user runs an application on a computer incorporating an embodiment of the invention. At some point, the user modifies the application or underlying operating system to the point that the application, the operating system or both become unusable. Indeed, the user may no longer be able to even boot the operating system.

Recognizing that the computer needs to be repaired, the user throws a switch on the computer. The computer fixes the malfunctioning software and so informs the user.

The user can then re-boot the computer. On re-booting, the user again has access to a correctly functioning operating system, application and data files.

A Self-Repairing Computer

Figure 1:
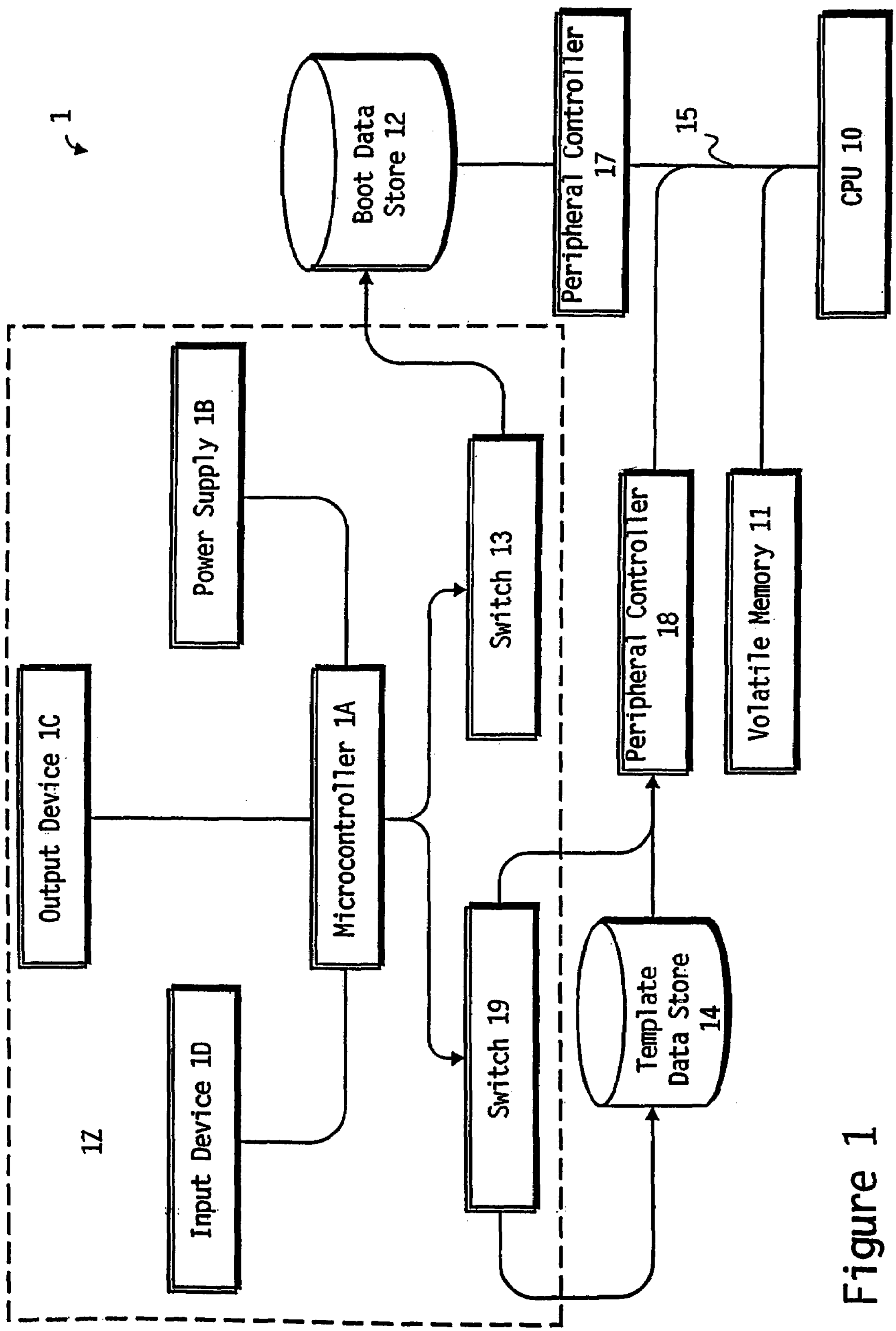
FIG. 1 illustrates a computer incorporating an embodiment of the invention.

FIG. 1 illustrates a computer 1 incorporating an embodiment of the invention. The computer 1 may include a CPU 10, volatile memory 11, peripheral controllers 17, 18, a first non-volatile data store 12 and a bus 15, all well known in the art.

The computer 1 may also include switches 13, 19, a second non-volatile data store 14, a controller 1A, a power supply 1B, an output device 1C and an input device 1D.

The bus 15 may communicatively couple the volatile memory 11 and the peripheral controllers 17, 18 to each other and to the CPU 10. The peripheral controllers 17, 18 may communicatively couple with the data stores 12, 14, respectively.

The switches 13, 19, the controller 1A, power supply 1B, output device 1C and input device 1D may form a data-store switch 1Z. A data-store switch may alter the accessibility of a connected data store according to the setting of the switch.

The controller 1A may communicatively couple with the switches 13, 19, the output device 1C and the input device 1D. The power supply 1B may supply the controller 1A (and other switch components) with power. More particularly, the power supply 1B may power the controller 1A independently of the power to the rest of the computer 1.

Figure 10:
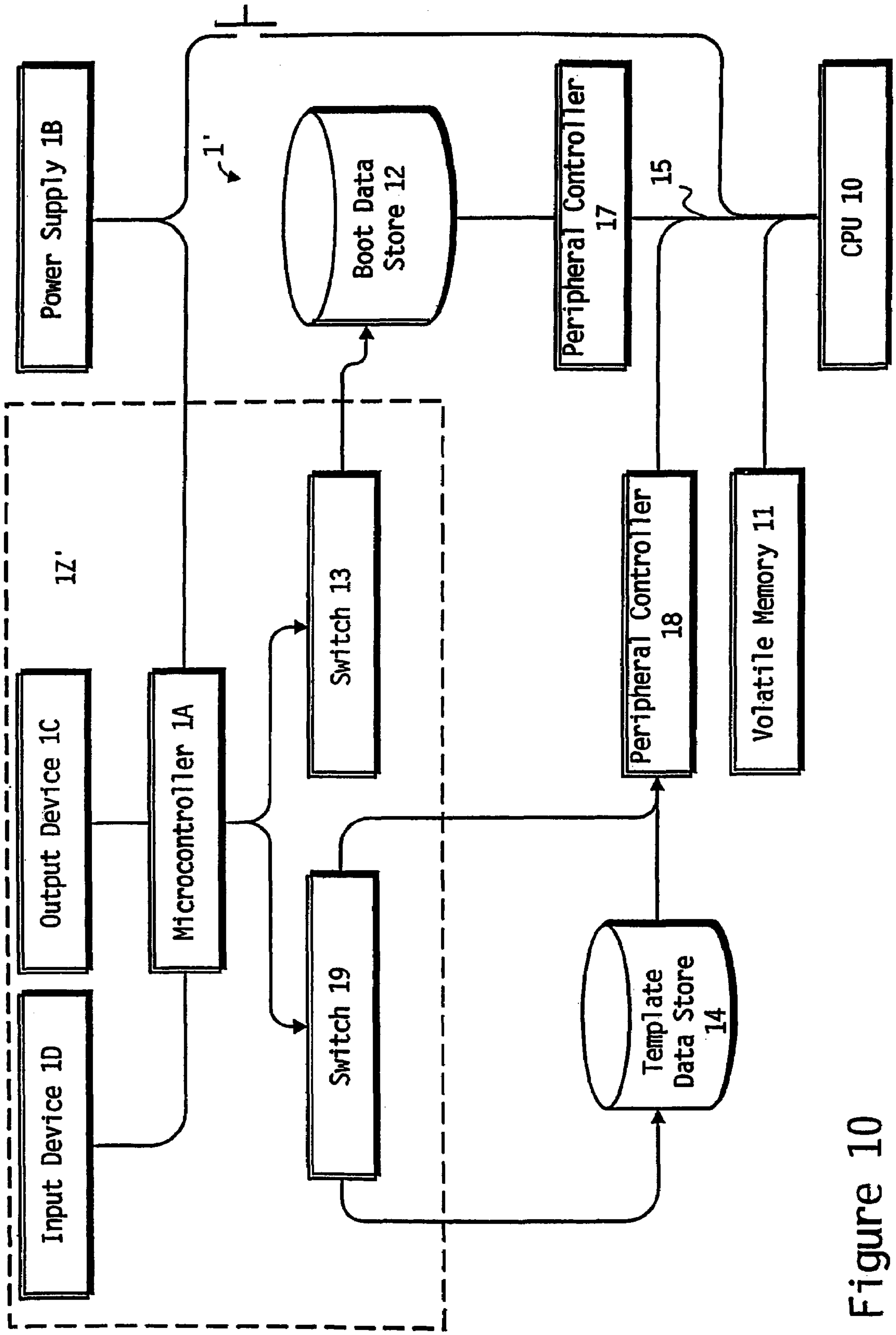
FIG. 10 illustrates a computer incorporating an embodiment of the invention.

The power to the switch 1Z may come from the same source as the power for the rest of the computer (the wall outlet or laptop battery, for example). The switch 1Z may then be powered from that supply even when the rest of the computer 1 is not. FIG. 10 illustrates this embodiment of the invention.

The switch 13 may communicate with the data store 12. The switch may control (toggle, for example) the identification settings of the data store 12.

The switch 19 may couple to the data store 14. The switch 19 may control (toggle, for example) the power to the data store 14.

The volatile memory 11 may be random-access memory. The data stores 12, 14 may be magnetic disks, for example.

The output device 1C may be the monitor of the computer 1, LEDs or an LCD distinct from the monitor, for example.

Figure 2:
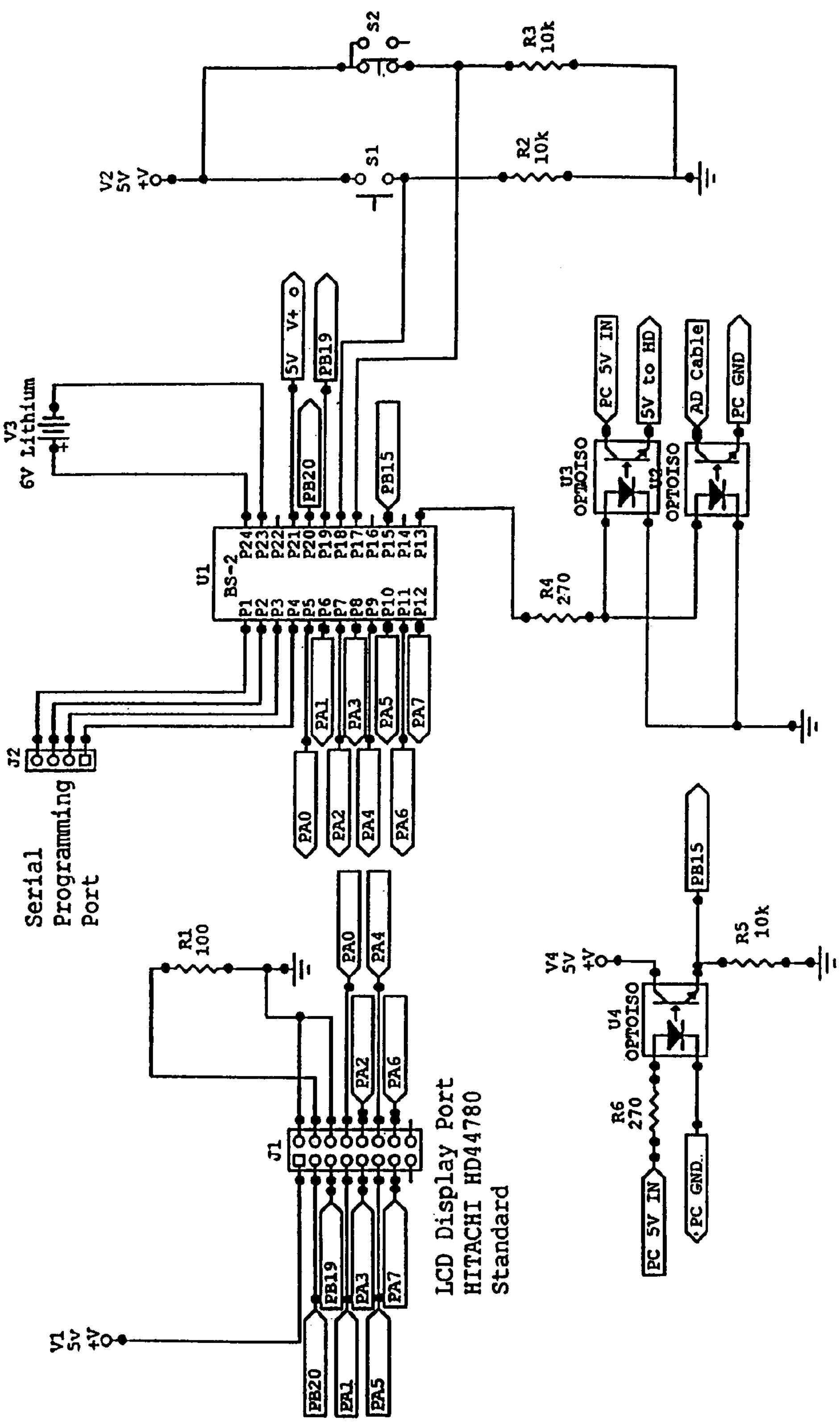
FIG. 2 is a schematic of a data-store switch according to an embodiment of the invention.

FIG. 2 is a schematic of the data-store switch 1Z according to an embodiment of the invention. In FIG. 2, the opto-isolators U2, U3 implement the switches 13, 19, respectively. The Basic Stamp II microcontroller U1 (from Parallax, Inc., Rocklin, Calif.) implements the controller 1A. The battery V3 implements the power supply 1B. The LCD display port J1 represents the output device 1C, and the switches S1, S2 implement the input device 1D. (Opto-isolator U4 detects whether the computer 1 has power.)

In a first mode of operation herein termed "normal mode," the computer 1 may run a predetermined operating system and application. Accordingly, the data store 12 may contain a correctly functioning copy of that software. The CPU 10 may access the data store 12, boot the operating system and then execute that application.

The data store 12 is termed herein the "boot data store." The data store 12 may contain a bootable, executable operating system and executable application.

The data-store switch 1Z may make the data store 12 accessible to the computer 1 as the boot drive (by means of the switch 13, for example). The data-store switch 1Z may also make the data store 14 inaccessible to the computer 1 (by means of the switch 19, for example). Otherwise, the data-store switch 1Z may idle, waiting for user input on the device 1D.

In the normal stage, the computer 1 may perform as a conventional computer. The user may run his application software, inattentive to the invention incorporated into the computer 1.

In a third mode of operation herein termed the "repair mode," the CPU 10 may run software on the data store 14 and the controller 1A may execute a program in parallel. A mode intermediate to the normal and repair modes, herein termed the "switching mode," may effect the transition from normal to repair mode.

In the switching mode, using an input device such as the device 1D the user may indicate that he wishes to repair software on the data store 12. (FIGS. 3A and 3B illustrate the switch-and-repair process according to one embodiment of the invention.) In response to the input, the computer 1 may switch from normal operation to repair, step 310, and repair the software on the data store 12, step 320.

The switching of a data store may be logical or physical. Logical switching is switching enforced purely by software. For example, software may set one or more predetermined bits that it or other software tests to determine whether a data store is accessible at any given time.

A physical switch opens or closes a predetermined electrical circuit of a device to be switched. A physical switch may, for example, alter the open/close state of identification jumpers of a data store. A physical switch may turn on or off the power supply to a device to be switched.

Figure 4:
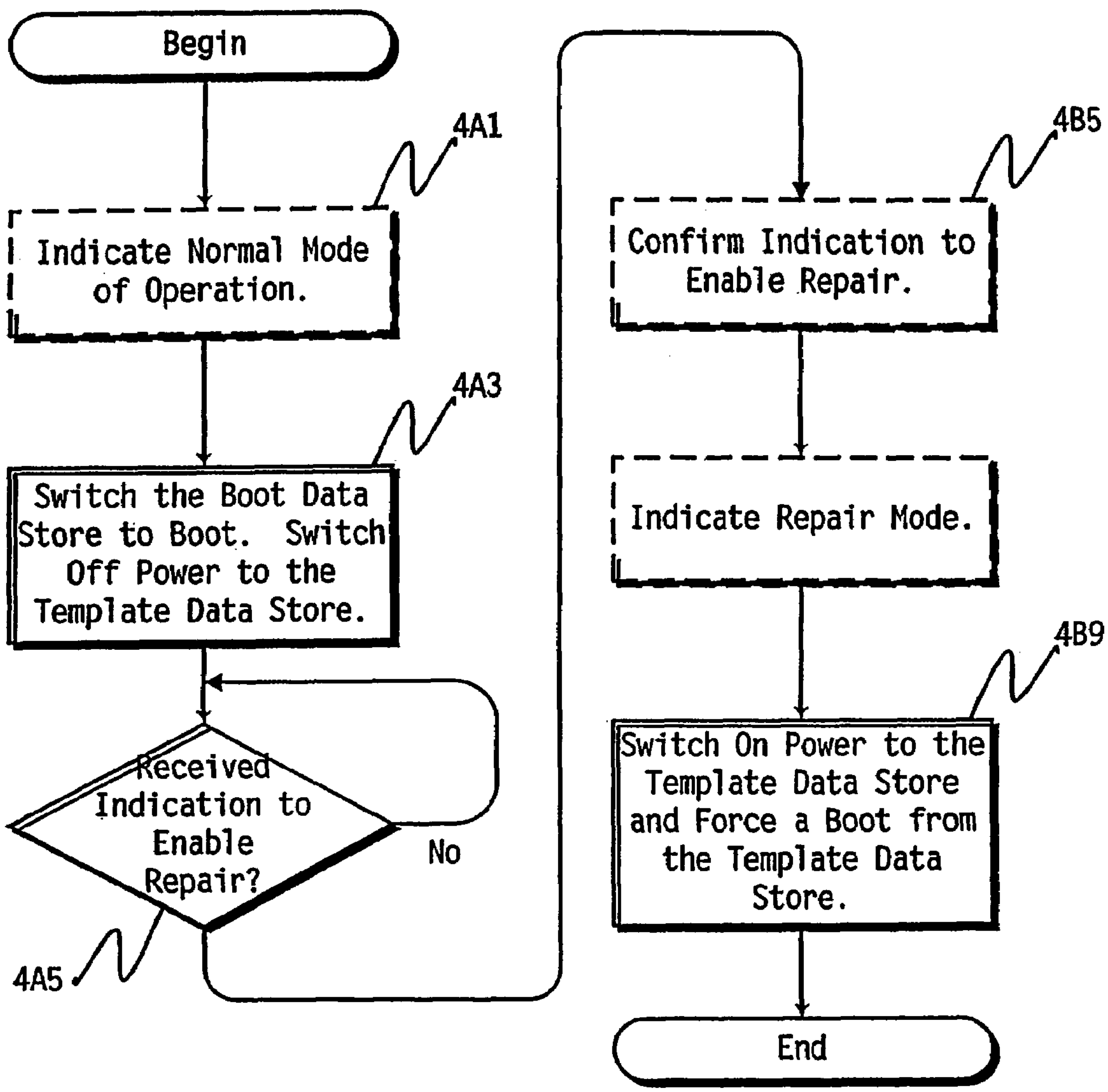
FIG. 4 illustrates the flow of control in a data-store switch according to one embodiment of the invention.

FIG. 4 illustrates the flow of control in a data-store switch 1Z according to one embodiment of the invention. On start up, the data-store switch 1Z may go into normal mode of operation. In this stage, the switch 1Z may set the switch 13 to make the data store 12 the boot drive, step 4A3. The switch also may set the switch 19 to leave the template data store 14 unpowered.

The data-store switch 1Z may then idle, waiting for the user to initiate the switch to repair mode, step 4A5. The data-store switch 1Z may display a message indicating that it is in normal mode, step 4A1.

When the data-store switch 1Z receives an indication to switch to repair mode, the switch 1Z may ask the user to confirm this indication, step 4B5. Confirmation is preferable where the repair process is destructive before it is constructive. Confirmation is preferable also because the activation of the input device indicating the switch to repair mode may have been accidental or ill considered.

On confirmation if requested, the data-store switch 1Z may switch power to the data store 14, step 4B9, making the data store 14 accessible to the computer 1. The data store 14 may be permanently configured to be addressable as the boot drive when it is accessible. Accordingly, the address of the data store 12 may then change.

In normal operation, the data store 12 may be addressable as the boot drive. However, during the switch, the switch 1Z may change the identity (address jumpers, for example) of the data store 12 to something other than the boot-drive identity.

The computer 1 is now ready to enter the repair stage.

Switched physically to repair mode, the computer 1 may boot from the template boot drive. The booted program or some other program executed during the boot sequence (autoexec.bat, for example, on machines running Windows™ operating system from Microsoft Corp., Redmond, Wash.) may query the user.

In one embodiment, on rebooting the computer 1 may automatically repair the data drive 12. It copies software from the template data store 14 to the data store 12 without further direction from the user. Previously set user preferences may, however, direct the course of repair.

Thus, where the template data store 14 contains only application software, the repair process may copy over or re-install that application software from the template data store 12. Where the template data store contains operating-system and application software, the repair process may copy over or re-install the operating system first and then the application software.

Uninstallation or deletion of an application may precede re-installation or copying over of that software. Re-formatting of the data store 12 may precede re-installation or copying over of the operating system. Resetting of ROM-resident parameters may precede re-installation or copying over of operating-system or application software.

On completion of the repair, the repair software may direct the user to switch back to normal mode and re-boot the computer 1.

Alternatively, the repair process may be menu-driven. The repair process may present the user a sequence of options to determine what repair process to execute. For example, on re-boot in repair mode, the repair software may offer the choices of running the repair process, reviewing repair-process settings, updating the template software (the application, operating system or repair-process software itself) and quitting the repair process.

The template data store 14 may contain application software, operating-system software and repair-process software. The application software may include the executable software itself (.exe, .dll, .o, etc.) or the files created by the application (.wpd files for Corel WordPerfect word-processing software, for example).

The software on a template data store 14 typically is an operating system and may include one or more applications, along with the underlying software to run the operating system (and any included application) on a computer with a predetermined configuration. The underlying software may include one or more boot records, one or more partition tables or a BIOS.

The template software is created by installing software onto a data store, by copying installed software onto the data store or by copying installation software onto a data store. (Installed software includes data files and other pre-existing software.)

The template data store software may be updated. Where the template software is installation-ready software, that installation software may be updated to a different, usually later, version. Where the template software is a backup of the software on the data store 12, a different, usually more recent, backup of the data-store software replaces or supplements that software.

Repair-process settings may include whether to recover data, run a virus check, reformat the data store, revert to a backup, run a human-mediated (i.e., manual) or an automatic repair, run diagnostics (software or hardware, for example). Repair-process settings may also include whether to format and at what level (quick versus low-level, for example), what software to re-install (operating system (OS) only; OS and executable-application software; OS, executable-application software and application data files; data files only, for example), whether to switch automatically (i.e., under program or hardware control), what level of repair to run (quick, better or best, in one embodiment), whence to setup (backup or template, in one embodiment) and whence to recover data files (most recent backup prior to repair, backup at the time of repair, other predetermined backup, query-and-response-specified backup, as examples).

The repair process may entail recovering a usable version of the appropriate data file. In some instances of computer repair, the problem is not so much with the operating-system or executable-application software so much as with the files (usually data files) associated with one or more of the applications. If the application in question is Microsoft Outlook, then the file to be recovered may be the mail-and-folder-data .pst file. Where the application is Microsoft's Internet Explorer, the file to recover may be the favorites file.

Running a virus check may entail first checking that the virus-check-and-repair software is up to date. Because new software attacks appear daily, and because newer malicious code has a higher chance of delivering a payload, this is not a trivial step. The software may then check for malicious code and repair software, as directed by the user or by default.

The above process presupposes that the data store 14 contains a copy of (a version of) the operating-system, application software or data file on the data store 12. In this sense, this second data store 14 is termed herein the "template data store." With the computer 1 switched to boot from the template data store 14, the computer 1 may perform the original copying of template software onto the data store 14. (Where the data store 14 is a read-only medium, it may arrive at the computer 1 in a pre-written state.)

An example of the operation of the computer 10 follows: Assume that the data store 12 contains a bootable Windows™ operating system (from Microsoft Corp., Redmond, Wash.). Assume also that the data store 12 also contains NaturallySpeaking® application software (Lernout & Hauspie, Ieper, Belgium and Burlington, Mass.).

The operating system and the application on the data store 12 may have each been run any number of times, and the user may have customized the operating system, the application or both to his preferences. In contrast, the template data store 14 may contain as-installed copies of the operating-system and the application software.

In the course of using his computer 1, the user puts the computer 1 into an undesirable state. He may, for example, foul up the optional settings of the operating system or application such that he cannot reset them to a usable state. He may download a virus, Trojan horse or other malicious code that changes his operating system, application or both. The particulars of the malicious code are unknown but the manifest effect is that the computer 1 is partially or completely inoperable. He may remove files critical to the correct operation of the software. As one of skill in the art will recognize, the ways in which software may be intentionally or unintentionally altered to the point of unusability are legion.

Figure 3:
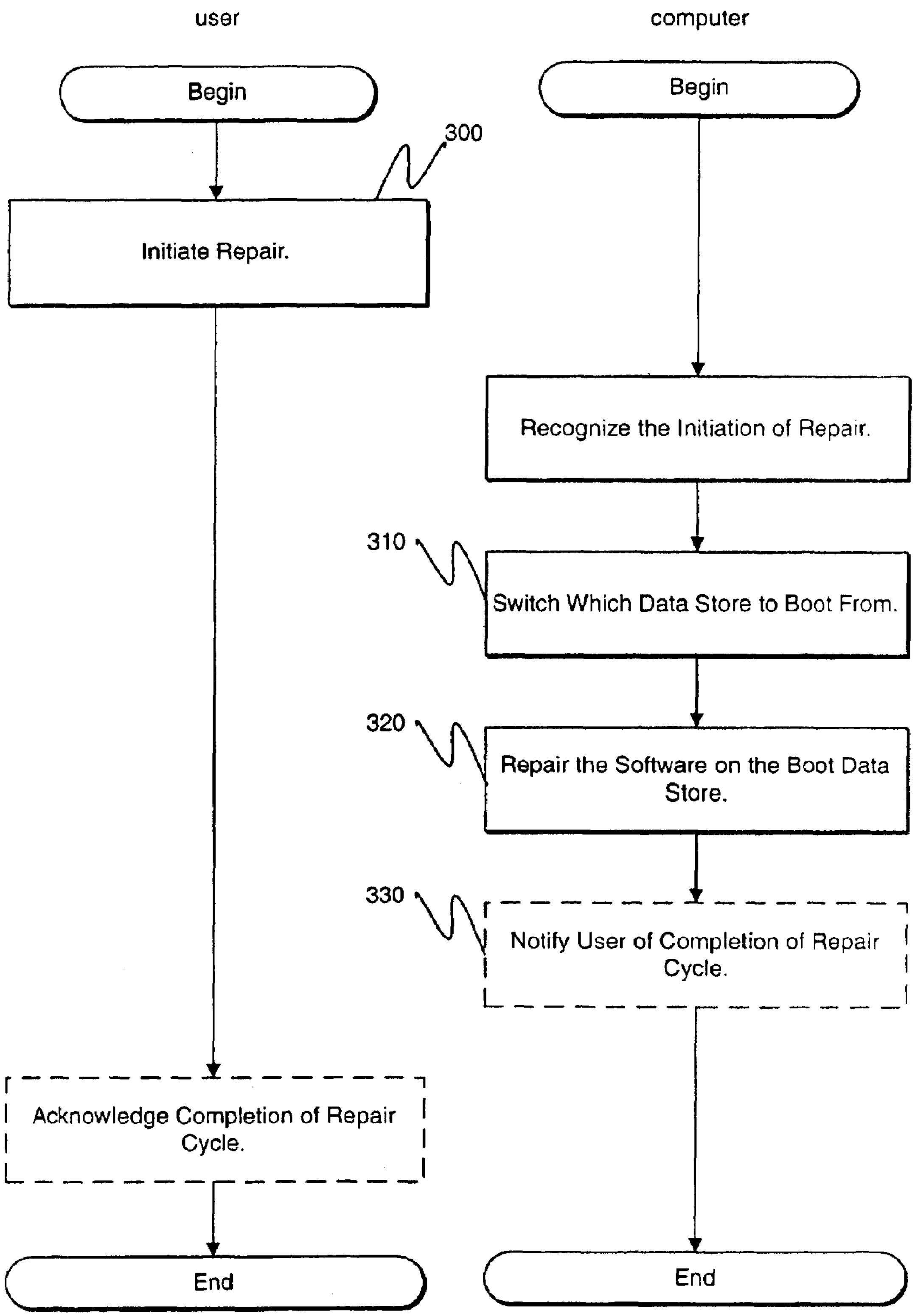
FIGS. 3A through 3B illustrate the switch-and-repair process according to one embodiment of the invention.

Recognizing that his computer 1 is in an undesirable state, the user activates the switch 13, step 300. FIG. 3 illustrates the switch-and-repair process according to one embodiment of the invention, and step 310 illustrates the actual switching. In response to the switch activation, step 300, the computer 1 repairs the software on the data store, step 320.

The repair process involves copying software from the template data store 14 to the data store 14. The software on the template data store 14 may be a master copy, a backup copy or an archive copy of software on the data store 12. (An archive is a copy of software, which copy cannot be overwritten or deleted.)

With template software on the template data store 14, the computer 1 may re-install or copy over software onto the data store 12. The computer 1 may overwrite all or part of any software on the data store 12.

The computer 1 may offer the user options as to how thorough its attempt to repair itself should be. In one embodiment, the computer 1 offers the options of a "Quick Repair," a "Better Repair," a "Best Repair" and a "Test." A Quick Repair may, for example, re-install or copy template software from the data store 14 onto the data store 12 without first re-formatting the data store 12. The Better Repair may perform a high-level re-format of the data store 12 before that copy or re-installation. A Best Repair may perform a low-level re-format of the data store 12 before copying over or re-installing software.

FIG. 4 illustrates the switch-and-repair process in more detail, according to one embodiment of the invention. The switching copies software from the template data store onto the data store, replacing the unusable software on the data store.

A number of situations occur where the computer 1 may effect repair without rebooting. For example, if only data files or application executables need to be repaired, then shutting down the operating system booted from the data store 12 is not usually necessary—especially in newer operating systems such as Windows 2000 (Microsoft) and more sophisticated operating systems such as Linux.

Further, a large number of operating-system files can be repaired (for example, by replacement) without shutting down the operating system. Repairing the operating system without rebooting is a preferred embodiment.

Still further, for backups (automated or otherwise), continuing to run from the data store already booted may be preferable. Where the computer 1 can become sufficiently quiescent that a backup from the data store 12 to the data store 14 can occur while still booted from the data store 12, then such a backup is quicker than shutting down and backing up the data store 12 while booted from the data store 14.

Where the data store 12 remains the boot drive when the data store 14 is simultaneously available, the data store 14 may be addressable as other than the boot drive. The address of the data store 14 may be switched similarly to the address switching of the data store 12.

A Virus and Hacker-Resistant Computer

Figure 6A:
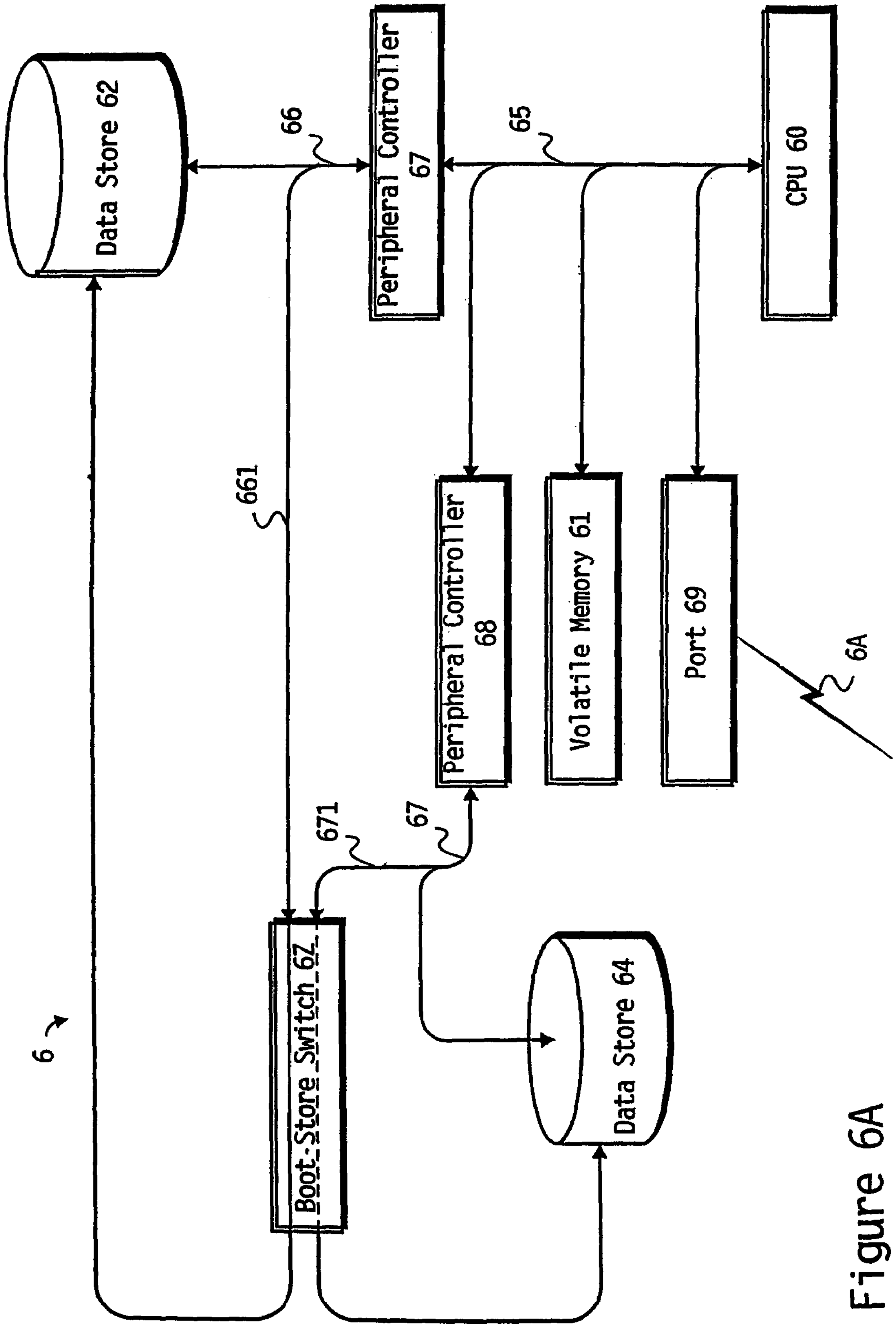
FIGS. 6A, 6B illustrate a computer incorporating an embodiment of the invention.

FIG. 6A illustrates a computer 6 incorporating an embodiment of the invention. The computer 6 may include a CPU 60, volatile memory 61, peripheral controllers 67, 68, first and second non-volatile data stores 62, 64, data port 69, communications link 6A and buses 65, 66, all well known in the art. The computer 6 may also include a data-store switch 6Z.

The bus 65 may communicatively couple the volatile memory 61, the peripheral controllers 67, 68 and the data port 69 to each other and to the CPU 60. The peripheral controllers 67, 68 may communicatively couple with the data stores 62, 64, respectively. The data port 69 may mediate access to the communications link 6A.

The bus 66 may communicatively and electrically couple the peripheral controller 67 to the data store 62 and to the boot-store switch 6Z. More specifically, the boot-store switch 6Z may switch the power line 661 of the bus 66, thus powering up or down the boot store 62.

Likewise, the bus 67 may communicatively and electrically couple the peripheral controller 68 to the data store 64 and to the boot-store switch 6Z. The boot-store switch 6Z may switch the power line 671 of the bus 66, powering up or down the boot store 64.

The port 69 may link the computer 6 to other devices such as a modems, networks, etc. as indicated by the communications link 6A.

The computer 6 may operate in two states: Connected and Disconnected. In the Disconnected state, the computer 6 does not use the data port 69 to communicate and the data-store switch may enable the data store 62.

By contrast, in the Connected state, the computer 6 may use the data port 69 to obtain data over the communications link 6A. In the Connected state, the switch may enable the second data store 64.

Thus, the computer 6 may enable only one of the multiple data stores 62, 64 at any given time, which depending on whether it is accessing the communications link 6A. This isolates data received over the communications link 6A to one of the data stores, namely, the data store 64. Where the data received was maliciously created (a virus or a hacking executable), this data is confined to the data store 64.

The switching of the data stores 62, 64 may be done under manual, hardware or software control. A mechanical throw switched by the user when the user wishes to access (or cease accessing) the communications link exemplifies a manual switch. A boot-store switch 6Z that responds programmatically to the CPU 60 illustrates a software-controlled switch.

For example, if the user boots an Internet browser and the communications link 6A is the Internet, then the CPU 60 may programmatically recognize the (intended) launch of a browser and initiate the switch of the data stores 62, 64. The switch may involve re-booting the computer 6 in order to make the second data store 64 the only data store available during the use of the communications link 6A. (A browser on the data store 64 may launch automatically on the boot from the data store 64.)

In one embodiment, the computer may synchronously switch the port 69 and the second boot store 64. This may improve the resistance of the computer 6 to hacking or infection.

FIG. 6A illustrates the enabling of the data store 62 in conjunction with the defeat of access to the communications link 6A. The solid line continuing the power line 661 through the boot-store switch 6Z illustrates the accessibility of the data store 62. Conversely, the dashed lined through the switch 6Z illustrates the inaccessibility of the data store 64.

Figure 6B:
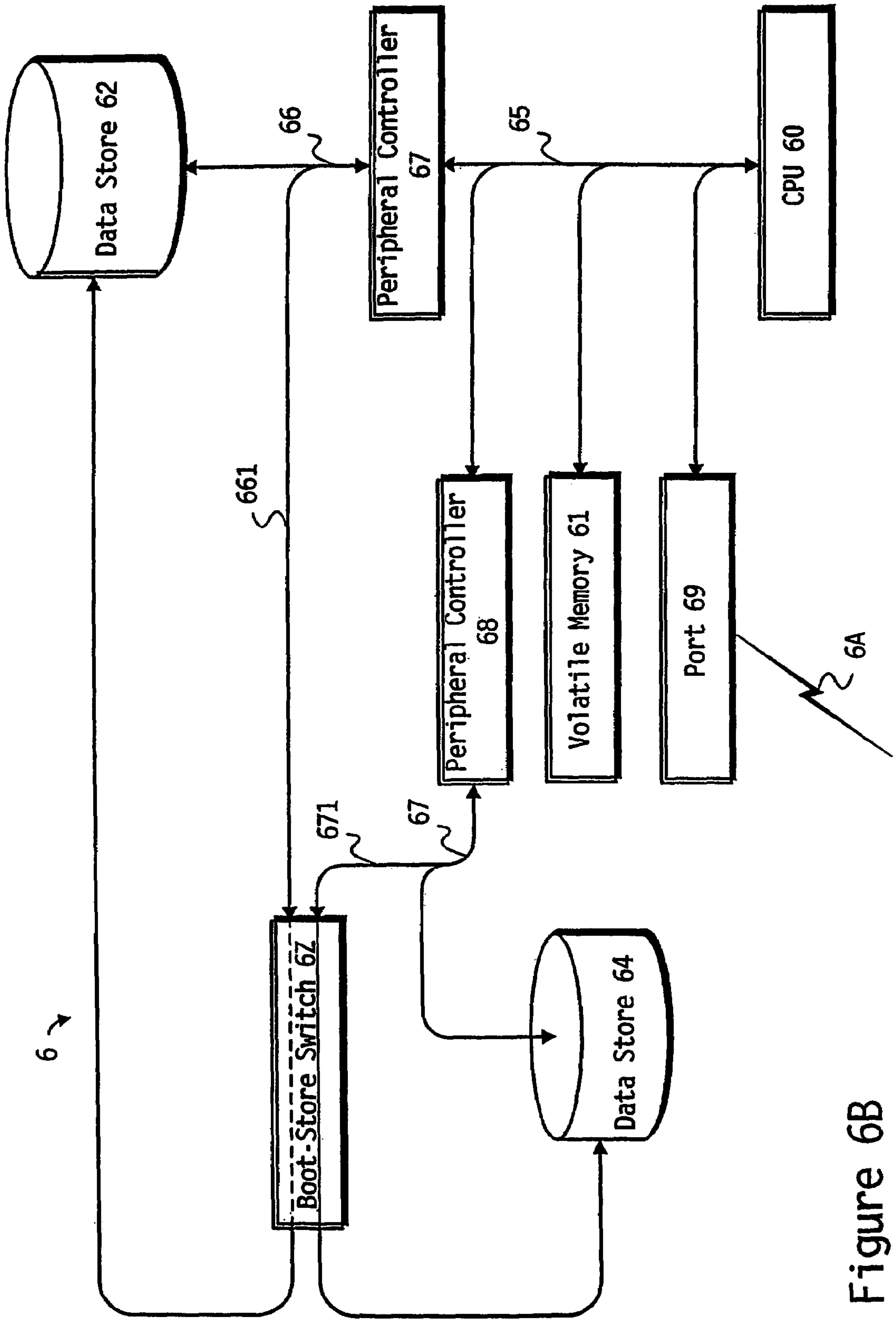

FIG. 6B illustrates the enabling of the data store 64 in order to support access to the communications link 6A. The solid power line through the boot-store switch 6Z illustrates the accessibility of the data store 64. Conversely, the dashed lined through the switch 6Z illustrates the inaccessibility of the data store 62.

The data store 64 may contain application software to process the data received over the link 6A. In such a setting the need to migrate the data on the data store 64 to the data store 62 may be minimal or non-existent.

Where, however, the application to process the data received over the link 6A and stored on the store 64 resides on the data store 62, then a process of migration is necessary. A predetermined time after receiving data over the link 6A, the computer may simultaneously enable the data stores 62, 64 and copy the data received to the data store 62 for processing there. The delay allows, for example, anti-virus software providers to produce and distribute security software addressing threats that have come to light since the time of receipt of the data.

The migration process may be manual or automatic.

A Lockable Network Computer

Figure 7A:
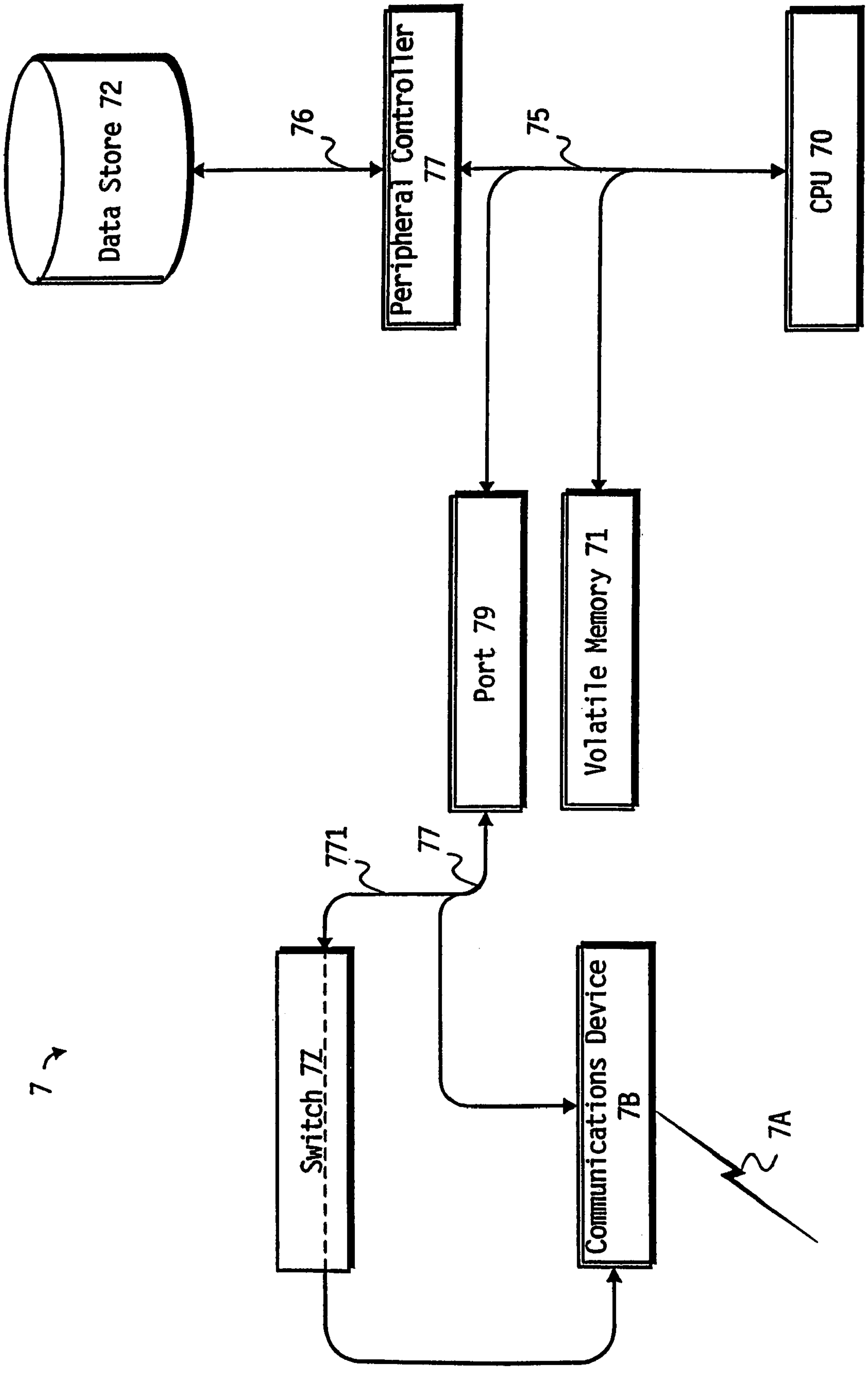
FIGS. 7A, 7B illustrate a computer incorporating an embodiment of the invention.

FIG. 7A illustrates a computer 7 incorporating an embodiment of the invention. The computer 7 may include a CPU 70, volatile memory 71, a peripheral controller 77, a non-volatile data store 72, a data port 79, a communications link 7A and buses 75, 77, all well known in the art. The computer 7 may also include a switch 7Z.

The bus 75 may communicatively couple the volatile memory 71, the peripheral controller 77 and the data port 79 to each other and to the CPU 70. The peripheral controller 77 may communicatively couple with the data store 72. The data port 79 may mediate access to the communications link 7A.

The bus 77 may communicatively or electrically couple the data port 79 to the communications device 7B.

The port 79 may link the computer 7 to other communicators through a communication device 7B and over a communications link 7A. Examples of the communications device 7B and link 7A include an acoustic modem 7B and a POTS telephone line 7A; a tap 7B and an ethernet 7A; and a wireless modem 7B and radiation-permeable space 7A.

The switch 7Z may switch a power line 771 of the bus 77, thus powering up or down the communications device 7B. The switch 7Z may switch (tri-state, for example) a data line 771 of the bus 77, thus interrupting or enabling the ability of the communications device 7B to transfer data to the data port 79.

Figure 7B:
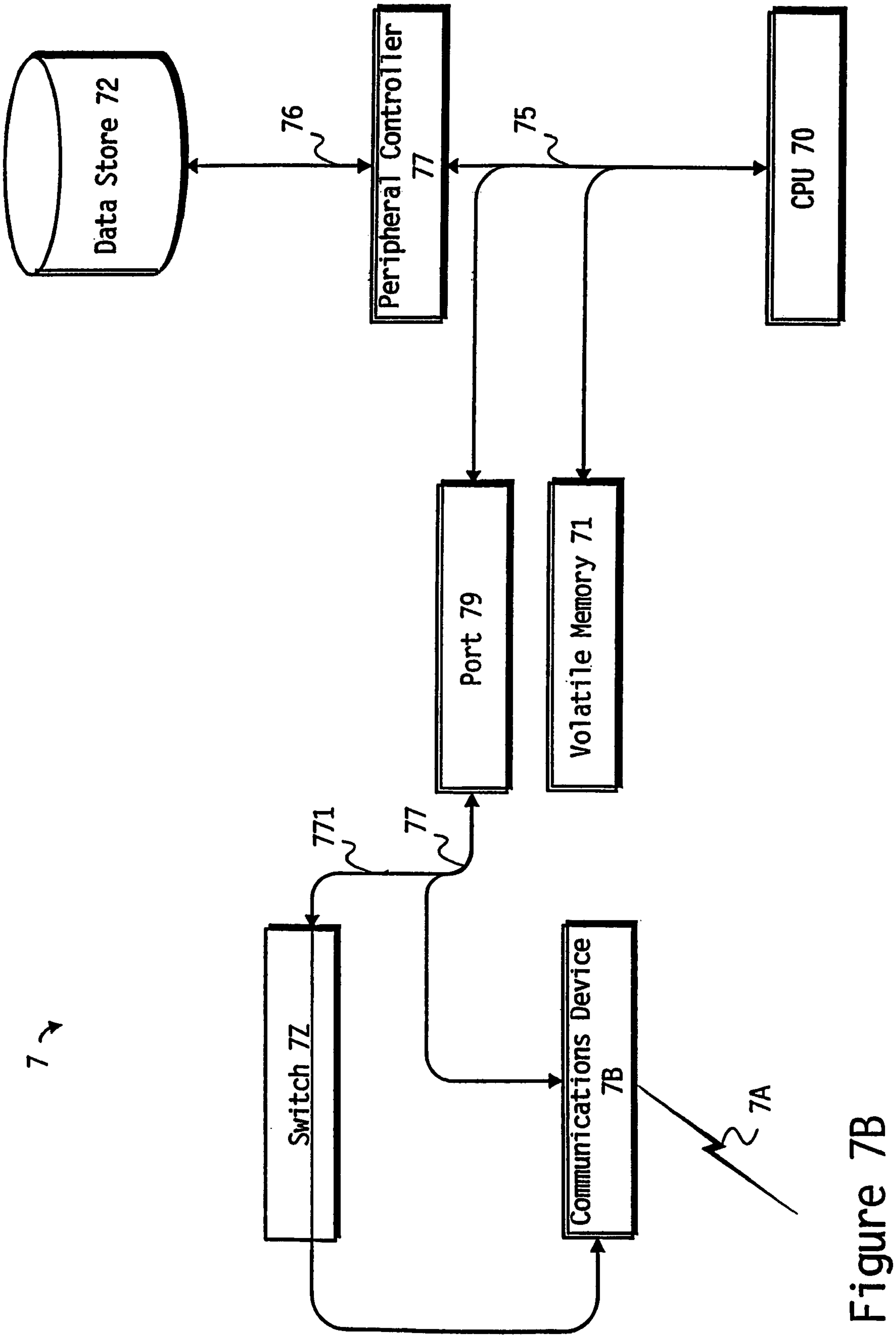

The computer 7 may operate in two states: Network Connected and Network Disconnected. FIG. 7A illustrates the computer 7 in its Network Disconnected state, while FIG. 7B illustrates the computer 7 in its Network Connected state. (The solid line continuing the power line 761 through the switch 7Z illustrates the continuity of the power or data line 771, and dashed lined through the switch 7Z illustrates the discontinuity of that line 771.

In the Network Disconnected state, the switch 7Z may disconnect the communications device 7B from communicating on the data port 79. Accordingly, none of the software running on the computer 7 may access the communications link 7A.

By contrast, in the Network Connected state, the switch 7Z may enable the communications device 7B to communicate on the data port 79. Accordingly, software on the computer 7 may access the communications link 7A.

An exemplary use for the computer 7 is where a parent uses the computer 7 to access, say, his employer's computer network via a virtual private network (VPN) over the Internet 7A. The parent also wants his child to be able to use the computer 7 for school or recreation—but without access to the Internet 7A. The parent thus switches the computer 7 into the Network Enabled state when he (the parent) wants to use it, and switches the computer 7 into the Network Disconnected state when the child is to use the computer 7.

The switching of the data stores 72, 74 may be done under manual, hardware or software control. A mechanical switch thrown by the user when the user wishes to access (or cease accessing) the communications link 7A exemplifies a manual switch. A mechanical switch that may be locked with a key, for example, is preferable.

A switch 7Z that responds programmatically to the CPU 70 illustrates a software-controlled switch 7Z. (The CPU 70 may respond to any kind of input, including keystrokes, voice commands, biometric data and data received over a network.) A hardware switch 7Z may be considered as an analog computer.

A computer 7 running an operating system that supports hot swapping offers an advantage. The addition and removal of the communications device 7B from the computer 7 may confuse OSs that do not permit hot swapping of peripherals.

A Multi-Data Store Server

Figure 8:
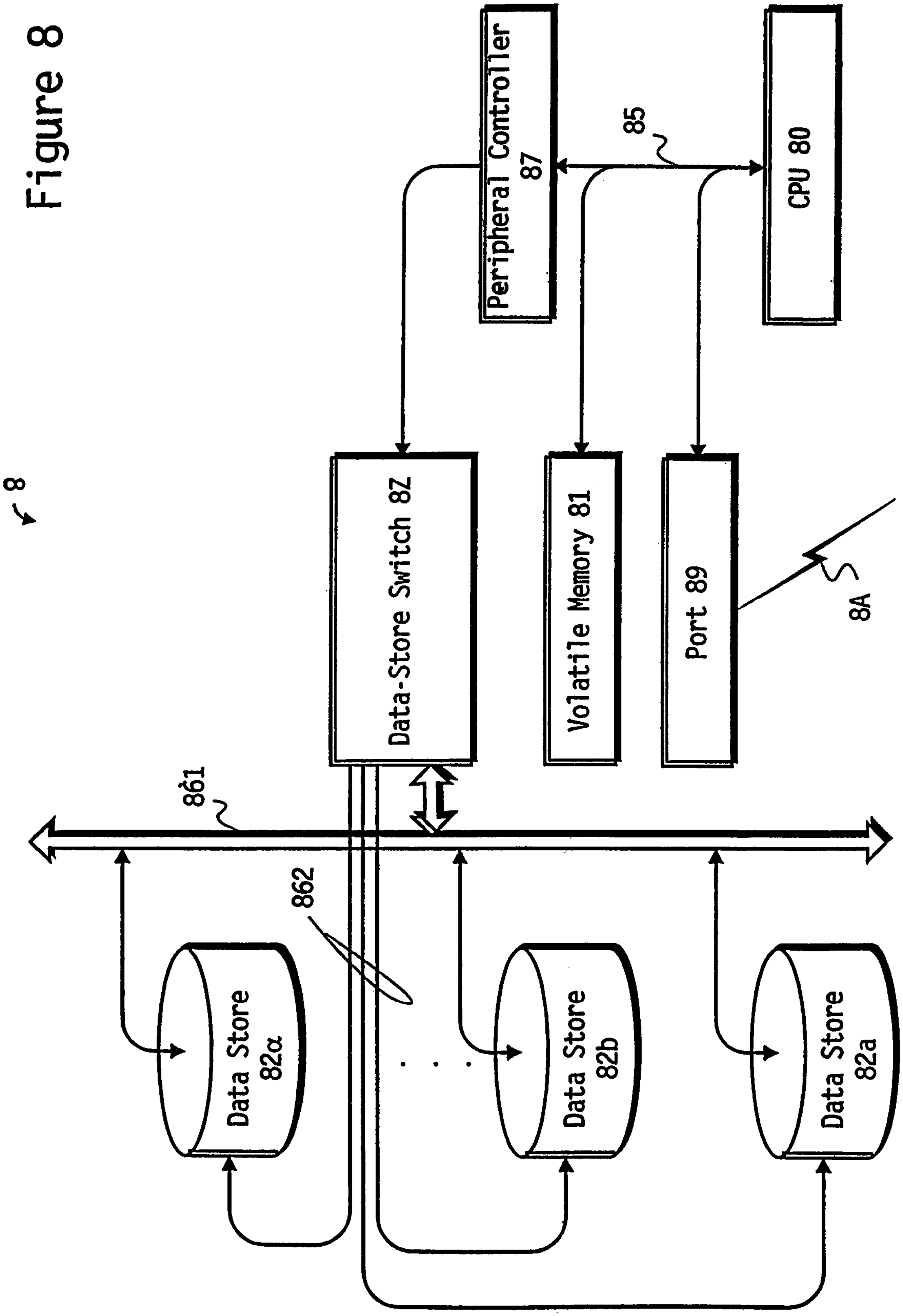
FIG. 8 illustrates a computer incorporating an embodiment of the invention.

FIG. 8 illustrates a computer 8 incorporating an embodiment of the invention. The computer 8 may include a CPU 80, volatile memory 81, a peripheral controller 87, multiple non-volatile data stores 82$a$, 82$b$, . . . 82$\alpha$, a data port 89, a communications link 8A and a bus 85, all well known in the art. The computer 8 may also include a data-store switch 8Z and a bus 86 consisting of the buses 861 or 862.

The bus 85 may communicatively couple the volatile memory 81, the peripheral controller 87 and the data port 89 to each other and to the CPU 80. The data port 89 may mediate access to the communications link 8A.

The peripheral controller 87 may communicatively couple with the data-store switch 8Z. The data-store switch 8Z in turn may communicatively or electrically couple to the data stores 82. The bus 861 may communicatively couple the data path of the switch 8Z to those of the data stores 82, and the bus 862 may electrically couple a power supply in or through the switch 8Z to the data stores 82.

The data port 89 may mediate access to the communications link 6A. The port 89 links the computer 8 to other communicators over the communications link 7A.

The computer 8 may operate in any of N states, where N is the number of data stores 82. In a first state, the data-store switch 8Z enables the first data store 82$a$ to communicate with the peripheral controller 87. In the second state, the switch 8Z enables the second data store 82$b$ to communicate with the peripheral controller 87, and in the Nth state, the switch 8Z enables the Nth data store 82$a$ to communicate with the peripheral controller 87.

The corruption or other failure of the data store 82 currently communicating with the controller 87 prompts the switching from one state to another, and thus from the failed data store to another, working data store 82. (The failed data store 82 may then be repaired in place, or it may be removed and repaired, removed and replaced, or removed permanently.)

Where, for example, the computer 9 is a web server and the communications link 8A is the Internet, the multiple data stores 82 may provide resistance against infection and hacking by malicious users of the Internet 8A. If the hackers succeed in corrupting the data store currently attached to the peripheral controller, then a switching may occur from that corrupted data store 82 to another correct data store 82. This switching may occur very quickly (preferably as quickly as possible) in order to minimize the loss of access to the data on the data stores 82.

The switching may be manual, hardware or programmatic. For example, a diagnosis program may execute periodically to determine the health of the currently accessible data store 82.

A Computer with Peripherals that can be Cycled

Figure 9A:
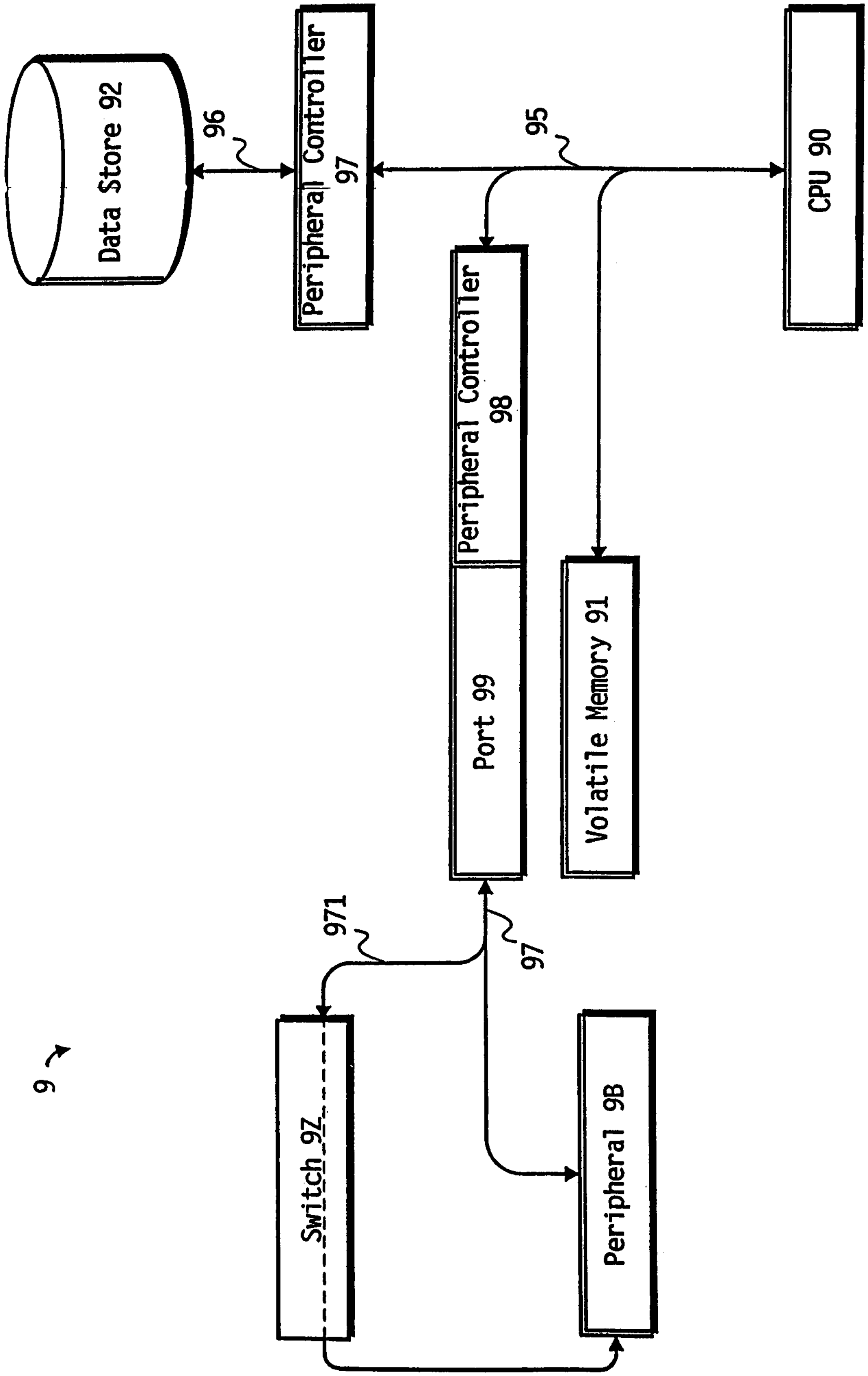
FIGS. 9A, 9B illustrate a computer incorporating embodiments of the invention.

FIG. 9A illustrates a computer 9 incorporating an embodiment of the invention. The computer 9 may include a CPU 90, volatile memory 91, a controllers 97, 98, a non-volatile data store 92, a port 99, a peripheral 9B and buses 95, 97, all well known in the art. The computer 9 may also include a switch 9Z.

The bus 95 may communicatively couple the volatile memory 91, the controllers 97, 98 to each other and to the CPU 90. The controller 97 may communicate with the data store 92. The controller 98 may communicate with the peripheral 9B.

The bus 97 may communicatively or electrically couple the port 99 (and thus the controller 98) to the peripheral 9B.

The peripheral 9B may be any computer peripheral. Examples include printers, USB devices, scanners, fax machines, data stores and keyboards.

The switch 9Z may switch a power line 971 of the bus 97, thus powering up or down the peripheral 9B. The switch 9Z may switch one or more data lines 972 of the bus 97, thus disabling or enabling the peripheral 9B to transfer data to the port 99.

A user of the computer 9 may be using the peripheral 9B, transmitting or receiving data on the from the device 9B as expected. The switch 9Z is supplying power to the peripheral 9B.

At some point, the computer 9 becomes unable to communicate with the peripheral 9B. This may be caused by an error in the software or hardware of the computer 9, including software or logic of the peripheral 9B.

The user attempts to revive communications with the peripheral 9B. The user may. for example, cycle the power to the peripheral 9B. Thus, the user changes the state of the switch 9Z such that the switch 9Z goes from powering to the peripheral 9B, to not powering that peripheral 9B, to again powering that peripheral 9B. This switching may be done manually, in hardware, or programmatically.

The cycling of the peripheral 9B may resolve the communication problem that the user was experiencing. For example, where the problem was with the software or logic of the peripheral 9B, then the power cycling may clear the software or logic state of the peripheral 9B. Where the problem was with the software or logic of the computer 1, cycling the power may clear the software or logic state f the controller 97 or applications running in the memory 91.

Figure 9B:
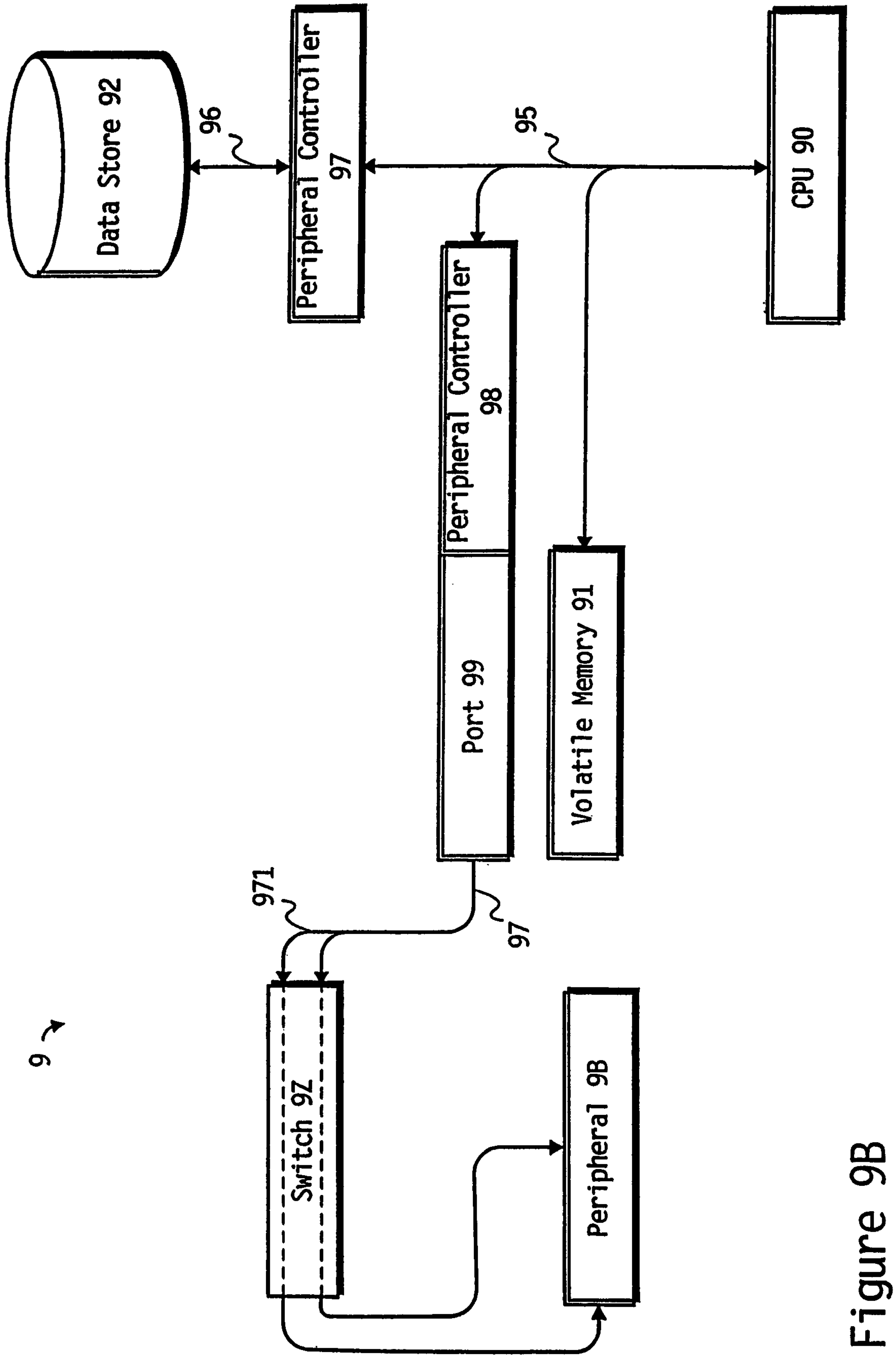

FIG. 9B illustrates an alternate embodiment of the computer 9. The switch 9Z switches both power and data lines.

A Multi-User Computer

Figure 5:
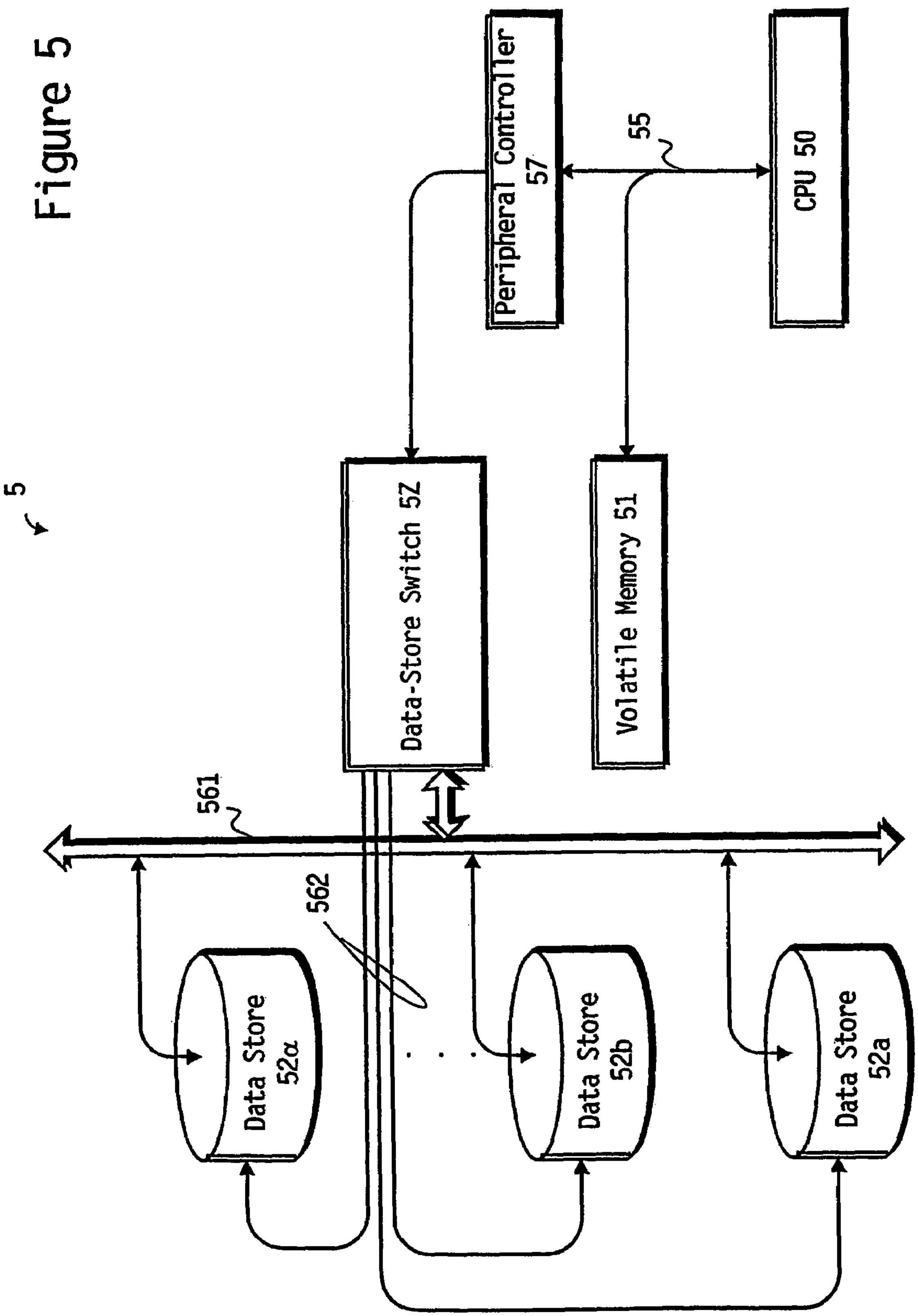
FIG. 5 illustrates a computer incorporating an embodiment of the invention.

FIG. 5 illustrates a computer 5 incorporating an embodiment of the invention. The computer 5 may include a CPU 50, volatile memory 51, a peripheral controller 57, multiple non-volatile data stores 52*a*, 52*b*, . . . 52α and a bus 55, all well known in the art. The computer 5 may also include a data-store switch 5Z and a bus 56 consisting of the buses 561 or 562.

The bus 55 may communicatively couple the volatile memory 51, the peripheral controller 57 and the data port 59 to each other and to the CPU 50.

The peripheral controller 57 may communicative with the data-store switch 5Z. The data-store switch 5Z in turn may communicatively or electrically couple with the data stores 52. The bus 561 may communicatively couple the data path of the switch 5Z to those of the data stores 52, and the bus 562 may electrically couple a power supply in or through the switch 5Z to the data stores 52.

The computer 5 may operate in any of N states, where N is the number of data stores 52. In a first state, the data-store switch 5Z enables the first data store 52*a* to communicate with the peripheral controller 57. In the second state, the switch 5Z enables the second data store 52*b* to communicate with the peripheral controller 57, and in the Nth state, the switch 5Z enables the Nth data store 52*a* to communicate with the peripheral controller 57. Only one data store 52 may access the peripheral controller 57 at any given time.

In one embodiment, the computer 5 has only one controller with multiple devices. In another embodiment, the computer 5' has multiple controllers, each with respective multiple peripherals. The switching then switches among the multiple peripherals of the first controller, the multiple peripherals of the second controller, etc. (The multiple controllers need not have the same number of multiple peripherals.)

Each data store 52 may contain self-contained software for a respective user or group of users. Each data store 52 may contain a bootable operating system, and optionally such application or data files as the user(s) corresponding to the data store 52 may require or desire.

Each user or group of users may use only a predetermined one (or more) of the data stores 52. Thus, before using the computer 5, a user sets the switch 5Z to the predetermined position enabling the data store 52 corresponding to that user to communicate via the controller 57.

In this way, a first user's data is separated from a second user's data on the same computer. The computer 5 more effectively separates users' data by enforcing security at a physical level rather than at the logical (software-enforced) level typical of multi-user operating systems.

In this scenario, re-booting between switches is desirable. Re-booting clears out the memory 51 in the switch from one user to another. Also desirable is a multi-key, multi-position lock. Any one key may turn the lock to any one predetermined position, enabling one corresponding data store 52.

The invention now being fully described, one of ordinary skill in the art will readily recognize many changes and modifications that can be made thereto without departing from the spirit of the appended claims. For example, in addition to switching software, data stores or other peripherals as described above, a computer may also switch properly functioning hardware for malfunctioning hardware. Indeed, in a computer with multiple mother boards, a switch may switch the functioning components of a computer from one board to another.

Also, while the description above usually uses data stores as the devices to switch, one of skill in the art will readily now realize that other computer components may be switched, including logic boards, ROM and controllers.

Under certain circumstances, danger or damage may follow from switching when power is supplied. Accordingly, a switch may be deactivated when such danger or damage may result. Logic such as the controller 1A may prevent dangerous or damaging switching by tracking power states, device identities, etc. and permitting switching, for example, when no electrical current is flowing to the devices to be switched.

Preferably, the switch is located in an easy-to-reach location. This contrasts with the typical location of USB, keyboard and other ports, for example.

On-the-Fly Repair of a Computer

The following invention provides an apparatus and method of supporting the backup and recovery of a computing device. The computing device will typically include both a user computing environment and a supporting environment which enhances the stability and functionality of the user computer environment.

Processes

In one embodiment, a plurality of computing processes may be utilized to enable the On-the-Fly invention. Here, individual computing processes may monitor, track, predict the stability, backup, restore, or recover attributes within the user computing environment. The attributes may be software specific, data specific, operating system specific, or any combination. Utilization of the plurality of computing processes can facilitate the normal operation of the user computing environment. In one embodiment the user computing environment may be stabilized without user intervention such as requiring the user to shut-down, restart, logging off, logging on, or terminating applications. In one embodiment the supporting environment may have a capability interacting with the user computing environment. In one embodiment the supporting environment may be capable of initiating or causing the user computing environment to shutdown, restart, logging off, logging on, or terminating applications.

Different Computing Systems

In one embodiment the user computing environment and the supporting environment function in different computing systems. The two computing systems may reside in a common box. The user computing system may consist of data storage devices, RAM, processor, video card, and other attributes known in the art to facilitate a computing system. The supporting computing system may consist of a master template data storage device, RAM, processor, and other attributes known in the art to facilitate a computing system. In one embodiment, the data storage devices may be linked as needed to perform repairs. Such as, the need to copy data from the support environment to the user environment.

Snap-Shot of Data

In one embodiment, the present invention takes a snapshot of the user computing environment. This snap-shot may subsequently be utilized to restore, analyze, or enhance the stability of the user environment. The snap-shot may include a stable image of the operating system, software applications, or user data. The snap-shot may contain an idealized or stable version of a disk drive utilized by the user environment, or a subset of the disk drive such as an individual partition. The snap-shot may also include an idealized version or image of the user system RAM, user system disk drive, user system partition image, memory of the video card, or any other memory stored or utilized in the user computing environment. These snapshots may be stored in the associated support environment data storage device Monitoring The supporting environment may monitor the user environment. The monitoring may include monitoring of processes running or enabled within the user environment. The monitoring may include monitoring both the utilization of the data storage device, data contained on the data storage device, and other aspect necessary for the normal operation of the user environment. This monitoring may facilitate identifying undesired changes, potential problems and also potential solutions. The supporting system may detect a freeze or other undesirable change within the user environment.

Recovery

When an undesirable change is detected in the user environment, the supporting environment may attempt to recover or restore or repair the user environment. The supporting system may be capable of re-enabling the user environment in a number of ways, such as resetting the keyboard in the event the keyboard locks the communication of keystrokes to the user environment. Further recovery of the user environment may be supported by reset connections such as describe by "Freezebuster", reset and clear devices as needed, replace defective software components as needed, and/or switch hardware components and/or devices as needed. The supporting environment and or supporting system may copy all or part of the data from one or more of the idealized snapshots mentioned above. These snapshots may be copied into their respective devices and/or locations.

Application Configuration

Another embodiment supports an ability to run two or more different programs at the same time on one computing system where the data and applications may be isolated from one another but may share output and/or input devices. In one embodiment, the applications may be isolated by executing the applications in a separate address space. The applications and data may be further isolated by utilizing two separated data storage devices. In order to safely send a command from one isolated data storage device to the other isolated data storage device the following may be utilized. In one embodiment, when an icon on the desktop icon is clicked the following may occur. The icon may execute a command that would launch a specific application on the other isolated data storage device. This may be accomplished by a shared ASIC that sends the command to the other isolated data storage device.

Another embodiment involves isolation of data with merged display. In this embodiment two user environments can be separated for the purposed of isolating data. For the AntiHacker System: A hard drive that does not contain "sensitive" data could be isolated and attached to a network. A second hard drive, may or may not be attached to the other hard drive (in any way), could be utilized for "sensitive" user data, but have no exposure to the network because it is "isolated" by a means of switching. The video signals associated with the data coming from these two hard drives could then be "merged" onto the same screen. In other words, all of the computing would be happening within isolated "secure zones" within a single computer but would not appear so to the user. Another example: the anti-virus system could use this method to isolate potentially infectious data.

Application Output

Applications may have its output displayed on the same screen alongside and/or superimposed upon the same screen with other applications and data that were being "computed" separately. Both computing processes may be separated but may then be "merged" together on the screen, and/or overlaid one another on the same screen. In one embodiment, this may be achieved by using multiple video cards. This concept can be applied for example to the Repair System, Multi User, Anti-Hacker, anti-theft and Anti-Virus.

In another embodiment both the user computing environment and the supporting environment will reside on a single computer system. A snap-shot of the operational user environment will be taken. The snap-shot will be associated with the supporting environment. Processes associated with the supporting environment will monitor the activities and status of the user computing environment. The monitoring function will become aware of any degraded performance of the user computing environment, such as a system freeze up. The monitoring function notifies the supporting environment of any degraded performance. The supporting environment will perform any recovery action as necessary to recover or restore the user environment. Recovery may include utilizing the snap-shot to recover or restore the user environment. An entire user disk may be restored. A specific application or software package may be restored, or particular files.

External Repair of a Computer

The invention may back up or recover a computing device. The computing device may include a user computing environment and a supporting environment which stabilizes the functionality of the user computing environment. The invention may include one or more external devices or removable media.

Master Template

A master template may be a copy of data that represents an ideal state of a computer system or component of a computer system. The master template may be created by copying data from an operational computer system or component of a computer system. The computer system may be in an ideal state before creating a master template. An ideal state of a computer system may be represented by data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, the master template for one computer system may include all of the information installed on that computer system, such as Windows 98 operating system, WordPerfect application, documents created by the user. The information may be installed across multiple hard drives accessible to the computer system. Additionally, the master template may include a copy or an ideal-state version of the BIOS settings.

A master template may represent a snapshot of a newly purchased computer system. The system is typically in an ideal state with an operating system and various applications pre-installed, thereby allowing a user to begin utilizing the computer system. For a particular user, the master template may represent an ideal state of a computer system, including, for example, an operating system, applications, and user customizations. A user customization may include the users prior selection of a picture or ".jpg" image for a desktop background, such as a picture of the users pet.

Optionally, the master template may be created from a first computer system and subsequently may be used as a master template for a different computer system. An ideal state of the first computer is thereby transferred to a second computer system or any number of computer systems.

Backups

A backup is a copy of data that represents an information on a computer system or component of a computer system. The backup may be created by copying data from an operational computer system or component of a computer system. A backup of a computer system may include data that is accessible to the computer system. Data, within this context, may include an operating system (e.g., Linux, Unix, Windows 98), applications (e.g., WordPerfect, Microsoft Office), user data (e.g., operating system preferences, background images, created documents), and component data (e.g., BIOS, PRAM, EPROM). Data may also include any information accessible to the computer system, including local and remote data storage devices.

As an example, a backup for one computer system may include all of the information installed on that computer system, such as Windows 98 operating system, WordPerfect application, documents created by the user. The information may be installed across multiple hard drives accessible to the computer system. Additionally, the backup may include a copy or an ideal-state version of the BIOS settings.

An archive is a backup which typically may not be erased.

Data Storage Device

A data storage device includes memory devices, which are accessible to a computer system. A computer system is capable of accessing or storing data in a variety of memory devices. Memory device may include hard drives, RAM, ROM, EPROM, or BIOS. Memory devices store data (e.g., data or programs). User data is typically stored on disk drives, but may potentially be stored on any memory device. Typically, a computer system utilizes a variety of memory devices. For example, an operating system, applications and user data may be stored on a hard drive, a BIOS program may be stored in ROM, and BIOS data may be stored in a protected memory.

DSD

A "DSD" refers to a "data storage device."

Methods of External Attachment

Data Storage Device (DSD) may be an external device. A variety of protocols currently exist for utilizing external devices. Some of the more prevalent protocols include TCP/IP, USB, USB 2, Firewire, IEEE 1394, PS/2, parallel, serial, PCMCIA, SCSI. Other protocols and method of connecting external devices to a computer system will be apparent to one skilled in the art. As an example, a SCSI hard disk and SCSI CDROM are memory devices that may be attached to a computer system. The computer system may then read or write to the external device.

Repair Process:

An automated process may repair a data storage device of a computer system. The repair process may include multiple programs. The automated process may be triggered by a particular event or a set of events. The repair process may be specific to a particular data storage device such as the primary boot partition of a hard drive. The repair process may encompass a variety of functions which may be modified, added, of skipped based on the type of repair or user preferences. The user may modify user preferences.

In one embodiment, the repair process represents a sequence of functions. Typically a Master Template is either provided to the user or created by the user. Backups are created intermittently. The computer system becomes unstable and repair becomes necessary. The user may activate the repair process or the repair process may recognize the instability or problems with the system and activate the repair process.

Prior to repair, a Master Template typically exists for the computer system. The Master Template may have been created in a number of different ways. Several ways of creating one or more Master Templates for this computer system include: shipped with a new computer, created with the installation of software (e.g., software to support this process), created by a user-activated program, periodically created of a Master Template by a program.

Backups typically exist for a computer system. A backup may include user data and programs which have been stored on a data storage device accessible to the computer system. For example, documents may have been created or modified by a user. These documents may be stored as a backup. The user may have installed additional programs that may be stored in a backup.

During a backup process data is copied from a data storage device of the computer system to the backup data storage device(s). Any data that is accessible to the computer system may be backed up. The backup may be compressed. Compression may reduce the amount of storage space required to hold the backup. Incremental backups may also be used. Incremental backups may reduce the time required to perform a backup and reduce the storage space required to store them. Backups may be stored as archives.

Repair Process is Activated and (Optionally may be Confirmed):

The repair process may include a number of functions. The repair process may be initiated by a user, administrator, repair software, or repair hardware. The user may specifically initiate the process (e.g., double clicking on an icon of a graphical operating system). An administrator may initiate the process by communicating with the computer system over an internet connection such as TCP/IP. Repair software may initiate the process by utilizing a boot diskette or a separate boot partition on the hard drive. Repair hardware may initiate the process by sensing a frozen state of the operating system or hard disk, and subsequently initiating the repair process. Alternatively, the user may press a hardware switch which initiates a process to shutdown the machine, switch boot disks, and the subsequent startup may initiate the continuation of the repair process.

The repair process may be configured to allow the user to confirm the repair process in a number of scenarios. For example, before a DSD is reformatted the user may be requested to confirm the operation. The user may be allowed to halt the repair process.

The repair process may utilize a Master Template, Backup, Archive, various commands associated with an operating system, switching, and other programs, for repairing a computer system. For example, the repair process may format and partition a hard disk using an MS-DOS command, then copy a Master Template to the primary boot partition of the hard drive, then copy the latest Backup or Archive, then mark the primary boot partition as the active partition.

Any number of backups or archives may be used to restore the user DSD(s).

Command associated with an operating system may be used to reset or update DSD of the computer system. A DSD (e.g., PRAM, BIOS, or CMOS) may be updated through the use of commands associated with an operating system. Typically, MS-DOS commands may be used to download, save, reset, reset to the default, or update a BIOS version. For example, one step in the repair process may include booting into an MS-DOS partition, executing MS-DOS commands to update the BIOS of the computer system, then change the boot device and reboot the computer system to continue the repair process if necessary. Alternatively, the DSD (e.g., BIOS) may be set to a previously saved state. The previously saved state may be included as part of the Master Template, Backup, or an Archive.

The repair process may also be capable of managing DSDs. Managing DSDs may include testing, reformatting, analyzing, resetting, or determining bad blocks. Alternatively, the repair process may interact with other programs to provide management functionality of all or some DSDs. For example, the repair process may rely on operating system commands to format a DSD (e.g., a hard drive), but interact with a program to interact with another DSD (e.g., BIOS, PRAM).

The repair process may evaluate the present state of the computer system. As part of the analysis the repair process may determine or recommend a type of repair. For example, if the DSD (e.g., hard disk) is not responding then reformatting may be recommended. If only several files appear to be corrupted then the repair process may determine only those files need to be copied from a Master Template or a backup. Some or all of the data from a master template may be copied on to the DSD(s). Alternatively, the repair process may copy the entire master template to the DSD(s).

The repair process may perform a similar evaluation regarding how much of a backup needs to be copied. Some or all of the data from a backup may be copied on to the DSD(s). Alternatively, the repair process may copy the entire master template to the DSD(s).

Rebooting the computer system may be integrated into the repair process. Switching between boot devices may be integrated into the repair process. The repair process may switch the boot disk from hard disk 1 to hard disk 2. Power may be cycled such that hard disk 2 boots up as the active partition. A default program may be executed as part of the boot sequence to perform part of the repair process. Subsequently, the repair process may alter the hard disk 1, switch hard disk 1 to the active partition, and then reboot or cycle the power to initiate the booting of hard disk 1.

Some Exemplary Embodiments of External Device Embodiments

The repair process may be initiated or managed by an externally located device that may be communicative coupled to the computing device through, e.g., USB, Firewire, parallel, serial, PS/2, PCMCIA, or infrared. The external device may be the boot device.

An external boot device may be connected to the computer system with the boot device activating the repair process. The repair program may reside on the boot device or a second data storage device. The second data storage device may also be communicatively coupled to the computer system. The second data storage device may contain master templates, backups, or archives. The second data storage device may also contain the repair program or other programs which facilitate the repair process.

For example, an internal SCSI device "id 0" may be the default boot device. The repair process may switch the power to the SCSI device "id 0" OFF. The repair process may switch the power to an external SCSI device "id 0" ON. The repair process reboot the computer system by actuating a reset command (e.g., a mechanical device, a logic circuit). When the computer system reboots, the external SCSI device may be the boot device. The repair process may then continue as directed by part of the repair process on the external SCSI hard drive.

The repair process may include switching the device id's of a primary and secondary SCSI disk. In this second example, the internal SCSI drive may be "id 0" and the external SCSI drive may be "id 5". The repair process may change the internal SCSI device to "id 5" and the external SCSI device to "id 0". Switching of the SCSI device id's may be performed by the repair process (e.g., a mechanical device or a logic circuit, activated by the repair process).

In another embodiment, the BIOS may be modified to enable booting from an external device. The boot device may also be switched by updating the BIOS. Typically the BIOS defines the boot sequence. If the first boot device is not found, then an alternate boot device may be defined in the BIOS (e.g., the boot-device sequence is CDROM, A:, C:). The BIOS may be downloaded, modified, and restored. The BIOS may be updated (e.g., in place, via download-modification-upload) to change the boot identifier of a USB device, an IDE device, or other devices. The repair process may download a copy of the BIOS in a variety of ways. One example, includes booting into an MS-DOS mode, executing a program to save the current BIOS to a file. The BIOS file may be saved into a master template, backup or archive. Alternatively, the BIOS file may be modified by the repair process to change the boot sequence. If the BIOS file is updated then it must be loaded into the computer system to take effect. Effectively the boot sequence may be changed to another DSD, such as a second hard drive. The external SCSI disk with a specific "id" may become the "boot device". Another option involves storing multiple copies of the BIOS file, each having a different boot sequence, uploading the appropriate BIOS file may allow booting from a particular boot device (e.g., IDE hard drive partition 1, SCSI device "id 0", USB disk, Jaz drive, etc.). An external device may be the boot device and start or continue the repair process.

In another embodiment, a secondary boot device may be attached as an external Data Storage Device to a computer system (e.g., connect to a parallel port). This secondary boot device may activate or manage the repair process. The secondary boot device may contain programs to conduct processes such as reformatting another data storage device (e.g., internal or external hard drive), copying data from a Master Template, copying data from a backup or archive.

A program on the secondary boot device, or accessible to the secondary boot device, may be activated to create a master template, backup, or archive of and data accessible by the computer system (e.g., the user's main drive).

A program on the secondary boot device, or accessible to the secondary boot device, may be activated to repair a data storage device on the computer system (e.g., the user's main drive that needs to be repaired). In this scenario, the Master Template, Backup, or archive Data Storage Device(s) may be attached externally via USB, firewire, etc. The program may actively search for Master Templates, Backups, or archive DSD(s) and present the user with a list of options for restoring the computer system. Alternatively, the repair process may determine and select the best restore options and continue the repair process.

In another embodiment the repair process may be initiated by insertion of a floppy, cd, dvd, or use any other form of removable storage/memory or startup device, and rebooting the computer system. The removable storage/memory or startup device may boot if the BIOS boot sequence contains a sequence in which the boot order enables a removable media to act as the boot device. Booting from the removable media may trigger or activate an automated repair process (e.g., a program located on the removable media or an external device). Booting from the removable media may activate a mechanical device or program logic to initiate the repair process (e.g., switch hard disk device id's and initiate a reboot sequence to boot from another device to continue the repair process).

In another embodiment, a repair program or part of the repair process may be placed in a StorExecute, microcontroller, ASIC, etc. The repair program may activate a repair process. The repair program may include managing the repair process. Functions which may be performed include reformatting data storage device(s), switching between boot devices, switching electrical components within the computer system or external components, copying data to/from data storage device(s), (e.g., copying master templates, backups, etc, or any portion to another data storage device), and other repair functions. The repair process, may also be located, integrated, or embedded in an external device. A switch trigger that activates the repair process may also be located, integrated, or embedded in an external device.

In one embodiment, the startup device may be selected by a StoreExecute. Alternatively, a device identity may be assigned by a StoreExecute. The necessity to perform switching through the use of jumpers is thereby reduced. For example if a repair process is triggered, a StoreExecute may assign device identities to data storage devices or may decide which data storage device shall be used for the repair process, and which data storage device shall be used for boot data storage device if rebooting is utilized in the repair process.

In one embodiment during "on-the-fly" repairs, an external data storage device may be utilized for such things as the Master Template or backups, or for software used for the repair process.

In this embodiment, an external data storage device ("DSD") is attached to a typical personal computer that contains an internal data storage device. The internal DSD may be referred to as the "main user" data storage device. An external DSD may be attached via any available external connection.

Example of External Data Storage Device ("DSD") for Repairing a Computer:

In this example, a user attaches an external data storage device ("DSD") to a computer with any available external connection (e.g., Firewire, USB, SCSI, etc.). An external connection may include USB, USB 2, Firewire, IEEE 1394, PS/2, parallel, serial, PCMCIA, SCSI, and other protocols and method of communicating with an external device.

The user installs software on "main user" DSD that initiates a program to create a master template, and schedules Backups to execute every Friday morning. The master template is created by the program and stored on the external data storage device. Every Friday morning the repair process runs and stores a backup of additional information to the external data storage device.

A micro-controller and EPROM may be attached to the computer to perform part of the repair process. Attachment may be via any available external connection. The micro-controller and EPROM may be integrated into the external data storage device.

A switch trigger may be attached to the computer. Attachment may be via any available external connection. The switch trigger may be integrated into the external data storage device.

As another example, the main user data storage device is accidentally erased or damaged and that the computer system will not boot. The user decides to repair computer and initiates the repair process by activating a switch trigger, which initiates the following process:

The micro-controller may interrogate the BIOS of the computer system to determine its current boot up sequence. EPROM may store instructions for how to accomplish this.

The micro-controller may determine that it is necessary to alter the boot sequence so that the externally attached data storage device will become the boot device. The micro-controller and associated EPROM may flash the BIOS in order to accomplish this. The micro-controller may then send a command to computer to reboot the computer. When the computer reboots, it will reboot from the external data storage device.

Following the boot up, programs which are located on the external data storage device may execute the repair process as defined herein.

Backup of a Computer

The invention may backup, maintain backups, or recover data associated with a computing system. The computing system may include any number of components including hardware and software, and any memory accessible to the computing system. The computing system may focus on a user computing system and potentially the supporting environment which stabilizes the functionality of the user computing system (e.g., operating system, BIOS, etc.). Typically data associated with the computing system is identified by a variety of characteristics, the data is stored as a backup, and subsequently data within the backup may be restored or used to evaluate an existing computing system.

Backups

Data has a number of characteristics, typically including availability for use in a computing system. Data may include one of more of any of the following: operating systems, application, user data, data residing in the computing system (e.g., hard disk, hard disk partition, RAM, ROM, BIOS, CMOS, EPROM, electronic serial numbers, etc.), applications residing in the computing system (e.g., sample listed above), and backups created or accessible. The term data may be used to describe a specific aspect of information for association with a backup process. A backup process may include identifying data and the characteristics of data, for backup, management, or restoration. Data may also refer to a backup or set of backups. By default the data to backup may represent all data on a given disk drive, a given disk partition, or a memory.

Characteristics of the data may include an indication of what data is part of the backup, how to access the data, where to backup the data, frequency of the backup, and type of backup. These characteristics may be used to define or identify specific data associated with a backup process. Specific implementations may vary according to what characteristics are associated with the backup process.

What data to include is limited by the accessibility of the data to the computing system. Specific data for inclusion in a backup may be predetermined or determined as part of the backup process. Predetermined identification of data to include in a given backup may be provided by a hardware or software manufacturer, or a user (e.g., system administrator). Predetermined set of data may provide an initial indication of what data to backup. An operating system may, for example, include a list of files and or directories associated with operating system functionality. Here the operating system may provide a predetermined list of files or associated data representing the operating system or identifying specific data to backup (e.g., list of uses, user preferences, passwords, windows registry file).

A hardware system may, for example, include a memory address range (e.g., RAM, ROM, EPROM, BIOS, etc.) that represents data that may be useful to backup for that system. The hardware system may also identify other data within the computing system that may be useful in the backup process (e.g., applications to extract or update a BIOS). Typically, the data identified is useful in the backup process, such as understanding the operation of the computing system or restoring data in the event of a failure or corrupted data. Data identified for backup may also have a variety of uses including cleaning up the computing system which may have limited disk space (e.g., verify the necessity of data in a current computing system) and restoring identified data.

Alternatively, what data to include in a given backup may be determined subsequent to the delivery of a computing system to a user. Data may be determined with installation of hardware or software, or during the normal course of utilizing the computing system. A determination may be made with the installation of hardware or software. The installation process may be actively engaged in identifying what data would be useful to the backup process. The installation process may interact with the backup process or tools to identify program files and data specific to a given installation. The location of user file may also be helpful to the backup process. The contents of a user directory may be marked by the backup process for inclusion in a periodic backup. Accessing data by an application may also be integrated into the backup process. One example includes added functionality, such that saving data (e.g., a files) by the application includes an indication to the backup process to backup that specific data. The installed application may add the saved user file to a list of files that should be include in a subsequent backup. If multiple users access the same computing system, the file to be included in a backup may include an ownership indication.

Data to include may be identified according to directories or specific files. For example, data to include may be identified by file type, file location, directory tree, of memory device. A selective backup may backup only data associated with a specific system component such as a disk drive or data storage device.

How to access the data may be an important characteristic of the backup. An important consideration may be required for accessing, storing, formatting, modifying, restoring, and updating data of the various components associated with a computing system. Not all data is readily accessible according to a well known process of accessing a hard drive. As described above, data may include any data accessible to the computing system. Typically, a piece of data is uniquely accessible according to a predefined process. The process for accessing information from a disk drive is readily appreciated by novice users.

For example, accessing BIOS data for backup may involve booting into a particular operating system (e.g., DOS 5.x), running a hardware-specific program which may verify the hardware compatibility, executing a second hardware-specific program which may copy the data (e.g., BIOS data) to a floppy disk. Updating the BIOS in the example may involve running another program to flash the BIOS. Both the old and new versions of the BIOS, and associated applications can be stored as data in a backup. Consequently, a restoration of the old BIOS can be incorporated into the backup process. Similarly, other data accessible to the computing system may be incorporated in to the backup process by analyzing the existing processes for managing data for specific components within the computing system.

Where a backup is stored may be predetermined or determined as part of the backup process. A manufacturer of the hardware or software may provide an initial predetermined backup storage area or an indication of another device where the backup is to be stored. An operating system may access a second data storage device such as a disk drive, a second partition, or a pre-allocated file (e.g., similar to a swap file). Backup data may be stored to this initial location. A Hardware system may, for example, include a second memory or an address range of a memory (e.g., RAM, ROM, EPROM, BIOS, etc.) that represents the default backup location. Optionally, the backup location may be another storage device within the computing system or accessible to the computing system (e.g., across an Ethernet, firewire, USB, etc.).

Frequency of the backup can be based on any of a number of factors associated with the data and computing system including: volatility of data, volatility of the computing system, importance, upgrade schedule, user projects, personal comfort level, past experience with similar environments, degree of user participation, etc. Backups can be scheduled at particular times and intervals based on these factors. Backups may be initiated by the hardware, software, or a user. Similarly, other activities on the backup process, such as maintenance and restoration, may be performed based on a given frequency.

Type of Backup

A variety of backup types may be supported. The types may include at least one of the following: full backup, selective backup, partial backup, master template, data modified since a prior backup, or based in part on a comparison with a prior backup (e.g., a prior backup, or a listing of the contents of a prior backup). The type of backup may be defined for all data included in the backup, or part of the data associated with the backup process. For example, a backup may include an operating system wherein only files associated with the operating system and files modified since a prior backup are included in a specific backup. The specific backup may further include a user data directory identified for backup.

Data Represented in a Backup

Data represented in a backup may be identified by the various characteristics described above. Typically, data represented in a backup supports a backup process, such as a possible restoration of the data for use in a computing system. The backup or the various data contained in the backup may be a compressed or encrypted. Specific data in the backup may be an exact duplicate or enough information that the data may be recreated, corrected, or verified. For example, file differences may be included in a backup, thereby allowing a set of backups to be utilized to recreate or correct a file or data. How to access the data may also be represented in a backup for certain types of data (e.g., BIOS) and not represented in a backup for other types of data (e.g., "c:\my docs*.docs").

Data to be included in a given backup may identify by hardware, software, user, or other characteristic of the computing system. A computer manufacturer may create an initial backup of a standard installation, which may include various forms of data associated with a computing system. The manufacturer sells the computing system to a user and may provide a master template as a backup that represents the manufacturers initial computing system configuration. This saves the manufacturer time and money, and gives the user peace of mind. Subsequently the user may install additional software and thereafter create a partial backup of the changes to the computing system. A comparison may be performed between the master template and data associated with the current computing system. Difference between the two can be identified as the data for backup. Here, data that has been changed, added, or deleted, in comparison to data associated with a master template may be identified for backup. Consequently, the master template and a subsequent backup may be used, according to this example, to restore the computing system to the level of functionality associated with the subsequent backups. A variety of scenarios will be apparent to one skilled in the art.

Repair Process

Restoring

Data represented in a backup is typically restored to a computing system. Restoration may include the selection of at least one of the following: specific backup, group of backups, specific data contained within a backup, and a master template. The restoration may initially determine the difference between the current computing system and a prior backup. Characteristic associated with the identified data may be used in the backup process (e.g., restoration process associated with BIOS which may have been included in a backup.).

The selection of a master template, for example, may return the computing system to an idealized state as defined by the master template. A master template and other data may be identified to restore the computing system to a state associated with the last backup in combination with the identified master template (e.g., master template represent the state as purchased, and the identified backup represents the state after a user installed several applications). Alternatively, a master template may represent an upgrade to the computing system. This upgrade may be combined with other user backup to enhance the functionality of the computing system and maintain existing user data.

Selecting Data

Data associated with the backup may be identified similarly to the selection of data for inclusion in the backup, as described above. This information may also be utilized to determine what data or aspects of the data to restore (e.g., specific users files).

Data matching a certain file type, file location, data storage device, device, component, description, date, wild card matching, etc. may be identified for restoration. The selection may be performed by the hardware, software, user, or any component in the computing system. In the event of an operating system failure it may be more appropriate to allow hardware or software select data to restore.

Restoration location for data may be specified by a user, hardware, software, default, original location of the data, temporary location, an alternate location (e.g., for further analysis), or by any component of the computing system. For example, a user may elect to restore data with wild cards such as "*.doc" and "*.txt" from all backups. The "*.doc"

files will be placed in a user-specified or default file location (e.g., "c:\documents folder\doc\"), and "*.txt" files will be placed in a user specified file location (e.g., "c:\documents folder\txt\"). Alternatively, the data (e.g., files in this example) may be restored to their original location which may be identified in the backup.

Preferences

Preferences may be associated with the backup process, and may include preferences of hardware, software, users or other components of a computing system. Preference may be defined as a set of default values associated with the computing system, hardware, software, or particular users. Configuration information and characteristics may be defined as preferences for each component of the computing system. A preference associated with a BIOS may include a process or program for accessing the BIOS in a specific manner, such as booting to DOS 5.x, executing a specific program to extract the BIOS. Preference may be changed by hardware, software, or users.

The preferences can be used to define data characteristics (including backups), restore characteristics, and manage data. Preferences may limit the interaction required with users during the backup process (e.g., selecting data or restoring data). A new user may establish preferences to limit interaction with a backup process. A seasoned veteran may establish preferences to provide a more robust control of the backup process or aspects of the backup process.

For example, the specific characteristics of how the backup process interacts with updating a BIOS may be of a greater interest to an experienced user rather than a novice. In another example, user preferences may dictate the interaction between the user and the restore. By default, the restoration process my provide the user with a push button restore, such that the computing system will control the entire restoration process. Alternative, the user may modify the preference such that a user response is required before specific aspects of the backup process are performed (e.g., format hard drive, or flash the BIOS).

Software may also have preferences, which may identify data associated with the software, when installed, serial number, and possibly an indication of the best way to backup, manage, and restore the software. Preferably, preference associated with hardware and software would minimize interaction required a by user in the process.

Initiating Restoration

The hardware, software, or user may initiate and may manage the repair process. Data matching a restoration criteria may be restored. Criteria for restoration may be base on the data stored in the backup (e.g., frequency, master template, compression, encryption, etc.). Further criteria for restoration may be based in part on the type of backup or current status of the computing system (e.g., functional, hard disk failure, BIOS failure, OS non-responsive, etc.) The current status may be determined in part through the utilization of hardware and software to monitor the health of the computing system. For example, hardware or software can monitor the computing system for any indication of a keyboard "freeze", and activate part of the backup process to return the computing system to a normal operating state. Utilization of hardware and software can be used to maintain the health of the computing system. Maintaining the health of a computing system may include determining backup process characteristics which may be based on user preferences. The frequency of backup may be a way to help ensure the computing system's health.

For example, an alternate boot sequence may be initially established in the BIOS such that the computing system initially attempts to boot from a primary disk drive and subsequently to a second drive. The second drive may contain software designed to boot the machine and evaluate the present condition of the computing system. Once the necessity of any repairs have been determined, the software may proceed to correct the malfunctions and return the computing system to a normal operating state. The software may then reboot the computing system to the normal operating state, thereby minimizing user involvement in the repair process.

Removing Data

During a restoration, process data may be removed including: deleted, moved, renamed, or altered. The method of removal may be specified as part of the data characteristics. The restoration process may require the computing system to reflect the data contained in a backup, and therefore necessitate the removal of some data. For example, in restoring data representative of an operating system, a preference may provide that existing inconsistent files may represent the culprits behind a malfunction predicating the restore process. Removing this additional data (files in this example) may be warranted. Removing extraneous data may be performed in a number of ways based in part on the type of restoration, preferences, characteristics of the backup or data, and the goals of the backup process (e.g., minimal user involvement). For example, if the goal is to restore the master template, then as part of a comparative restoration all data determined to be different from the master template may be removed to a specified data storage device or memory such as a default folder.

Restore Specific Data

The hardware, software, or user of a computer system may request the restoration of data. To facilitate the restoration of specific data a user may perform a restore based in part on: file type, creation date, user identification, modification data, backup date, or any characteristics of the data. For example, a completed restore may include a default folder that contains all data from the last backup which differs from data currently available for access to the computing system or some subset of all of the data (e.g., specified according to preferences). Alternatively, the folder may contain all data which differs when comparing two backups, such as the last backup and a master template. Data conforming to the users request may be sorted into different directories to provide the user with an indication of the information contained therein, such as "This is probably your stuff 2/25/03", "Is any of this your stuff? 2/25/03", and "Probably not your stuff2/25/03".

Managing Restored Data

Preferences may also control what happens to restored data. Data restored may be available to the user or the computing system for a limited duration, to reduce the amount of memory utilized by the computing system. For example a user definable preference may indicate that a dialog warning that the folders named "Is any of this your stuff?2/25/03" and "Probably not your stuff2/25/03" will be automatically deleted in 10 days and if the user desires data from those folders the data should be moved prior to the expiration date. Optionally, a preference may provide that after 10 days the contents specific folders may be moved to a temporary "trash" folder with a new expiration date of 30 days.

Placement of Restored Data

Placement of data may be defined in part by the data characteristics stored with the backup or data, the characteristics associated with the backup process, and the preferences. Data, such as user data, may be returned to an original location, and other data may be placed in a different location. For example, user data located on the desktop may be returned to where it was, whereas user data located in the system folder may be returned to its original location depending in part on preferences. Alternatively, user data may be deposited in a default or indicated location such as a "documents" folder, a "Your Stuff is In Here" folder, a "proposed trash" folder, a "trash" folder, or other custom locations.

Master Templates

A master template is a backup of data, representing a computing system according to an ideal state. The ideal state typically includes an operating system, a collection of applications or software. The data included in the master template may have been specifically chosen for a particular user and for a particular hardware configuration.

A master template may be created or updated according to a variety of approaches. One approaches involving a data storage device may include: 1. Creating several backups of data on a data storage device over time; 2. An activity associated with the backup process, such as a repair process is triggered; 3. A backup of user data files is performed (e.g., to save the users current work); 4. Existing data storage device (e.g., memory) may be reformatted or tested, and may be performed according to preferences for that data storage device; 5. The master template is copied to the user data storage device; 6. Backup of user data files is restored to the user data storage device. The computing system is thereby restored to a normal operating state with minimal user intervention.

The master template may also be updated, changed, or modified in a variety of ways including: by the user, by access to an update (e.g., an incremental release by a computer manufacture), or by access to a replacement master template, etc. The preferences associated with a master template may provide a method for performing these modification.

The master template may be tested to ensure the master template and the repair process functions as expected in the backup process, such as restoring the computing system This testing helps ensure the functionality of the master template, the restore process, and may also be used as a virus check and repair. An on-line service may be provided to detect virus, verify the integrity, or to update a master template.

Restoring

A backup may be tested to verify its integrity (e.g., with a checksum and verifying readability). If the backup is tested and fails, the user may change the preferences. The user may restart the repair process, select different preferences (e.g., applications or software), upgrade the backup (e.g., master template), and retest the backup. If the backup passes the verification tests, the user may accept the backup and continue with the restore. When a backup (e.g., master template) is accepted it can be copied from its storage location to a second backup (e.g., the new master template). The old master template(s) can be saved so that it is possible to revert back to prior master templates. After the user template is "accepted", the backup user data is returned to the user data storage device.

In one embodiment, a master template can be created by the user selecting to "boot into" a master template. The user may then make changes, install new software, make modifications, etc., and then exit. This approach allows the master template to be updated independently of user's documents and other data which may not be a beneficial to a master template.

In a different embodiment, the master template may be modified/updated by the user first conducting a repair of computing system. The repair process may automate 1. The backup of user files according to preferences, potentially including particular file types (e.g., documents); 2. the reformat of the user's primary disk drive or the restoring of the master template to the user's primary disk drive. The user may then install new software to an essential copy of the master template as present on the user's primary disk drive. A backup may subsequently be activated to generate a new master template version. A backup of the user's data (e.g., user specific documents) may then be restored to the computing system. Preferably, restoring the user specific documents is performed automatically.

The master template may be created by a process of selective copying. For example, depending on the particular OS in use, a program may interrogate the registry, determine what entries are associated with a particular program or application, and then choose to selectively copy only those files and entries associated with the particular program or application to the master template.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

Attached is a 209-page Appendix which is a part of this specification. The Appendix includes the following documents:

"Description of Self-Repairing System" (Text, 5 pages; Drawings, 4 Pages; Code, 5 Pages)

"Backup and/or Repair System—Multi-User System" (Text, 43 Pages)

Diagrams (Text, 18 Pages)

Table of Which Diagrams Go With Which Embodiments (Text, 1 Page)

Figures, S Series (Drawings, 20 Pages)

Figures, F Series (Drawings, 38 Pages)

Figures, W Series (Drawings, 32 Pages)

Figures, M Series (Drawings, 5 Pages)

Figures, E Series (Drawings, 17 Pages)

Figures, L Series (Drawings, 21 Pages)

APPENDIX

Description of Self-Repairing System:

When power is applied to the system, the micro controller powers up, initializes the LCD prompt screen and the "Ready for Normal Operation" prompt is displayed. At this point the micro controller waits until the single pole single throw switch (S1) is pressed. When S1 is pressed the micro controller prompts the user "Repair Selected".

The position of the slider switch S2 is now stored in memory. Then based on the switch's initial location the user is instructed to slide the switch opposite its initial position to confirm the repair request: "Please slide switch from A->B" or "Please slide switch from B->A".

At this point or any other time (except when a "Repair in Progress"), the user can cancel the repair request by pressing the pushbutton switch, at which point the dialog "Repair Cancelled" is displayed. The system will then return to "Ready for Normal Operation" mode.

If the user wishes to confirm the repair, and moves the slide switch as instructed, the computer will check the power status of the computer. The micro controller reads the logic level of opto-isolator U4. Logic high represents the computer being powered. If the computer is on, the user will be prompted to "Please Shutdown the Computer". The computer then again reads in the logic level of U4.

If the computer has been shut down U4 will output a logic low. After the controller confirms that the computer is off the user is then prompted to restart the computer At this point solid-state relay U3 and opto-isolator U2 are enabled. This ensures that when the computer is restarted the Master hard drive receives power as IDE ID0 and the internal user drive boots with its ID switched to Address 1 (ID1).

When the computer is restarted, U4 outputs logic high to the micro controller. This signal denotes that the computer is powered and prompts the "Repair in Progress" message, which is displayed on the LCD screen. Once the repair process is enabled the micro controller displays this message and executes no other commands until the computer is shutdown (U4 outputs a logic low signal).

When the computer is shutdown by the repair software, the micro controller informs the user that the process is complete with the "Repair Complete" dialog.

The micro controller then enters the "Ready for Normal Operation" mode and waits for a new repair process.

Hardware description:

The microcontroller at the heart of the system is a Basic Stamp II micro controller which controls the repair progress, LCD user interface and also supplies a 5 volt regulated power supply for all the devices in the circuit.

The optional LCD screen is a 2X16 character LCD based on the industry standard Hitachi HD44780 controller chip.

The solid-state relay, which switches power to the master hard drive, is an International Rectifier PVN012. Any switching device could be used to switch hard drive power.

The other opto-isolators are NEC 2501.

The batteries are quantity 2 – 3 volt 1200ma Lithium batteries connected in series for a 6 volt output. This powers a voltage regulator on the Micro controller, which supplies 5 volts to the rest of the circuit. Any power supply from 5.1 volts to 15 volts can be used.

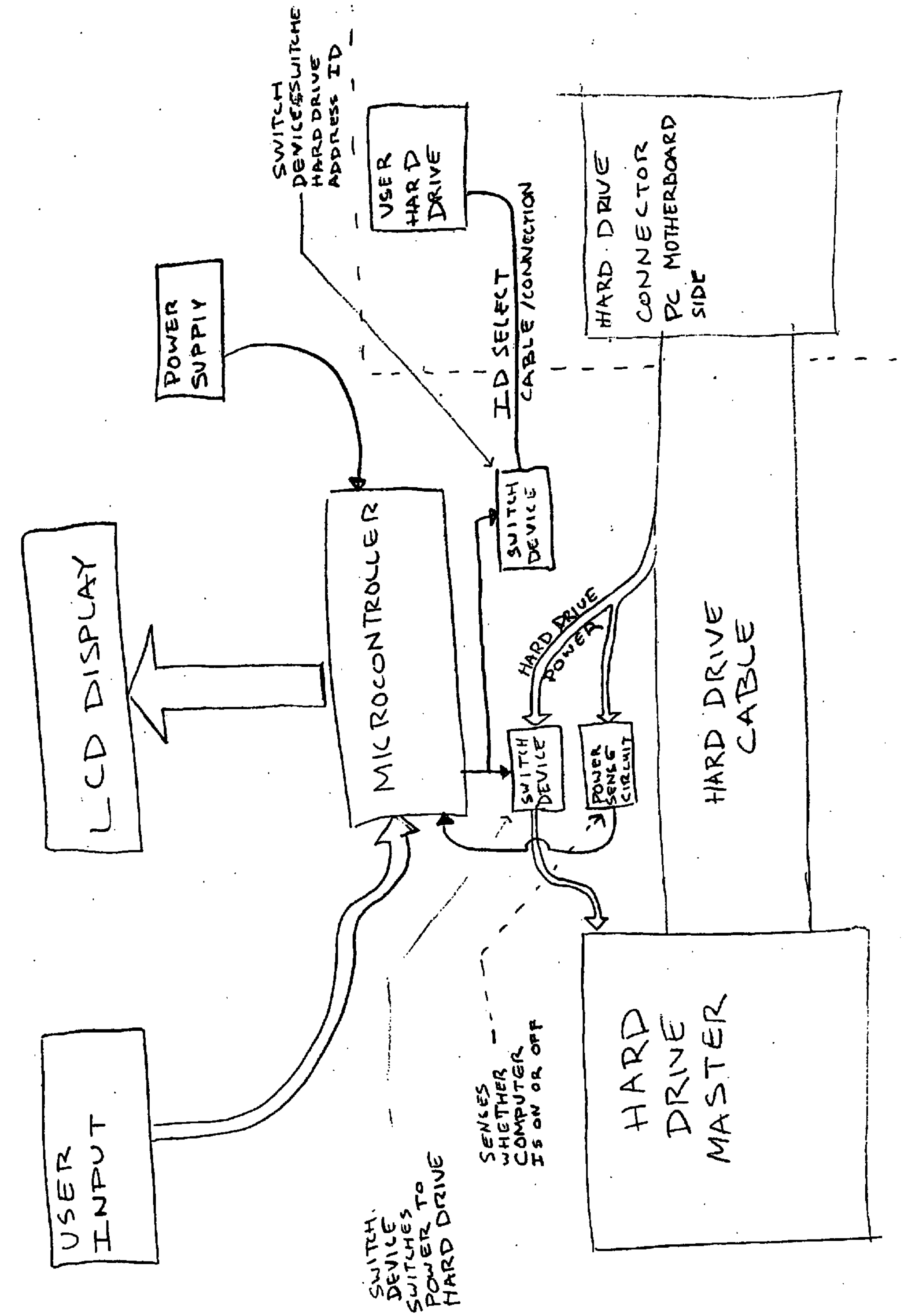
LCD DISPLAY
MICROCONTROLLER
USER INPUT
POWER SUPPIY
SWITCH DEVICE
SWITCH DEVICE
POWER SENSE CIRCUIT
HARD DRIVE POWER
USER HARD DRIVE
ID SELECT CABLE /CONNECTION
SWITCH DEVICE$SWITCHE HARD DRIVE ADDRESS ID
HARD DRIVE CONNECTOR PC MOTHERBOARD SIDE
HARD DRIVE CABLE
HARD DRIVE MASTER
SENSES WHETHER COMPUTER IS ON OR OFF
SWITCH DEVICE SWITCHES POWER TO HARD DRIVE

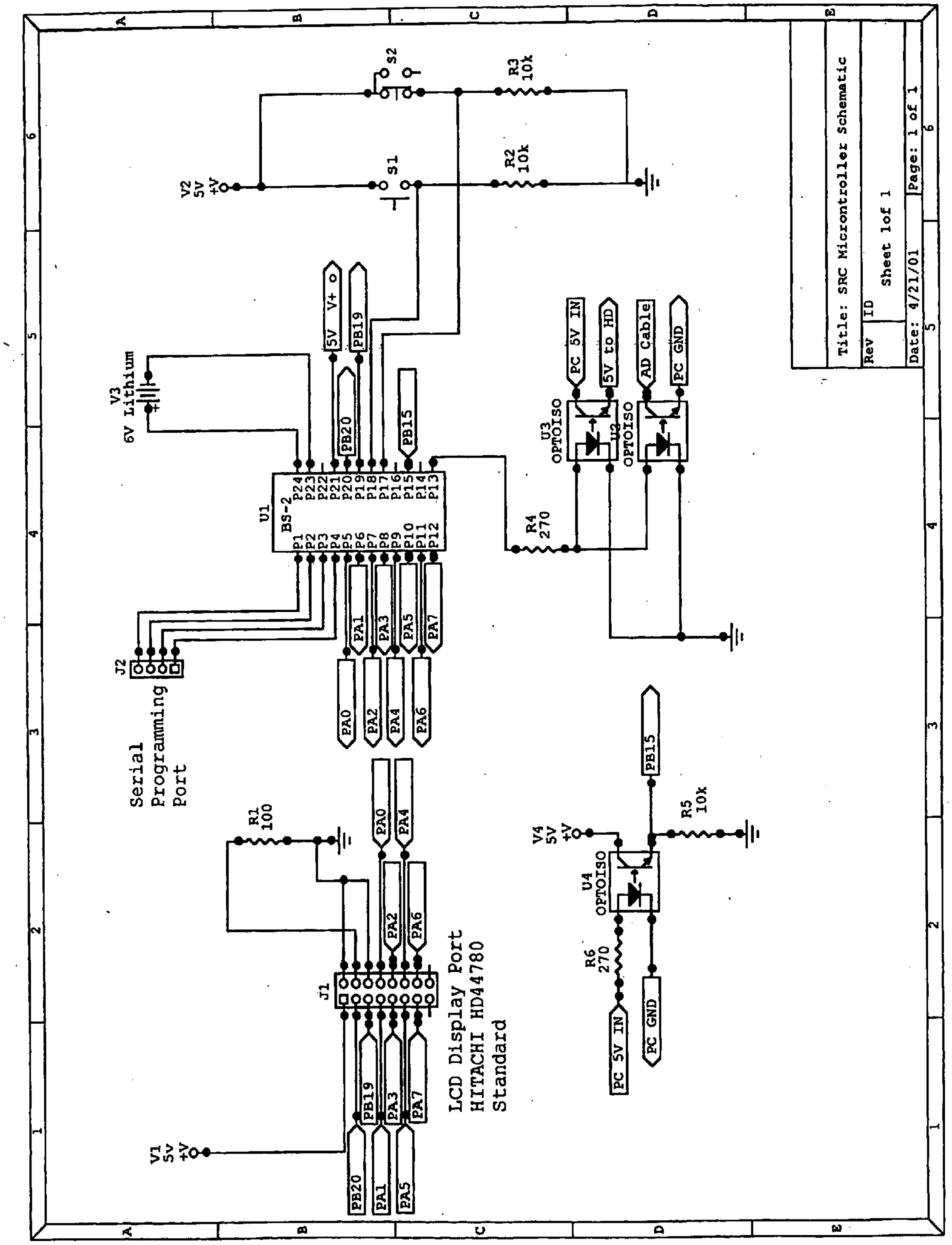
Title: SRC Microntroller Schematic
Rev
ID
Sheet 1of 1
Date: 4/21/01
Page: 1 of 1
V2
5V
+V
S1
S2
R2
10k
R3
10k
V3
6V Lithium
U1
BS-2
5V V+
PB19
PB20
PB15
U3
OPTOISO
U2
OPTOISO
PC 5V IN
5V to HD
AD Cable
PC GND
R4
270
J2
Serial
Programming
Port
PA0
PA1
PA2
PA3
PA4
PA5
PA6
PA7
R1
100
J1
LCD Display Port
HITACHI HD44780
Standard
V1
5v
+V
V4
5V
+V
U4
OPTOISO
R5
10k
R6
270
PC 5V IN
PC GND

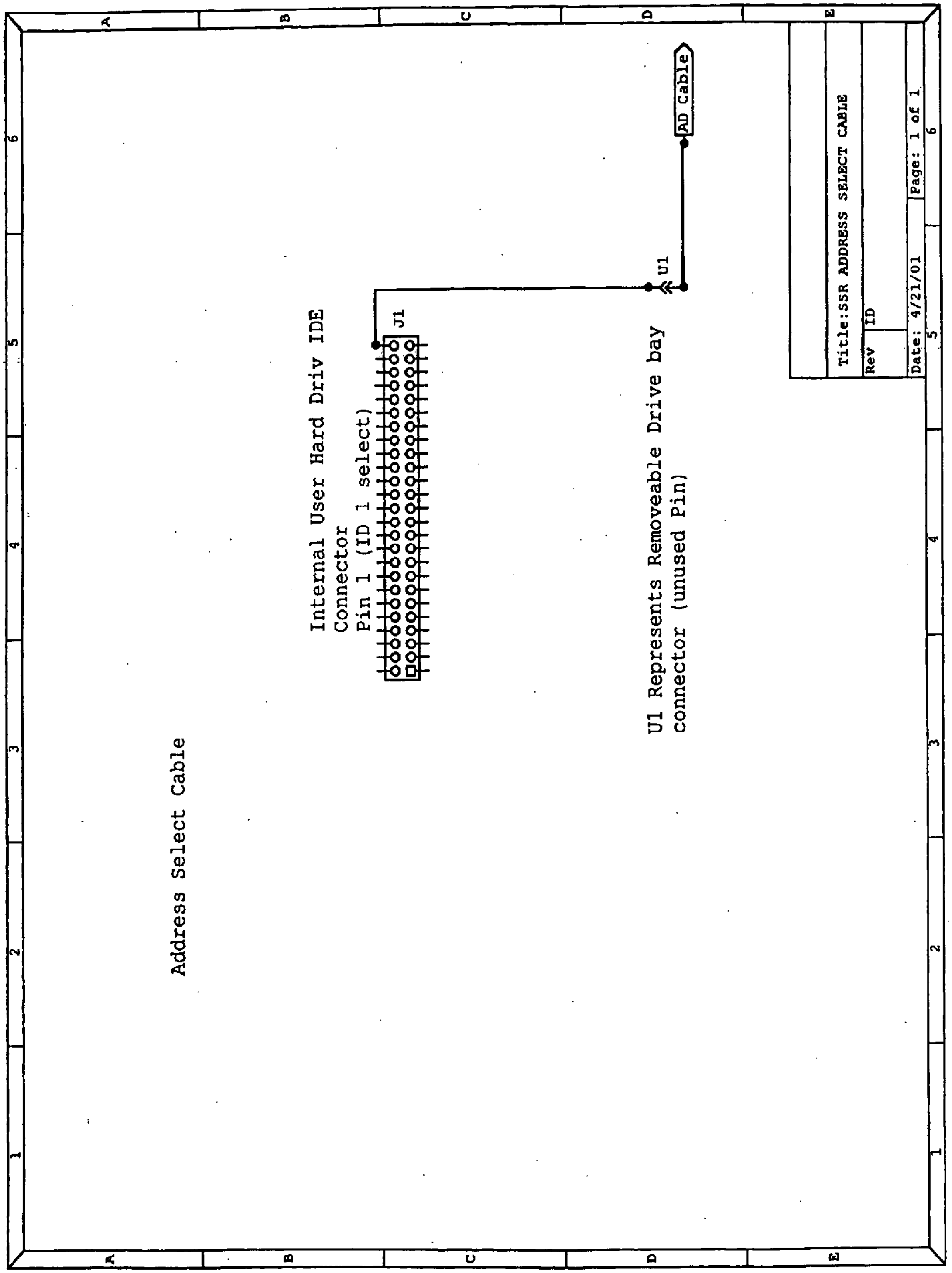
AD Cable
U1
J1
Internal User Hard Driv IDE
Connector
Pin 1 (ID 1 select)
U1 Represents Removeable Drive bay
connector (unused Pin)
Address Select Cable
Title:SSR ADDRESS SELECT CABLE
Rev
ID
Date: 4/21/01
Page: 1 of 1

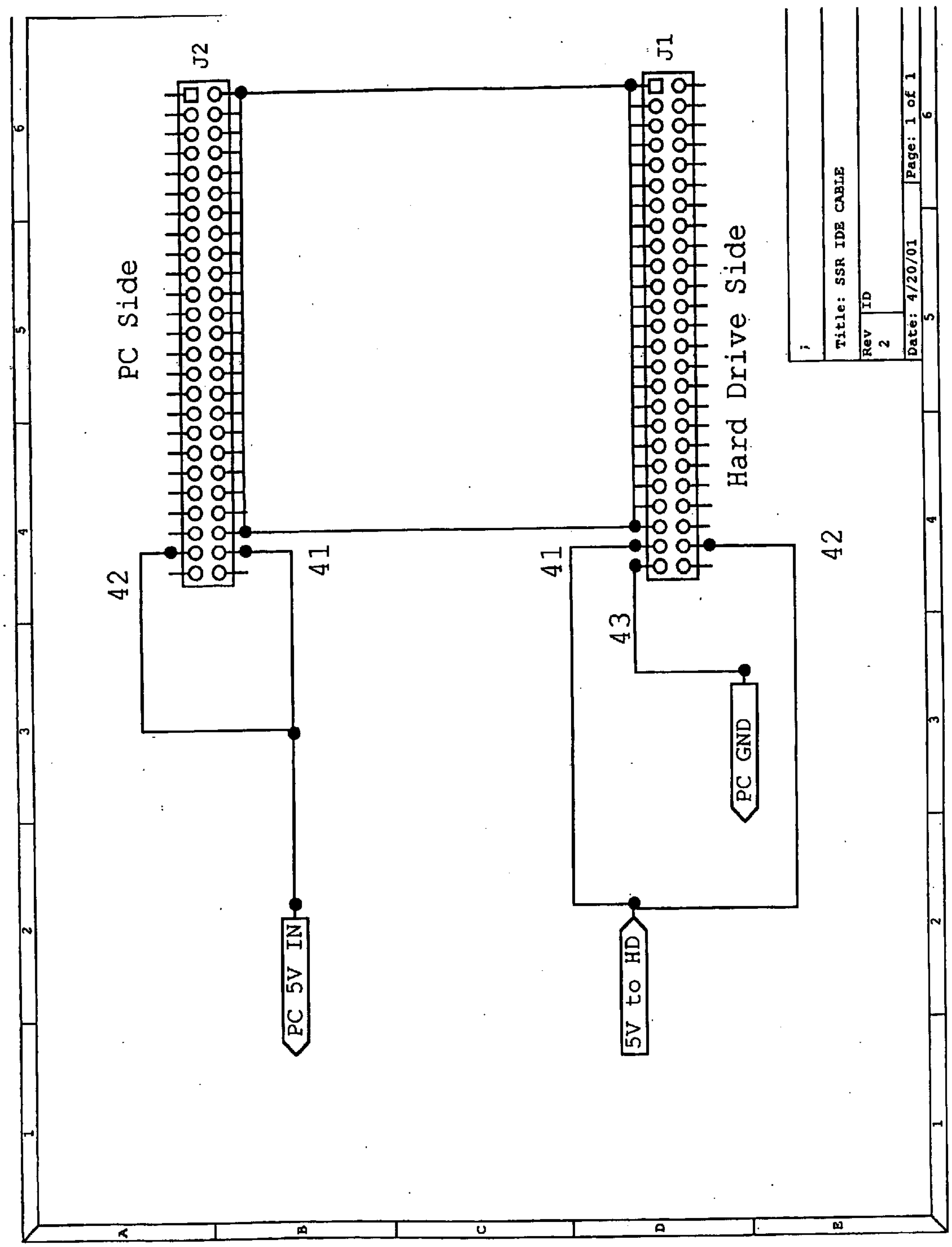
J2
J1
PC Side
Hard Drive Side
41
42
41
42
43
PC 5V IN
5V to HD
PC GND
Title: SSR IDE CABLE
Rev
2
ID
Date: 4/20/01
Page: 1 of 1

Cable Pinout

Hard Drive Pinout (from IBM website)

Travelstar 20GN, 30GT, 32GH
Models: DJSA-232, 230, 220, 210, 205

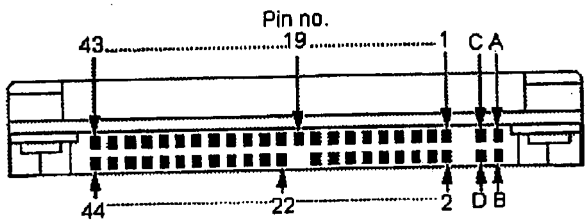

*Notes:* A/T = IDE. Pin position 20 is left blank for secure connector insertion. Pin position A,B,C, and D are used for drive ad Signal definition As shown in the schematic diagrams, the IDE Hard Drive cable is a standard 'Hard Drive extension cable. The Hard Drive power connections ( cable lines 41 and 42 have been cut and rout the circuit's solid state relay which switches the hard drive power under the microcontroller's direction. I connection has (line 43) has also been routed to the circuit board to drive the opto-isolators. The comput supply and the microcontroller power supply are separate, and interfaced through opto-isolators.

The Address Selector Cable carries the address signal connection from the internal User Hard drive to the removeable drive bay removeable connector. On that connector an unused pin is connected on the computer mother board side. The male interface connector from the removeable drive bay then interfaces to that signal when the bay is inserted into the computer. On the drive bay side the signal is then taken to the mircontroller where the connection is switched to ground in order to change the drive address (ID selector signal pin is a floating pin that must be sinked to ground to switch).

Cable Pinout

Hard Drive Pinout (from IBM website)

Travelstar 20GN, 30GT, 32GH
Models: DJSA-232, 230, 220, 210, 205

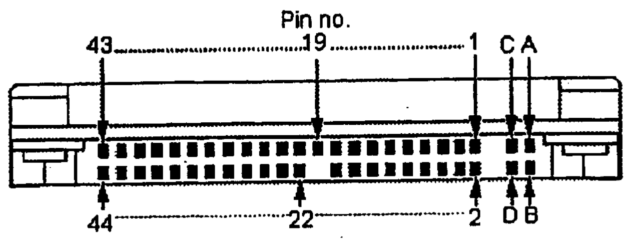

*Notes:* A/T = IDE. Pin position 20 is left blank for secure connector insertion. Pin position A,B,C, and D are used for drive address setting.
Signal definition As shown in the schematic diagrams, the IDE Hard Drive cable is a standard 'Hard Drive extension cable. The Hard Drive power connections ( cable lines 41 and 42 have been cut and rout through the circuit's solid state relay which switches the hard drive power under the microcontroller's direction. PC ground connection (line 43) has also been routed to the circuit board to drive the opto-isolators. The computer power supply and the microcontroller power supply are separate, and interfaced through opto-isolators. Therefore the microcontroller ground and PC ground must be kept separate The Address Selector Cable carries the address signal connection from the internal User Hard dri to the removeable drive bay, removeable connector. On that connector an unused pin is connected on the computer mother board side. The male interface connector from the removeable drive bay then interfaces that signal when the bay is inserted into the computer. On the drive bay side the signal is then taken to the micrcontroller where the connection is switched to ground in order to change the drive address (ID select signal pin is a floating pin that must be sinked to ground in order switch).

In other systems with different types of hard drives there are other methods of accomplishing the switchir process. The necessary signals to switch are the Hard Drive power and Drive ID. These connections may different on other computer hard drives. For example ID switching could be carried out using Cable Sele The Computer power sensing circuit could also sense power somewhere else in the computer.

```
'...........................................................................................
'       Variable Declarations

'
Sw1                     var             IN13
Sw2                     var             IN12
Sw2_Loc                 var             byte
Sw2_Loc_Cnfrm   var             byte
Mode                    var             byte
Char                    var             b3
btnWk           var             byte
HD                      var             out8
Comp_On         var             in10
z                       var             byte
RS                      con             15
E                       con             14
LINE1           con             128
LINE2           con             128+$40
'...........................................................................................
'       Variable initializations

DIRs = %1100000011111111
btnWk=0
'...........................................................................................

Init_LCD:                                               'LCD INITIALIZATION
low 8                                                   'Hard Drive OFF

low RS
low E
x var byte
x=0

i_LCD:  OUTL = %00000010                        'Set to 8-bit operation.
                        pulsout E, 1                    'Send data three times
                pause 20                                'to initialize LCD.
                        pulsout E, 1
                pause 20
                        pulsout E, 1
                pause 20

                        outl = $0038                    'Set up LCD in accordance with
                pulsout E,1                     'Hitachi instruction manual.

                outl = %00001010                'Turn on cursor and enable
                pulsout E,1                     'left-to-right printing.

                        outl = %00001100
                         pulsout E,1

                        outl = %00000001
                         pulsout E,1

                        outl = %00000110
                         pulsout E,1

        High RS                                         'Prepare to send characters.
                        outl = %00000101
                         pulsout E,1
                        outl = %00000011
                         pulsout E,1

        Gosub CLR
'...........................................................................................
Start:                                                  'idle mode
                                                                'Hard Drive off - Normal operation
        HD=0
        gosub Ready_Mesg

Idle:
        BUTTON 13,1,255,0,btnWk,1,Repair                ' check pushbutton switch

        goto Idle


Repair:
                gosub GETSW_LOC

                if SW2_LOC= "A" then UPDLOC
                        SW2_LOC_CNFRM= "A"

                goto Repair1

                UPDLOC:
                SW2_LOC_CNFRM= "B"
```

```
Repairl:
        gosub CLR

                low RS                                          'center text on top line
                x=LINE1+4
                gosub Send_data
                high RS

        for b2=0 to 14
                Lookup b2,["Repair Selected"],b3
                x=b3
                gosub Send_data
                next
        pause 500

                low RS                                          'format text
                x=Line2+1
                gosub send_data
                high RS

        for b2=0 to 17
                Lookup b2,["Slide Switch From "],b3
                x=b3
                gosub Send_data
        next

        x=Sw2_Loc
        gosub send_data

        x="-"
        gosub send_data

        x=">"
        gosub send_data

        x=SW2_Loc_Cnfrm
        gosub send_data

Cnfrm_loop:
                gosub GetSw_Loc                                 ' Get Current Switch Location
                BUTTON 13,1,255,0,btnWk,1,Cancel                ' check pushbutton switch

                if Sw2_Loc = Sw2_Loc_Cnfrm Then Enable_Repair   'check for confirmation or cancellation

goto Cnfrm_loop

Enable_Repair
        if Comp_On = 1 then Prompt_Shutdown

        goto Prompt_Restart

Prompt_Shutdown:
        gosub Shutdown_Mesg

Shutdown_Loop:
        If Comp_On = 0 then Prompt_Restart
        BUTTON 13,1,255,0,btnWk,1,Cancel
goto Shutdown_Loop

Prompt_Restart
        HD = 1                                          'Enable Hard Drive - Normal Addressing
        gosub Restart_Mesg

Restart_Loop:
        If Comp_On=1 Then In_Progress

        BUTTON 13,1,255,0,btnWk,1,Cancel
goto Restart_Loop
```

```
        Gosub Progress_Mesg
        pause 200
        If Comp_On=0 then Repair_End
        pause 300
        gosub ClR
        Pause 200
        If Comp_On=0 then Repair_End
        Pause 300
        Gosub ClR
Goto In_Progress

Cancel:
        gosub CLR
        pause 400
        gosub Cancel_Mesg
        pause 400
        gosub CLR
        pause 400
        gosub Cancel_Mesg
        pause 400
        gosub CLR
        pause 400
        gosub Cancel_Mesg
        pause 400

goto Start
Repair_End:
        HD = 0                          'Disable Hard Drive - Return to Normal Mode

        Gosub CLR
        pause 400
        Gosub Complete_Mesg
        pause 400
        Gosub CLR
        Gosub Complete_Mesg
        pause 400
        Gosub CLR
        Gosub Complete_Mesg
        pause 400
        Gosub CLR

goto Start
''''''''''''''''''''''''''''''''''''''''''''''''''''''''''''''''''''''''''''''''''''
'                       Messaging Subroutines

Ready_Mesg:
gosub CLR

        low RS
        x=LINE1+7                                                  'center text on top line
        gosub Send_data
        high RS

        for b2=0 to 8
                Lookup b2,["Ready For" ],b3
                x=b3
                gosub Send_data
        next

        low RS
        x=Line2+4
        gosub send_data
        high RS

        for b2=0 to 15
                Lookup b2,["Normal Operation"],b3
                x=b3
                gosub Send_data
        next

return
''''''''''''''''''''''''''''''''''''''''''''''''''''''''''''''''''''''''''''''''''''
Repair_Mesg

        gosub CLR
                low RS
                x=LINE1+4                                  'center text on top line
                gosub Send_data
                high RS


        for b2=0 to 14
                Lookup b2,["Repair Selected"],b3
                x=b3
                gosub Send_data
        next
```

```
return..........................................................................
Cancel_Mesg:

                gosub CLR

                Low RS                                   'center text on top line
                x=LINE1+4
                gosub Send_data
                high RS

        for b2=0 to 15
                Lookup b2,["R","e","p","a","i","r"," ","C","a","n","c","e","l","l","e","d"],b3
                x=b3
                gosub Send_data
                next

return..........................................................................
Shutdown_Mesg:

        Gosub CLR

                for b2=0 to 23
                Lookup b2,["P","l","e","a","s","e"," ","S","h","u","t","d","o","w","n","
","C","o","m","p","u","t","e","r"],b3
                x= b3
                gosub send_data
                next
return..........................................................................
Restart_Mesg:

        Gosub CLR

                for b2=0 to 22
                Lookup b2,["P","l","e","a","s","e"," ","R","e","s","t","a","r","t","
","C","o","m","p","u","t","e","r"],b3
                x= b3
                gosub send_data
                next
return..........................................................................
Progress_Mesg:

        gosub CLR

                low RS                                   'center text on top line
                x=LINE1+3
                gosub Send_data
                high RS

        for b2=0 to 17
                Lookup b2,["R","e","p","a","i","r"," ","I","n"," ","P","r","o","g","r","e","s","s"],b3
                x=b3
                gosub send_data
        next

return
..........................................................................
Complete_Mesg:

        Gosub CLR
                low RS
                x=LINE1+5                                'center tect on top line
                gosub Send_data
                high RS

for b2=0 to 14
Lookup b2,["R","e","p","a","i","r"," ","C","o","m","p","l","e","t","e"],b3
x=b3
gosub Send_Data
next
return
..........................................................................................
        Clr:
                low RS
                outl =%00000001          'Clear the display.
          pulsout E,1
                high RS
        return
..........................................................................................

        send_data:
                outl =x
                pulsout E,1
```

```
GETSW_LOC:

if SW2 then SW2_ON_UPD
if NOT SW2 then SW2_OFF_UPD

        SW2_ON_UPD:
                SW2_LOC="B"
        return

        SW2_OFF_UPD:
                SW2_LOC="A"
        return
```

Flowchart Description
*Figure J90*

Figure J90 is an operational diagram of the circuit board shown in Figure Design1_2.ckt]. In Item J90.10 the input selector switch is checked in order to determine which of the three possible operations (A, B, or C) is requested by the user. As denoted in J90.20 if operation A is selected the device branches to operation A. If operation B or operation C is selected, the device branches to either of the respective operations. If none of the operations are selected the device continues to wait for a selection.

Operation A

Upon startup, if the operation input switch is selecting operation A, the device switches the user hard drive BUS Address ID to a number other than 0. At the same time the master hard drive's power is turned on and the drive spins up recognized at ID 0 in place of the user hard drive. This function, as shown in flowchart item J90.40, can use any type of switching device, whether analog or solid state, to switch both the user drive ID and the master drive power. In [Design1_2.ckt] the devices used are electromechanical relays, which are switched with a Darlington transistor pair at the coil input. As shown in [Design1_2.ckt] relays RLY1, and RLY2 switch the 12 volt and 5 volt power connections to the master hard drive. This configuration uses 2 relays but the same task may be carried out using any number or configuration of relays, transistors, or other type of switching device. In another implementation, the hard drive power could have the ground connections all switched in order to turn the hard drive on and off. This implementation is shown in figure W52 [Design1.ckt]. When the master drive power and user drive address are switched, an optional message on an LCD screen (optional, but used in this implementation), appears along with an indicator lamp, which denotes the operation currently executing.

Operation B

Upon startup, when operation B is selected by the input switch, the device waits for X seconds before operation execution. This ensures that the user has time to abort and run under the normal operating conditions. Operation B as shown in flowchart item J90.30 waits for the specified time delay J90.60 and then Resets CMOS J90.110. At the same time an optional indicator lamp (LED B) is illuminated as shown in J90.100 and a message is displayed on the optional user interface (LCD) screen.

Operation C

Operation C is a normal operation mode J90.50 that allows the computing device to startup in a non-repair mode. Besides normal operation a message is displayed on the optional user interface J90.80 (LCD screen), and a normal mode indicator lamp is illuminated J90.90 (LED C)

After the selected operation executes the device loops, in order to check for a change in the operation selector switch. This is shown in J90.140, which performs the same function as J90.10. At this point, if the operation selector switch has not been

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*

*Invented by Anthony More & Kenneth Largman Version 42601*

1. The invention described herein is hereafter referred to as the: "Backup and/or Repair System" – "Multi-User System" – "Virus-Proof/Hacker-Proof System" – "Hardware-Repair System" – "Freeze-Buster System" – "Net-Lock System" – "Anti-Theft System" "Entertainment/Communication System."

2. BACKGROUND AND HISTORY OF INVENTION 2.1 For the past several years we have been developing a new type of computer repair process to enable typical, non-technical, computer users to repair complex computer problems without effort, repair knowledge or skills. Our goal was to provide a way for the computer user to simply flick a switch, push a button, or speak a command, and have the computer take care of fixing itself, quickly, and easily, no matter what was wrong with the computer. We also wanted to be able to protect the computer from damage.

We constructed a prototype switching assembly and installed it in a computer, with the control switch located on the front of the computer to give the user easy access to the switch, and enabled a person to:

• Conveniently and simply push a button, flick a switch, or speak a command and perform our automated repair process. This switching system and related features that we initially developed for the repair process also enabled us to create several derivative inventions.

This switch triggered relays that were used to switch between data storage devices by switching power and/or device identities -- functions that were used by the repair process. We wrote repair scripts and programs to automate the repairs, so that the user didn't need to know a thing about fixing computers. The repair scripts made backups of the user's data storage device, reformatted the data storage device as necessary, and then replaced some or all of the operating system data, and/or other settings and/or data. These repair scripts and programs were loaded onto the prototype, and after a few adjustments, we got the contraption working.

For the first time, in conjunction with a combination of our repair scripts and programs, a user could just turn a switch on their computer and the computer would fix itself. Incidentally, we realized that the same invention we had made for the repair process also provided the ability to easily switch between one or more data storage devices, and also to switch groups of data storage devices. By using the ability to switch between data storage devices, we were able to construct prototypes that had one or more data storage devices dedicated to particular users, and that by turning a switch the computer would be set up for a completely different user. Additionally, this gave us the ability to construct computers that could be used by network administrators to rapidly switch between large numbers of data storage devices, and therefore, more easily create and update templates used in network repairs, perform software installations and "updates" of client computers.

The devices, methods, and technologies we developed for the repair process led to many new discoveries. We realized that many unique inventions could be derived from this technology. For example:

- A device that could automatically backup and/or repair data storage devices and software.

- A way to enable multiple users to share a computer, each having total privacy of data.

- A way to enable a computer to have totally separate and independent and multiple operating systems and unique setups on one computer.

- A way to enable switching between multiple data storage devices.

- A way to enable a computer to switch to an emergency "startup" and/or "operating" device.

- A method of switching data storage devices so as to "quarantine" viruses, block hackers, and protect data.

The repair process evolved. We wanted to be able to enable a user to test and repair more data storage devices and components, and be able to switch to other components in the event of component failure. We decided to develop a computer in which any part and any software could fail and/or become corrupt, and that our invention could fix anything, (hardware or software) that went wrong.

We realized there was a broader spectrum of devices that we could switch, which led to yet other unique inventions that were derived from this technology, such as:

- A way for users to switch from components that have failed to components that function properly.

We also recognized that certain types of devices are prone to causing computer "freezes" that can be resolved by breaking and re-establishing one or more of the connections to that device. Therefore we developed:

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*

*Invented by Anthony More & Kenneth Largman Version 42601*

• A method of switching the connection to devices off and then back on, as a means to reset the connection and break out of a "freeze."

As we considered the repair process we also wanted to prevent the computer from needing repairs in the first place. One source of computer damage is from viruses and hacking from the Internet. We realized that our switching process could also be used to solve concerns about network privacy and security, and a desire to enable parents to control children's access to the Internet. We decided to use our invention to switch "on" and "off" network and/or communications connections. During this development process we developed:

• A method of switching and/or locking a network/communications connection in the "on" or "off" position.

So we added more switching features, such as giving a user the ability to turn a switch on their computer and switch between entire sets of data storage devices, the ability not only to switch between data storage devices, but also to switch power supply, jumper cable connections, network connections, and any type of circuit or connection, and enabled the ability to reset hardware and software settings. We added the ability to reset PRAM; BIOS; CMOS; CUDA, and any other chip, board, and/or device that stores such information. We then decided to add the ability to switch between a data storage device and a circuit board, and the ability to switch between circuit boards. Then we added the ability to switch remotely, and for the device not only to be on a computer, but on any type of computing hardware. We added the ability to switch between logic boards and entire computing hardware systems, neural networks, etc.

We kept adding more switching functions, until virtually anything on the computing hardware device could be switched locally or from a remote source, and interact with other devices that were local or at remote locations.

Initially we had just given the computer user the ability to perform the switching process by mounting the switch on the computer where it was easy for the user to reach the switch. But as time went on, we added the optional ability for it to be controlled: by a system administrator, other users, by network devices and appliances, automatically, locally, or remotely.

We created optional scripts and programs to enable computers and computing hardware to do new things with the new abilities that resulted from the new switching features. These scripts and programs enabled new methods of: repairing computers, switching between data storage devices and groups of data storage devices, switching back up systems, reformatting data storage devices, providing for emergency switching of data storage devices and circuit boards and computing systems, recovering data from back-up storage devices, etc.

For example, a user could sit at a computer and flick a switch located on or in the computer to fix a corrupt data storage device (or any device), and be able to flick a switch on or in the computer to change from one device to a different device, such as a logic board and/or ROM chip, and/or network connection, etc.

Here is a different example using our switching system, in conjunction with programs and/scripts, to perform a backup and repair process for a malfunctioning hard drive:

- Two hard drives can be connected to a "regular" computer.
- A single toggle switch can be mounted on the front of the computer, or any location.
- Both hard drives are controlled by our special switching system that can control their "Device IDs" and/or "master" and "slave" settings, and power.
- Hard drive 1 is a "typical computer user's" hard drive with an OS, a few applications, documents, and e-mail. Its device identity is set as the "master" hard drive.
- Hard drive 2 can be partitioned into 3 partitions: a) a "start-up" partition b) a "master" partition and c) a "backup" partition. Partition "a" is configured to be the "booting" partition.
- During "normal" use, our switching system switches hard drive 2's device identity to be a "master" hard drive, but our switching system also turns off hard drive 2's power.
- In partition "a" we have a perfectly functioning OS and related software to control the repair process. In partition "b" we have exactly the same OS and exactly the same applications as on hard drive 1, in a "pristine state" with no "defects". Partition "c" is blank at this point in the process because the machine is new and "backups" have not yet been made.
- A program that copies data from hard drive 1 to hard drive 2 can then execute periodic "backups" of the user's data (e.g. the "My Documents" folder, email) to partition c of hard drive 2. These backups may be uncompressed, compressed, or represented by an algorithm. The program can be stored on any device that can store data (hard drive 1 or a flash ROM chip are two examples).
- This copying procedure can be made possible, for example, by utilizing a program that initiates the switching process (which switches the power "on" to hard drive 2 and gives it the "slave" device ID) at periodic intervals (that could be adjusted by the user) in conjunction with scripts that copy the user's documents and email to the "backup" partition "c". Each backup that is created may be given a unique time/date stamp so that when the user needs his/her data back s/he can choose from multiple "backups."

Various parts of the OS, application software, or any other data on hard drive 1 could then be damaged, deleted, corrupted, or destroyed. The hard drive could even have "bad blocks" and/or sectors, and/or even physical damage on the surface of the hard drive. The corruption of hard drive 1 could be so terrible that the computer could not even "boot up." We could then repair it:

- "Flip" the "toggle switch" and the following switching process occurs:
- Our switching system then switches the "device ID" settings so that hard drive 1 becomes the "slave" drive, power is then connected to hard drive 2, and hard drive 2 is switched to become the new device ID of "master."
- The script that creates "backups" could then execute again and copy all or selective data from hard drive 1 (for this example, it could copy the user's "My Documents" folder and/or email.) to Partition "c" of hard drive 2.
- Another script could then run on hard drive 2 that would completely reformat hard drive 1. It could also map the "bad blocks" on the hard drive.
- Then another script could run on hard drive 2 that copies the "perfectly functioning" copy of the OS and applications from partition "b" over to hard drive 1.
- Optionally, a script could then run that asks the user which copy of the "backups" from partition "c" the user would like to revert to. Upon choosing a particular backup, the "My Documents" folder and email (from partition "c" on hard drive 2) would then be copied back to hard drive 1.
- When it finishes copying, another new script could run that shuts-down the computer and its hard drives.
- The user could then "flip" our switch again and it would switch the "device ID" back to "master" for hard drive 1, switch hard drive 2 to "slave" and cut its power.
- The user could then restart the computer, and it would boot-up perfectly into the freshly reformatted hard drive 1, with its freshly copied OS and applications, its freshly copied "My Documents" folder, and its malfunctioning behavior would thus be repaired.

We added optional switch locks to the hardware, and scripts and programs were developed to enable multiple users to use a computer with completely different sets of data storage devices, with each user unable to access the others storage devices. The functions of the scripts and programs can also be handled by programs in ROM, programmable logic controllers, circuit boards, and various forms of data storage devices.

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*
*Invented by Anthony More & Kenneth Largman Version 42601*

Numerous scripts and programs were developed, and we continued to develop the hardware.

In some situations, we soon learned it could be dangerous or cause damage, to turn a switch when power is being supplied to a device, and thus we invented several methods of preventing (or locking) a switch from turning or deactivating the switch when power was being supplied, and releasing the switch (or allowing the connection to be made) when it was safe and power was removed. This dangerous situation can also be avoided by using a logic controller to prevent a switching process from taking place until it is "safe." This would be accomplished by having the controller keep track of power, device identities, etc. and thus control switching as needed.

It then occurred to us that we could trigger various functions very similar to what we had developed via hardware by using software that could be integrated into: data storage devices, ROM, programmable logic controllers, circuit boards, etc., which led to a whole new approach to the repair process. To clarify this, in addition to software triggering the switching process, we found a way to replace most or all the switching process with software, or to use the software switching replacement in conjunction with the hardware switching.

We then developed numerous options for triggering the process, instead of just being limited to a switch we realized it could be controlled via voice commands, via telecommunications, optical control, wireless communications, scheduled events, logic control, etc. We decided to provide optional security over the switching process not only by key switches, but by voice id, retina id, optical recognition id, thumb prints, voice prints, magnetic cards, passwords, encryption, and any type of method available to provide secure identification.

Therefore, we realized that we needed to make our invention work for a wide spectrum of users, no matter what options they wanted. We decided to make our invention scaleable -- expandable as needed -- with modular hardware components that could be quickly connected together if desired, and optional software scripts that could be mixed and matched as needed. Thus, if someone wanted one component switched, our switching system would consist of the switching circuitry needed for that one component and the optional software for that one function could be provided. If a user wanted more components switched, we would have the ability to just snap in additional modular components as needed, and provide the optional software for the additional functions. (Snapping the components together is optional... they can also be mounted as separate non-modular components.). Non-modular versions can also be produced as needed.

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*

*Invented by Anthony More & Kenneth Largman Version 42601*

We wanted to make these innovations usable for robots, robotic devices, electronic devices, network appliances, vehicles, and all situations where computing equipment was integrated with other equipment and devices. Therefore, we revised the trigger and switching system so that instead of being limited by the restriction of having the switch and/or "trigger" located on the front of a computer (or under an access panel/door of some sort) the trigger and/or switch could be movable so that it could also be located anywhere to give the user(s)/operator(s) easy access. For example, in situations where a computer is used as part of a vehicle, robotic device, etc, the switching system(s) and/or trigger(s) can be located within easy reach of the user(s). It can be built into a dashboard, control panel, robotic control system, control room, house, building, door, remote location, or anywhere else.

We have ended up with a scaleable switching system with scaleable hardware and software and scripts and programs that perform many scaleable functions, that can fit together in modular fashion as needed; as well as, several methods of controlling the switching process.

We also invented electronic connections on the outside and inside of the computer that provide ways to connect lighting, decorations, LCD's, LED's, sound, and or video, to communicate what is taking place, and for entertainment purposes.

We also invented a light emitting/reflecting acrylic device that may also utilize/interact with the other inventions.

Upon evaluating what we had developed, we observed that it can be used to enable one or more functions described herein. Therefore our work evolved into writing this preliminary patent application.

We have attempted to put these inventions/processes/systems into 7 groups. They all utilize a variation of our "switching system" in conjunction with software and hardware. They are:

"Backup and/or Repair System"
"Multi-User System"
"Virus-Proof/Hacker-Proof System"
"Hardware-Repair System"
"Freeze-Buster System"
"Net-Lock System"
"Entertainment/Communication System."

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*
*Invented by Anthony More & Kenneth Largman Version 42601*

3. How are these inventions different from existing products?

3.1 The "Backup and/or Repair System" - new and unique features:

- Push a button (or other trigger to initiate the switching process) and the computer repairs a corrupt or malfunctioning data and data storage device(s) by executing a process of automatic steps (without technical skills needed by the user.)

- A combination of hardware and software processes that back-up data and can repair data storage devices (for example, automatically re-format a data storage device, and then restores a backup).

- Use of "master copies" (or "templates") of software programs on separate data storage devices for purposes of repair.

- The ability to "start-up" from a separate data storage device as needed to be able to function and/or initiate repairs.

- The ability to back-up data to a separate, internal, protected (because it may be switched or "un-mounted" or locked) data storage device without user involvement in order to enable repairs (such as reformatting) to the malfunctioning data storage device.

- The ability to backup, copy and restore data (and execute scripts and/or programs) so as to repair data storage devices, even if the data storage device is corrupt and "unbootable" by booting from a different data storage device.

- The ability to repair devices that utilize computer equipment without needing to access the computer equipment. Several other new features have been developed and are summarized in the abstracts that follow.

- Ability to utilize and/or be integrated with our other systems.

- Ability to automatically repair any type or model or brand of computing device.

3.2 "Multi-User System" - new and unique features:

- Push a button (or other trigger to initiate the switching process) and the computer switches "device identity" settings for data storage devices so as to enable different devices to become "startup" devices (for example, to accommodate manufacturer's default requirements for boot sequences).

- Ability to utilize and/or be integrated with our other systems.
- Ability to change device ID settings and/or power connections on data storage devices quickly and easily.

3.3 "Virus-Proof/Hacker-Proof" System - new and unique features:

- A means to automatically switch data storage devices by executing a process of steps (without technical skills needed by the user.) By switching device IDs and/or other means, so as to "quarantine" data, for a period of time, into separate data storage device(s). This allows time for updated virus programs to check for new viruses and "kill" them", and/or so that infected files can be accessed without contaminating the rest of the system.
- Ability to utilize and/or be integrated with our other systems.
- A means to prevent access to data within a computer by shutting off/on network connections as needed (automated) and by only having a data storage device "open" to the network that contain no "user" data or software.
- Automated web-site protection: data storage devices that "host" the data of a web site could be duplicated on many data storage devices and the "cycled" to be connected or disconnect to the network. In this way, "hacked" data could be repaired when it was cycled to the "offline" position, while an "un-hacked" duplicate data storage device could be instantly rotated "online" (switched) to take its place.

3.4 "Hardware Repair System" - new and unique features:

- Push a button (or other trigger to initiate the switching process) and the computer switches from malfunctioning or "failed" components by executing a process of steps (without technical skills needed by the user) to components that function properly.
- Ability to utilize and/or be integrated with our other systems.

- Push a button and the computer switches to a "backup" computer (internal components are all switched at once to duplicate components).

3.5 "Freeze-Buster System" - new and unique features:

- Push a button (or other trigger to initiate the switching process) and the computer momentarily interrupts the connection of a computer peripheral by executing a process of steps (without technical skills needed by the user) so that computer can "recognize" the device.

- Ability to utilize and/or be integrated with our other systems.

3.6 "Net-Lock System" - new and unique features:

- Push a button (or other trigger to initiate the switching process, for example, turn and lock with a key) and the system interrupts the connection of a network/communication connection (for example, the Internet and/or intranet) by executing a process of steps (without technical skills needed by the user) so as to restrict or allow access to said network/communication connection.

- Computers (and other computing devices and/or hardware) don't have built-in switches that can be easily controlled by the user(s) (or by an administrator, or across a network, or wireless, or other method of control) that allow switching on/off of network and/or communication connections. The "Net-Lock System" provides these abilities and comes with optional scripts and programs that enable users to more easily use these new abilities. It also enables high speed automatic switching of network communications connections.

- Ability to utilize and/or be integrated with our other systems.

4. ABSTRACT 4.1 Overall Abstract:

The following did not exist until now: the ability for a user to control the switching process by locking/unlocking a switch on their computer, remote switching as we have developed it, software switching as we have developed it, the many items that our switching process can control, and our scripts and programs executing in particular orders with specific and unique, and useful results. We combined them into a switching process that provides many new functions.

The unique "Switching System" is an integral part of what enables these new, unique and useful functions to be made possible. The optional scripts and/or programs have been utilized in specific sequences to perform specific tasks in conjunction with the Switching System. The Switching System is more specifically defined in section 7.

The Switching System includes a switching process that can switch one or more of the following: between data storage devices, data storage device ID's (often controlled by jumper cables and/or a "cable select" cable on a data storage device), between power supplies, between jumper connections, etc. It can also reset PRAM; BIOS; CMOS; CUDA, and any other chip or board and/or device that stores such information. Any circuit between any two devices that can be "opened" or "closed" in any combination can be "switched". It can switch indicators (such as LED lights) for activity, power, and identity. It can also, reset hardware and software settings. As needed, it can utilize optional scripts and programs to enable use of these new switching abilities. It can do any of these switching processes in any combination and permutation.

(Please note that that the switching System can be scaled so that it can be used for one or more of the functions described in the following abstracts. It need not be constructed for more than one function, and can be scaled to perform any combination of functions as desired.)

4.1.1 Abstract of Software as a Switch "Replacement:"

Optionally, the "Switching System" can use a software "Switch Trigger" (see definition) replacement. In other words, a program and/or script can initiate the switching process, instead of a person pushing a button (see examples in section 7.1) The software can also replace a mechanical switch.

4.1.2 Abstract of Switch Lock, Bypass, Delay, and/or Cylinder Lock Device 4.1.3 Optional Switch locking mechanisms and switch deactivation mechanisms were developed to prevent damage to computer equipment if someone turned the physical "Switch Mechanism" at the wrong time. The locking mechanisms prevent the "Switch Mechanism" (a physical switch, for example, a "switch-lock") from physically turning when it is not safe to turn the switch. The switch deactivation mechanisms deactivate all or part of the Switching Process until it is safe to perform the switching process, e.g., when no electrical current is flowing to the devices being switched.

4.1.4 A logic controller can also be used to control the Switching Process and/or power, and/or any other connections and/or settings, so as to prevent damage to computer equipment by deactivating the Switching Process when it is not safe to switch.

4.1.5 Abstract of system Scalability and Expandability:

The Switching System switch can be scaleable and expandable. It can switch one item, device, or circuit, or very large numbers (theoretically infinite numbers) of items, devices, circuits, and/or computing hardware systems. It can be modular, and/or non-modular.

4.1.6 Abstract of Location and Accessibility:

One of the features that makes the each of these systems different, is that there can be a "Switch Mechanism" (see definition) (a physical trigger) readily available to the user, and that the Switch Mechanism can be located anywhere, including on or near the computing device, and/or convenient to the user. For the first time, the devices being switched can be switched easily and conveniently. The Switch Mechanism can be located in easy to reach locations such as the front or side of computing devices, near user controls of robotic devices, on vehicle dashboards, in control rooms, locally, remotely, and/or wherever it is convenient for the user/operator. This enables the user/operator to easily reach a (the) switch(es). The Switch Mechanism can take the physical form of any sort of a trigger; for example, toggle switches, buttons, switches, switch-locks, voice control, retina identification, card readers, magnetic key systems, and any sort of local and/or remote system used for triggering a switching process.

Please note that when switching takes place, it is not necessarily switching to/from devices on the local computing hardware, but may switch to or from devices on a network, and/or global computer network and/or communications network. The "Switch Trigger" may be located separately from the "Switch Mechanism."

*****

4.2 The "Backup and/or Repair" System Abstract

The "Backup and/or Repair" System consists of copying data, executing scripts, and switching data storage devices for the purpose of repairing data and/or data storage devices.

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*
*Invented by Anthony More & Kenneth Largman Version 42601*

The "Backup and/or Repair" system consists of a series of software and/or hardware events, that, when strung together in specific order(s), back-up and perform repair functions of data storage devices.

This invention can be built as a computer that contains the features described herein, and/or can be built as independent devices that can be added to or integrated into computers.

4.2.1 The "Backup and/or Repair" system as Used for data storage device repair:

One option is for the "Backup and/or Repair" system to keep and/or utilize one or more perfect master template(s) of the users' data storage devices, and it can back up and archive the user's data using software or scripts [(which can, for example, be located on a StorExecute (see definition)] that "backs-up" or copies data from one data storage device to another. When the data storage device has a "problem," the "Backup and/or Repair" system can use its switching features to access the perfect master template(s), and/or the backup(s) and/or archive(s), and may use some scripts and/or programs [(which can, for example, be located on a StorExecute (see definition)] to restore a computer to a functioning state. Rather than using a master template, the "Backup and/or Repair" system can also conduct the repair from a backup, and/or archive on a separate data storage device.

The following events can take place in variable sequences, and each step is optional, depending on desired results:

- The "Backup and/or Repair" system copies data from a user's data storage device to one or many different data storage devices.
- These other data storage devices would then contain "backups" (or duplicates) of some or all of the user's data.
- After the data is copied, a switching process can then protect the duplicates on the other data storage devices by restricting access to them (for example, by locking and unlocking a series of partitions, or by creating "read-only" files and/or folders and/or partitions.
- Then, if the user's "main" data storage device becomes corrupted, or it fails to "boot-up," a switching process can allow a different startup device to "boot-up."
- The user's data could then be copied BACK to the original user's "main" data storage device; and/or, a different data storage device can copy only the Operating System software, and/or application software to the original user's "main" data storage device.

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*
*Invented by Anthony More & Kenneth Largman Version 42601*

An optional hardware diagnostic program may execute in conjunction with the switching system to administer repairs on demand and/or self repairs by switching from defective data storage devices to data storage devices that function properly.

Note: The user's own monitor could be used by the Repair System to communicate with the user. For example, a second video card (or other device to process a video signal) may be utilized by the system so that it can display information to the user on the users own monitor.

Alternatively, for example, the system may utilize the existing video card by switching its signal so that the repair system controller can control it and send its own video signal to the monitor (to display repair messages or information to the user using his/her monitor).

4.2.2 The "Backup and/or Repair" system as used for "Emergency Startup" & "Emergency Computing"

The "Backup and/or Repair" system can optionally be used for switching to a separate data storage device for use as an emergency startup system (note: the data storage device may be "on" and always available for instant switching, so that the computer does not require a restart). Thus, when a startup device is not recognized by the computing hardware, and/or at the request of the user, and/or other request from elsewhere, (or automatically when a problem is detected, and/or on a schedule) the "Backup and/or Repair" system can then switch to a secondary startup data storage device and restart, and/or switch between RAID mirror data storage devices, etc.

4.2.3 Abstract of the "Backup and/or Repair" system as Used for Formatting and Device Testing The "Backup and/or Repair" system can optionally be used to test data storage devices. It can be used to temporarily switch to a data storage device for startup, while a data storage device reformats and/or tests another different data storage device.

4.3 "Multi-User" System Abstract

"Multi-User" System as used to enable multiple users to share a computer, each having total privacy of data:
The "Multi-User" System can be used to enable multiple users to use computing hardware as if each of the users had their own private computer. When a user is using a computer, the "Multi-User System" sets up the data storage device, operating system, applications, etc. just for that particular user. Then, when a different user wants to use the computer, the "Multi-User System" hides away the previous users data storage device, operating system, software, and data, and provides a different data storage device, operating system, and software for the new user.

4.3.1 Abstract of the "Multi-User" system as used to enable a computer to have totally separate and independent and multiple operating systems and unique setups on one computer The "Multi-User System" can be used to control totally different setups of operating systems and software, and switch back and forth between them. For example this would enable a computer to be set up with Linux and movie editing software in Japanese, and the "Multi-User System" could then switch the computing hardware to be set up with Windows and mathematics software in German.

4.4 "Virus-Proof/Hacker-Proof System" Abstract

"Virus-Proof/Hacker-Proof System" as used for a method of switching data storage devices so as to "quarantine" viruses, block hackers, and protect data.

By switching data storage device IDs and/or power, and/or network connection, and/or other means, data storage devices can be connected to a computer in such a way that one or more of the data storage devices can be isolated from other data storage devices, and/or isolated from network connections.

Thus, if a hacker or virus were to enter a data storage device that was connected to a network, said hacker or virus could only access one of the data storage device(s) because the other data storage devices were "separated" by the Switching System. This data storage device could be devoid of user data. Incoming data, such as email and/or web downloads could then be transferred to a data storage device that acts as a "quarantine are". After a period of time has passed, and/or virus checks have been run, data can then be safely transferred out of "quarantine" and onto user's "regular" data storage device. In this way, a data storage device could act as a "quarantine" for data. Viruses could then be "killed" in this isolated data storage device at a later time (for example, it would give a user enough time for an anti-virus definition to be written and downloaded for a new virus. This system would also prevent infected files from being accessed without contaminating the rest of the system.

Also, a user could switch from one data storage device that was "private" or "isolated" (by using our switching system) from the network, to a different data storage that was exposed to the network, but was "empty" of user's personal data. Thus, a hacker would not be able to access the user's private data storage device., but only the one containing no user data.

4.5 "Hardware-Repair" System Abstract

"Hardware-Repair" System as Used for Computer Repair:
By utilizing the Switching System, a user can easily switch from components that have failed to components (and or computing device) that function(s) properly. An optional hardware diagnostic program may execute to determine the status of hardware, and if necessary, switch from defective devices to devices that function properly, (and/or to a secondary computing system) by utilizing the Switching System. Note: The switching of data connections may also occur while electrical power is still connected to the device(s) (see section 7).

4.5.1 Abstract of the "Hardware-Repair System" as Used for Formatting and Device Testing:

The "Hardware-Repair System" can optionally be used to test data storage devices, circuit boards and computers. It can be used to temporarily switch to a data storage device for startup, while a data storage device reformats and/or tests another different data storage device. It can be used to switch to a different logic board, network connection, or computing system. It can test the hardware that was taken out of use. One way it can do this is by switching from the device in-use, to alternate devices that are used while testing and formatting takes place.

4.6 "Freeze-Buster" System Abstract

"Freeze-Buster" System: a method utilizing the Switching System to momentarily switch the connection(s) to devices "off" (not connected) and then back "on" (connected), (or vice versa) as a means to reset the connection and "break out of" a device and/or computer "freeze."

4.7 "Net-Lock" System Abstract

"Net-Lock" System: a method of "locking" a network/communications connection to be either "on" or "off". This method utilizes the Switching System to be able to switch and/or lock a network and communications connection both "on" (connected) or "off" (not connected). The "Net-Lock System" may also contain optional scripts/programs that switch and lock the network and/or communications connection (including wireless).

This led us to another evolution. We realized that companies would want a way of shutting off internet connections, without shutting off their own intranet. So we developed methods for switching from an Intranet connection to a full web connection, and visa versa. This may also be done by utilizing two network connection devices that can be independently switched. This can also be achieved by integrating two network "jacks" (and associated and necessary circuitry/parts) onto one network interface card that can be independently switched.

Thus, if someone wanted one network connection switched, our switching system would consist of the switching circuitry needed for that one connection and the optional software for that one function could be provided. If someone wanted more connections switched, we would have the ability to just snap in additional modular components as needed, and provide the optional software for the additional functions. (snapping the components together is optional... they can also be mounted as separate non-modular components.). Non-modular versions can also be produced as needed.

The "Net-Lock System" can also switch on and off network connections. It can turn off and on (and lock and prevent access to) connections to a global computer/communications network, Intranet connections, and all other types of network connections.

For example, a parent could connect over a global communications network to their home computer and turn off and lock their computer network connection from use… and only they can unlock it.

Optionally, the user can restrictively control the "Net-Lock System" settings. For example, software could provide options such as: who has the right to "lock" or "unlock", when unlocking can occur, (on a schedule, and/or certain hours, etc,) etc.

An optional program/script gives the user/operator locking/unlocking the network and or communications connection. Optionally, this process could also run automatically.

5. Explanations of Terms 5.1 Master Template & Master Template Storage Device & Master Template System 5.1.1 Master Template: A master template is a collection of software that consists of one or more of the following: operating system, applications, or whatever else the user and/or maker of the template wants to put on it, and/or default/user preferences and settings. It is created by copying said software onto a data storage device (or partition) that is defined as a Master Template Storage Device.

5.1.2 Master Template Storage Device: A data storage device and/or partition(s) that is/are used for storing Master Templates. It may exist locally, and/or over a network. Optionally it may consist of more than one data storage device. This may be permanently or temporarily set to "read only" access during the repair process. Optionally, it may also be set to "read-write" access, for example, during an update.

5.1.3 Master Template System: A master template is created, copied, or exists and is stored on a Master Template Storage Device. It may be updated on demand, and/or at specific intervals defined and executed by a program. Data may be installed (and/or optionally copied), thus creating an updated master template.

5.1.4 StorExecute: Any method and/or device for storing and/or executing a program. This can be a logic board, CUDA, EPROM, chip, circuit board, etc.

5.2 Backup & Backup Storage Device & Backup System:

5.2.1 Backup: A copy of data to another data storage device and/or partition. It exists on a data storage device that is defined as a Backup Storage Device. This may be permanently or temporarily set to "read only" access immediately following the backup process. Optionally, it may also be set to "read-write" access, for example, during an update.

5.2.2 Backup Storage Device: A data storage device and/or partition(s) that is/are used for storing backups. It may exist locally, and/or over a network. Optionally it may consist of more than one data storage device.

5.2.3 Backup System: Optionally, "on demand," and/or at specific intervals defined and executed by a program, a backup is created (as needed). Backups may be overwritten on demand and/or based on a computer program that, for example, but not limited to this example, staggers the intervals for creating backups over time, thus creating a collection of backups. Optionally, backups may be created by currently existing programs. Optionally, backups may be incremental, differential, or full. The backup Storage Device may also have multiple partitions that are turned into "read only" partitions immediately after that user's data has been copied there, and could cycle back over the oldest partitions first, after all partitions were filled.

Optionally, the Switching System may switch off the accessibility of the Backup Storage Device (by interrupting power and/or changing device ID settings, or other means) so that said data storage device is only accessible while backups are being created or restored, and thus hidden from the user the rest of the time.

Several different examples follow:

A program or script runs a "copy" command that makes a full, or partial, or compressed, and/or "normal", and/or encrypted, and/or "read-only" backup of User's data. This can be done by using any one of a number of software backup, or cloning products such as, but not limited to Retrospect; Assimilator; Backup Exec, Ghost, File Wave, etc., or by using a "copy" command, or running a block by block copy of the User's data.

Another Example: Backups could be stored that are: same day most recent, same day next older, same day next older, 1 day old, 2 days old, three days old, one week old, two weeks old, three weeks old, one month old, two months old. As time goes by, obsolete (oldest) backups may be overwritten. They can be made locally, or over a network.

Repair Examples

Example 1: A second operating system runs in the background with hardware and/or software process watchers that watch for a freeze, and/or any type of problem. When a problem occurs the repair process replaces any files and/or data that is different/modified/etc. as needed., resets connections as needed, and may copy and/or reset RAM, information in the processor, etc. as needed, and send a delayed copy of the data to the processor, prior to the last event that may have caused the problem (such as opening of an incompatible application).

2) Example 2: A second and "mirrored" operating system can run on a second processor, and a third another processor (or microprocessor) can run a repair program. The second data storage device can be running in a time delayed mode. When a problem occurs, the process in the second processor is stopped, (before a freeze), the freeze is analyzed, and the processor and ram is set up as they were before the event occurred that may have triggered the freeze.

Alternatively, it could backup in time without necessarily (or in conjunction with) analyzing what went wrong, and see if the freeze occurs again... if so, "back up" further in time... until such time as the freeze does not occur.

Comparative Copying and replacement of files and data.

Master template may be compared to the User data storage device and/or to a partition and/or area of the user data storage device that it needs to repair. Some or all of the data is repaired by copying from the master and replacing software on the user data storage device that is different, changed, modified, or missing. Any items that do not match the template are removed.

Shortcuts, finder flags, aliases, icon positions, folder views, etc. are set to match those needed on the user data storage device. Based on user preferences and/or defaults, particular items on the master template can be marked or selected as items not to delete and/or items not to copy.

The master template may also contain a log and/or database of information to store information, and during the repair process set such items as the volume name, machine name, user name, password(s), which master template to use, which Data Storage Device, and/or partition to use, etc. These may also be adjusted by the user as preferences.

There can be various (and different) master templates to choose from. When one or ones to be used can be selected by the user(s) in preferences. Example 1: a user named "Mary" may use one master template, whereas a user named "Fred" may use a different master template. Example 2: A robotic device should be controlled a particular way in a particular situation. Thus it is using "template A". The situation changes and it is decided that the robotic device should act a different way. A switch may be made to utilize master "template b". Any number and variety of master templates may be utilized. Example 3: In the anti-theft version, the master template can be shifted to be a "bogus" template if the ID check fails. Which user data storage device(s) to repair can also be a "default," and/or a preference, and/or can be modified by an administrator. More than one user data storage device can be repaired.

The master template(s) and data storage device(s) can also be repaired. In this case (a) different master(s) (perhaps on a network) can be used, and the repair process can be similar to the options described herein for the repair process of the user data storage device, except it is the master template(s) and data storage device(s) being repaired.

User preferences can enable a user to select whether only part of a data storage device is repaired, and/or if the entire data storage device is repaired (such as reformatted) but if only some data is replaced, for example, if just the data on "Partition A" is replaced, but not the data on "Partition B".

A sub-master (a subset of a master) can also be used as all or part of the repair process.

In preferences, data on the master can be selected for special attention such as: always replace, never replace, replace if changed, replace if missing, etc.

A database can be used to store preferences, and information about which template to use, which user data to repair, etc.
Example of one embodiment of the repair process: When repair is needed on the primary system and/or data storage device, switch to secondary operating system that may be mirroring and/or having delayed mirroring (and may use a secondary processor and/or protected processing), do repairs on primary system, reboot primary system if needed, switch back to primary system.

The repair process can function in a number of different ways. For example, it can be user controlled, it can always take place on a schedule, and/or on startup, shut down, etc.

The master template may be a "perfect" installation of the system and software and/or data that a user wants and/or is required and/or desired on their computer/computing device, that may also have been checked for conflicts and/or errors and said errors could then corrected by an IT professional.

There are a number of ways to create a master template. For example:
an original "perfect" installation (where errors may have been identified and corrected) can be made on the user data storage device and then copied, or installed, to a second data storage device that contains the master template.
It can be created on another computer elsewhere, and downloaded via a network to reside on the users' computers.
It can be created and/or reside on a data storage device located on a computer elsewhere, and run across a network to repair the users' computer.

It can be created on the storage device and/or partition used to store the master template.

When the master template is created elsewhere and "run", or installed, over a network, or created on a different data storage device than the user data storage device, then shortcuts and/or aliases may need to be modified to work properly when they are copied to the user data storage device. In this case, during the copy process, the code fixes those shortcuts and/or aliases to point them to the correct item on the user data storage device.

If a reboot of the computer is required, this step can be eliminated by copying the startup sequence of the computing device to an EPROM, and keeping it powered "on" when a computer is "shut down". RAM and/or other volatile memory, (and/or a time delay version of RAM and/or other volatile memory) can also be stored, and copied back as needed.

Optionally, one or more additional switches and/or switch triggers can be utilized by user to confirm the repair process.

5.3 Archive Storage Device:

5.3.1 Same as a backup (5.2), but archives are never overwritten. Often (but not always) the type of media used for making an archive can only be written once.

5.4 Startup Device

A startup device is any device that can be used to "boot" or startup up a computer and/or computer equipment. It may exist on any media, device, and/or circuitry that can perform this function, and can be performed across a network.

(Intentionally no section 6)

7. Switching System:

7.1 Switch Mechanism: a physical switching device or a software switch (which uses software programs) to execute instructions and/or events. If a hardware switch is used it may be mounted on and/or in the computing hardware and/or on devices, control panels, dashboards, remote locations, control rooms, and anywhere.

For example, consider two data storage devices: Device A and Device B. The "Switch Mechanism" (in the form of a physical mechanism) could initiate the change of the device ID of Device A, and change the device ID of Device B. If the devices use jumpers for ID switching, the switching process could switch the jumper(s) on devices A and B to different IDs.

Software can do the same thing. For example, a program stored in a StorExecute (see definition) can be used to tell the computing hardware to "un-mount" Device A and "mount" Device B and treat the identity of Device B as a different ID.

7.2 Switch Trigger: Any method of triggering a Switch Mechanism to initiate the Switching Process. For example: Turning a switch or key, voice command recognition system, optical recognition system, software command, and/or any of a myriad other ways of triggering a switch to occur. The switch trigger can be controlled by the user or operator locally and/or remotely, across a network, wireless, etc. The switch trigger may be mounted on and/or in the computing hardware and/or on devices, control panels, dashboards, remote locations, control rooms, and anywhere. It may also be initiated in software only.

7.3 Switching Process: The process of using a Switch Mechanism to switch data storage devices to and/or from other data storage devices.

The Switching Process may also use an optional program/script to give the user/operator the choice of which data storage device they want to use. For example, a dialog can be used to give the user the option to choose from an array of several data storage devices. Optionally, this process could also run automatically. This process may include the opening and/or closing of electrical circuits connected to data storage devices, and/or ground connections, and or jumper cable connections, to switch which device "boots" the computing device, and/or switch data storage device identity.

Switching Process: The ability to switch device(s) and/or circuitry to and/or from other device(s) and/or circuitry.

An optional program/script and/or switch(s) gives the user/operator the choice of which device(s) they want to switch. For example, a dialog can be used to give the user the option to switch from "parent data storage device" to "child data storage device"; or offer an array of several data storage devices to choose from; or the user or program can switch to a different logic board or RAM chip, circuitry or computing device. Optionally, this process could also run automatically.

7.3.1 Switching Process: The ability to switch device(s) and/or network and/or communications connections.

7.3.2 The switching of data connections may also occur while electrical power is still connected to the device(s).

7.4 Switching a Data Storage Device:

The switching system may perform one or more of the following functions:

7.4.1. The switching process can change the device ID for a data storage device. For example, in the case of a hardware switch mechanism, in some cases it is a matter of closing or opening the circuit(s) of the jumper(s) for one ID, and not closing/opening other jumper(s) for different IDs. Another example: switching a cable select cable so that the "master" becomes "slave" and "slave" becomes "master" is another way of switching device IDs.

7.4.2. The switching process can change the device ID for a data storage device in other ways: this could also be achieved by having one data storage device (device "A") set to a particular ID (that is the startup device ID), but with its power switched off. Another data storage device ("B") could be in normal use. Then, when "A's" power is switched "on", this device, along with its ID, becomes "active", thus making it ("A") the new start up device. The ID used by device "B" can be switched to a different ID.

7.4.2.1. The Switching Process can switch data storage device power on and off, thus "hiding" and "un-hiding" the device; switching between making the device inaccessible and accessible.

7.4.3. In the case of software, a program may decide which device to mount and/or which device(s) to treat as active, and which device(s) to treat as inactive.

7.4.4. A software version may execute a program in a StorExecute, which can mount one data storage device and "un-mount" a different data storage device. Additionally, device Ids could be switched in software 7.4.5. Another example of how a software switch could operate is for a StorExecute, to be programmed to give the user and/or operator the choice which data storage devices and/or startup devices to use, and/or be programmed to make scheduled changes between devices in use. A StorExecute, can also change to become the default data storage device(s), unless the data storage device doesn't mount or freeze repeatedly, in which case it can automatically switch to another startup device and/or set of data storage devices.

7.4.5.1 Functionality of Circuit Board

This is but one example of how the Switching System can be controlled.

In circuit board figure W152T:

• A jumper shall control whether the time delay circuit receives power. Thus a jumper can disable the time delay circuit.

• If power is being supplied to power control indicators A, or B, or C, do not allow the board to switch anything, even if power to a power control indicator is changed. For example, if power is being supplied to power indicator A, and then is switched to power indicator B while power is still being supplied to indicator A, ignore the change and keep the terminals closed that are associated with power control indicator B. Only if power is removed from all power control indicators for a period of 3 contiguous seconds or more, allow the changes in which circuits are closed when power is restored to one of the power control terminals.

• Boards and switches combined must be any of these sizes or smaller (smaller is better):

• The socket shall bypass the circuit board with the neutrals (see diagram of neutral jumper bypass).

• If Circuit A: Wait X contiguous seconds and check to see if power is still on to A. If so, turn on time delay circuit. Leave circuit on Y seconds and then turn off circuit. If power is still on to B, don't run again until such time as power is removed from all controls A and B and C for at least 3 contiguous seconds.

• If circuit C, turn on time delay after X seconds (follow b above) and then turn on 1,2,3,4.

• ID Jumpers 4 and 6 are optional spares.

• For multiple users/operating systems, and/or data storage devices, duplicate the circuitry in the drawing (except for the controller and switch/switch lock... in most cases only one controller and switch/switch lock is needed.

In reference to figure L75:

Please note that this is just one example of the "Backup and/or Repair System" and is a functional design. The integrated "Backup and/or Repair System" Switching System can be integrated anywhere in or on the storage device, and/or integrated into the storage device circuitry.

It can be built with wires and relays, and/or a software switching process, and/or a circuit-board, and/or a logic control device. An optional switch can be used that is separate or integrated into the data storage device.

7.4.6. An optional program/script can give the user/operator the choice of which backup and/or archive they want to use to the repair. Optionally, the backup and/or archive process could also run automatically and/or on a timed schedule.

(Intentionally no section 8)

9. How each System works:

9.1 The Switching System:

Four issues should be clarified when considering the Switching System. The way in which the "Switching Process" is initiated ("Switch Trigger"), the hardware (or software) switch ("Switch Mechanism"), that which is being switched (data storage device IDs, power, etc.), and the location and/or accessibility of the "Switch Mechanism".

A Switch Trigger is used to initiate a hardware or software switching process that enables a computing device to switch between one or more data storage devices and/or partitions on one or more data storage devices; and/or sets of data storage devices (Figure M24). When using a "hardware" switch (i.e., when the "Switch Mechanism" is a physical device, as opposed to software only), the switch can switch power and/or device ID jumpers and switch between data storage devices and/or groups of data storage devices, as needed. Similar results can also be achieved using software instead of, and/or in conjunction with, the hardware version of the "Switch Mechanism".

If a "hardware" switch is used, it may be mounted on and/or in the computer and/or computing hardware and can be controlled in any way switches are controlled, including but not limited to switches, switch locks; voice control; optical recognition, encryption, passwords, etc. The switching device can be controlled by the user or operator locally and/or remotely, across a network, wireless, and/or automatically, etc.

The Switching System takes place as described in section 7. Optional scripts/programs designed for the switching process function can be executed as well. See examples described in section 7.3.6.

9.1.1 Switch Lock, Bypass, Delay, and/or Cylinder Lock Device - How it Works:

The locking mechanisms and switch deactivation mechanisms were developed to prevent damage to computer equipment if someone turned the switch at the wrong time. The locking mechanisms prevent the switch (or switchlock) from turning when it is not safe to turn the switch. The switch deactivation mechanisms deactivate the switch until it is safe to use the switch. Some versions of the Switching System do not require a switch locking mechanism or switch deactivation mechanism.
There are several ways to construct the lock. It could be done with a brake, clutch, tooth, clutch, solenoid, piezo device, etc. Two examples follow:

9.1.2 An optional solenoid, brake, lock, or clutch assembly can be used to prevent a key from turning in the switch lock when power is on. (i.e. figures M20, M21, and M22). This device can stop either the lock cylinder from turning, and/or a rod and/or other attachment to the switch and/or switchlock.

Example: A mechanical rotary cam lock with an extension or mechanical key lock with an extension shaft is mounted so that the knob or key can be turned from the outside of a computer, or can be located behind an access panel that can be accessed easily by the computer user.

Coming from the rear of the cam lock or key lock is a round extension shaft, 1/4" in diameter, for example. The shaft is surround by a brake, such as a friction brake, magnetic brake, or many other types of brakes or clutches that can be used to stop a shaft from turning, the shaft then is connected to a electric switch. These three devices can be separately mounted on a platform, or to make things a bit more compact, they can be combined into one switching device with one housing.

When power is on, power is supplied to:

1) the brake so the switch can't be turned, and 2) power is provided to the input power post of the main electric switch.

Therefore wherever the switch is positioned before the computer is turned on and power is supplied, devices connected to that circuit will get power, and at the same time because the brake is on, the user will be unable to turn the switch to another position until the power is off.

Example: Instead of locking the shaft, the shaft can be eliminated, and the brake/clutch/solenoid/piezo device, etc. can lock the cylinder and thereby prevent it from turning.

Or, another method can prevent damage to the computing device: Option: An "StorExecute" (logic control device, Programmable Logic Controller and/or circuit board) can be used that can perform one or more of the following functions: reset the PRAM, CMOS, BIOS, etc., switches data storage device identities as specified, and switches data storage devices as needed, switches their power as needed, restarts or resets the computer, deactivates switching process as needed, runs computing device as needed, etc. (Note: Switch Trigger can be initiated in myriad ways: the Switch Mechanism does not need to be physically moved to utilize integrated voice activated control, and control via telecommunications and network access – built into the circuit board/PLC. This board/PLC, etc., can also delay some switching events as needed, while other events transpire. For example if the user turns a switch the PLC/circuit board may delay that switching process, until it is safe for that event to take place without damage. Board may also deactivate Switch Trigger, and/or Switch Mechanism, and/or Switching Process as needed.

9.1.3 Switching System Scalability and Expandability- How It Works:

The Switching System switch is scaleable and expandable. It can switch one data storage device, or very large numbers (theoretically infinite numbers) of data storage devices. This is done simply by adding or removing switching circuits and control. We have developed modular switching devices than can be used for this purpose.

9.1.4 Location and Accessibility - How It Works:

One of the key features that make the Switching System different, is that there can be a "Switch Mechanism" (see definition) (a physical trigger) available to the user, and that the Switch Mechanism can be located anywhere, including on or near the computing device, and/or convenient to the user. For the first time, the devices being switched can be switched easily and conveniently. The Switch Mechanism can be located in easy to reach locations such as the front or side of computing devices, near user controls of robotic devices, on vehicle dashboards, in control rooms, locally, remotely, and/or wherever it is convenient for the user/operator. This enables the user/operator to easily reach a (the) switch(es). The Switch Mechanism can be easily accessed by any sort of a trigger, for example, toggle switches, buttons, switches, switch-locks, voice control, retina identification, encryption, card readers, magnetic key systems, and any sort of local and/or remote system used for triggering a switching process.

The Switching Process that can switch one or more of the following: between data storage devices, device ID's, power supply from one source to another, and/or on and off, and jumper connections. It can switch indicators (such as LED lights) for activity, power, and identity. It can also reset hardware and software settings. As needed, it can utilize optional scripts and programs to trigger the use of these new switching abilities. Another option, it can trigger a switching process over a network, and/or global computer network/global communications network (for examples see figures L70 - L76, M24).

The Switch Trigger can be used to initiate the switching process that switches between one or more data storage devices and/or partitions on one or more data storage devices;

and/or sets of data storage devices. When using a "hardware" switch trigger, the switch trigger can switch power and/or device ID jumpers to switch between data storage devices and/or groups of data storage devices as needed. The Software Switch can accomplish similar results (see explanation under Software Switch).

9.1.5 Note: Any switching features listed below can be combined with other switching features.

9.1.6 Note: Scripts and programs can be located on a StorExecute. (e.g.: figure W53 and L76)

Figure L76: The series of instructions of these various systems can be integrated into a StorExecute. These methods may utilize software, hardware, and/or a combination of hardware and software. For example, a program can be written into ROM that controls the startup sequence and/or data storage device selected for startup during normal use; and then when a request for repair has been made, the program in ROM can switch the startup device. Additionally, for example, a memory module can contain the master template(s), the backup(s), archive(s), and/or any other software, instructions, and/or code to execute the Switching System.

In the figure L76, L76.1 represents the concept that the switching system can be executed via a StorExecute. It may store and/or execute the some or all of the instructions that may control the entire repair process. For example it can reset PRAM, CMOS, BIOS, etc. settings as in L76.2, it can determine which data storage device will be the startup device, and switch startup devices during the repair process if needed, (it can also perform some types of repair without switching startup devices), it can control backups and archives to a storage device, memory module, a remote location, etc. It can also control communication with the users, manage automatic repairs and processes, including, but not limited to execution of all scripts, switching, programs, etc. It can interact with other logic control systems and devices to conduct, coordinate and manage collaborative repairs with other computing devices using the Switching System.

In the paragraph above, when we use the word "computing device" it is used in its broadest sense… for example, it could consist of biological and/or "nano" computing elements and switching mechanisms.

9.1.7 There are myriad combinations, permutations and variations on how hardware and software switching can be done. The following are only a few examples for demonstrating concepts. A person skilled in the arts can develop numerous variations in short order.

*****

9.2 Specific Examples:

9.2.1 The "Backup and/or Repair" System as Used for Computer Repair - How it Works:

The "Backup and/or Repair" system can be used to repair computers, and other devices that use data storage devices. One option is for the "Backup and/or Repair" system to keep and/or utilize one or more "perfect" master template(s) of all or some of the user's data stored on their data storage device(s), and it can backup and archive all and/or some of the user's data. When the data on a data storage device, or the data storage device itself has a problem, the "Backup and/or Repair" system uses its Switching Process and the Master Template(s), and/or the Backup(s), and may use a/various script(s) and/or program(s) which can for example be located on a StorExecute, to repair the data storage device(s). Rather than using a Master Template, and/or in addition to using a master template, the "Backup and/or Repair" system can also conduct the repair from a backup, archive, and/or other data storage device(s). (Example: see figures F31 - F44).

Optionally, the Master Template System and/or Backup System, and/or startup device may be utilized to perform their functions as described in sections 5.1 and 5.2. (Example: see figures F31 - F44)

If a decision is made (by user and/or operator and/or program) to repair a data storage device (Example see figures: W51 - W64), then the Switch Trigger triggers the Switching System. Several options and variations on what devices are switched can transpire at this point. This can occur in many variations. The Master Templates and Backups and Archives can exist on only one data storage device or on many different data storage devices in myriad combinations and repair one data storage device, or many.

Optionally, the Switching Process (See example figures S1 - S10, M24 and W51 - W64) can change the startup device to a different startup device that is connected to the computing system hardware either locally or via a network. Upon starting ("booting") from this new startup device, and/or upon switching to another logic control device, a program that may reside on this new startup device, and/or a logic control device, and/or StorExecute, may execute and display a list of various options, for example, methods to "fix" the data storage device that is in need of repair, and/or update Master Template.

An optional program and/or script may also execute (or give the user a dialog box offering the user to select) functions to be performed such as: user may choose to reformat the data storage device that needs repair ... and/or the user may choose to execute a low level or quick reformat of the data storage device, or the user may choose to skip the reformatting process. When choice is selected, the function is performed by a program that executes that function, e.g., reformatting software is run.

Optionally, the user may also be asked if he/she wants to copy all or some of the data that exists on the Master Template data storage device(s), and/or Backup data storage device(s), and/or Archive data storage device(s), to the data storage device(s) that need(s) to be repaired. If this choice is selected, then the same type of program that was used to make the backup(s) could also be used to copy and/or modify the data from the Master Template back to the user's data storage device, thus making the data storage device used by the user (nearly) identical to the Master Template. (There may be some variations made to the data on the repaired data storage device as needed-- for example, shortcuts and/or aliases may need to be modified to point to their targets correctly).

Optionally, a program and/or script may also execute (or give the user a dialog box asking the user to select) any of the following functions to be performed: copy data from one data storage device (from a particular date or partition) to a different data storage device, as needed. For example, the same type of program that was used to copy User Documents, Email, Bookmarks/Favorites, Quicken data and/or preferences, etc. to the Backup Storage Device, can now reverse its process and copy all or some of the data back to the user's data storage device that needed repair. (A script may be executed that gives the user the choice of which backup (e.g. from which date) to copy the data).

Optionally, a program and/or script may also execute (or give the user a dialog box asking the user to select) any of the following functions to be performed: modify data, and/or perform ANY instructions ("de-fragment", virus scan, re-partition, etc.) that affect ANY data storage device that is in need of repair and is accessible/available to the computer system locally or across a network.

Upon successful completion of the repair process, a program and/or script may execute that causes the Switching Process to select the original "startup device," and the repaired data storage device can continue to operate normally.

The Master Template System and/or Backup System, and/or original data storage device may continue to be utilized to perform their functions.

The "Backup and/or Repair" system Switching System is utilized as described in section 7. Optional scripts/programs designed for various other functions can be combined as well.

9.2.2 In reference to figure TW 169:

This is another example of one method of an optional automatic repair script/program:

Upon computer startup, a script/program can hide all activity that occurs in the background. During this time, a logo and text or other information and/or graphics may be shown to user. This text and logo could be able to be modified by the user. Optionally, this "hiding" function can be toggled off/on at any time by keyboard input of a password and/or use of (a) "hot" key(s) by the user.

Optionally, a program or script could run the following sequence of events (all in the background hidden from the user):

A backup and/or archive program could be run that makes a complete backup and/or archive of the data on the data storage device that is normally used (e.g. at device ID 1). The destination of this backup and/or archive could be able to be modified in user preferences. For example the backup/archive could go in a partition or folder on the drive at ID 0, or could go on a drive at ID 2.

Optionally, a program or script executes that checks to see that the backup has been made successfully. After confirmation that backup is complete and successful, user can be given an optional dialog (that can be modified by client) allowing user to select one of the following options: (ID 1 is used as an example) no format of ID 1, quick format of ID1, low level format of ID1. Optionally including complete deletion and recreation and/or re-write of all partitions, master boot records, etc. (Background could remain hidden) Optionally, this dialog only shows up if selected in preferences. In lieu of this dialog, preference can be selected by the user as to which type of format is performed or not performed.

Optionally, if user is given the option in "user-preferences," based on user selection, quick, or low level, or no format is run on ID1. Otherwise whatever default option is in preferences is done. Optional script then executes a program that copies some (not all) data on ID 0 to wherever data belongs on ID 1. For example this script may copy such items as: Explorer Favorites, Netscape Bookmarks, E-mail, in box, out box, and address book. Optional: LED and/or computer screen can provide a dialog box that says something like: please turn switch to "Normal Use" position. Optional: LED and/or computer screen can provide a dialog box that says something like: "please restart computer". Or those events can happen automatically, with or without dialog. Optionally, all the events described above can also be written into a StorExecute.

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*

*Invented by Anthony More & Kenneth Largman Version 42601*

9.2.3 Another example of controlling the repair process. See figure TW169

- An optional time delay circuit can be integrated that allows the PRAM/CMOS/CUDA, etc. to be reset prior to performing the rest of the repair process.

- Optionally, a controller can reset PRAM/CMOS/CUDA/BIOS, etc.

- Optionally, a logic control device can delay switching between data storage devices until restart, and/or can avoid restart by use of switching control to another logic control device, and/or can conduct repairs without restarting.

- Optionally, a second processor and OS can run in the background so that switching for repairs does not require restarting.

Please Note:

In all wiring and circuit board diagrams, only the material are illustrated, and it will be understood that they are not drawn to scale.

9.2.4 The "Backup and/or Repair" system as used for Repairing Several/Many Data Storage Devices, Multi User Repair:

The repair process can be used to repair multi-user computing devices, and/or device with multiple data storage devices using the same techniques as described herein for single data storage devices.

9.2.5 The "Backup and/or Repair" system as used for Emergency Startup - How it Works:

The "Backup and/or Repair" system can be used for switching to an emergency startup system and/or device. When a startup system and/or device can't be seen, and/or at the request of the user, and/or other request from elsewhere, the "Backup and/or Repair" system can switch to a secondary startup system and/or device, and/or to switch between RAID mirror data storage devices and/or systems. The "Backup and/or Repair" system Switching System is utilized as described in section 7. Optional scripts/programs designed for various other functions can be combined as well.

9.2.6 The "Backup and/or Repair" system as used for formatting and device testing - How it Works:

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*
*Invented by Anthony More & Kenneth Largman Version 42601*

The "Backup and/or Repair" system can be used to test data storage devices. It can be used to temporarily switch to a data storage device for startup, while a data storage device reformats and/or tests another different data storage device. It does this by switching from the data storage devices in-use, to alternate logic control and/or data storage devices that are used while testing and formatting takes place.

9.3 The "Multi-User System" as Used for Multiple Operating Systems and/or Software - How it Works:

The "Multi-User System" can be used to have totally different setups of operating systems and software, and switch back and forth between them. So for example this would enable a computer to be set up with Linux and movie editing software in Japanese, and the "Multi-User System" could then switch the computing hardware to be set up with Windows and mathematics software in German.

9.3.1 The "Multi-User System" as Used for Multiple-Users - How it Works:

The "Multi-User System" can also be used to enable multiple users to use computing hardware as if each of the users had their own private computer. When a user is using a computer, the "Multi-User System" sets up the data storage device, operating system, applications, etc. just for that particular user. Then, when a different user wants to use the computer, the "Multi-User System" hides away the previous users data storage device, operating system, software, and data, and provides a different data storage device, operating system, and software for the new user.

9.3.2 The "Multi-User System" as used for Switching Between Several/Many Data Storage Devices - How it Works:

Data Storage Device Switching: "Multi-User System" can also be used for rapidly switching between many different data storage devices such as those used on computers. Please note that if the data storage devices are set up as bootable startup devices, then the "Multi-User System" can switch rapidly between startup data storage devices.

9.4 The "Virus-Proof/Hacker-Proof System" - How it Works:

A "Network accessible" data storage device defined:

A network accessible data storage device could usually be switched partially or completely off, and/or the network connection could be switched off, and/or the network accessible data storage device could be "un-mounted." The network accessible data storage device could: 1) only be mounted and/or connected to the network, and/or turned on, when used for sending and/or receiving data on the network; or 2) could always be network accessible; or 3) sometimes be network accessible.

Optionally, the network accessible data storage device could be limited to containing only non-sensitive software, and/or outgoing data waiting to be uploaded or sent.

Optionally programs could exist on the network accessible data storage device that enables mail to be sent and/or received, but not opened.

The program could: unlock and/or open network connections, send and/or receive mail, upload and/or download data, close network connections, mount and or turn on, and/or connect to another data storage device, send downloads and/or mail received to another data storage device.

Quarantine data storage device

A Quarantine data storage device is utilized in the transfer of data back and forth between isolated segments of a computing device. Data may be copied from the "Internet Accessible" and/or "Temporary" data storage device to and from the Quarantine data storage device and then into the protected user data storage device as needed to isolate/protect data. Optionally, after being held in quarantine for a period of time, data can be checked with the latest virus checker before being copied to the protected user data storage device.

Additional information

If any computer on the network detects a virus and/or starts missing data, it notifies all nodes on the network and a preset protocol of response takes place that may consist of one or more of the following: all nodes on the network make backups; all nodes download most current virus checker; all nodes check themselves; backup schedule for all nodes may increase, etc.

Multiple communication cards with various identities may be used to switch identities and send/receive data. A computer send/receive function may be set up like a shell game, where the identity is changing rapidly, and the data storage device is on-line for as short a time as possible… just long enough to send and/or receive, and then it is taken off line. Rather than using a separate drive for viewing data, software would not allow viewing until drive was off line… then before going back on line, software would transfer all data except outgoing data to quarantine.

A program may also synchronize (or copy on a time-delayed schedule) emails (and or other files) that were sent and/or received from the "Temporary" data storage device to the "Quarantined" data storage device, as needed.

(Optionally, data on a data storage device (and associated computing hardware that determines date/time) may be "duplicated" onto a different data storage device with one significant difference: it could be set to use an "older" date/time setting so that if a "date-triggered" virus is present it would not trigger on the "older date" data storage device.)

9.5 The "Hardware-Repair System" as used for Emergency Computing - How it Works:

The "Hardware-Repair System" can be used for switching to emergency backup computing when a computer fails due to hardware problems. The "Hardware-Repair System" can switch to a secondary computing device, and/or to switch between computing components 9.5.1 The "Hardware-Repair System" as used for formatting and device testing - How it Works:

The "Hardware-Repair System" can be used to test computer hardware components, circuit boards and computers. It can be used to temporarily switch to a data storage device for startup, and then tests hardware components. It can be used to switch to a different logic board, network connection, or computing system, while it tests the components that were taken out of use. It does this by switching from the devices in-use, to alternate devices that are used while testing and formatting takes place.

9.5.2 Software Switch Replacement - How it Works:

A software switch replacement can use a program that performs many of the same functions as a switch.

For example, imagine two computers: Computer A and Computer B. A hardware switch could be used to turn off Computer A, turn on Computer B, and switch jumper(s) on a mirror data storage device on B to ID 0.

Software can do the same thing. For example, a simple program in ROM or elsewhere can be used to tell the computer (or computing device) to switch computing devices and use a mirror of the data storage device.

Software can select which computer circuit boards, devices, components, and hardware to utilize.

9.6 The "Freeze-Buster System" - How it Works:

The "Freeze-Buster System" includes a switching process that can switch and reset connections to devices. To do this it switches on/off one or more wires that run between the device and the computer/computing device. It can be used to switch any connections such as data, and/or power, and/or ground. It can switch one or more devices. It can also switch indicators (such as LED lights) for activity, power, and identity. As needed, it can utilize optional scripts and programs to enable use of these new switching abilities. Another option, it can switch local computing hardware, and/or switch over a network.

For example, imagine that an external "hot-swappable" data storage device is attached to a computer. "Freeze-Buster System" can be integrated into the device, or put inline, or on the computing device. It switches the connection to the device off/on as needed to break out of a freeze, and/or reset the connection.

Freeze-Buster can be used to reset connections with external and internal devices.

9.7 The "Net-Lock System" - How it Works:

The "Net-Lock System" includes a switching process that can switch one or more of the following: network and communication connections. It can switch indicators (such as LED lights) for activity, power, and device identity settings. As needed, it can utilize optional scripts and programs to enable use of these new switching abilities. Another option, it can switch local computing hardware, and/or switch over a network, and/or global computer network/global communications network. (for example see figures L70 - L74, M24.

A program and/or script may also execute (or give the user a dialog box asking the user to select) functions, for example, but not limited to:

- Lock/Unlock Network and/or communications connection.
- Setup remote lock and unlock preferences
- Schedule lock and unlock times
- Create or modify list of users who are authorized with lock/unlock privileges 9.7.1 Network Privacy and Security - How It Works:

The "Net-Lock System" can also switch on and off network connections. It can use the "Net-Lock" switching system to turn off and on (and lock and prevent access to) connections to a global computer/communications network, intranet connections, and all other types of network connections.

9.8 The Entertainment Center System as Used for Computer Repair - How it Works:

The Entertainment Center consists of electrical connections, holders, fittings, etc. on the inside, outside, and/or integrated into the body of a computing device that provide the ability for the user (or manufacturer) to hook up anything they want that may interact with the computer and provide entertainment, education, artistic value, etc. For example the outside of a computer can be covered in part, or completely with electrical connections that allow a user to attach devices. Examples:

Example 1: Flashing lights plug into a device that is attached or is itself the computing case. User can change where lights plug in. Lights interact with all switching events and/or with the user(s)

Example 2: A model and/or robot (or robotic device) modeled/constructed in the likeness of a person and/or animal and/or creature and/or thing and/or device, with computer built in Example: Robot that appears human, holding flat screen monitor, sits cross legged on users desk. Wireless keyboard option. Speech, movement, vision, etc. can be integrated into this robotic device. As part of the interface with the computer, the robot can explain what is happening, and discuss events taking place on the computer, work performed by the user, daily news, information gleaned from the internet, ask questions about how the user is feeling, etc.

Example 3: It can be used for art projects, education, entertainment, can consist of any creative use a user wants to make of it. For example, it can be an aquarium, or a hamster house, (in which case attachments can monitor and interact with the pet, and give user feedback. (i.e.: number of cycles a hamster has run on a wheel, etc.) It can be used for educational projects, anything at all. The idea boils down to this: A computer/computing device, does not need to look like a computer. It can have electrical connections and methods of attaching things that enable a user to do anything creative and constructive with the outside of the computing device. Events taking place in the computer can interact with components attached to the computer, and/or in communication with the computer. Components attached to the computer, and/or in communication with the computer can interact with the computer and information can be exchanged, processed, controlled. The computer can control the attachments, and/or the attachments can interact with the computer.

Example 4: The entertainment center can have switches that turn things off/on and interact with the computer Example 5: The entertainment center, that is connected to and/or houses the computer/computing device, can look like anything. Whatever someone wants to create. And any artistic endeavor.

Example 6: Entertainment center: Can use interactive modular devices, modular components that fit together, and/or non-modular components.

Example 7: The entertainment center can utilize and/or interact with any form of modular and non-modular devices that can plug into it. People can create whatever fantasy they like. Any sort of modular and non-modular kits can be built to be utilized with the entertainment center and for any purpose such as education, entertainment, games, science, robotics, chemistry, art, lighting, whatever.

Example 8: The entertainment center can run and/or be integrated with a biosphere, terrarium, garden, food dispenser and/or diet control device that may provide food on a schedule.

9.9 Method of Creating Custom Cables and Connections

Figure W177 description

A method of constructing new types of cables and/or connectors to enable switching.

"A" is a cable utilizing a new type of connector "B". The view of B is a top or bottom view. In this example 3 of the wires need to be switched, so the cable has been manufactured with 3 of the connections split. For example connection "N" is connected on one side to the cable, and the other side is plugged into a hard drive, but the connection between the two sides leads to separate pin outs on the cable, (in this example they are located at the top or bottom of the cable). These pin outs can then be connected to wires or a cable that is then attached to a switching device with switches the connection(s).

Example J below is similar to the connector above, but it is not built into a cable. Two cables could be plugged into each end of it, or a cable could be plugged in one end, and the other end could be plugged into a data storage device for example.

Example K is a top or bottom view of a connector in which each of the wires is switchable, and diagrams L and M shows side views of the same connector. The connections in these special cables and/or connectors can be male and/or female.

The switching process can be controlled manually, and/or by a logic control device.

F shows a switch with optional logic controller which can be plugged into standard cables and connectors, and that can switch one or more of the connections.

Please note that these new type of connectors don't need to have the new pin or connectors at the top or bottom, they can be located anywhere convenient. They can be any shape and/or side, and be designed for any type of cable.

Alternatively, the wires themselves can be routed directly to a switch (and back) as needed. Thus, cable A can have one or more of the wires routed directly to the switch as wires and/or as a cable.

This can be used to switch any type of cable, for example, it is possible to switch device ID, read/write, power, perform cable select switching, switch hardware devices, individual components, etc.

Figure W179 description

Figure W179: The one or more wires in a cable can be cut and go to a switch. This can be used to switch any type of cable, for example, it is possible to switch device ID, read/write, power, perform cable select switching, switch hardware devices, individual components, etc.

9.10The inventions described herein can be mixed and matched as needed 9.11Anti-theft system: The Anti theft system can contain one or more of the following: cellular phone technology, a global positioning system a transmitter/receiver, a meaning of identifying the user, and an extra data storage device, logic control, and a switching process. Using all or some of these devices it can use any means of identification to identify user. If user does not match authorized user the following events can occur:

1) User data storage device is switched off and is thus "hidden"

2) A "bogus," but normal looking data storage device is switched "on," and mounts (optionally id may be switched). It may optionally have a hidden partition that is protected from being erased. Software executes that may be hidden and/or misnames, and/or otherwise would not draw attention from the user and sends out machine location to for example, police, owner's e-mail address, a security service. Information can also be transmitted using any type of transmitter, example: cellular phone call, and/or be sent over a network and/or the internet. The anti-theft process could also be triggered by a phone call.

If user identity doesn't match authorized user, the device may hide the user data storage device, switches to "rigged" data storage device, and also may turn on a global positioning system transmitter to identify location of computer.

When the location of the computer is identified, it can be tracked, even if it is moving.

9.12A combined repair system:

The hardware repair system can be combined with the other parts of the invention to provide a unique combination of repair functions. For example, if the hardware repair system included all of the features described herein, the combined inventions would provide a computer that could repair any software and hardware problem, be immune to hackers, be extremely virus proof, provide entertainment, interface, artistic, and educational features, etc.

In one example, the Self Repairing System utilizes two processors, and can use two discrete computing systems (with an optional shared data storage device, and/or mirrored data storage devices and/or quarantine data storage device(s) that may be integrated into one box) and can be combined with the hardware repair system.

Combined hardware & software repair example: If a second computing process is utilized, repairs can happen on the fly, perhaps without notice by the user, and/or with little interruption to the user. An integrated secondary backup computing system can always be "up and running", with the ability to automatically detect a problem, switch to the backup system, and conduct software repairs on the fly, and/or conduct repairs from the backup system, without bothering to switch the user to a secondary system (unless needed) because the repair process can be so fast the user may not even notice a problem. For example, a freeze occurs. The secondary system can detect the freeze, reset connections, replace defective software components, and clear and reset devices as needed, so fast that the user may never notice that a freeze took place The repair process can (optionally) utilize a comparative process that compares the software on the user data storage device to a perfect Master Template. By monitoring user processes, we can monitor the state of the user template, be aware of changes (optionally, have a database of changes and/or differences between the user data storage device and the master data storage device) and rapidly repair the user data storage device (on the fly) as needed based on that database, reset connections, and reset memory if needed.

As an option, system does not need to discard (and/or overwrite) user documents, email, etc. so if there is a freeze or corruption problem only the system software, and/or offending software that is having a problem can be repaired, and just those components that are different from the master can be replaced.

9.13 Optionally, the user operating system and/or applications, and/or data and the Master Template, and repair process can be run in volatile memory, enabling a fast repair process to perform much more quickly, especially if a comparative repair process is used that repairs problems as they occur. Thus, if a "process watcher" is used to detect a problem, the fast repair process can happen so quickly it may not even be noticed by the user.

9.14 Another version of the web site repair process is to use the repair process to repair the web site on a continuous basis during use, and/or optionally switch to other web servers during the repair sequence. Thus, a web site can always be kept in "perfect" condition. If the anti-virus/anti-hacking system is integrated, it could also prevent hacking past the web site. In this case, for example the web site could reside on the data storage device accessible to the network and/or internet, but all other data on the web server would be isolated, not connected to the network, and therefore "un-hackable."

Optionally, an integrated logic control device can reject additional users and close the site down for repairs when defects in the site are detected (during the process of comparison with the master template). To do this, during the repair process, when it is noticed that files and/or data is changed, modified, and/or different, the software then sends a command to the logic controller to reject further hits to the web site, (and optionally disconnect web site users), and conduct repairs as needed.

*"Backup and/or Repair System" – "Multi-User System" – "Virus-Proof/Hacker-Proof System" – "Hardware-Repair System" – "Freeze-Buster System" – "Net-Lock System" – "Entertainment/Communication System" for Computing Devices and Hardware*
*Invented by Anthony More & Kenneth Largman Version 42601*

9.15 All of the inventions herein can be integrated into any device that utilizes a computer and/or computing device, such as televisions, radios, network appliances, machinery, vehicles, etc.

9.16 Net-lock and Freeze-buster can be internal and/or external devices. Either of these devices could lock into place using any sort of locking system and/or holder and/or retaining mechanism and/or device.

9.17 In Anti-virus/Anti-hacker can switch back and forth between a "side" of a computer connected to the internet, and a "side" that is isolated from the internet, by use of a hardware and/or software switching process.

9.18 Dual network connection cards (and/or multiple "cards") can be controlled by a single switch and/or switching process.

9.19 Net-lock can be triggered by software and can be a software switch, without use of hardware.

DIAGRAMS

S

The diagrams that begin with "S" represent the concepts of what we are switching, and that power, ground wire(s), device ID(s), startup order, data, etc. may be switched, and may bypass the switch as needed. They represent circuitry that could optionally bypass the switching mechanism; for example: power and/or ground and/or data (including via SCSI, Firewire, USB, IDE, and all other types of data communication). We assume someone skilled in the arts can use a bit of common sense here.

Please note that data storage devices, switch triggers, etc. in diagrams can be "local", or utilized over a network.

In the figures S1-S8, the circle with an X in it represents the switching process. The lines to the circle with the x show what is switched, and lines that go around the outside of the devices, (and not to the switch) represents the concept that the data does not need to get switched (but it can be switched).

Any combination of the 5 V and/or 12 V and/or ground and/or other power may be switched, either individually, or in combination. It is possible to switch the jumper cable connections that determine the boot order upon system startup. These connections are indicated on Figure S1 by the letters (a) (b) and (c).

Also, ground wires have not been shown, because anyone skilled in the arts can hook up ground wires (or interrupt them).

Data storage devices shown in these drawings can be hot swappable, "local", or located on a network.

When computing equipment is used with any other type of device(s) (for example: robots, robotics, transports systems, televisions, telecommunications, manufacturing, equipment control, etc.) the Switching System switching system and/or switch trigger can be relocated, and/or additional switches and/or switch triggers added, so as to easily provide accessibility users and/or people controlling the system. Additionally the switch mechanism and/or trigger can be camouflaged or hidden as needed. Location appearance, and type of switch can be changed as needed.

S1: Example of Backup and Repair System: the Switching System (S1500) is used for repair of one or many data storage device(s) (S1150) switched via connection (b), and connected to computing system hardware (S1100) via connection (f). Master(s) and backup(s) reside on one or many data storage device(s) (S1700) connected to the computing system hardware via (g) and switched via connection (a). Electrical power, and/or ground wire(s) and/or jumper cable connections, and/or any connection that determines the boot order upon system startup, may all be independently or collectively switched by the switching process. These various connection types are indicated on Figure S1 by the letters (a), (b) and (c) and can be switched by the switching system (S1500). In the event that ID switching is used, the ID of the startup device can be switched to a different ID, and another data storage device can be switched to the default startup device position.

Optional PRAM, CMOS, CUDA, BIOS, EPROM (or other memory storage module and/or device) reset is indicated in box (9202) and controlled by the switching system (S1500 via the connection (d) and powered by connection (e).

S2: Example of Backup and Repair system Switching Process as used for repair of one data storage device. Master and backup on separate data storage devices, with archive.

S3: Example of Backup and Repair system Switching Process as used for repair of two or more data storage devices. Optional startup device.

S4: Example of Backup and Repair system Switching Process as used for repair with other processes such as switching circuit boards, chips, devices, device identity, data storage devices, circuitry, global positioning transceiver & transmitter anti-theft and positioning system, computing hardware systems, ROM, backup storage devices, identity indicators, remote trigger and/or switch, and any StorExecute (see definition).

S5: Example of Multi User System as used for switching between multiple operating systems, software setups, storage devices, and/or circuitry, and or templates.

S6: Example of Backup and Repair Switching System as it is used for repairing multi-user and/or multi-use use, (such as parents and children.)

S7: Example of Backup and Repair process as used with many data storage devices and/or startup devices and/or circuit boards.

S8: Example of Backup and Repair Switching System as used for emergency startup and/or operation.

S9: Example of Hardware-Repair Switching System as used for switching between computing devices. Thus, if one computing device fails, it is simple to switch to a secondary computing device. S9110 optional combined hardware represents the concept that such items at keyboard, mouse, monitor, etc. can be shared, or seperate.

S10: Example of BAR system Switching System as used for switching data storage device identity. A relay and/or switch can be used to break and connect jumpers as needed to change device identity.

S11 Switching process with dual computing devices and ability to switch data storage devices.

S12 Examples of Switching System triggering methods: switch trigger (a) triggers the Switching Process (b).

S13 Switching process for the purpose of isolating data so as to protect data from malicious code and/or "hackers" that are "snooping" via a network connection.

S14 Switching Process switching computing hardware devices in order to isolate and protect data and to include the repair ability of figure S1.

S18 Switching Process controlling dual/isolated computing systems for the purpose of isolating data (so as to protect data from malicious code/un-authorized network "prying eyes" ("hackers).

S19 Switching Process switching computing hardware devices in order to "repair" the computing device, e.g. the ability to switch from a "failed" device to a "backup" or "redundant" and "functioning" device S20 Example of switching a network connection "off" or "on" and then back again.

S21 Example of the ability to interrupt a connection to a connected computing device for the purpose of "resetting" or "unfreezing" a connection and/or device.

S22 Example of isolating/protecting data by switching data storage devices and network connections.

S23: Example of various "systems" capable of being integrated with one another in a interconnected (optionally modular) manner. Note: each "system" can be "mixed and matched" selectively with other "system(s)" to function independently and/or dependently.

F

The diagrams that begin with "F" are flowcharts.

F20: This example shows the switching process between data storage devices. The switching process switches to a different startup device and/or group of data storage devices.

For example: User is using data storage device "A", then triggers the switching process, and device "A" is deactivated, and device "B" becomes the new startup device.

"A" and "B" can each represent one data storage device, or an entire group of data storage devices. Although the diagram only shows switching between A – G, there is actually no limit to the number of devices it can switch. Please note that: a user, schedule, or event may trigger the switching process.

F31-F44: Diagrams F31 through F44 are considered to be one continuous flowchart extending over seperate pages.

F31: Example of sequence of events including optional backup, archive, Master template creation/update F32: Example of sequence of events including: switching startup devices; reset of PRAM/CMOS/CUDA, BIOS, EPROM (or other memory storage module and/or device) etc.

F33: Example of sequence of events including options offered to user.

F34: Example of sequence of events including more options offered to user.

F35: Example of sequence of events including method of virus checking.

F36: Example of sequence of events including backup and archive of data.

F37: Example of sequence of events including options for user to run various types of repairs.

F38: Example of sequence of events including options for user to select startup device.

F39: Example of sequence of events including options for user to select automatic repair preferences.

F40: Example of sequence of events including options for user to select type of data storage device format.

F41: Example of sequence of events including an example of repairs performed based on preferences.

F42: Example of sequence of events including backup/archive and options for user to select which backup or archive to "revert to".

F43: Example of sequence of events including update of master template.

F44: Example of sequence of events including options for user to revert to prior bookmarks, E-mail, and other items.

F50: Switching Process occurring without shutting the computing device down and restarting by utilizing two or more processors (and/or "protected processing") and two or more memory devices (and/or "protected/segmented" memory).

F51: By isolating data, potentially malicious code (e.g. viruses) cannot destroy other isolated data because it does not have access to the "protected" data.

F52: The Switching Process (5210) isolates data (5220) that exists on or in computing devices.

F53 Examples of the types of devices where data can exist (and thus isolated).

F54 Example of booting into different data storage devices for the purpose of isolating data on different data storage devices.

F55 Example of isolating data in volatile memory by "flushing" volatile memory, or "emptying" its memory, before and after switching to different data storage devices.

F56 Example of isolating data in volatile memory by utilizing two discreet volatile memory devices when switching between different data storage devices.

F57 Example of isolating data in volatile memory by switching between discreet "segments" of a single volatile memory device when switching between different data storage devices.

F58 Example of isolating data in processors by utilizing two discreet processor devices when switching between different data storage devices.

F59 Example of isolating data in a processor by switching between discreet "segments" (or "protected" addresses) of a single processor device when switching between different data storage devices.

F61 Example of the Switching Process (6110) occurring so as to physically switch "on" or "off" (by "breaking" or connecting the circuit/wiring) power connections (6120) and/or data connections (6130) of a network connection device (6140) as utilized by a computing hardware device (6150).

F62 Example of the Switching Process (6210) occurring so as to "logically" switch data connections of a network connection device (6240) by ignoring data (6220) or by ceasing to process the data (6230). A computing hardware device (6250) typically utilizes network connection devices.

F63 Example of a "brief" Switching Process (6310) occurring so as to physically switch, momentarily, from "on" to "off" and then quickly back to "on" (by "breaking" or connecting the circuit/wiring) power connections (6320) and/or data connections (6330) of a peripheral computing device (6340) as utilized by a computing hardware device (6350), for the purpose of "resetting" the device.

F64: Example of switching system connected to a computer that is connected to a network (e.g. a web server connected to the Internet) and many data storage devices (a, b, c, d, e, f -- could be many more). Switching system "cycles" between data storage device so that only one data storage device is utilized (online and connected to the network) by the web server at any given moment. Note: data storage devices may also be "repaired" (see figure S1) by repair system (while not connected to the web server) if they become corrupted or "hacked" (defaced).

F65: Example of a Switching System that "records" data from one memory device to a second memory device so that if memory in first memory device is deemed to cause undesirable events in the processor, the user can "revert" to the code/data that was executed before the undesired event occurred, thus allowing computer (and/or user) to avoid the activity that caused the problem the first time.

F66: Example of Switching System used as an Anti-Theft device to protect a user's private data. Optionally, it may verify ID as method to trigger Switching System. Optionally, system may send a signal to identify the computer's location.

F90: One example of the direction that data is allowed to "flow" from one device to another.

The diagrams (Examples: Figures 200.1-200.5, 201, 90) are meant to represent the concepts of what we are switching, and that power, device ID, network connection, data, etc. may be switched, and may bypass the switch as needed. They represent circuitry that bypasses the switching mechanism such as power when it is not switched, ground, data (including via SCSI, Firewire, USB, IDE, and all other types of data communication). We assume someone skilled in the arts can use a bit of common sense here.

F200.1 – F200.5: Flow chart of step-by-step scenario for process of protecting data from virus and hacker attacks.

F201: Devices the computing device switches.

W

Wiring Examples:

Circuit Boards: Figures starting with the letter "W" show relays and wires which we used for building prototypes. We have not duplicated the drawings into their circuit board versions because anyone skilled in the art can perform the same functions via circuit boards.

Please note that data storage devices, switch triggers, etc. in diagrams can be "local", or utilized over a network.

We have used relays and wires in the drawings, but assume that anyone skilled in the arts can convert relays and wires to circuit boards.

Data storage devices shown in these drawings can be hot swappable, "local", or located on a network.

When computing equipment is used with any other type of device(s) (for example: robots, robotics, transports systems, televisions, telecommunications, manufacturing, equipment control, etc.) the switching system and/or switch trigger can be relocated, and/or additional switches and/or switch triggers added, so as to easily provide accessibility users and/or people controlling the system. Additionally, the switch mechanism and/or trigger can be camouflaged or hidden as needed. Location appearance, and type of switch can be changed as needed.

In most of these diagrams the 5 V and 12 V power can optionally be switched, but in most cases both can be switched, but it is only necessary to switch one or the other.

Also, ground wires have not been shown, because anyone skilled in the arts can hook up ground wires.

W40: Example of Switching Process switching the data storage devices for the purpose of repair. This is accomplished by switching power and jumper Ids to change the startup order of said data storage devices.

W51: Multi-User computing system, with data storage device identity switching, PRAM, CMOS, CUDA, etc. reset, Switching System repair process, and use of brake, clutch, circuit board, programmable logic controller, etc.

At W5110 the circuit board/PLC can time delay the sequence of events so that the reset relay (for example see W5117) is triggered first, and then after completion of reset, the rest of the switching process continues. Thus, if PRAM, CMOS, etc. is corrupt or set for a different startup device, it will be cleared prior to the next steps. Also, optionally after reset, a program or script can be run that sets the startup sequence and/or resets PRAM/CMOS, etc. to predetermined settings.

W52: Single User with repair.

W53: Repair and backup of Multi-User and/or multi-use system, and PLC and/or circuit board, and reset of PRAM, CMOS, CUDA, etc. Also, example of modular approach to backup and repair process. The same wiring and circuitry methods can be duplicated over and over for more users/more devices.

W55: Repair and backup of Multiple Data Storage Devices. Shows repair, backup, and individual switching of power and device identity. Please note that the device identity switch could be the type that is usually on the back of external SCSI devices that can be switched from 0 -6 or the type that can be switched from 0 - 15, or other switches that can perform switching to multiple identities. Also, example of modular approach to backup and repair process. The same wiring and circuitry methods can be duplicated over and over for more users/more devices.

W56: Repair and backup of Multiple Data Storage Devices. Shows repair, backup, and individual switching of power. Please note that device identity is not switched in this version. A version can also be constructed that has some of the devices switched, and some not switched. Also, it is an example of a modular approach to the backup and repair system. The same wiring and circuitry methods can be duplicated over and over for more users/more devices.

W57: Repair of Multiple Data Storage Devices. Repair on separate busses.

W58 Repair of Multiple Data Storage Devices utilizing hot-swap drives.

W59: Switch used for switching computers, computing devices, computing hardware. Thus, if one hardware device fails, just switch to second device. Please assume that switch W5911 can utilize the brake, PLC, circuit board controls shown in many of the other figures.

Optionally do not switch ground. Optionally, isolate ground from other computing device(s).

W60: Single user, with repair, with switch to secondary computing device and common mirror. Continued on W61.

It should be mentioned that on diagrams 60 and 61 and other diagrams that use shared computing hardware, that optionally ground wires can isolated, and/or switched as needed to isolate each of the computing devices. Surge and voltage protection and filtering can also be added between the data storage devices and computing devices.

W6060 can be a switch or a relay. In diagrams W60 and W61, instead of using two relays for the master, one relay can be used if the wires from CPU A and B are isolated power coming from the power supplies. For example when CPU "A" is on it won't effect CPU B if B is isolated. The device can also be constructed without isolating the power, and without any switch or relay although that construction method is not recommended.

W61: Single user, with repair, with switch to secondary computing device and common data storage device mirror. Continued on W60.

W62: One computer and/or computing device containing two computers and/or computing devices with mirror and ability two switch between devices. The computing devices can be set up with multi-user, repair, etc., but with common mirrors and ability to switch between computing devices. This system can also be built as separate units instead of combined in one box.

W64 represents examples of wiring diagrams for interrupting connections to computing devices. The diagram shows four examples of this: A, B, C, and D. This is a functional diagram only. Additional wires can be added and switched as needed. Interrupting connections can also apply to switching wireless connections. The connection is briefly interrupted for the purpose of "resetting" the device.

W64NL represents examples of wiring diagrams for turning network connections "off" and "on". The diagram shows four examples of switching a network connection: A, B, C, and D. This is a functional diagram only. Additional wires can be added and switched as needed. Can also switch wireless connections.

W64.6 Example of interrupting connections to an external device to reset connection and/or for the purpose of resetting a device, connection, or to "break" out of a "freeze."

W65 Example of computing device containing dual computing devices that can be switched, plus a shared data storage device (that can be switched back and forth between the dual computing setup) for the purpose of isolating data (so that malicious code cannot affect other data).

W66: Repair of a Multi-User System.
Assumptions about circuit board:
If there is no power to circuit board when computer is shut down:

Circuit board won't operate and can't break CMOS circuit. In this situation it is best to just bypass circuit board and only break CMOS circuit when key is in momentary position.
If there is power to circuit board when computer is shut down AND if there is no power to logic board in shutdown mode:.
Circuit board can be used to break power to CMOS prior to computer startup.
If there is power to circuit board when computer is shut down AND if there is power to logic board in shutdown mode:
Circuit board can NOT be used to break power to CMOS prior to computer startup.
Circuit board can be used to send "zap PRAM" keyboard sequence to logic board on startup.

W67 Similar to W65 but also shows how data can be further isolated: a network connection can be switched to ensure isolation of data. For example, the network connection can be switched "off" whenever data storage device (6215) is "on" and the network connection can be switched "on" when data storage device (6214) is "on" (and vice-versa). This "Virus-Proof/Hacker-Proof" computer is a computer that uses one (or more) data storage devices for normal use, and a different data storage device(s) for doing E-mail. The Switching System switches between the data storage devices, alternating between "active" and "inactive" data storage devices. To move data from the E-mail data storage device to the hard drive, or visa versa, a temporary "quarantine" data storage device is used. Optionally, it will not release data until an on-line connection has been made and the drive checked with a current virus checker. Data can optionally be held for a time period, and then released upon a virus check.... giving data virus companies time to detect new viruses and update their software.

Software can be used to replace the Switching System switch or in conjunction with the Switching System switch.

Optionally, the Switching System switch can leave a network connection "on", and switch "off/on" a separate connection to the internet/global computer and communications network. Or both the network connection and connection to the Internet can be switched separately W68 Circuit Board and Socket Assembly Option W152T: One type of circuit board for Repair and Backup 1) circuit 1
2) circuit 2
3) circuit 3
4) circuit 4
5) circuit 5
6) circuit 6

7) circuit 7
8) circuit 8
9) circuit 9
10) circuit 10
11) circuit 11
12) circuit 12
13) circuit 13
14) circuit 14
15) circuit 15
16) circuit 16

17) circuit 17
18) circuit 18
19) circuit 19
20) circuit 20
21) Power Control Indicator #21
22) Power Control Indicator #22
23) Power Control Indicator #23
24) Power Control Indicator #24
11) 25) Power Control Indicator #25
31) Power Control Indicator activity light for #21
32) Power Control Indicator activity light for #22
33) Power Control Indicator activity light for #23
34) Power Control Indicator activity light for #24
35) Power Control Indicator activity light for #25
26) time delay circuit
27) Data and power to LCD screen
and/or data for computer monitor
and/or to computer.
28) Power to board
50) time delay jumper
51) controller In circuit board figures W152T:

A jumper shall control whether the time delay circuit receives power when the time control knob that activates power turns the power on. Thus a jumper can disable the time delay circuit.
Supply power to the switch common from the board power supply
Determine whether computer has power based on input from power cable.
If power is being supplied to power control indicators A, or B, or C, do not allow the board to switch anything, even if power to a power control indicator is changed, unless power is off to power input. For example, if power is being supplied to power indicator A, and then is switched to power indicator B while power is still being supplied to POWER INPUT, ignore the change and don't switch power to B. Only if power is removed from power input for 3 seconds or more, then switch to A, or B, or C.
The socket shall bypass the circuit board with the neutrals (see diagram of neutral jumper bypass).
A = Normal Mode
B = Repair Mode
C = Zap mode If switch is at A, don't change anything.
If switch is at B, turn on
if someone hit on button while zap is happening we are shot.

If Circuit A: Wait X continuous seconds and check to see if power is still on to A. If so, turn on time delay circuit. Leave circuit on Y seconds and then turn off circuit. If power is still on to B, don't run again until such time as power is removed from all controls A and B and C for at least 3 contiguous seconds.
If circuit C, turn on time delay after X seconds (follow b above) and then turn on 1,2,3,4.
ID Jumpers 4 and 6 are optional spares.
For multiple users/operating systems, and/or data storage devices, duplicate the circuitry in the drawing (except for the controller and switch/switch lock... in most cases only one controller and switch/switch lock is needed.

W153: One type of circuit board for Multi User System

TW160 One type of Circuit Board for Repair and Backup.

Optional Automatic Repair Example Script/program: On computer startup the script/program hides all activity that occurs in the background. During this time a logo and text is shown to user. This text and logo should be able to be modified in preferences. This "hiding" function can be toggled off/on at any time by keyboard input of a specific keys sequence: e.g. while the command key is down, sequential input of the letters: zappy A program or script runs the following sequence of events (all in the background hidden from the user):

A backup program is executed that makes a complete backup of the data on the drive at ID 1. The destination of this backup should be able to be modified in user preferences. For example in could go in a partition or folder on the drive at ID 0, or could go on a drive at ID 2.

A program or script executes that checks to see that the backup has been made successfully. After confirmation that backup is complete and successful, user is given an optional dialog (that can be modified by client) allowing user to select one of the following options: no format of ID 1, quick format of ID1, low level format of ID1. (Background remains hidden) This dialog only shows up if selected in preferences. In lieu of this dialog preference can be selected in preferences as to which type of format, or lack thereof, is performed.
If user is give the option in preferences, based on user selection, quick, or low level, or no format is run on ID1. Otherwise whatever option is in preferences is done. Optional script then executes a program that copies some (not all) data on ID 0 to wherever they belong on ID 1. For example this script may copy such items as: Explorer Favorites, Nets cape Bookmarks, E-mail, in box, out box, and address book. Optional: LED and/or computer screen can provide a dialog box that says something like: please turn switch to "Normal Use" position. Optional: LED and/or computer screen can provide a dialog box that says something like: "please restart computer". Or those events can happen automatically. Optionally, all the events described above can also be written into ROM or the operating system.

TW 169 One type of Circuit Board for Repair of Multi-User System Option.

An optional time delay circuit can be integrated that has a circuit that is normally open. It can have two user controllable time delays controlled by knobs ranging from 5 seconds or less - 60 seconds or more. One time control knob shall control the amount of time until the circuit is closed. The second timer control knob shall control the length of time the circuit is open. A jumper shall control whether the time delay circuit receives power when the time control knob that activates power turns the power on. Thus a jumper can disable the time delay circuit.

If power is being supplied to power control indicators 1, or 2, or 3, or 4, do not allow the board to switch power, even if power to a power control indicator is changed. For example, if power is being supplied to power indicator 2, and then is switched to power indicator 4 while power is still being supplied to indicator 2, ignore the change and keep the terminals closed that are associated with power control indicator 2. Only if power is removed from all power control indicators for a period of 3 contiguous seconds or more, allow the changes in which circuits are closed when power is restored to one of the power control terminals.

Boards and switches combined must be any of these sizes or smaller (smaller is better). The socket shall bypass the circuit board with the neutrals (see diagram of neutral jumper bypass).

Power Control Indicator 1: When power is supplied to power control indicator #1: provide power to time delay circuit if jumper A is on. After time delay circuit has finished and power off for that circuit, provide power to input terminals 1, 2, 3, 4, 5, 6, 7, 8, 10. (not 9)
Power Control Indicator 2: When power is supplied to power control indicator #2: provide power to input terminals 3, 4, 6, 7, 8, 9, 10 (not 5)

Power Control Indicator 3: When power is supplied to power control indicator #3: provide power to time delay circuit if jumper A is on. After time delay circuit has finished and power off for that circuit, provide power to input terminals 11, 12, 13, 14, 15, 16, 17, 18, 20 (not 19)
Power Control Indicator 4: When power is supplied to power control indicator #4: provide power to time delay circuit if jumper A is on. After time delay circuit has finished and power off for that circuit, provide power to input terminals 13, 14, 16, 17, 18, 19, 20 (not 15)

Single User only uses power control indicators #1 and #2.
Please note: boards contain optional spare circuits that can be eliminated.
Please note: knobs for delay start and stop are temporary for the prototype and will be replaced with non-adjustable components after further experimentation with length of time for delay circuit.
Only the material portions of the circuit board and socket are illustrated, and it will be understood that is not drawn to scale.

W175: Example of Net-Lock system as external "add-on" device for network communications device (such as a network interface card, or modem, or other device) and a network. The data signal is redirected via the net-lock device to a switchlock (or other switch trigger) where the connection to the network can be locked "on" or "off" (wire circuit for data "opened" or "closed").

W176: Example of cable connections being "redirected" through Switching System to enable switching each and/or all connections to either a state of "connected" or "disconnected" so as to change, for example, Device IDs, power, read/write abilities, data flow, lock/unlock status, etc. An optional logic controller is indicated to control the process as needed. Without a logic controller, switching could be controlled by, for example, a physical "toggle" switch.

W177: Detailed example of cable connections being "redirected" through Switching Process to enable switching each and/or all connections to either a state of "connected" or "disconnected" so as to change, for example, Device IDs, power, read/write abilities, data flow, lock/unlock status, etc. An optional logic controller is indicated to control the process as needed. Without a logic controller, switching could be controlled by, for example, a physical "toggle" switch.

W178: Example of Entertainment/Communication System utilizing modular blocks that "snap" into one another and thereby connect the wires that are embedded inside each block ("connectors"). Thus, by connecting blocks, circuits can be formed to create effects or functions (such as, for example, but not limited to, an LED and/or LCD and/or robotic device, connected via blocks, to a power supply).

W179: Example of cable connections being "redirected" through Switching Process (in this example without using "wire connectors" as shown in W176) to enable switching each and/or all connections to either a state of "connected" or "disconnected" so as to change, for example, Device IDs, power, read/write abilities, data flow, lock/unlock status, etc. An optional logic controller is indicated to control the process as needed. Without a logic controller, switching could be controlled by, for example, a physical "toggle" switch.

WJ1: Example of Switching Process switching jumper IDs so as to change the boot order of the attached data storage devices.

WJ2:

WJ3:

M

M20: Example of a Switching System that utilizes a brake on the lock cylinder to prevent cylinder from moving when power is present.

M21: Example of Switching System that utilizes solenoid or piezo switch to stop lock cylinder from turning when power is present.

M22: Example of Switching System that utilizes either a brake, clutch, lock, piezo device, or solenoid, to prevent a rod from turning. The rod goes from a mechanical key or rotary switch to an electrical switch.

M23 shows that the switching can be done on a circuit board represented by M2370, and switch by a switch and/or switchlock M2301. This Example of the Switching System that utilizes a programmable logic controller and/or circuit board to control one or more functions: for timing of switching, reset of PRAM, CUDA, CMOS, etc, control over switching, control over power, connection to network(s) for switch triggers and commands over network(s), control over switches and relays, control over circuit boards, control over global positioning system/security system, control over selection of startup device, control over switch triggering.

M24 shows that the switching can be done by any sort of switching device and/or switch trigger.

We have used a simple switch in the drawings, but assume that anyone skilled in the arts can also diagram the switch into a circuit board if so desired, so that the switching function can stand alone on a circuit board, or be integrated into other circuitry.
This is an example of the Switching System triggering methods.

L

The diagram figures that begin with the letter "L" are examples to demonstrate that the switch(es) can be located anywhere, and on a wide range of devices, inline, and in wireless situations.

When computing equipment is used with any other type of device(s) (for example: robots, robotics, transports systems, televisions, telecommunications, manufacturing, equipment control, etc.) the switching system and/or switch trigger can be relocated, and/or additional switches and/or switch triggers added, so as to easily provide accessibility to users and/or people controlling the system. Additionally, the switch mechanism and/or trigger can be camouflaged or hidden as needed. Location, appearance, and type of switch can be changed as needed.

L70: Example of switch(es) located on computing hardware.

L71: Example of switch(es) located on computing hardware.

L72MU: Example of switch(es) located on robotic device.

L72 NL: Example of switch(es) located on robotic device.

L72S: Example of switch(es) located on robotic device.

L73: Example of switch(es) located on vehicle.

L73FB: Example of switch(es) located on vehicle.

L73MU: Example of switch(es) located on vehicle.

L73NL: Example of switch(es) located on vehicle.

L74: Example of switch(es) located on robotic device.

L75: Switching system integrated into data storage device. Please note that this is a functional design. The integrated Switching system can be integrated anywhere in or on the storage device, and/or integrated into the storage device circuitry. It can be wired and/or wireless, and an optional switch can be used that is separate and/or integrated into the data storage device itself.

L76 Switching System integrated into a StorExecute (see definition).

L76.1: Switching System integrated into a StorExecute (see definition).

L76CD: Switching System integrated into automatic CD burner that can create multiple burned CDs without user interaction.

L81: Front view of Switching System mounted in case.

L81FB: Front view of Switching System mounted in case.

L81MU: Front view of Switching System mounted in case.

L81NL: Front view of Switching System mounted in case.

L83: Examples of LCD screen dialog.

L83MU: Examples of LCD screen dialog.

L84 Example of ability to disconnect a network connection with switch trigger mounted on vehicle dashboard.

E

E1: Front View: Optional clear case sitting on top of computing device for housing components described herein.

E2: Side view: Optional clear case sitting on top of computing device for housing components described herein.

E3: Two versions of front View of acrylic block lit by LED or other lighting source.

E4, E5, E6, E7: Optional top and/or sides and/or back of computer/computing device/peripheral device with optional lip. The dots represent electrical connectors for providing electrical current.

E8: Clear case surrounding computer/computing device/peripheral device.

E9: Clear case surrounding computer/computing device/peripheral device. Optional area for liquids and pipes, wires, etc.

E10: Optional top and/or sides and/or back of computer/computing device/peripheral device. The dots and lines represent electrical connectors for providing electrical current.

E11 and E12: Plugs into E-10 on one side, and is connected to E12 on the other side. Main circuits are shown on E11, and can be routed by software to pin outs on E12.

E80: Optional acrylic (or similar plastic) lit by LED lights to indicate the state of the switch. Optionally it can also be used as a decoration triggered by sound, motion, etc. Various colored lights are used to change colors in acrylic. Other art pieces can also be put in these "entertainment" boxes, such as lava lights, plasma lamps, and various art projects.

E81: Optional top and/or side panels of computing device case with positive and negative connections.

E82: Optional Colored or clear Transparent Acrylic Case Lit by LED or other light source. A layer of white acrylic or similar material can be under the outer layer for the purpose of diffusing the light. Optionally, case can be clear and change color when computer functions change when different groups of colored LEDs go on depending on switching functions taking place, or sounds, motion or other triggers. LEDs can be hidden in bottom of case, which can be surrounded by colored material.

| Backup & Repair | | Freeze-Buster | Hardware Repair | Virus-Proof Hacker-Proof | Net-Lock | Multi-User | Entertainment/ Communication |
|---|---|---|---|---|---|---|---|
| E14 | | F63 | L70 | F200.1 | F61 | F20 | E1 |
| E83 | | L70 | L71 | F200.2 | F62 | F50 | E10 |
| F31 | | L71 | L72 | F200.3 | L70 | F64 | E11 |
| F32 | | L72S | L73 | F200.4 | L71 | F66 | E12 |
| F33 | | L73FB | L74 | F200.5 | L72NL | L70 | E14 |
| F34 | | L74 | M20 | F201 | L73NL | L71 | E2 |
| F35 | | L81FB | M21 | F50 | L74 | L72MU | E3 |
| F36 | | L84 | M22 | F51 | L81NL | L73MU | E4 |
| F37 | | M23 | M23 | F52 | L84 | L74 | E5 |
| F38 | | M24 | M24 | F54 | M23 | L75 | E6 |
| F39 | | S12 | S12 | F55 | M24 | L76CD | E7 |
| F40 | | S21 | S19 | F56 | S12 | L81MU | E8 |
| F41 | | S23 | S23 | F57 | S20 | L83MU | E80 |
| F42 | | W64 | S9 | F58 | S23 | M20 | E81 |
| F43 | | W64.6 | W153 | F59 | W175 | M21 | E82 |
| F44 | | | W59 | F64 | W64.5 | M22 | E83 |
| F50 | | | W60 | F90 | W64NL | M23 | E9 |
| F64 | | | W61 | L76CD | | M24 | S23 |
| F65 | | | W62 | M20 | | S10 | W178 |
| L76 | | | W179 | M21 | | S12 | |
| L76.1 | | | | M22 | | S18 | |
| L76CD | | | | M23 | | S23 | |
| L81 | | | | M24 | | S3 | |
| L83 | | | | S10 | | S4 | |
| M20 | | | | S11 | | S5 | |
| M21 | | | | S12 | | S6 | |
| M22 | | | | S13 | | S7 | |
| M23 | | | | S14 | | W153 | |
| M24 | | | | S18 | | W169 | |
| S1 | | | | S22 | | W51 | |
| S10 | | | | S23 | | W53 | |
| S12 | | | | W65 | | W55 | |
| S18 | | | | W67 | | W56 | |
| S2 | | | | W68 | | W57 | |
| S23 | | | | W176 | | W58 | |
| S8 | | | | W177 | | W66 | |
| W152T | | | | W179 | | W68 | |
| W160 | W176 | | | | | W176 | |
| W170 | W177 | | | | | W177 | |
| W40 | W179 | | | | | W179 | |
| W52 | | | | | | | |
| W58 | | | | | | | |
| WJ1 | | | | | | | |
| WJ10 | | | | | | | |
| WJ2 | | | | | | | |
| WJ3 | | | | | | | |

Table of Which Diagrams Go With Which Invention Embodiments

Figure S1 Sheet 1 of 47
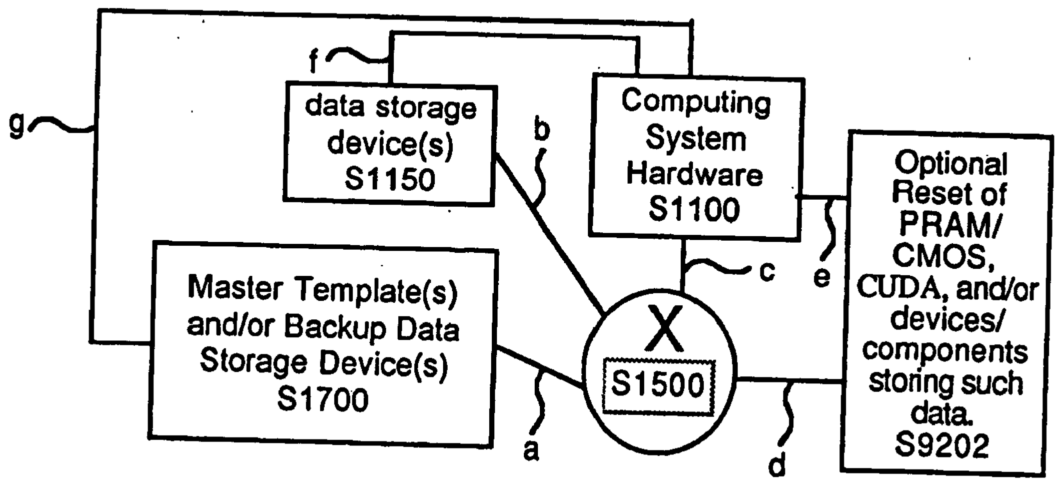

Figure S2
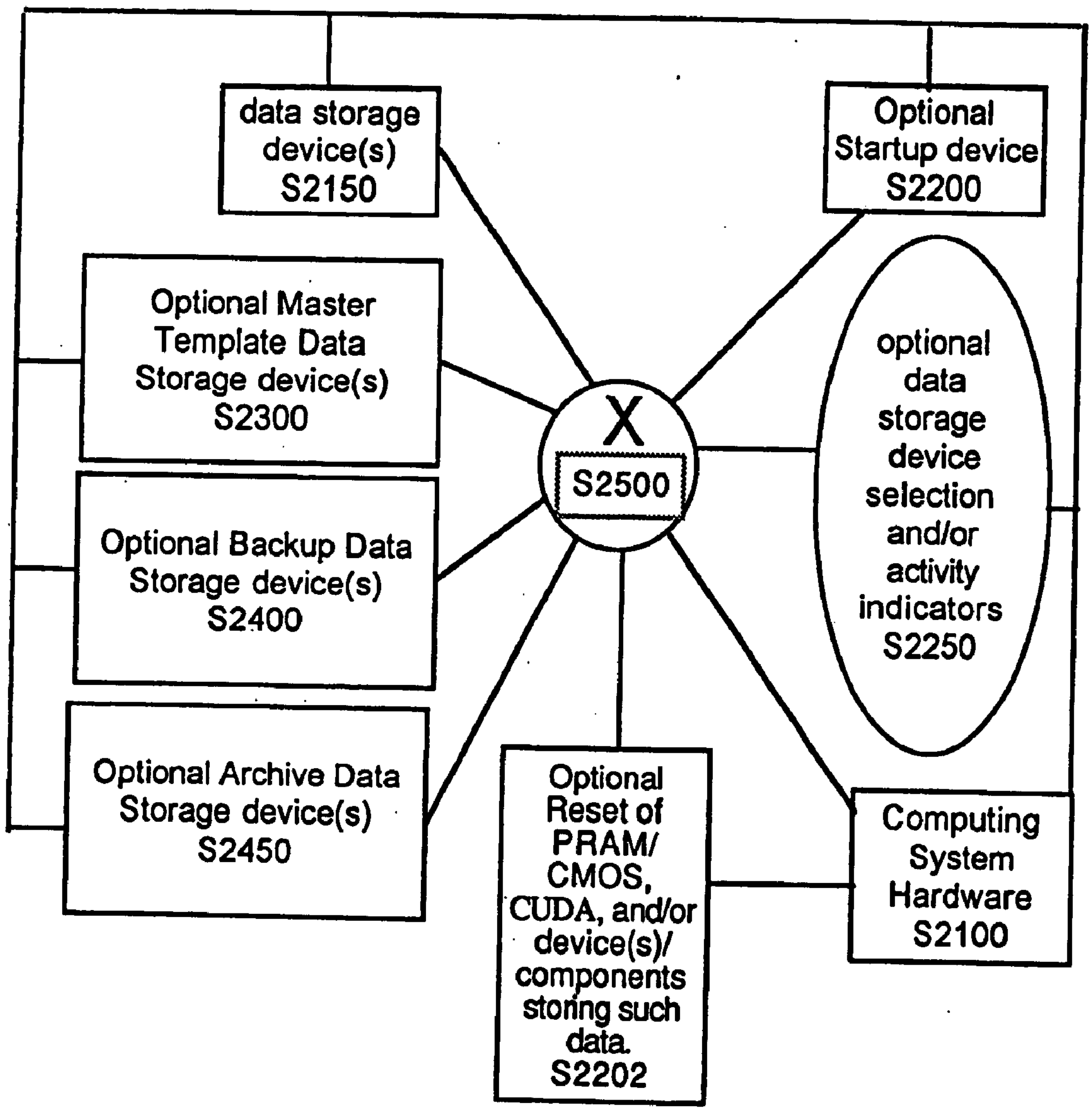

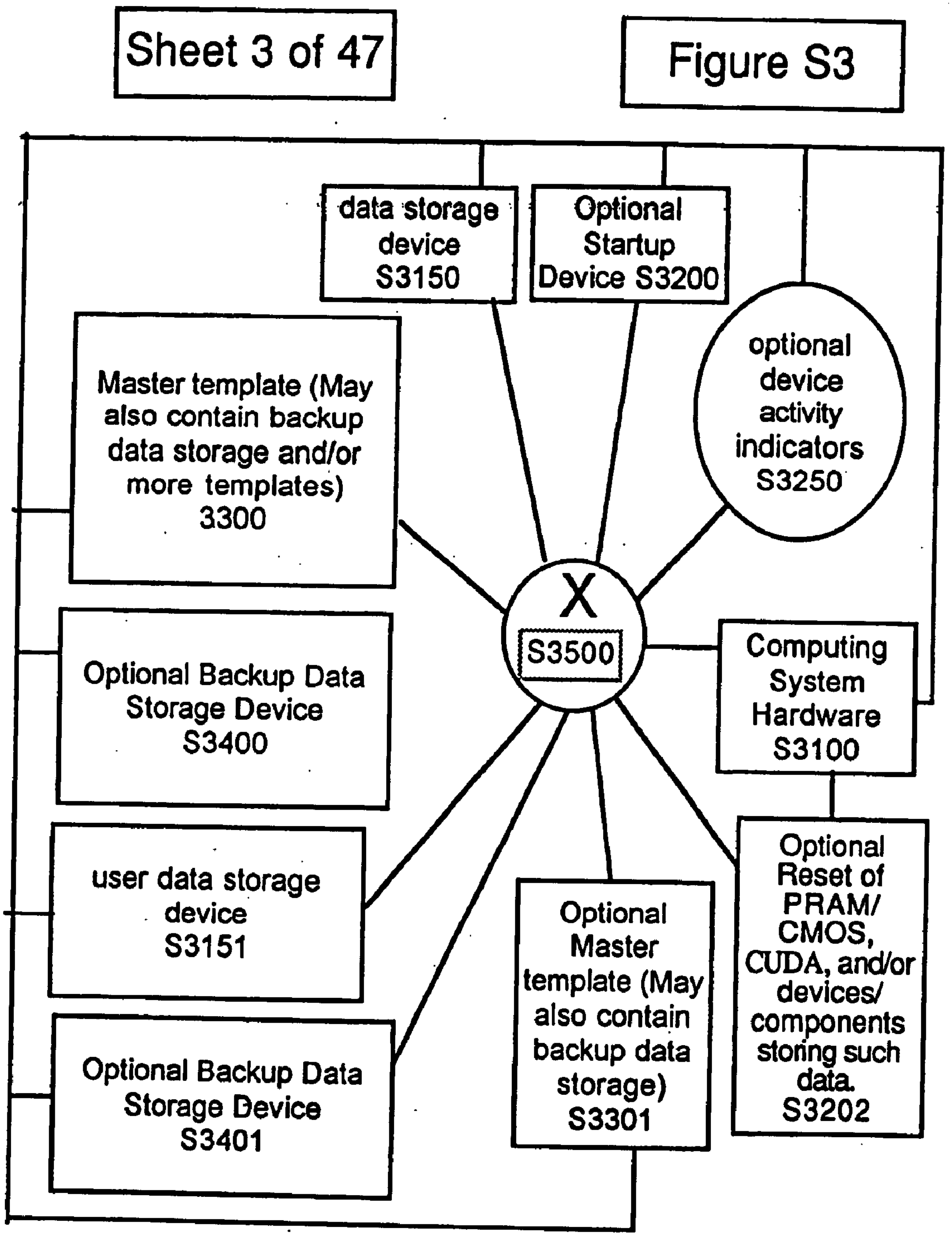
Sheet 3 of 47
Figure S3
data storage device S3150
Optional Startup Device S3200
optional device activity indicators S3250
Master template (May also contain backup data storage and/or more templates) 3300
X
S3500
Computing System Hardware S3100
Optional Backup Data Storage Device S3400
user data storage device S3151
Optional Master template (May also contain backup data storage) S3301
Optional Reset of PRAM/ CMOS, CUDA, and/or devices/ components storing such data. S3202
Optional Backup Data Storage Device S3401

Sheet 4 of 47 Figure S4
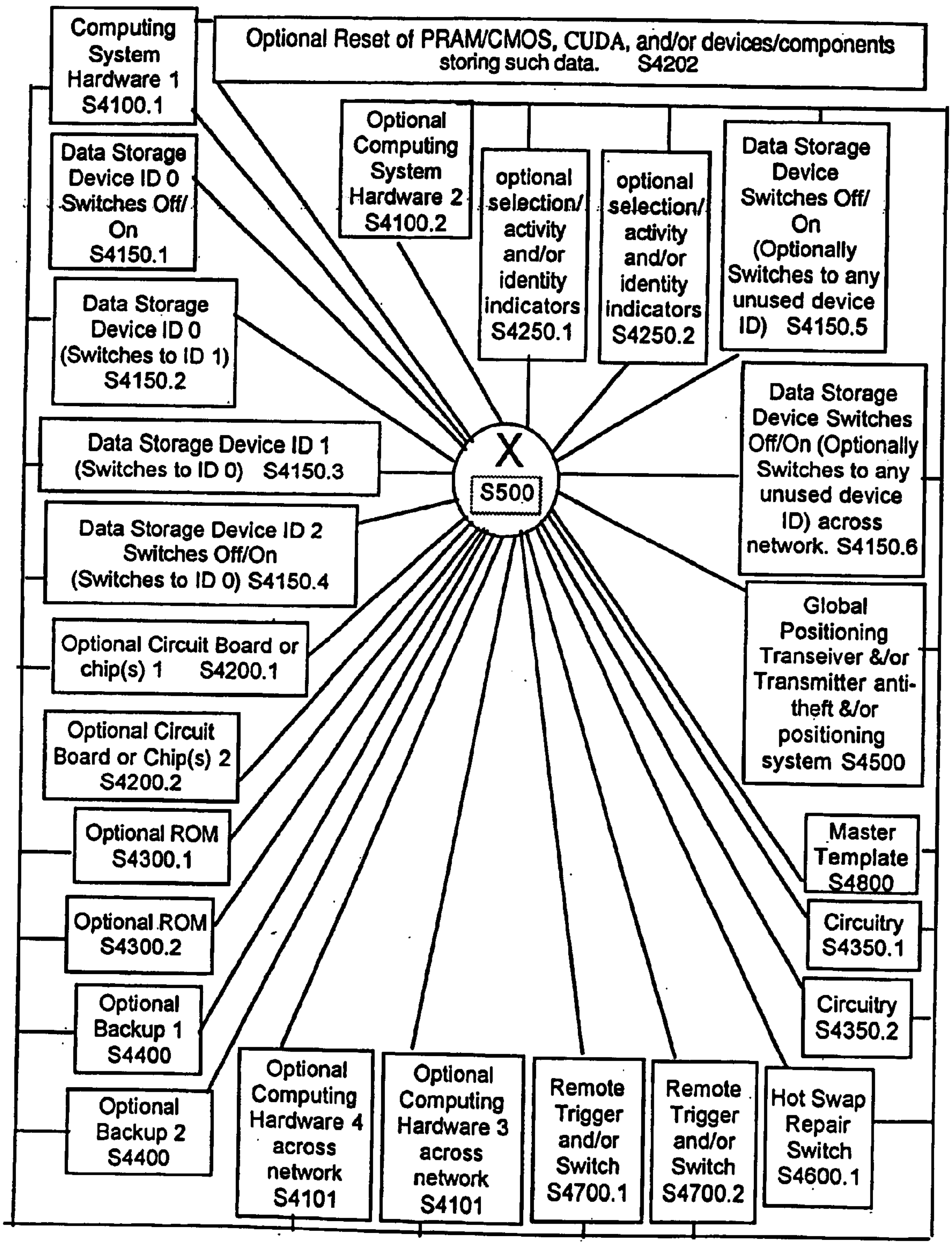

Sheet of Figure S5
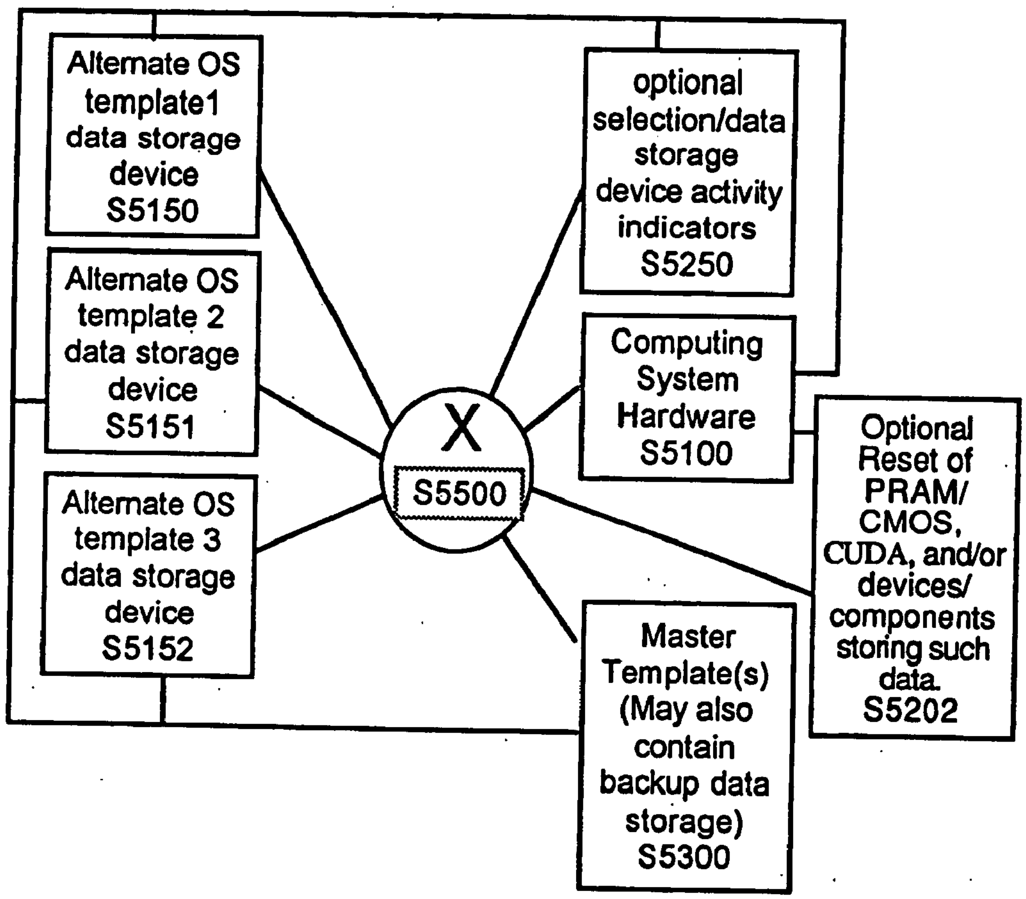

Sheet 5 of 47 Figure S6
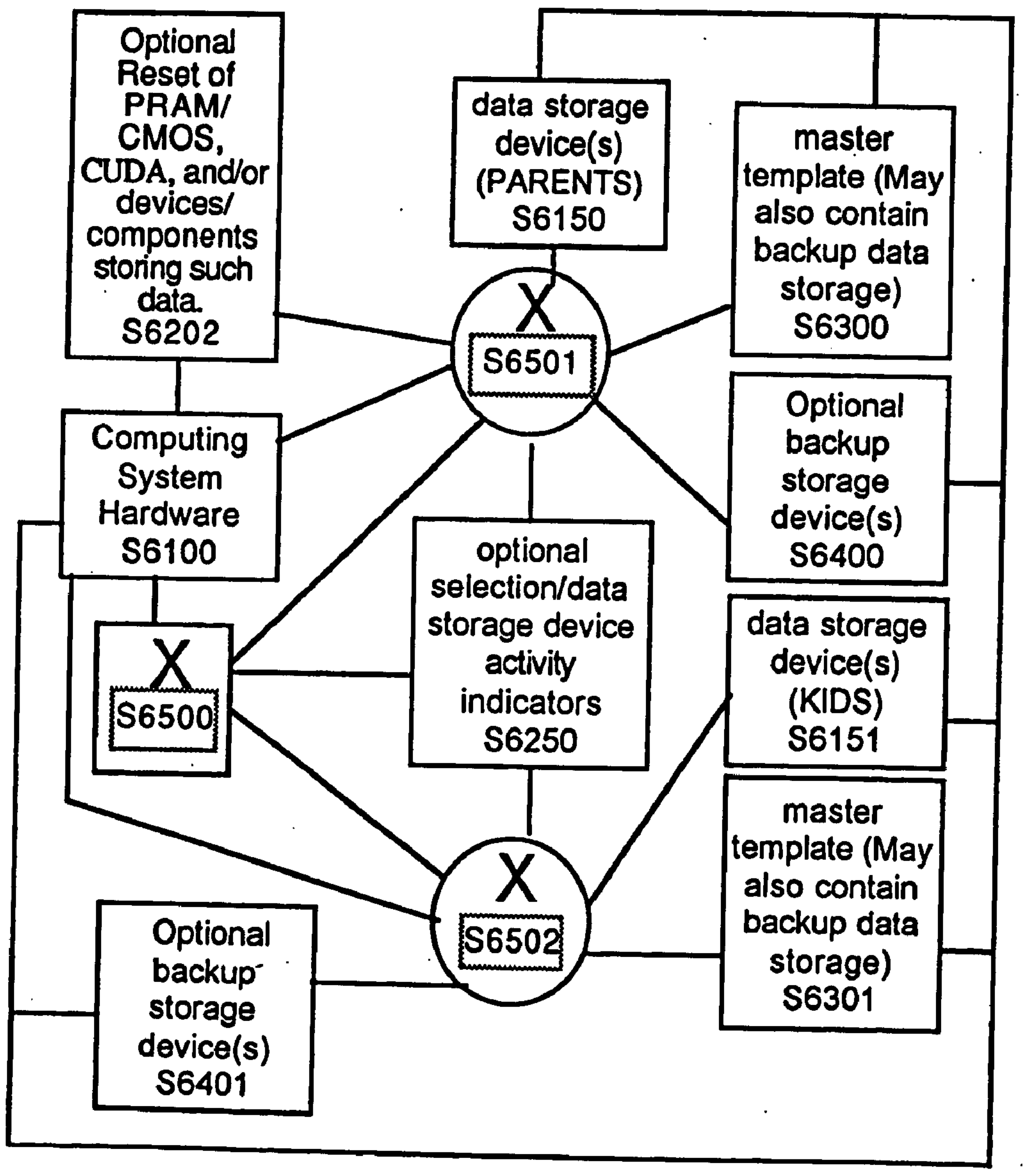

Sheet 6 of 47 Figure S7
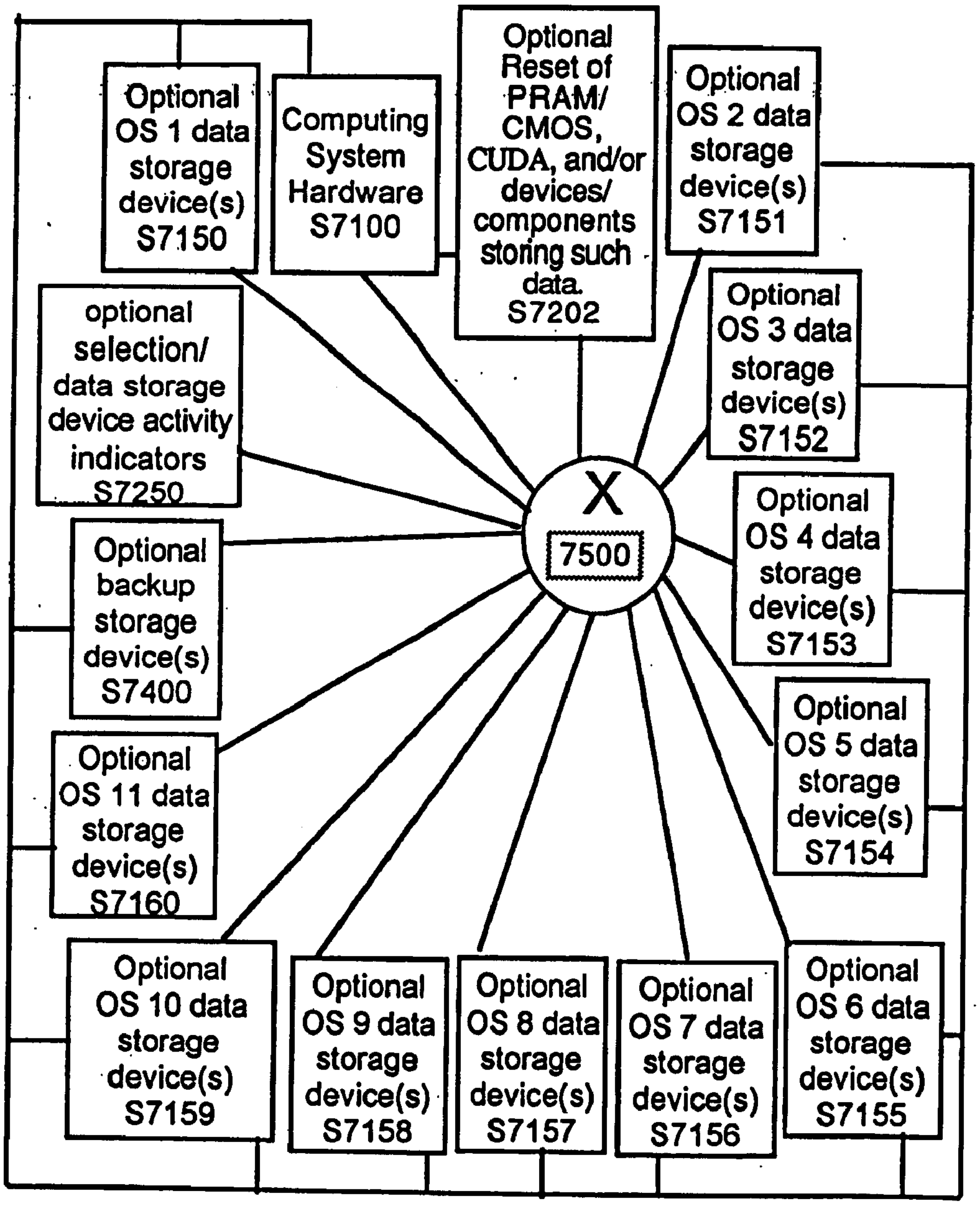

Sheet 7 of 47 Figure S8
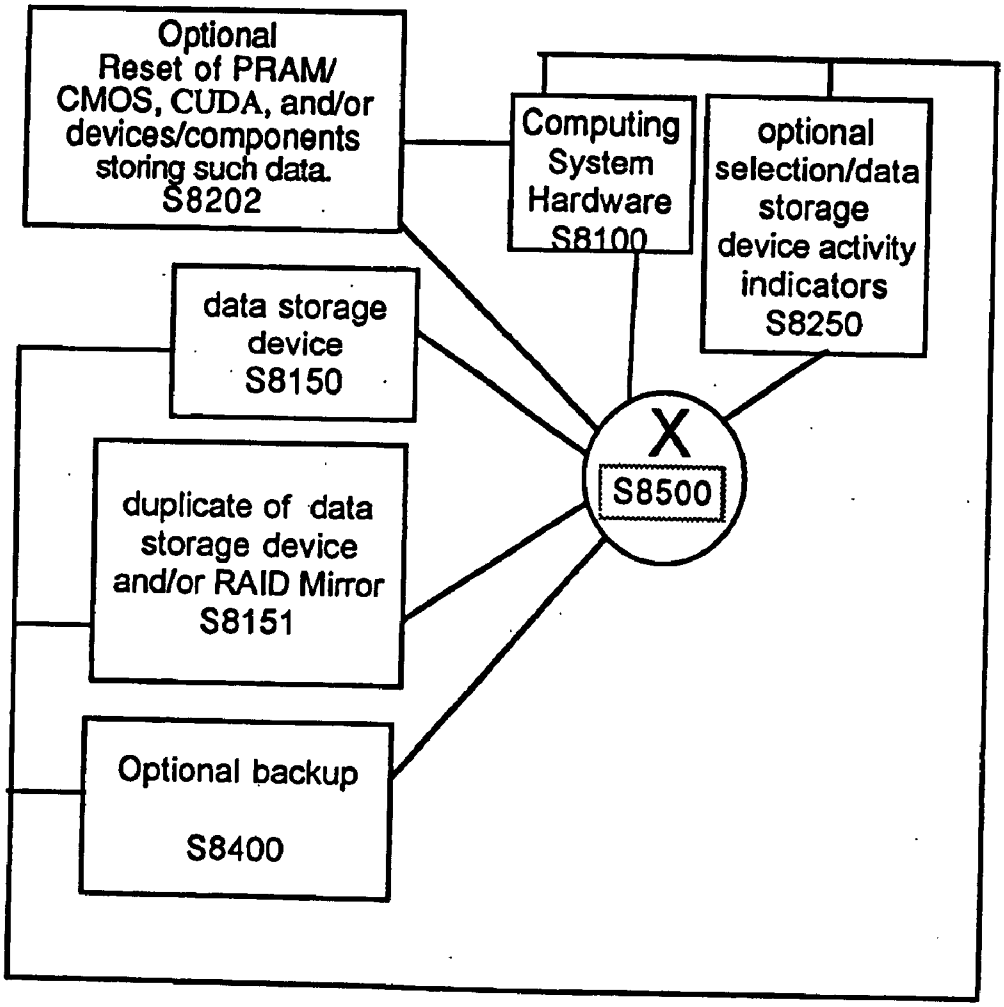

Sheet 1 of 15
Figure S9
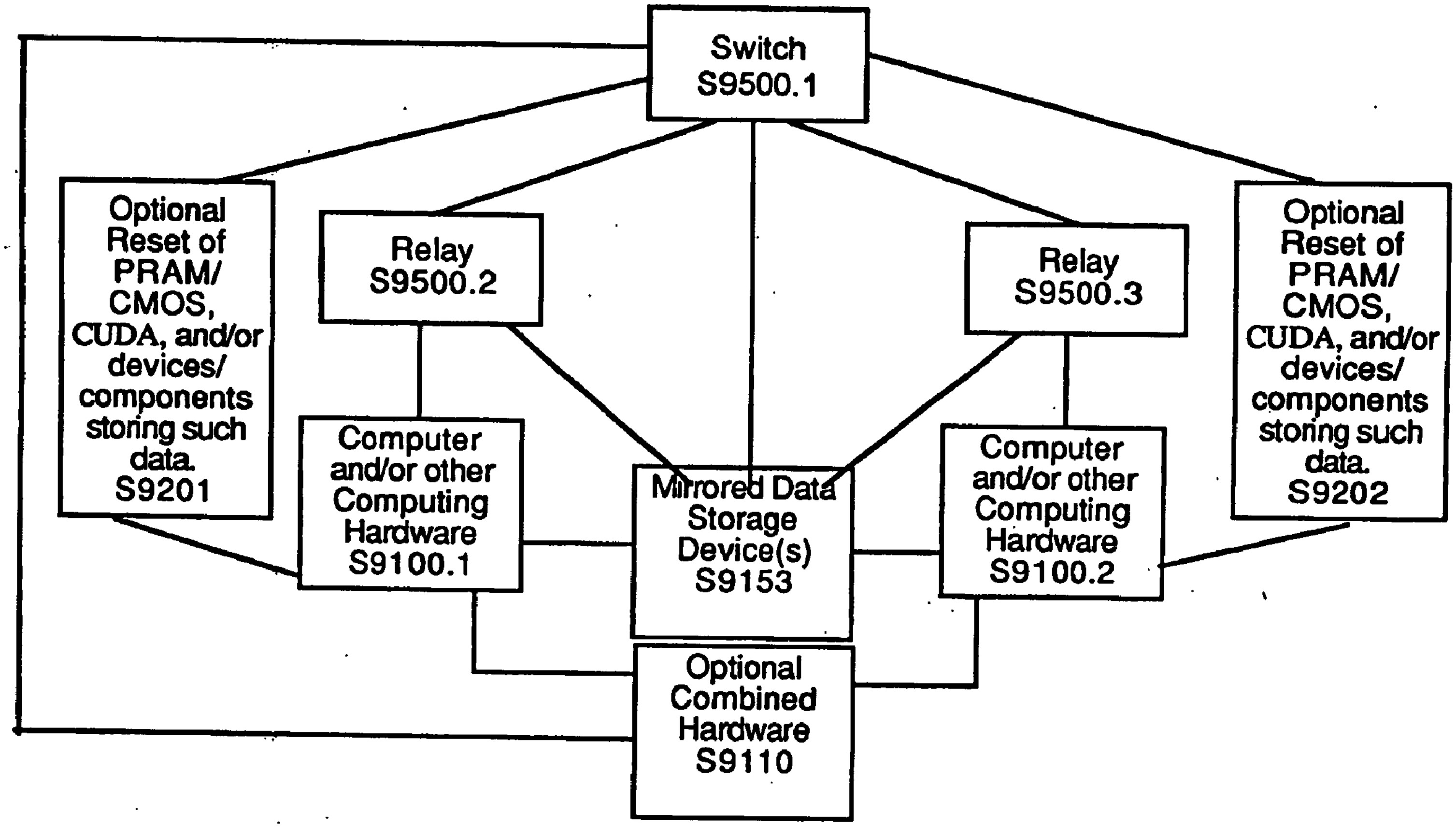

Figure S10
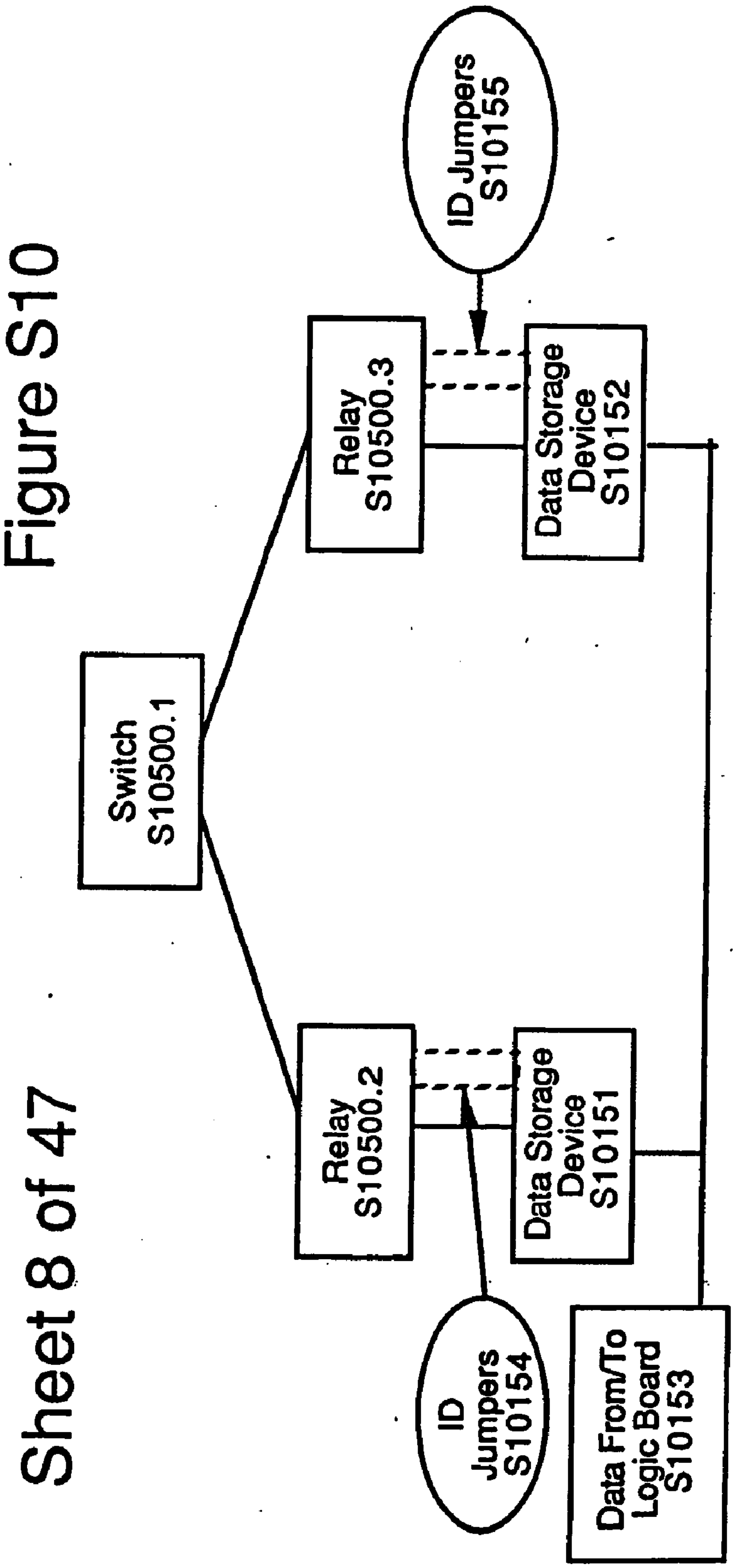

Sheet 3 of 10
Figure S11
Switching Process with dual computing devices
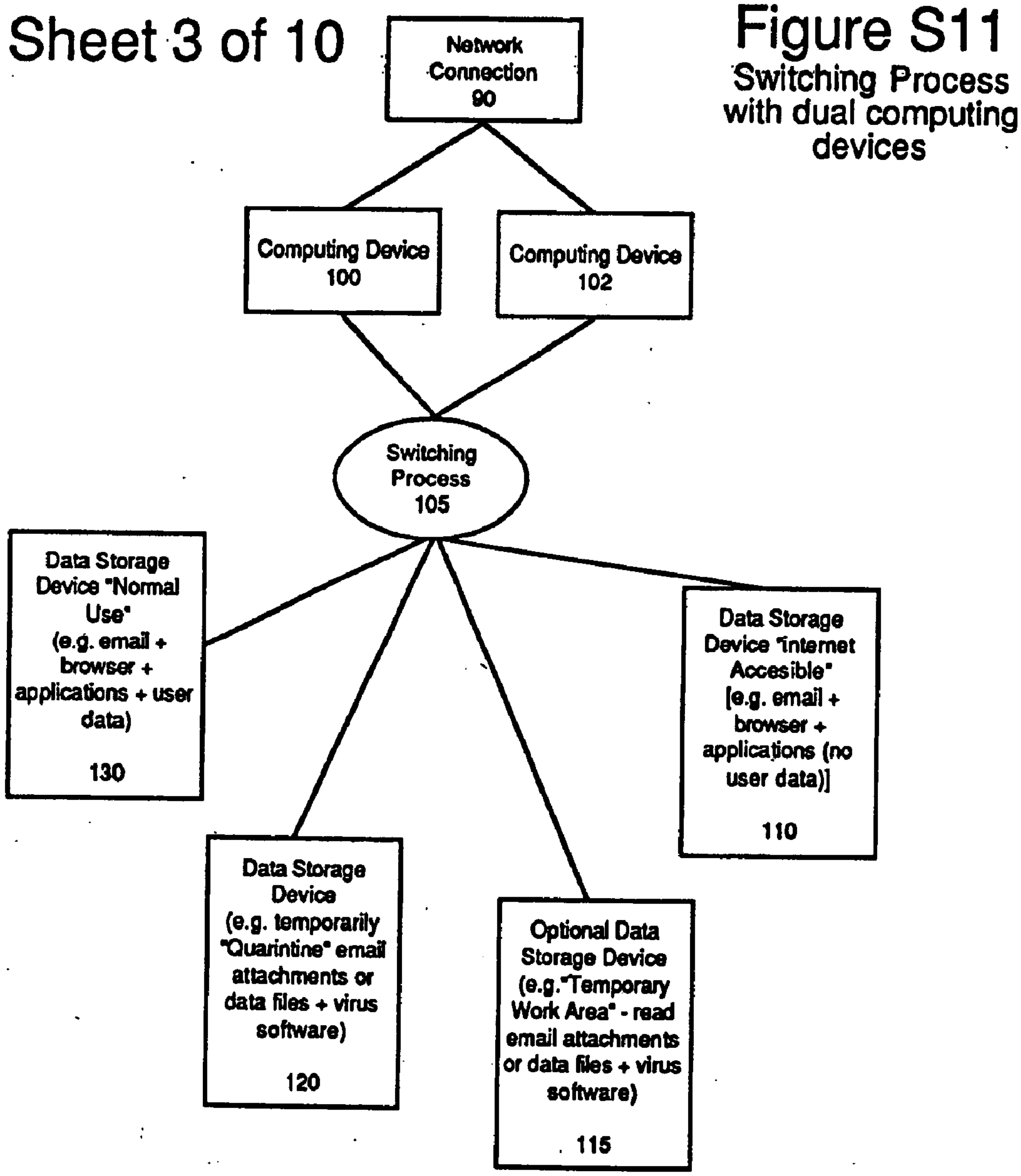

Figure S12 Sheet 13 of 47
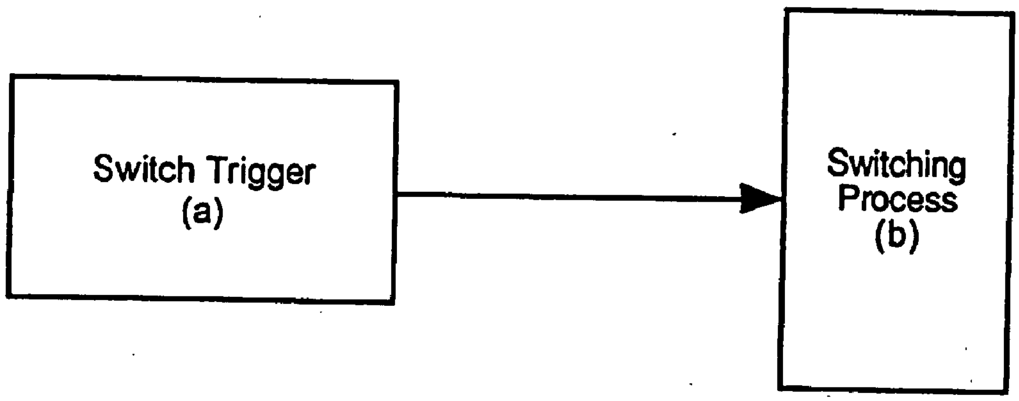

Sheet 2 of 10
Figure S13
Switching Process
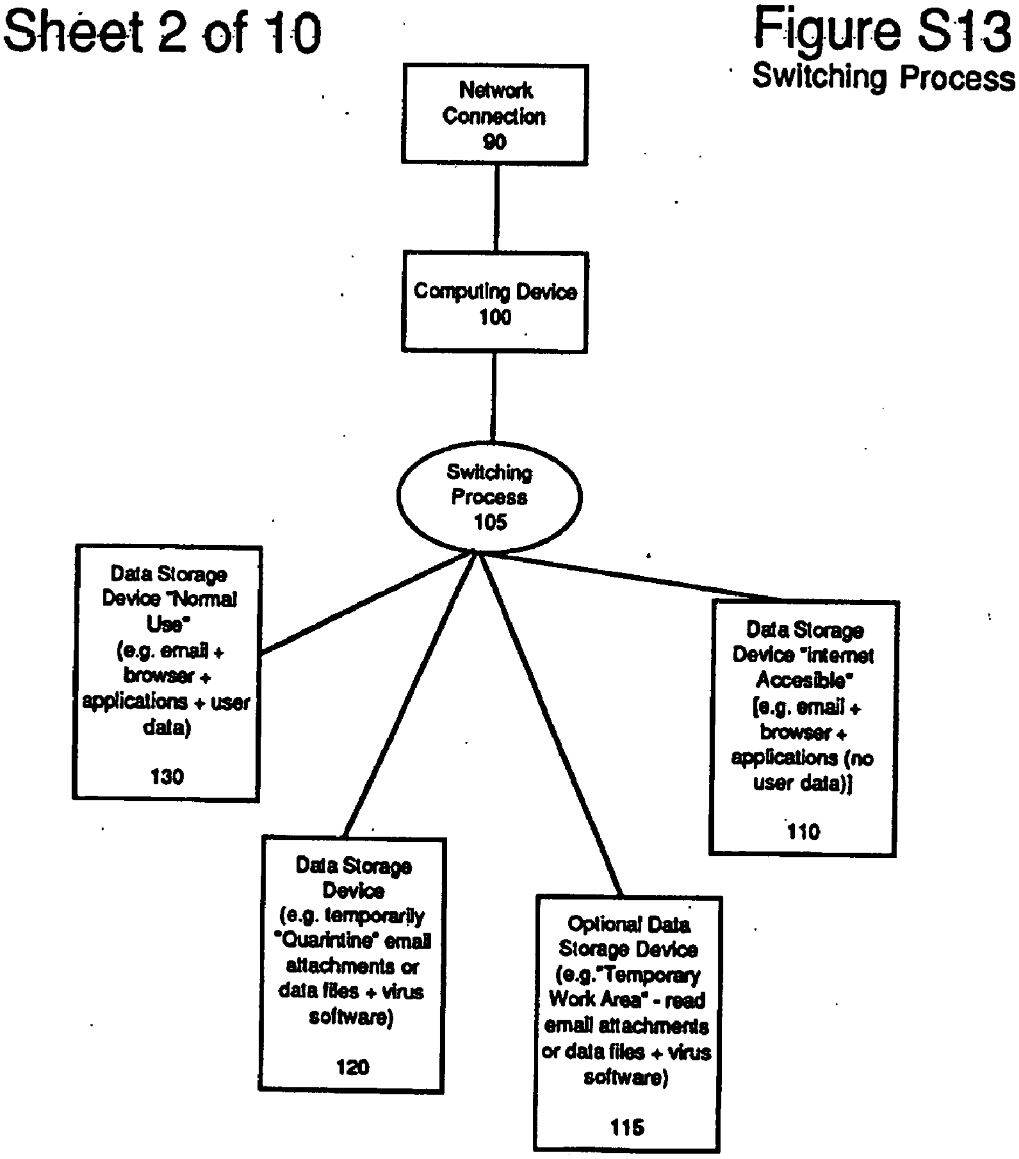

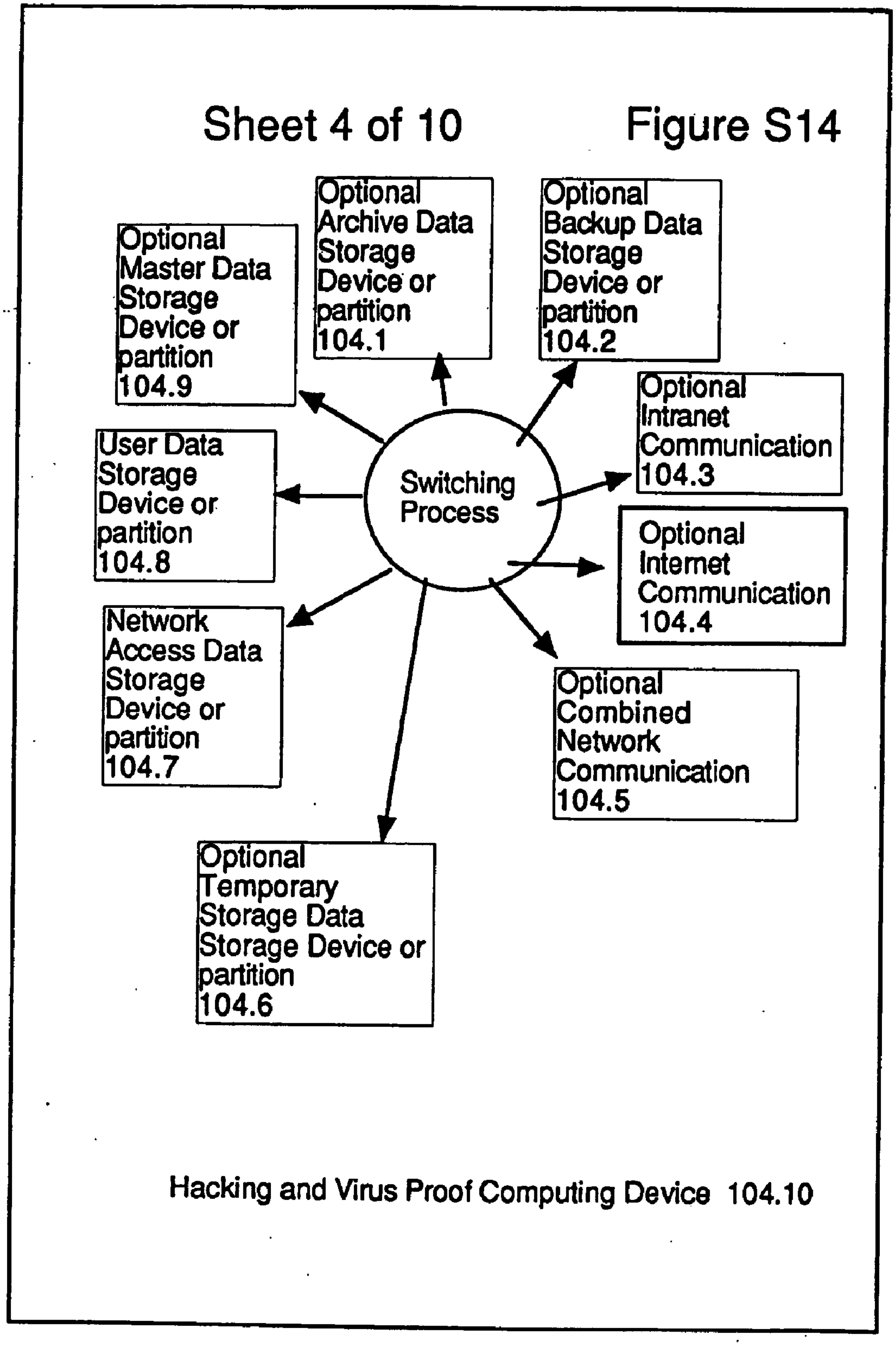
Sheet 4 of 10
Figure S14
Optional Master Data Storage Device or partition 104.9
Optional Archive Data Storage Device or partition 104.1
Optional Backup Data Storage Device or partition 104.2
Optional Intranet Communication 104.3
User Data Storage Device or partition 104.8
Switching Process
Optional Internet Communication 104.4
Network Access Data Storage Device or partition 104.7
Optional Combined Network Communication 104.5
Optional Temporary Storage Data Storage Device or partition 104.6
Hacking and Virus Proof Computing Device 104.10

Figure S18 Sheet of
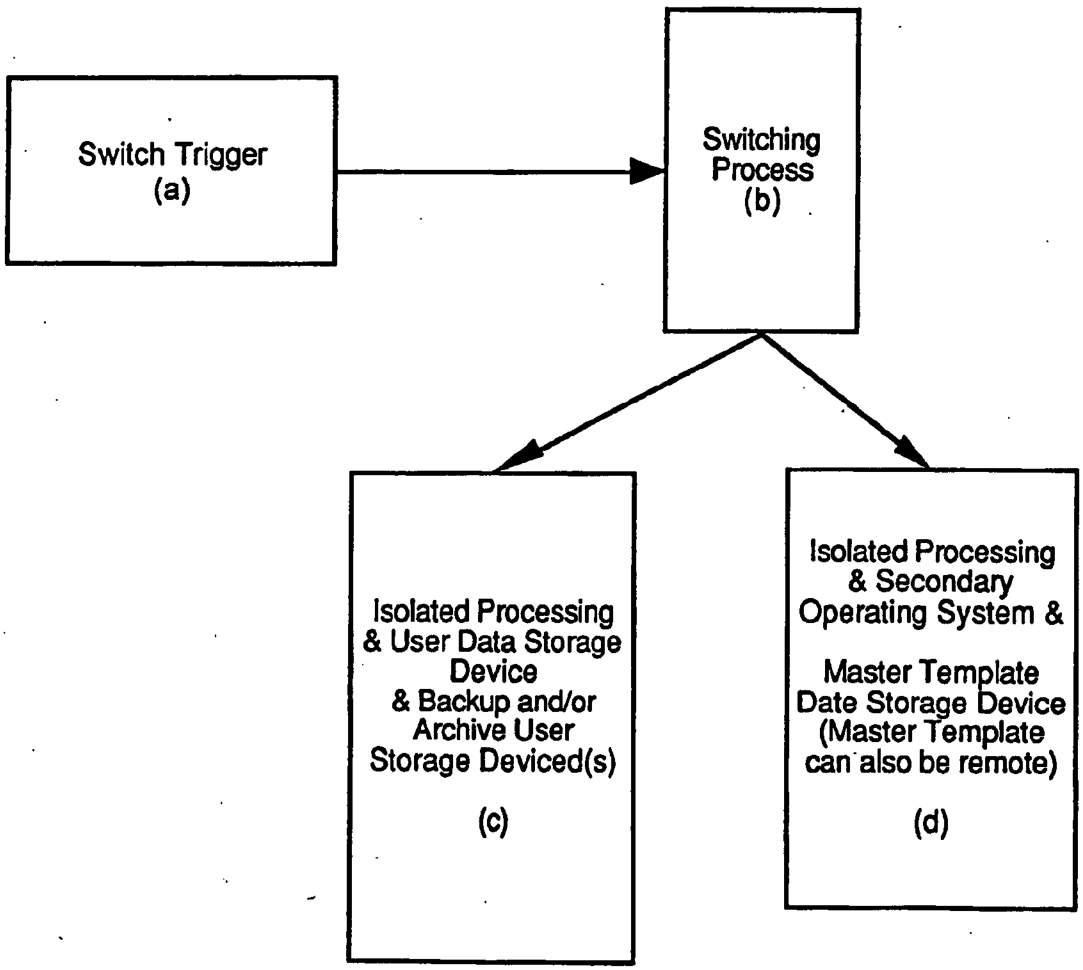

Figure S19
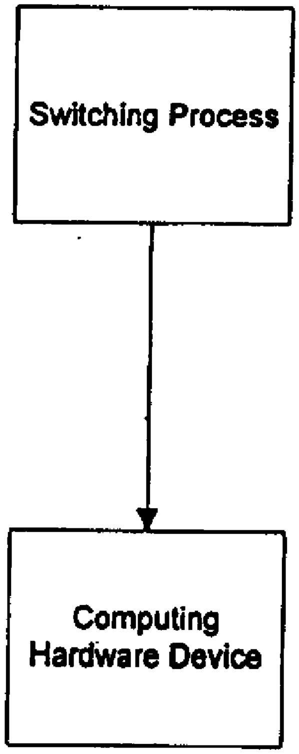

Figure S20
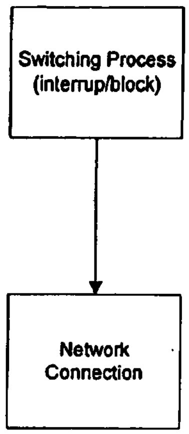
1.) S20

Figure S21
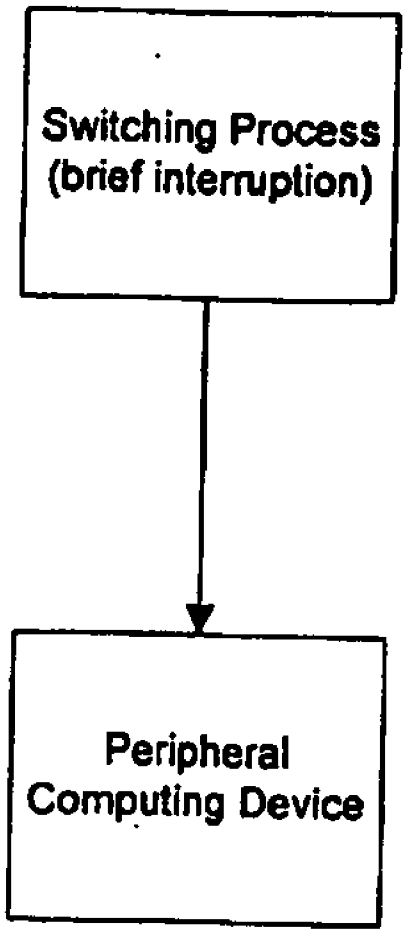

Figure S22 Anti-Virus with shared computing device
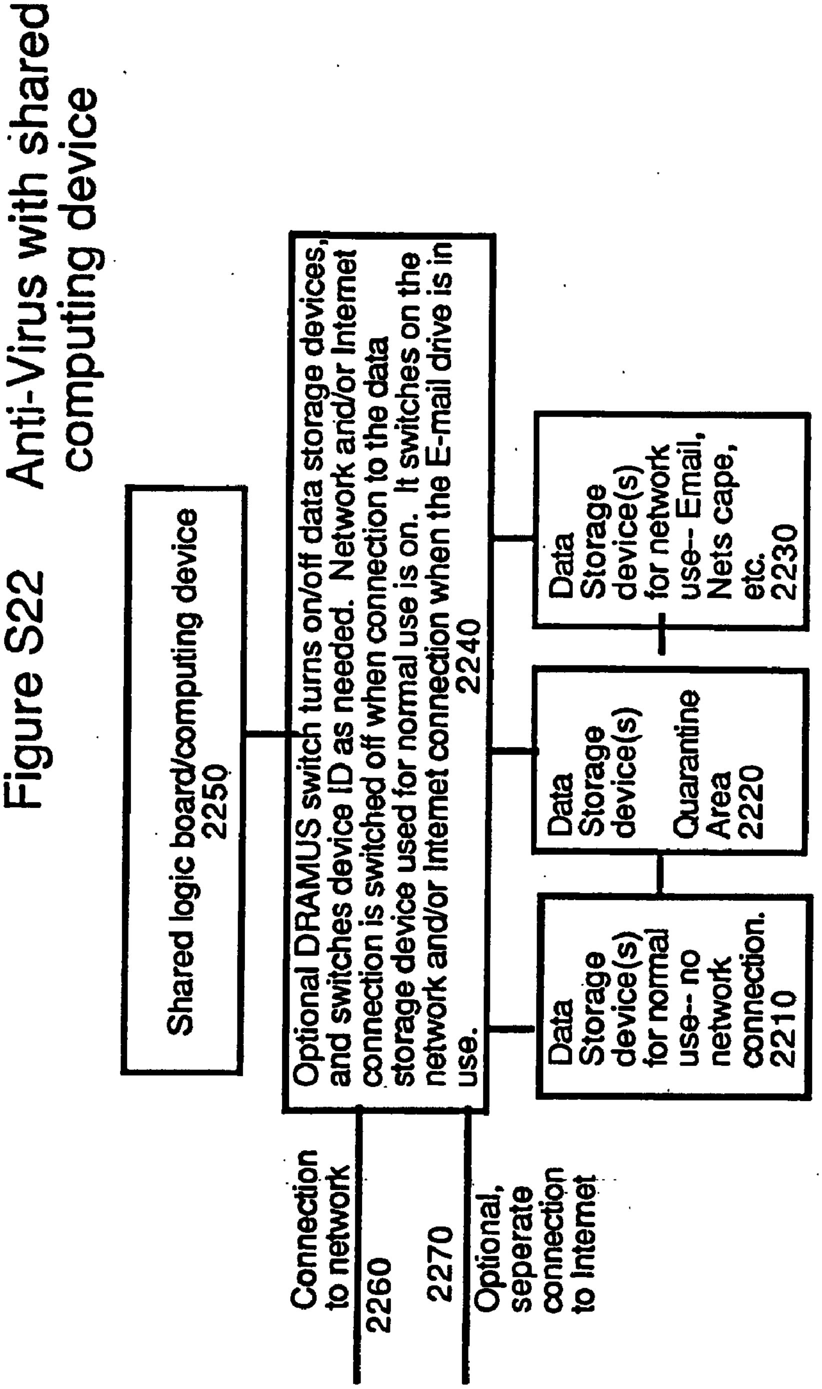

FIGURE S23
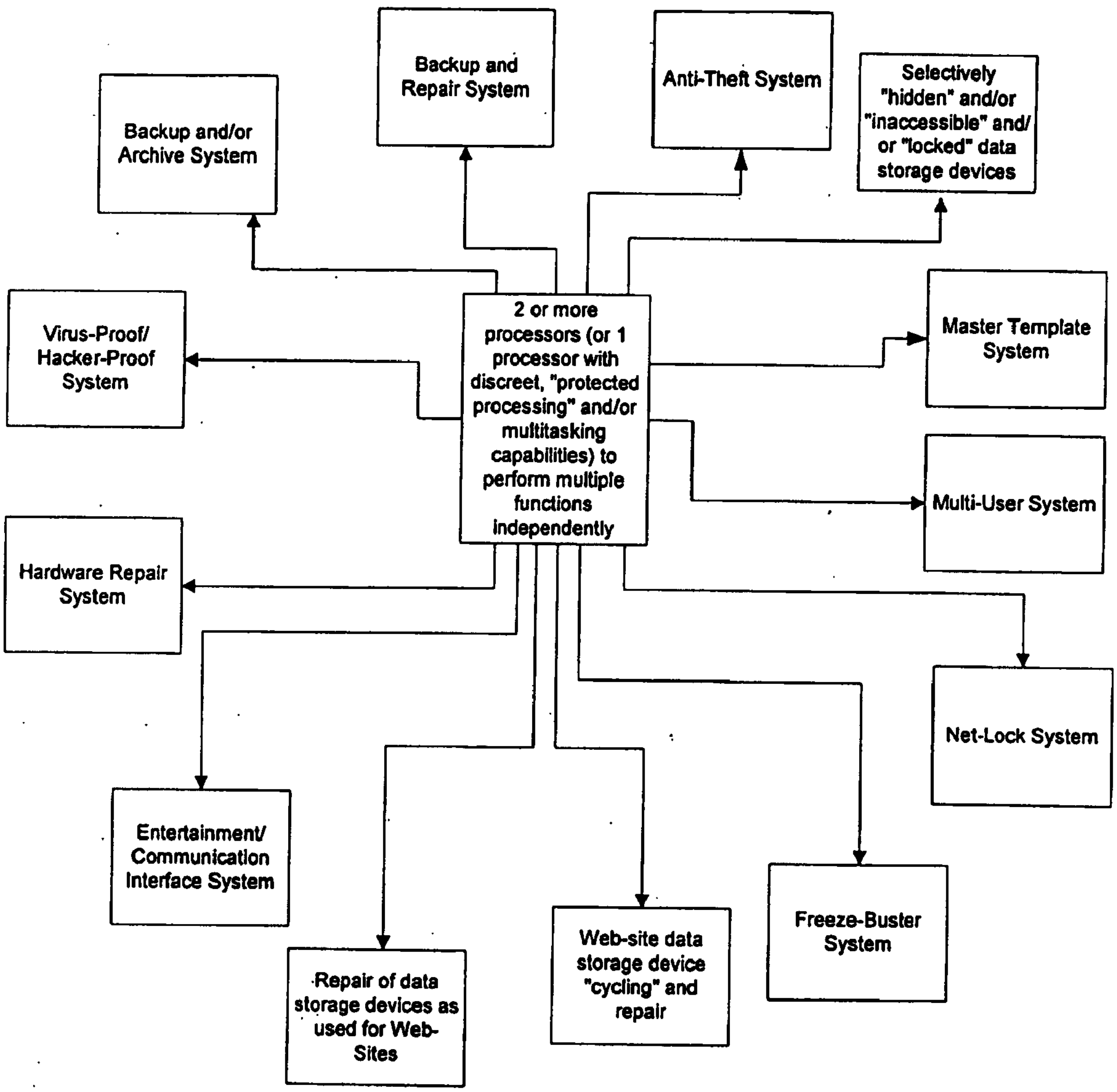

Sheet 12 of 29
Figure F20
Multi user
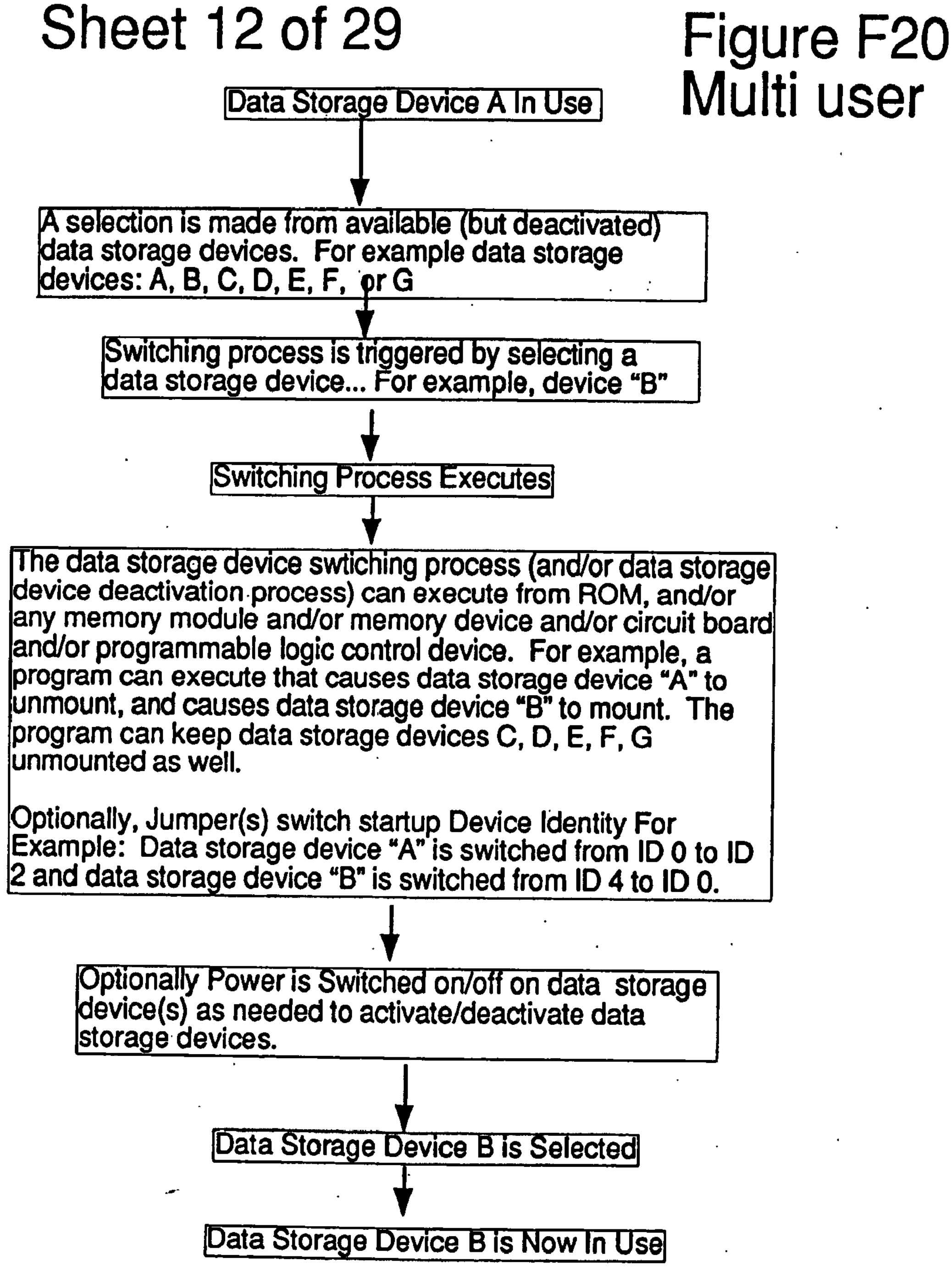

Sheet 14 of 47
Figure F31
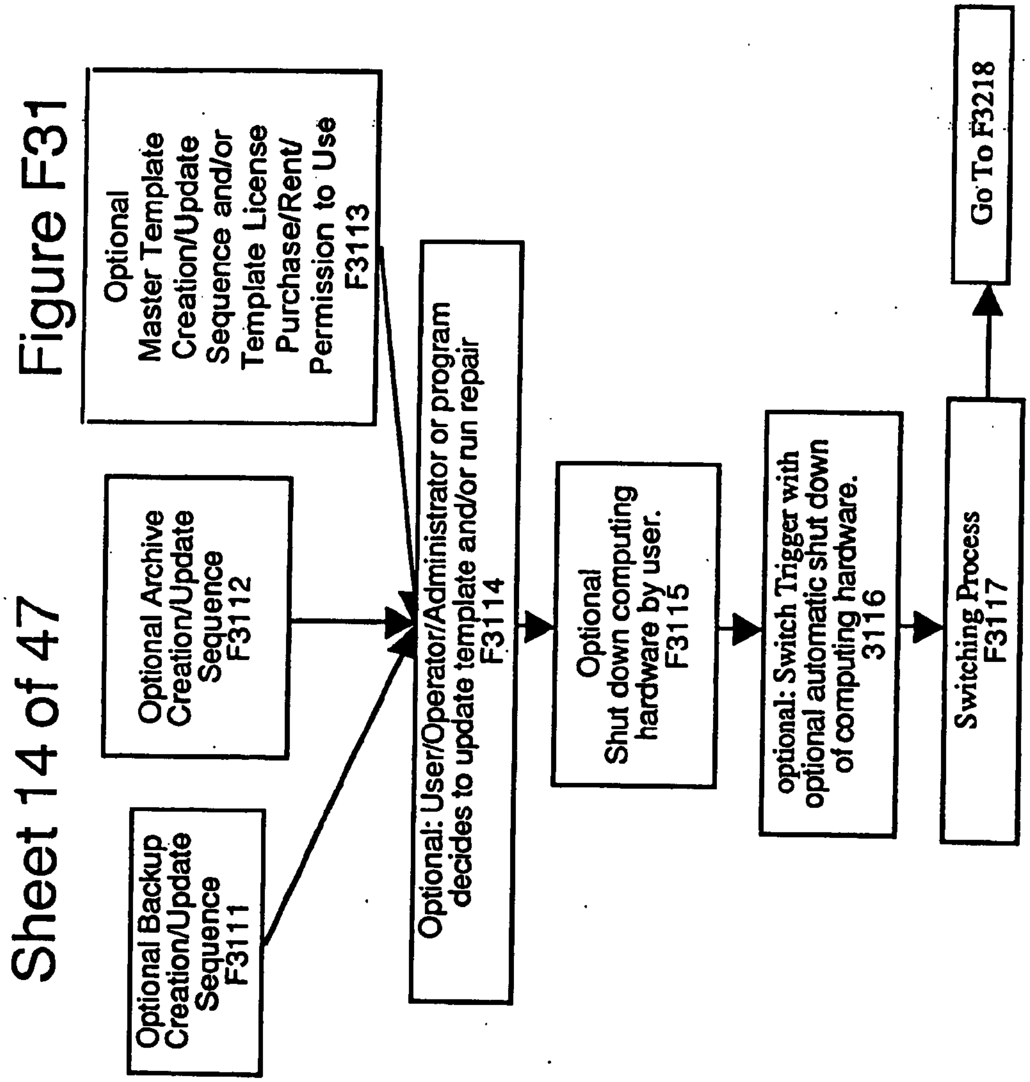

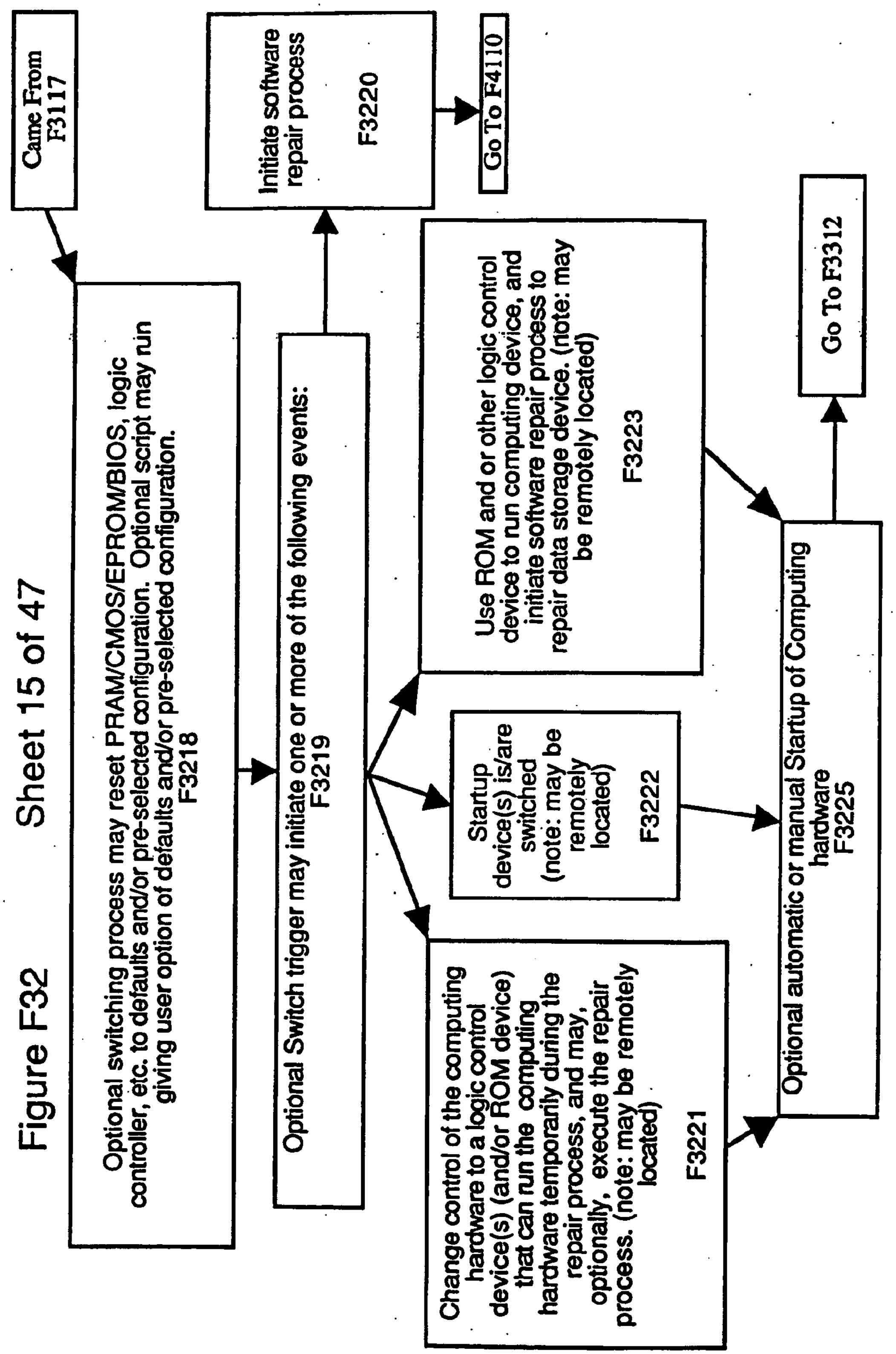
Figure F32
Sheet 15 of 47
Came From F3117
Optional switching process may reset PRAM/CMOS/EPROM/BIOS, logic controller, etc. to defaults and/or pre-selected configuration. Optional script may run giving user option of defaults and/or pre-selected configuration.
F3218
Optional Switch trigger may initiate one or more of the following events:
F3219
Initiate software repair process
F3220
Go To F4110
Change control of the computing hardware to a logic control device(s) (and/or ROM device) that can run the computing hardware temporarily during the repair process, and may, optionally, execute the repair process. (note: may be remotely located)
F3221
Startup device(s) is/are switched (note: may be remotely located)
F3222
Use ROM and or other logic control device to run computing device, and initiate software repair process to repair data storage device. (note: may be remotely located)
F3223
Optional automatic or manual Startup of Computing hardware
F3225
Go To F3312

Figure F33
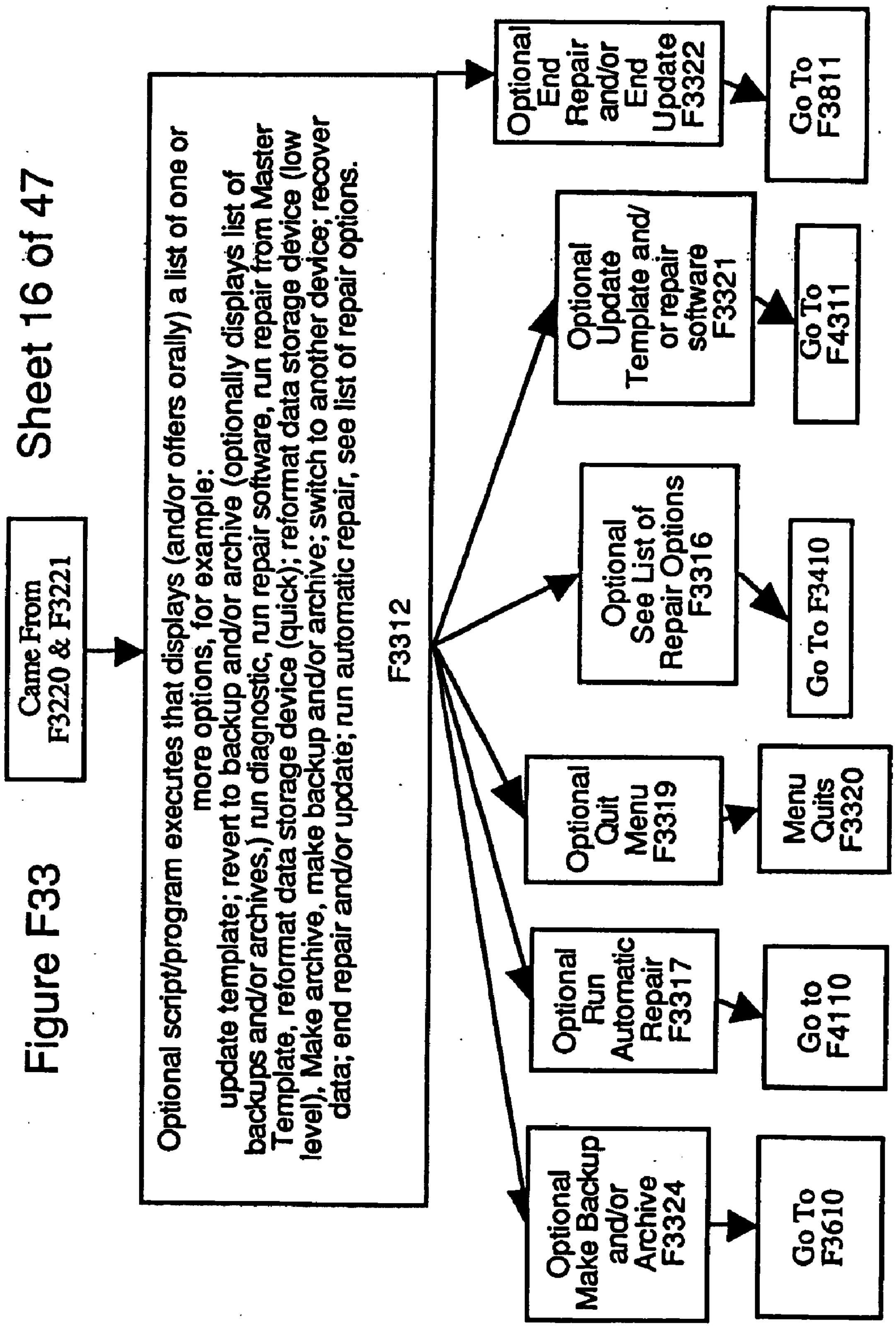

Figure F34
Sheet 17 of 47
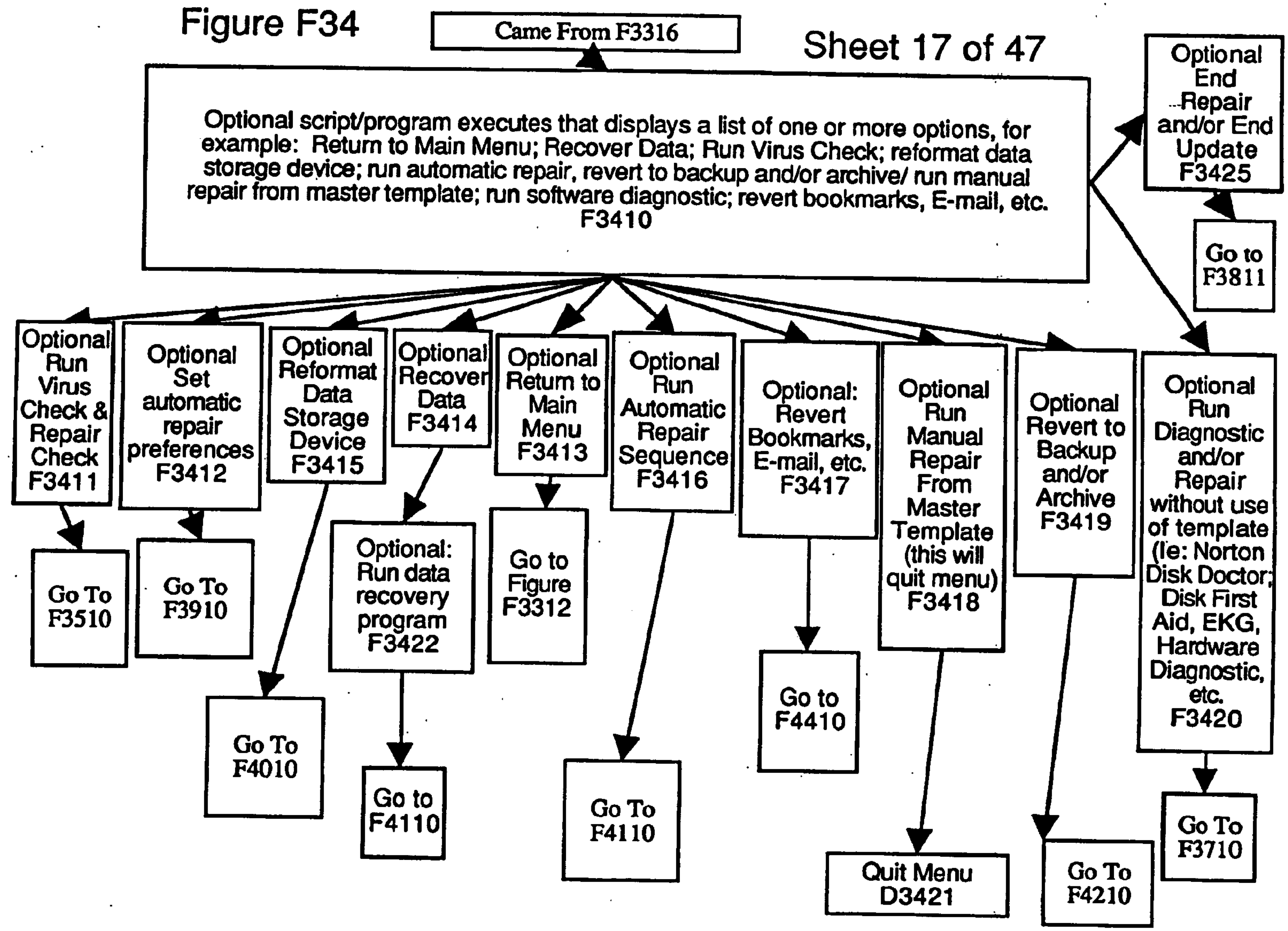

Figure F35
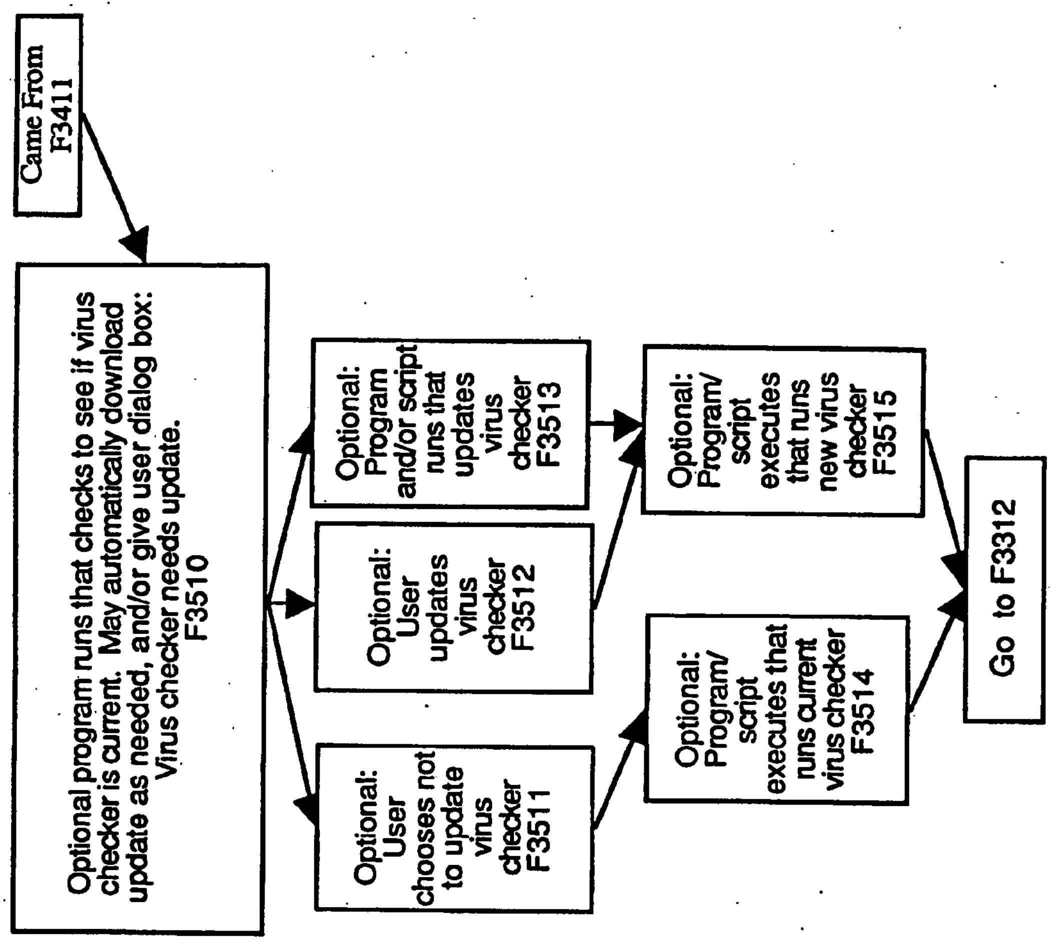

Figure F36
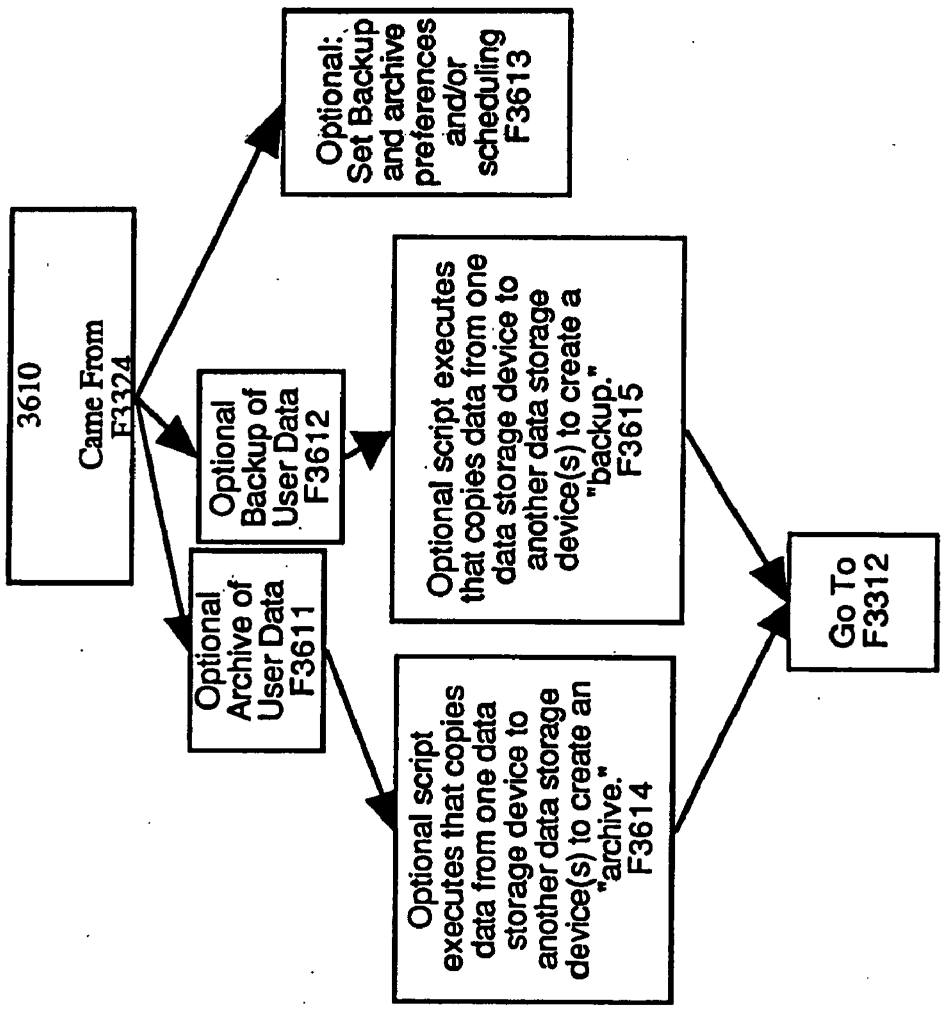

Sheet 20 of 47
Figure F 37
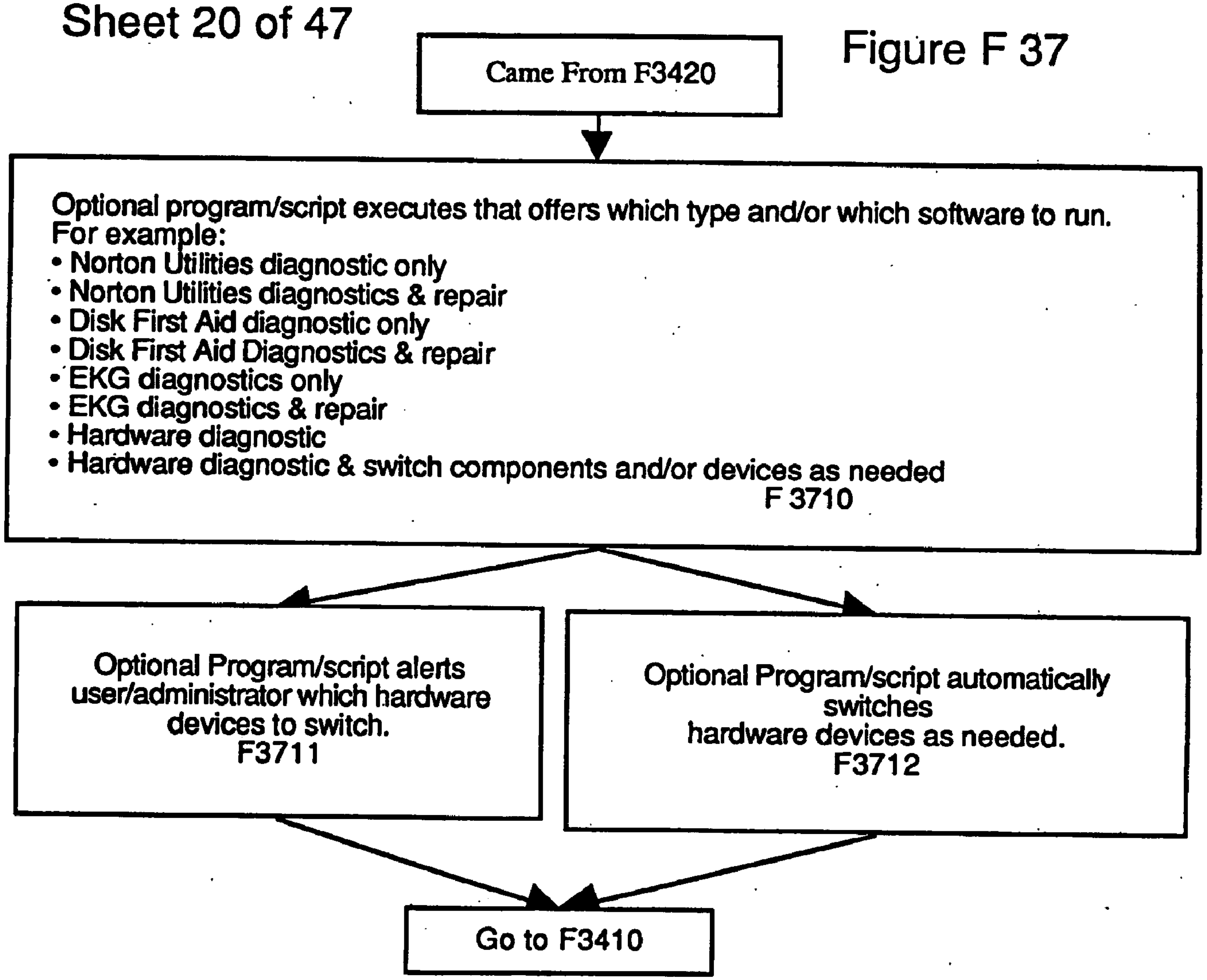

Sheet 21 of 47
Figure F38
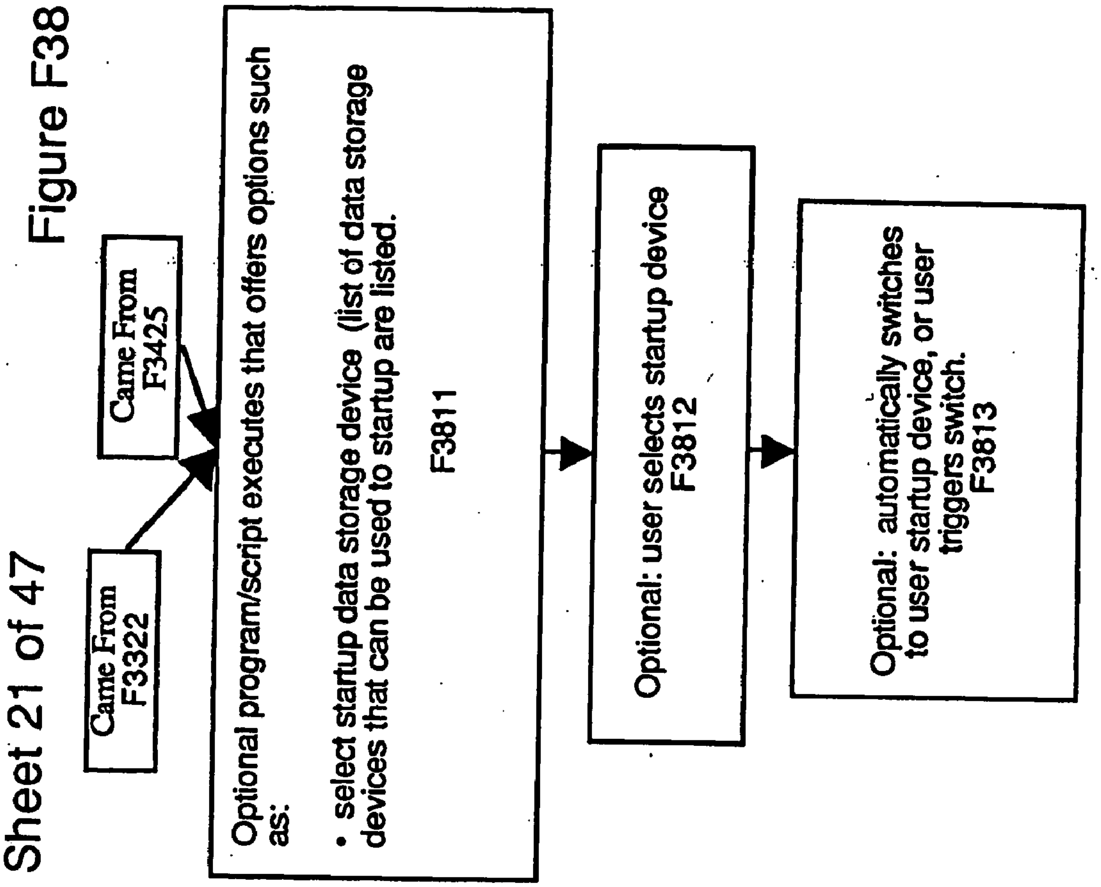

Figure F39
Sheet 22 of 47
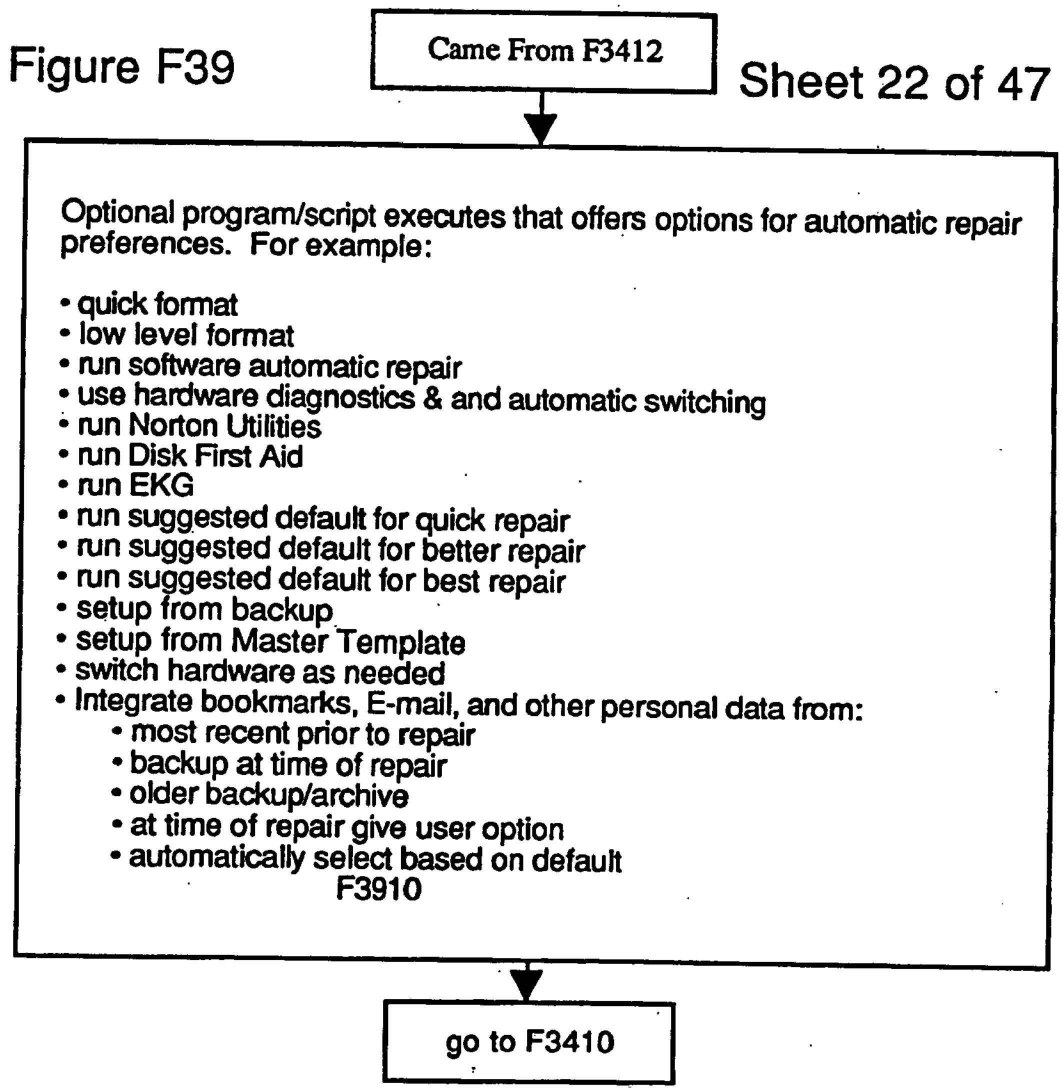

Figure F40
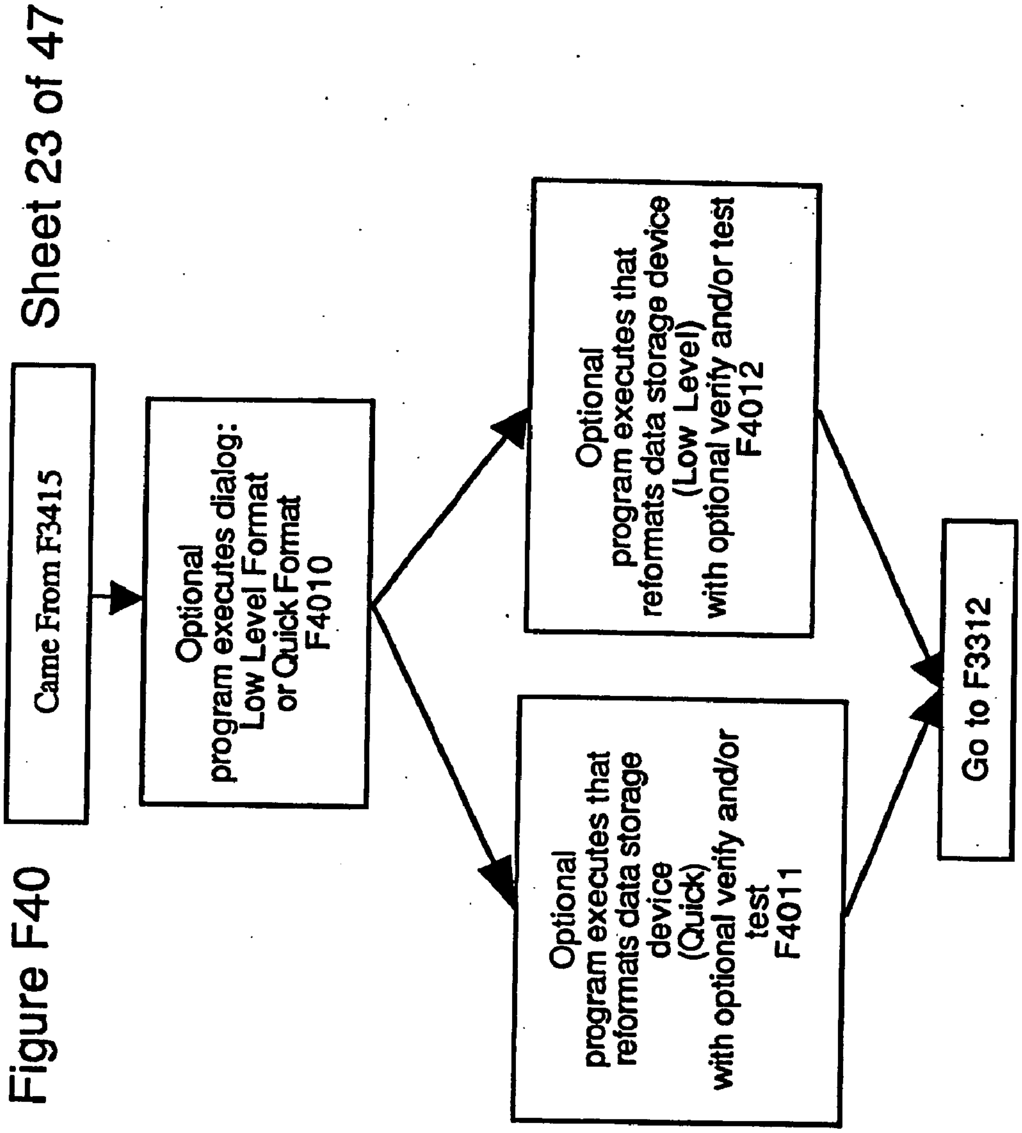

Sheet 24 of 47
Figure F41
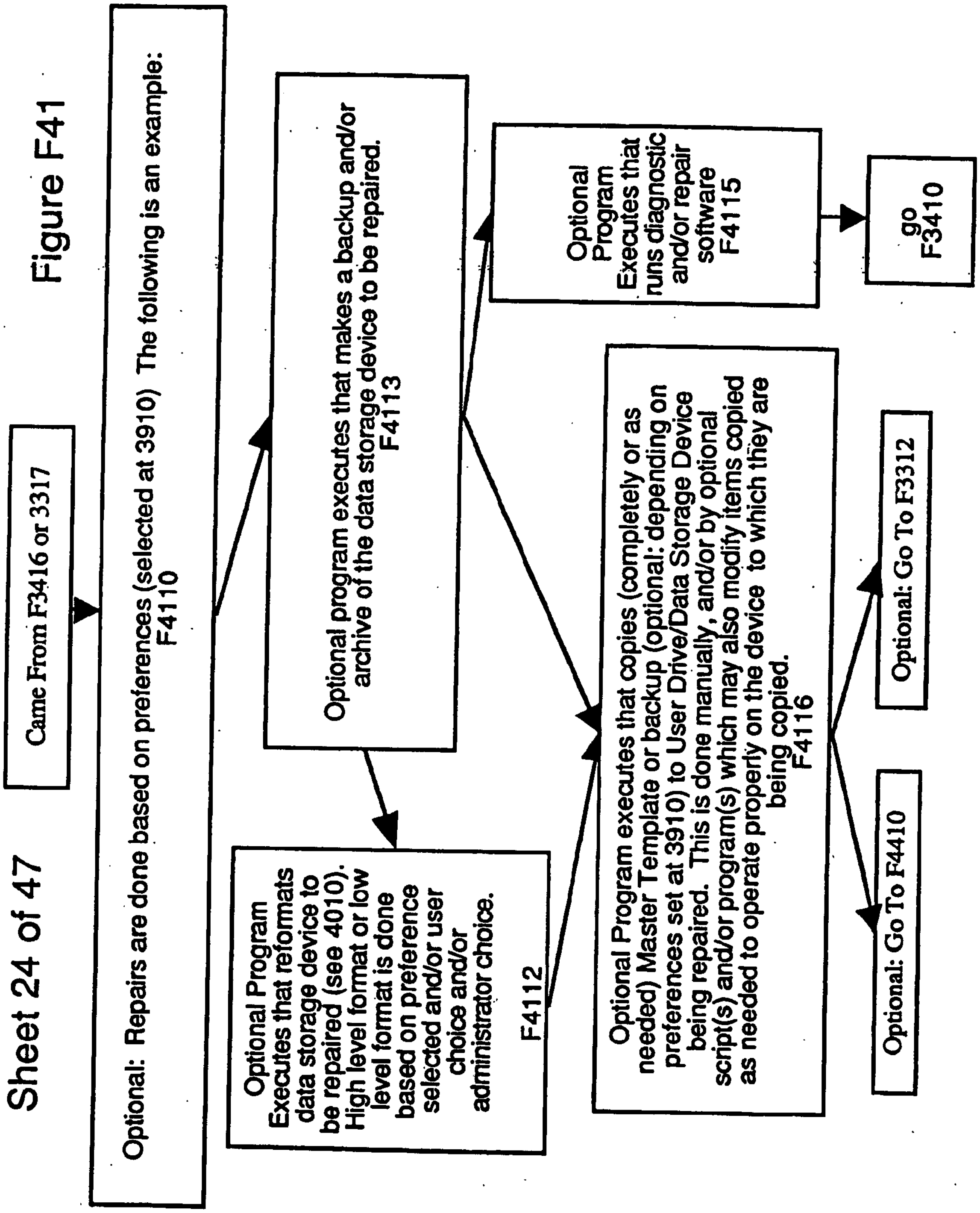

Sheet 25 of 47
Figure F42
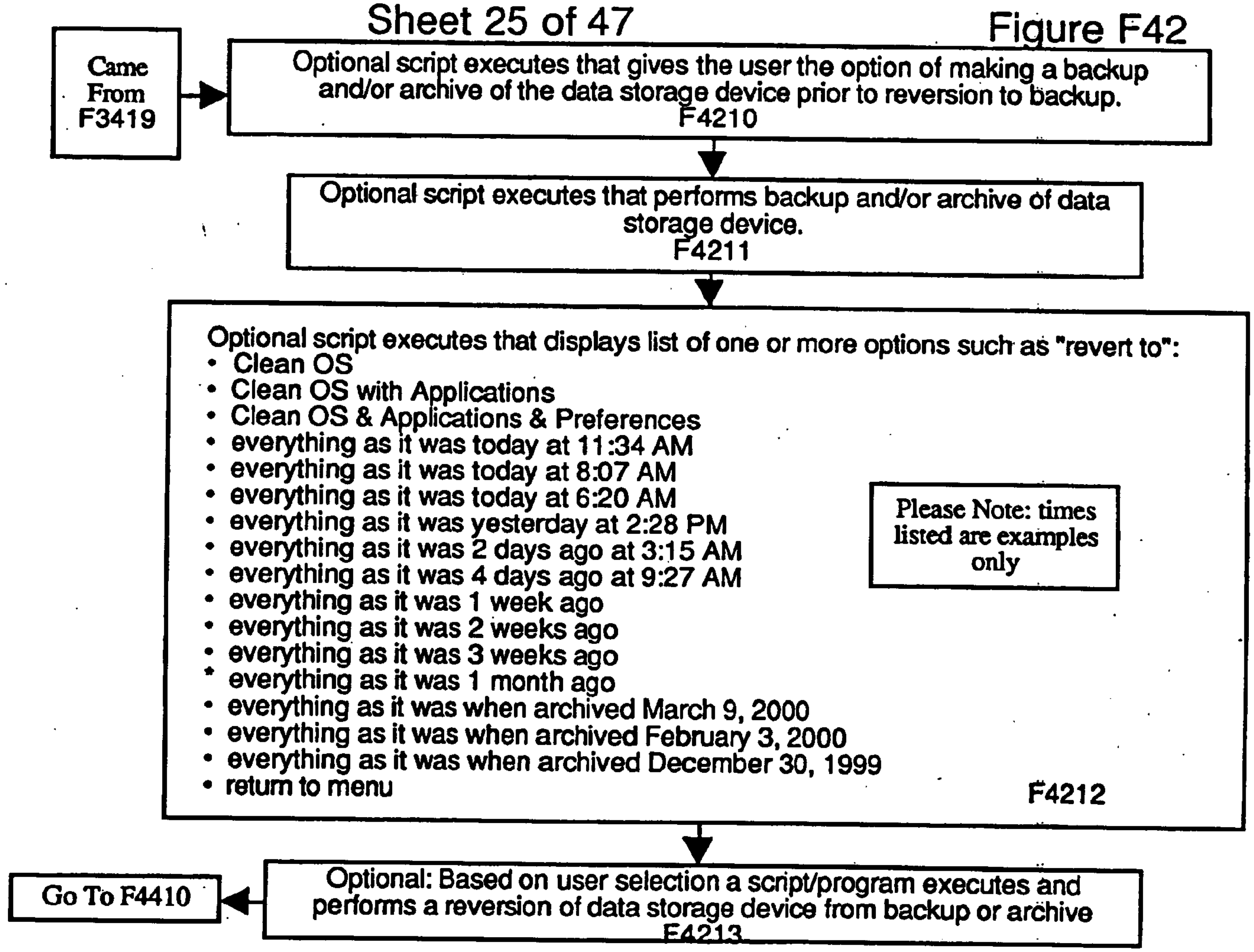

Figure F43
Sheet 26 of 47
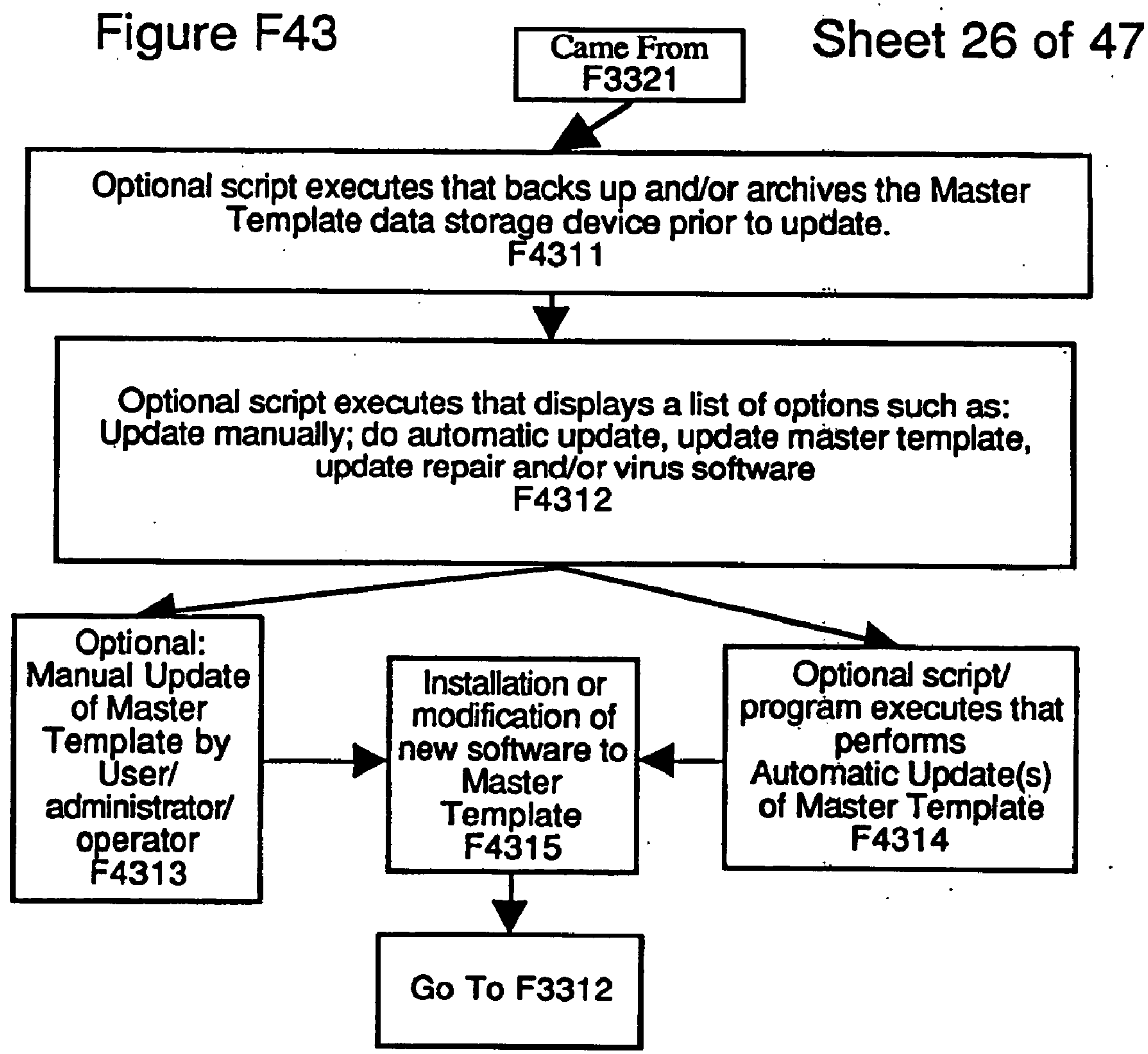

Figure F44
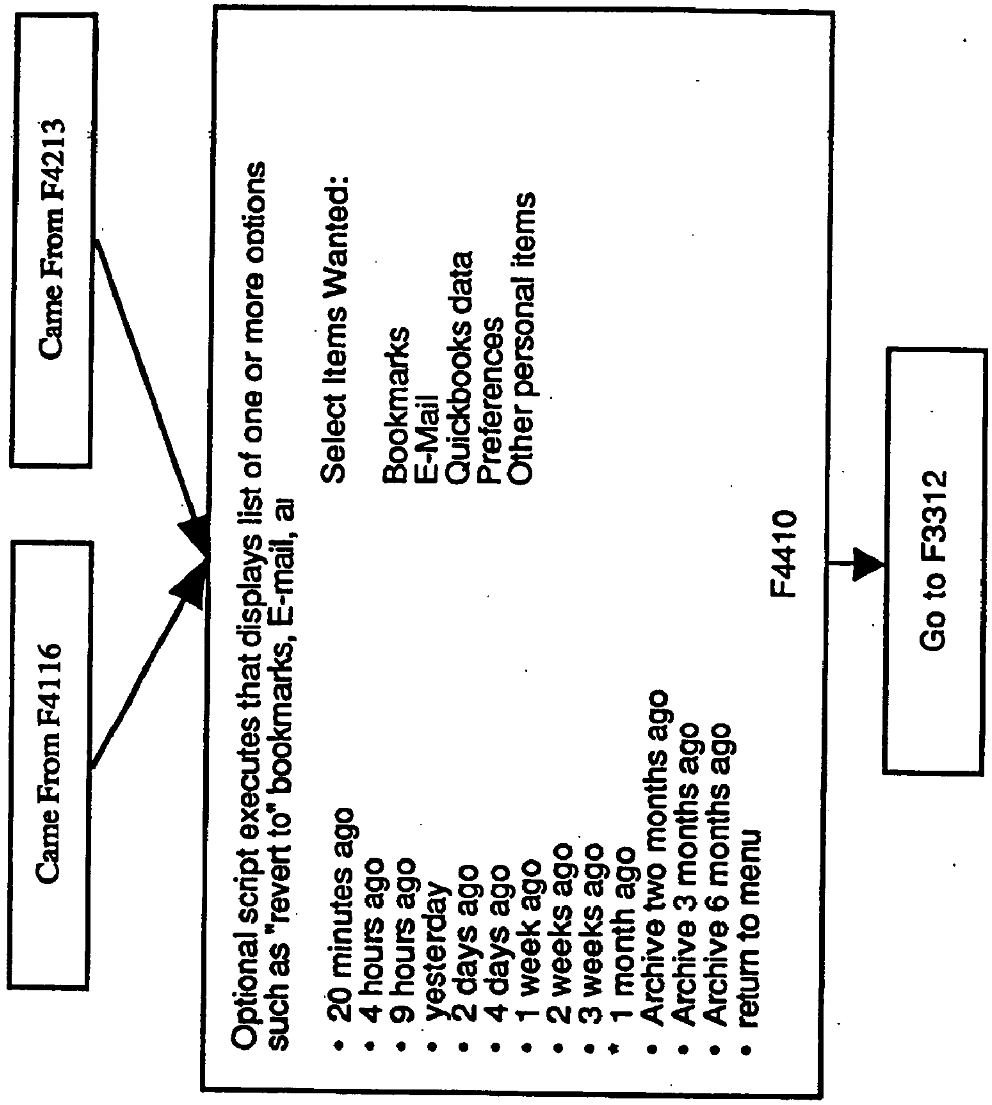

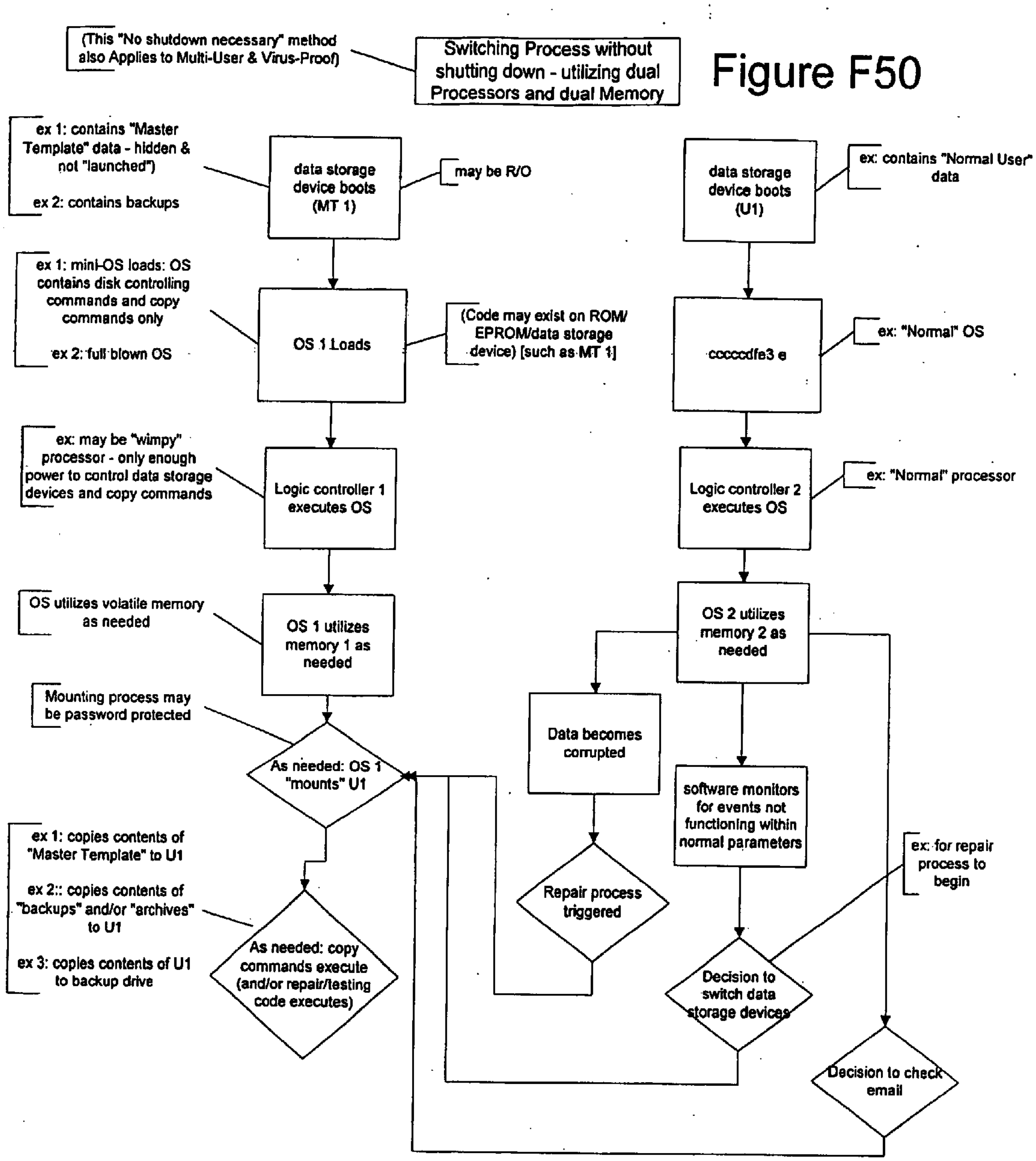
1.) F50

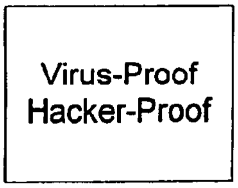
Figure F51
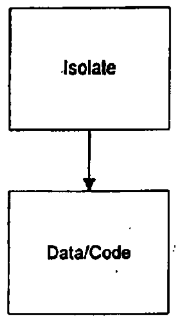
1.) Isolation

Figure F52
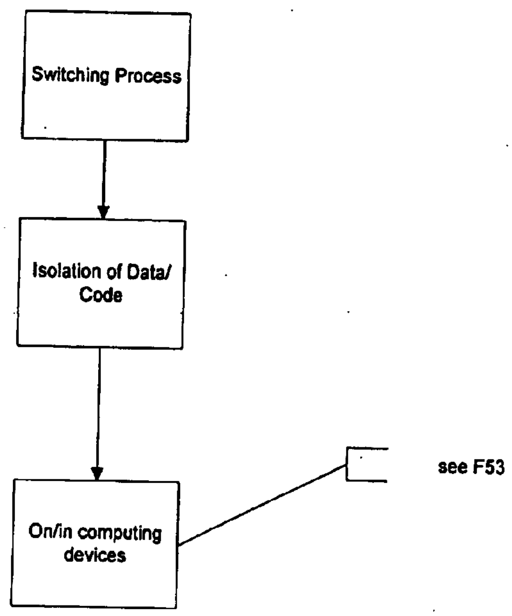
2.) Expanded

Figure F53
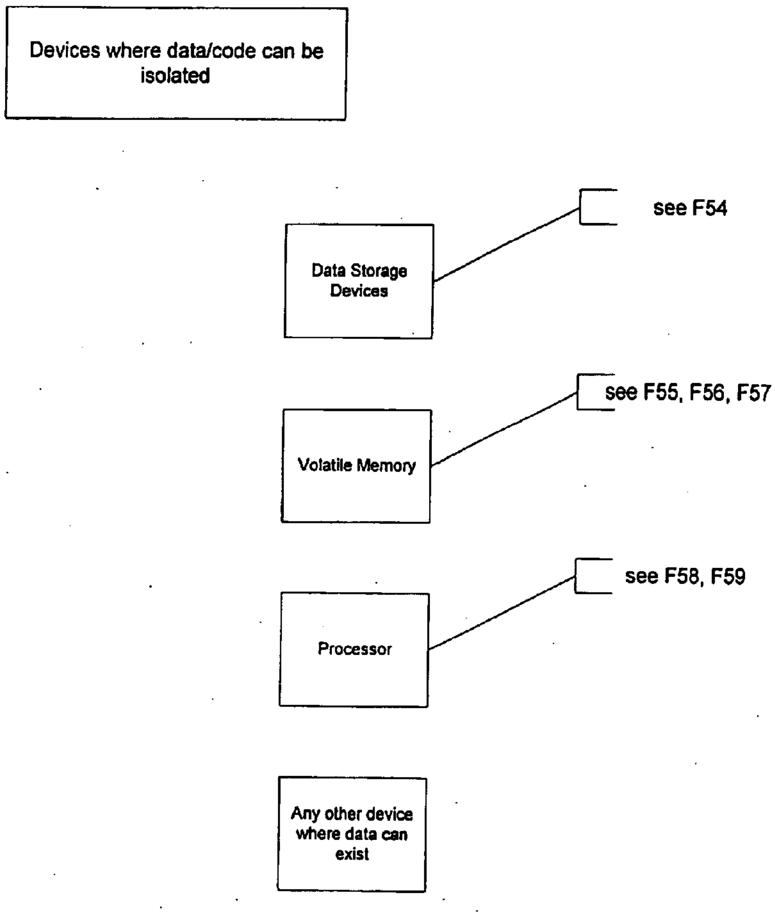
3.) Where's Data

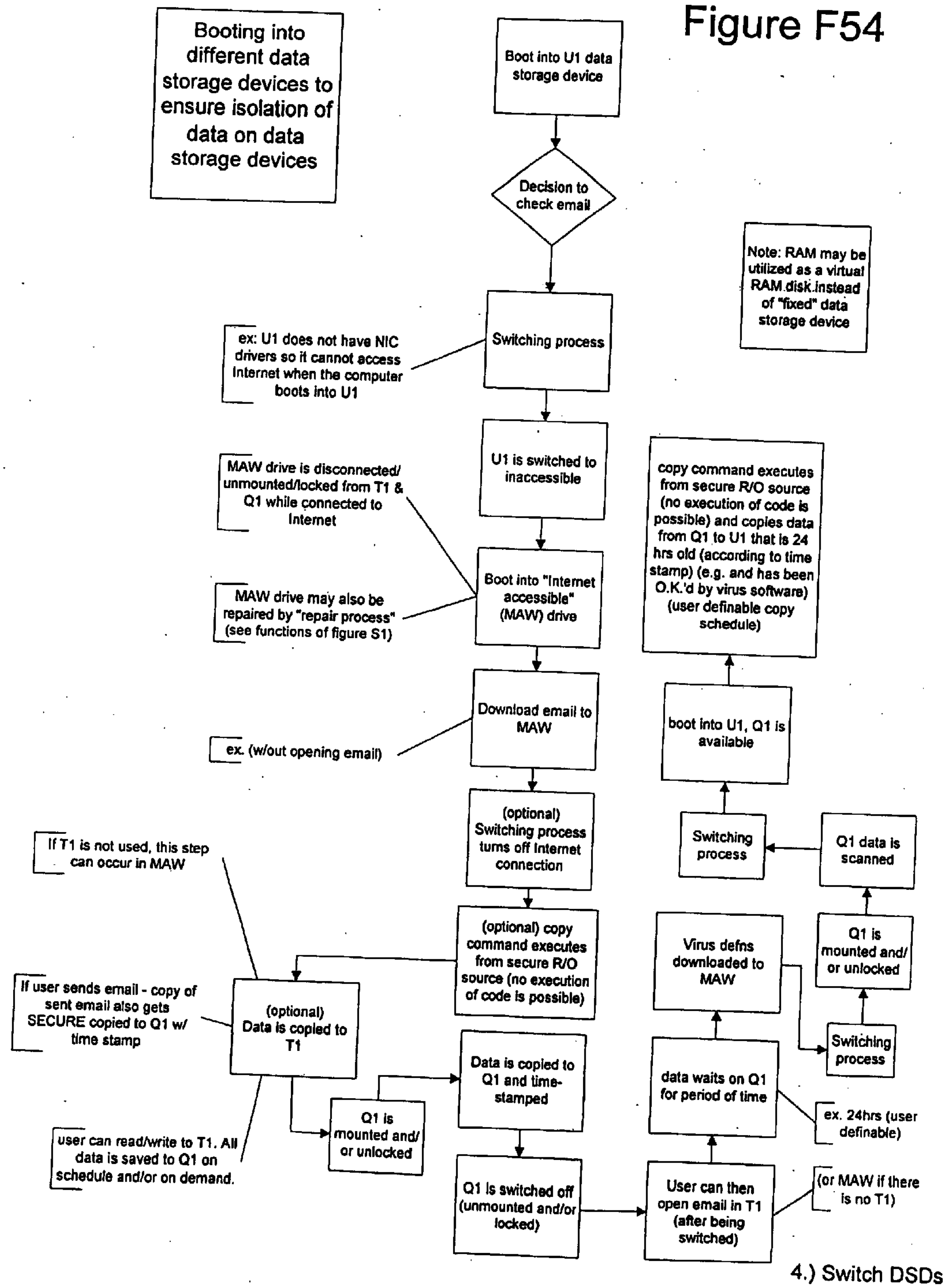
Figure F54

Figure F55
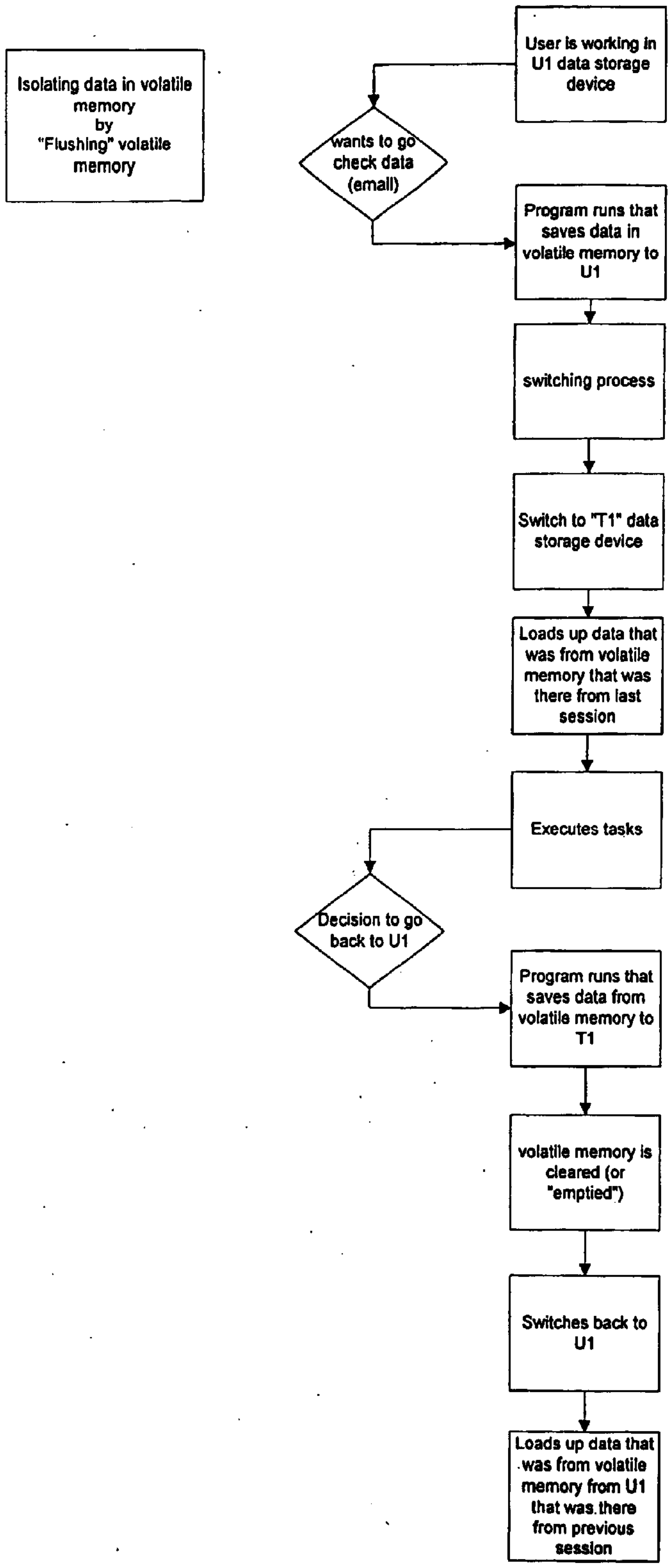
5.) Flush RAM

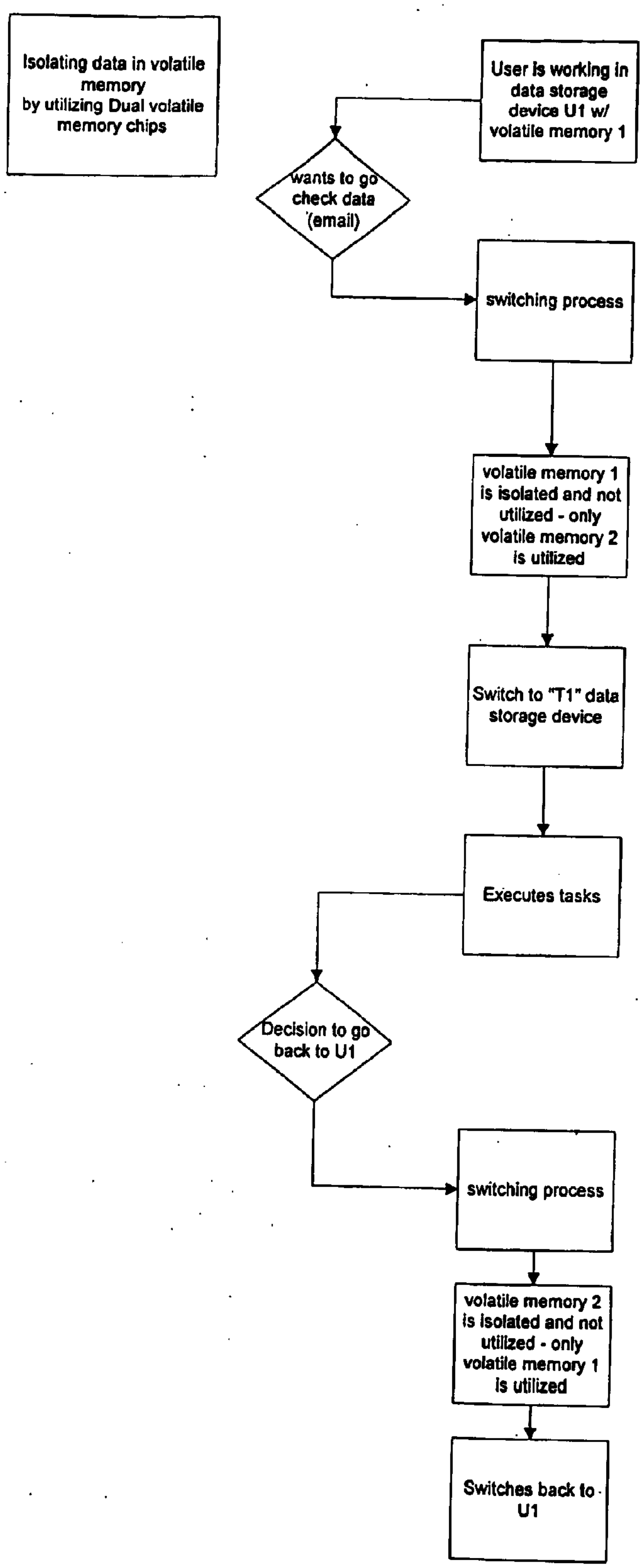
Figure F56
6.) Dual RAM

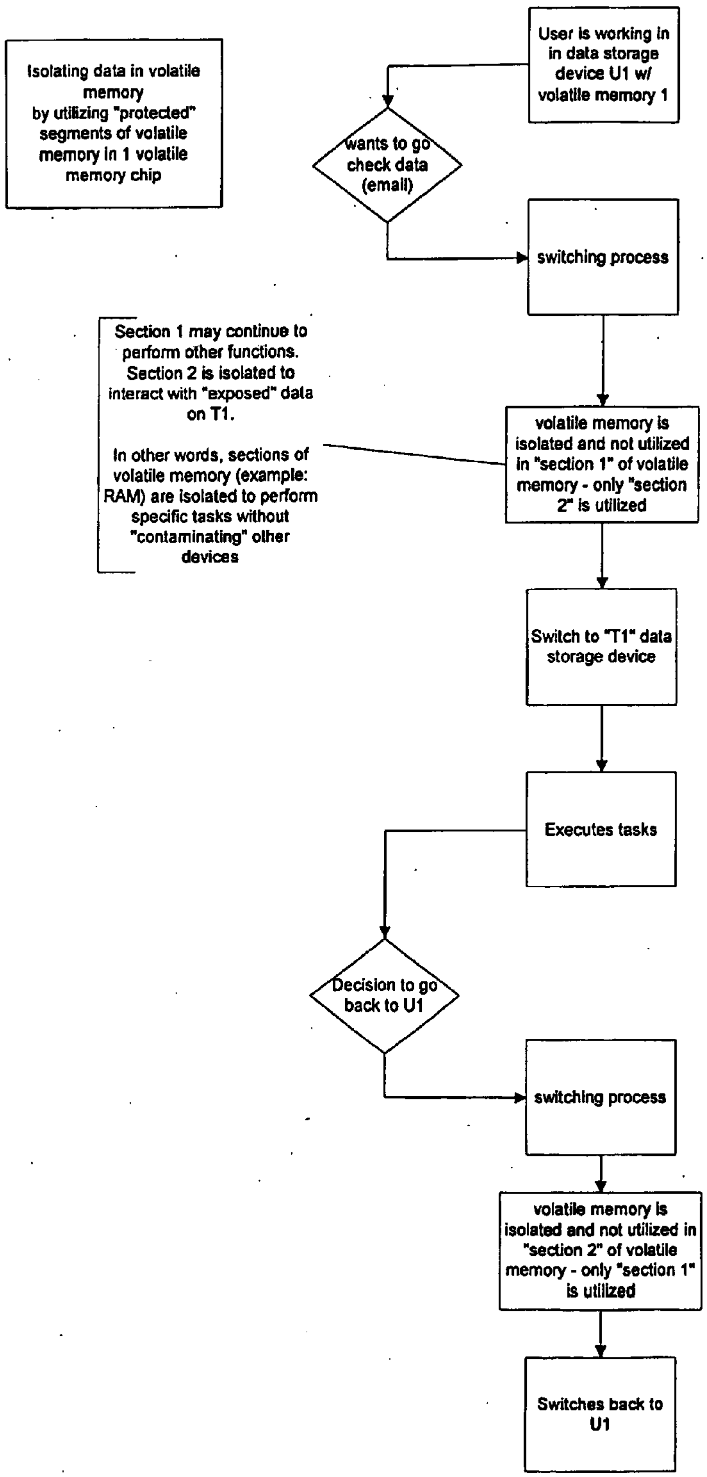
Figure F57
7.) Single RAM - isolated funcs

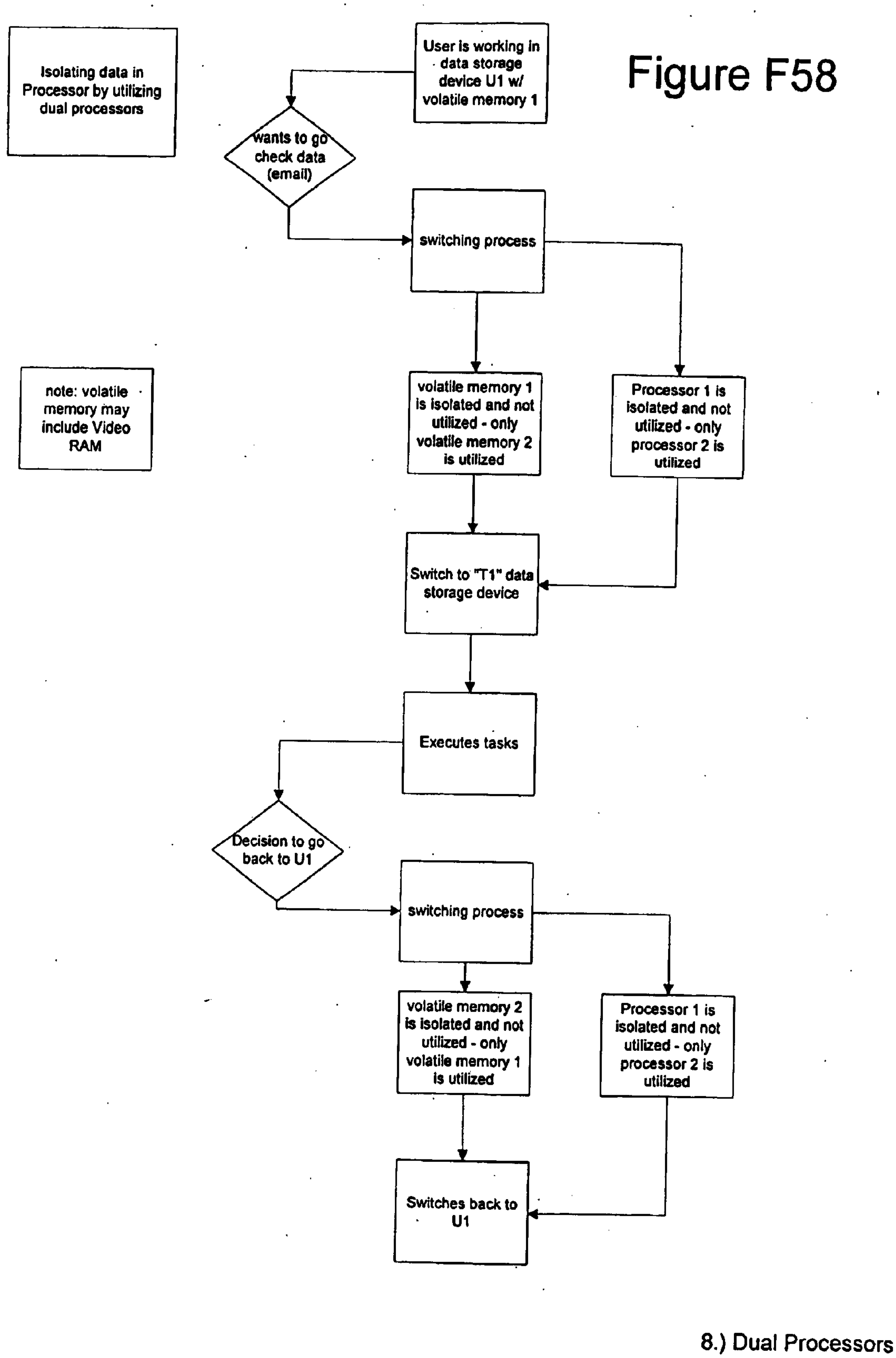
Isolating data in Processor by utilizing dual processors
User is working in data storage device U1 w/ volatile memory 1
Figure F58
wants to go check data (email)
switching process
note: volatile memory may include Video RAM
volatile memory 1 is isolated and not utilized - only volatile memory 2 is utilized
Processor 1 is isolated and not utilized - only processor 2 is utilized
Switch to "T1" data storage device
Executes tasks
Decision to go back to U1
switching process
volatile memory 2 is isolated and not utilized - only volatile memory 1 is utilized
Processor 1 is isolated and not utilized - only processor 2 is utilized
Switches back to U1
8.) Dual Processors Figure F59
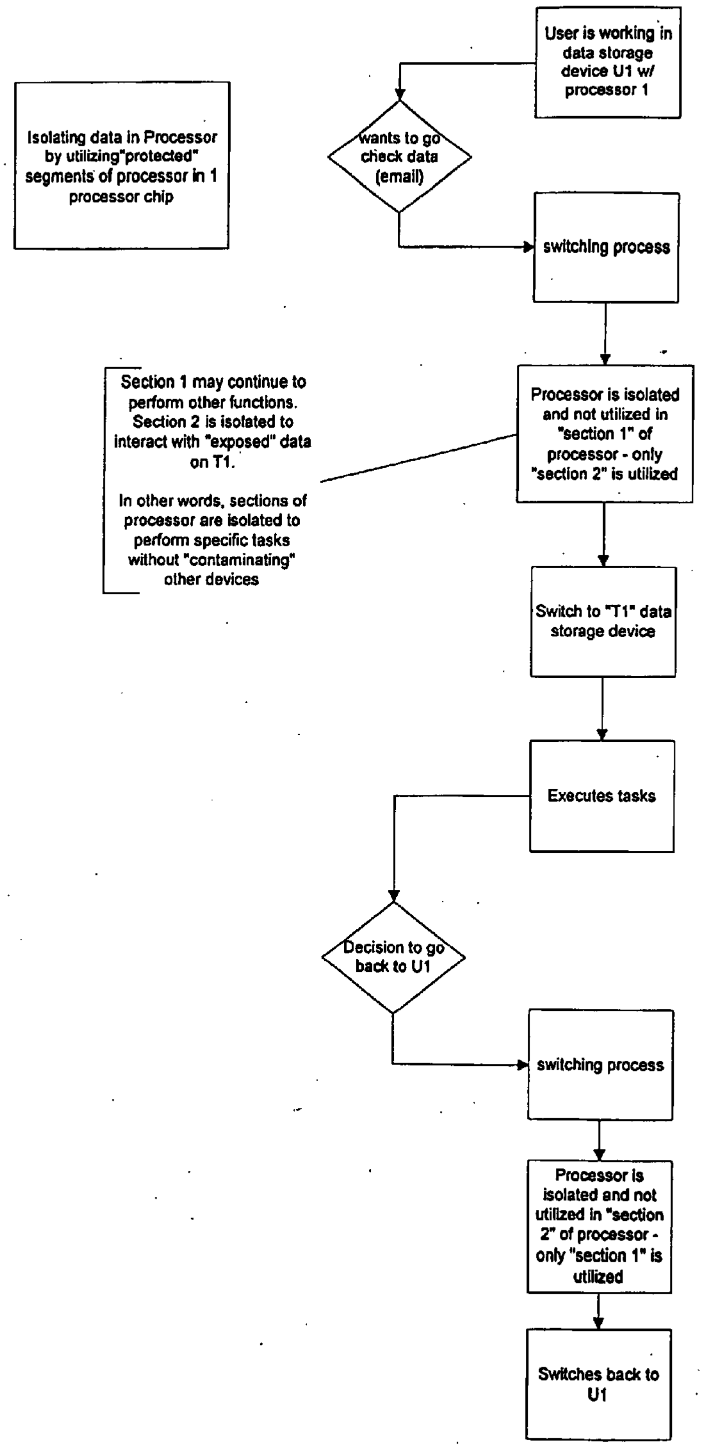
9.) Single Processor "protected"

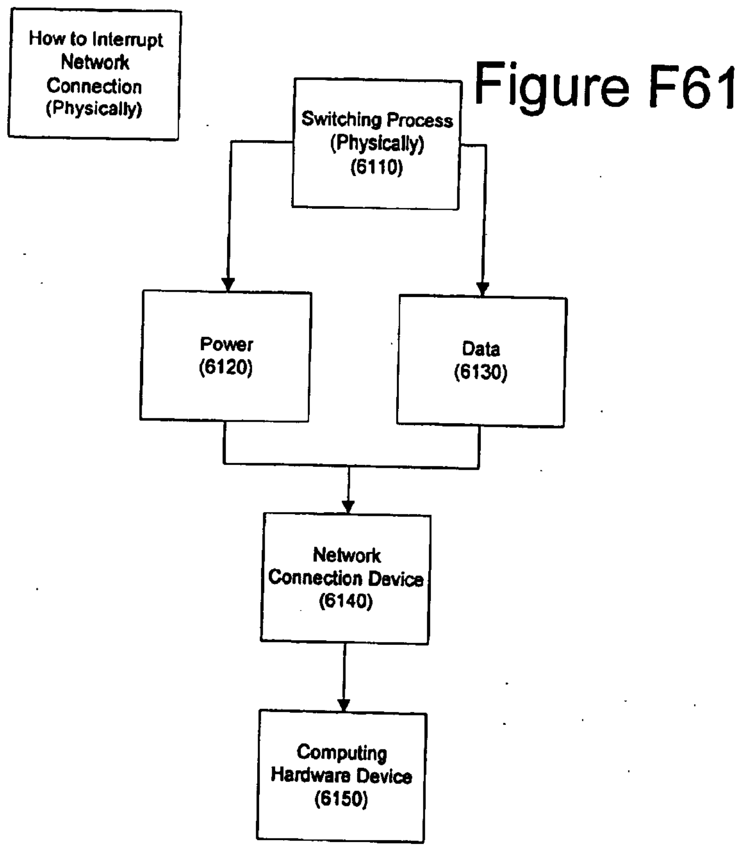
Figure F61
1.) F61

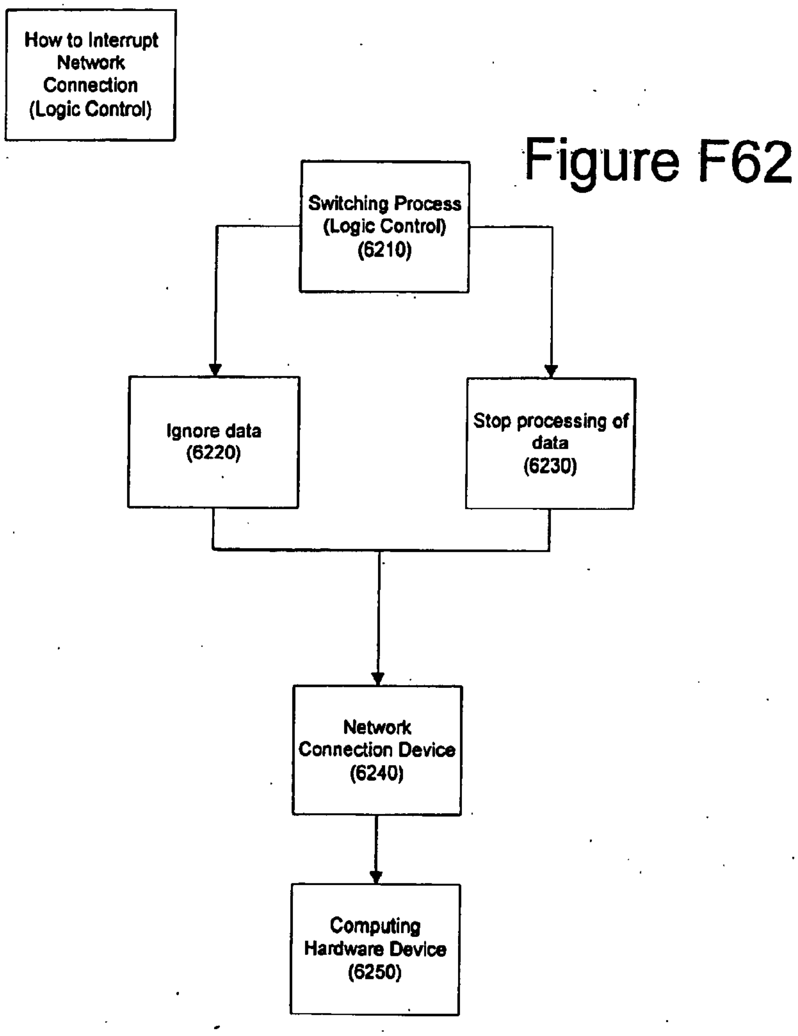
2.) F62

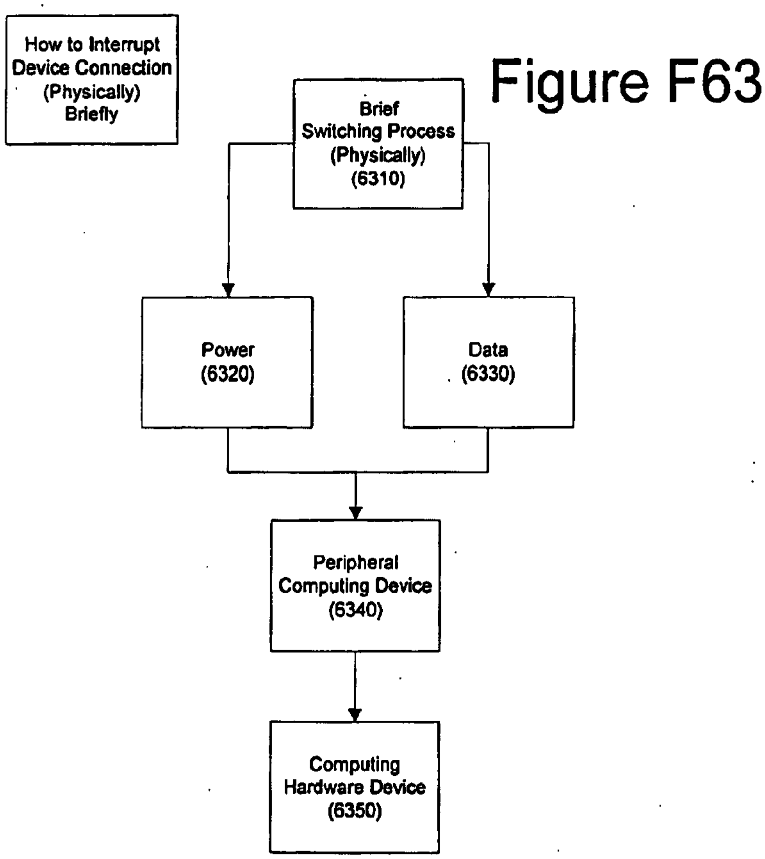
Figure F63
3.) F63

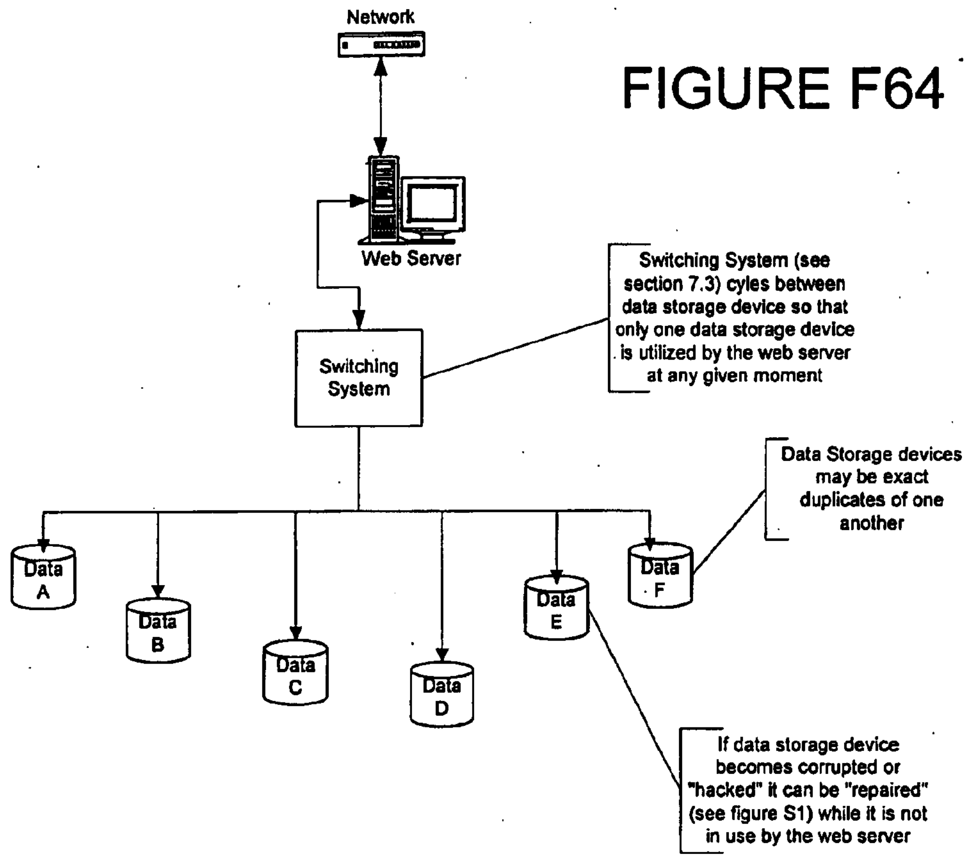
FIGURE F64

FIGURE F65
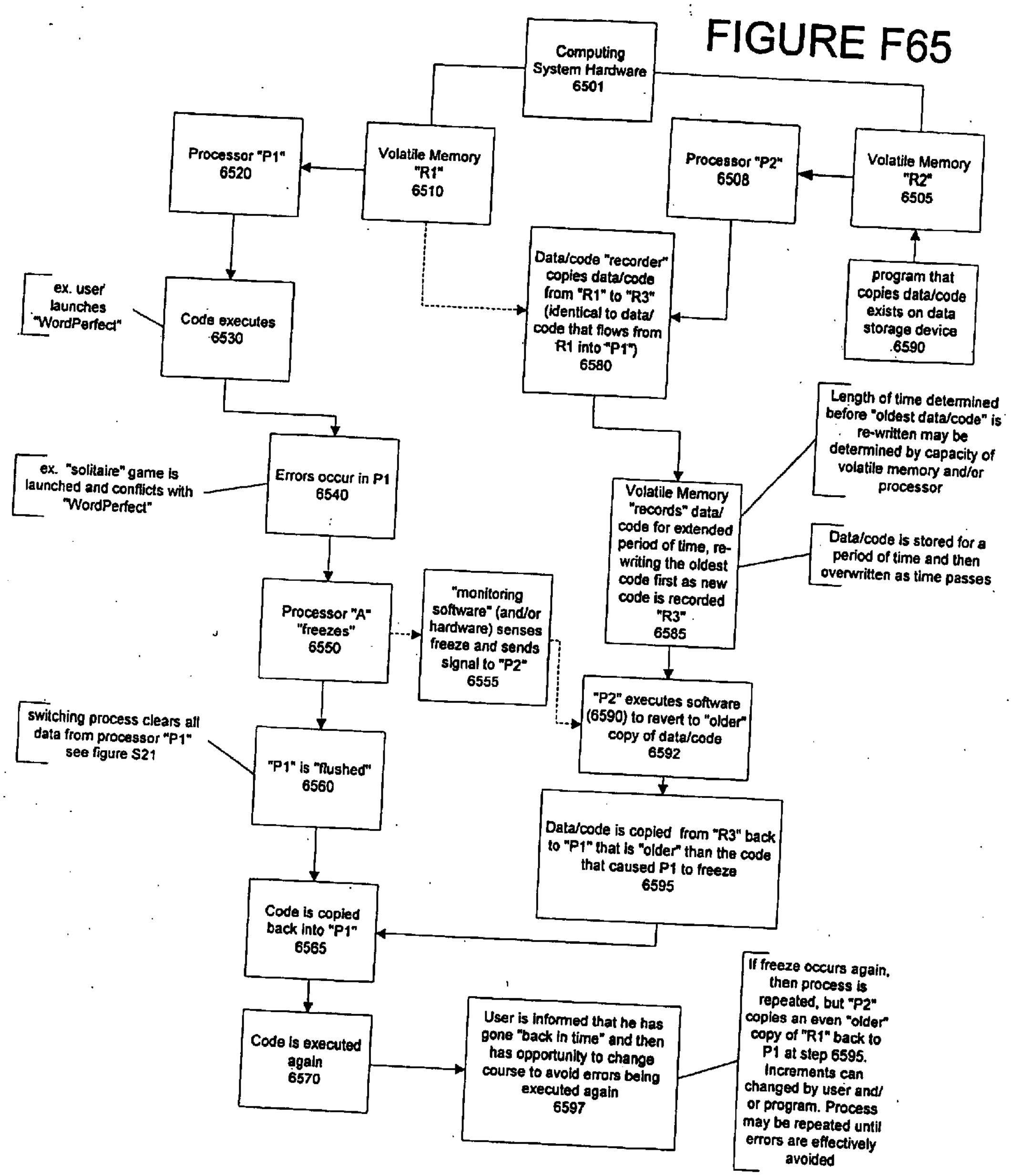

FIGURE F66
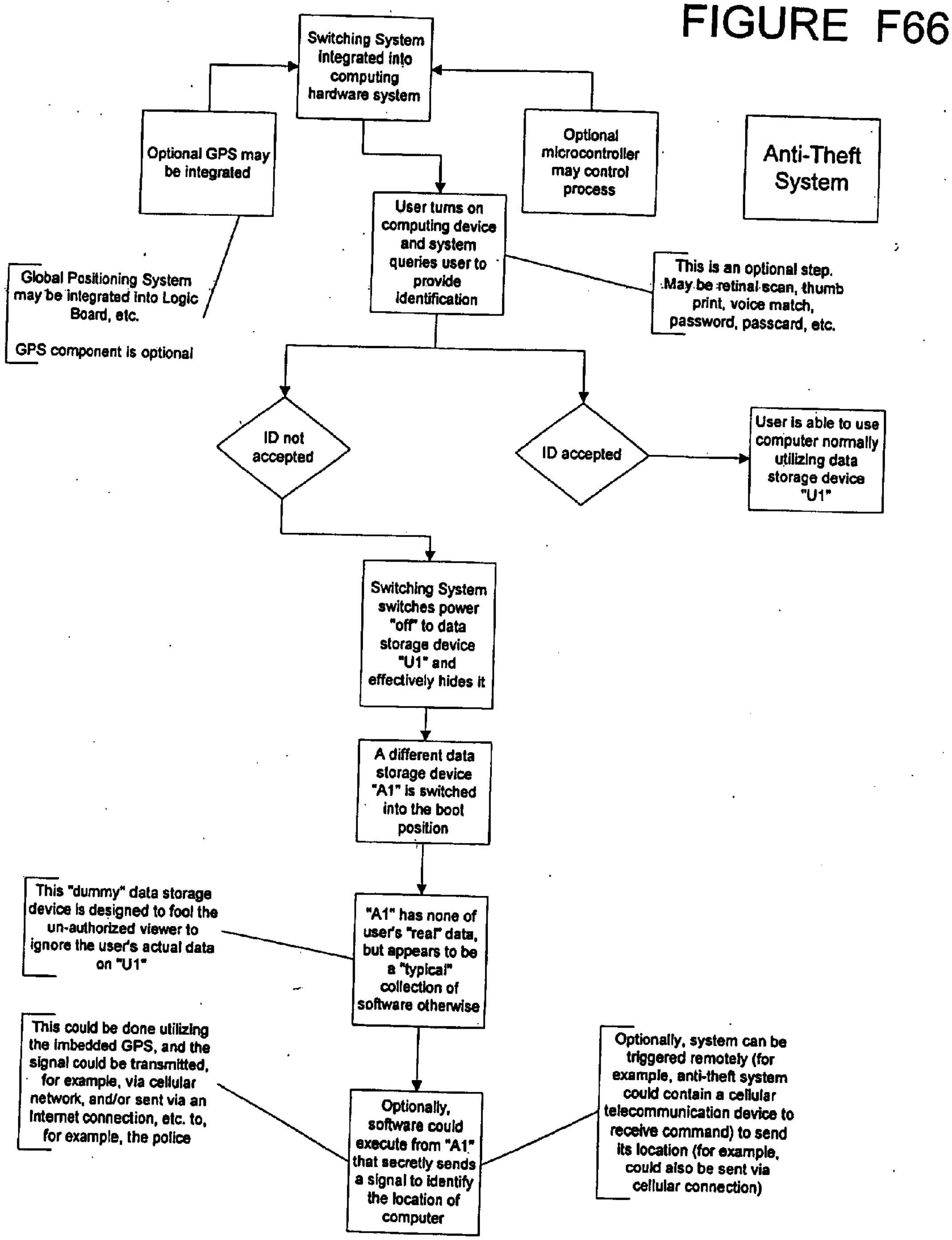

Sheet 1 of 10
Figure F90
One example of Directional Data Flow Path
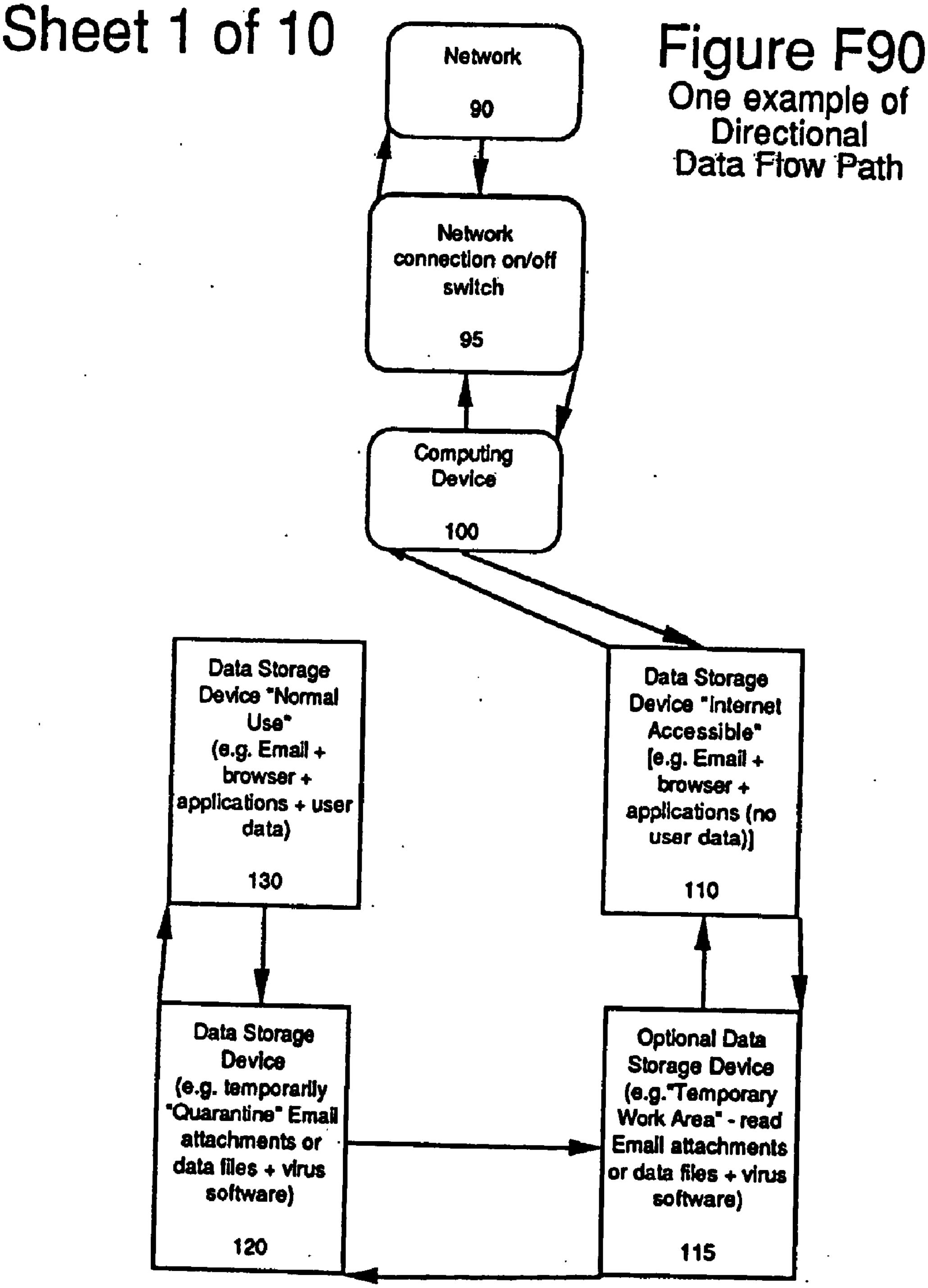

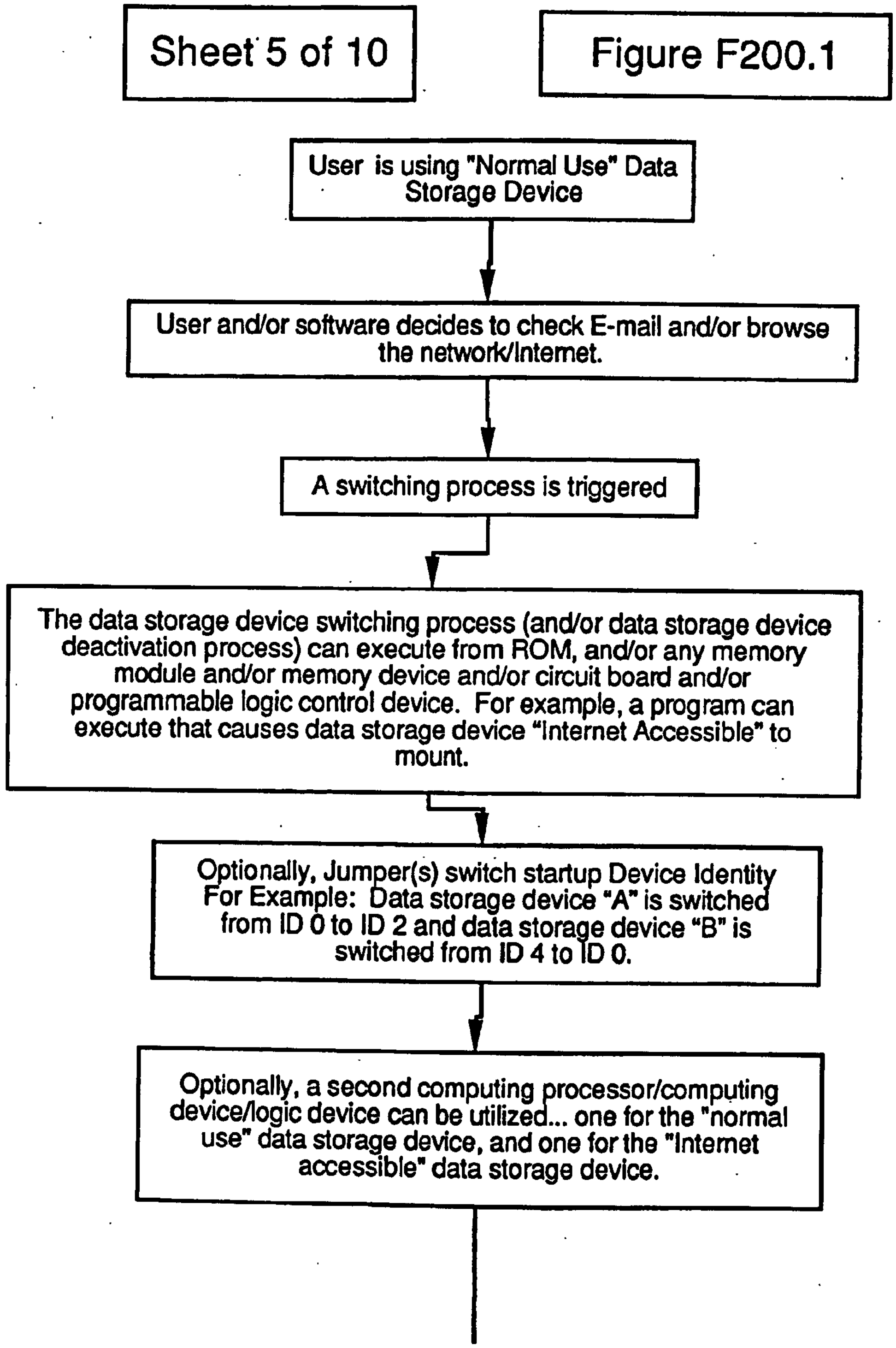
Sheet 5 of 10
Figure F200.1
User is using "Normal Use" Data Storage Device
User and/or software decides to check E-mail and/or browse the network/Internet.
A switching process is triggered
The data storage device switching process (and/or data storage device deactivation process) can execute from ROM, and/or any memory module and/or memory device and/or circuit board and/or programmable logic control device. For example, a program can execute that causes data storage device "Internet Accessible" to mount.
Optionally, Jumper(s) switch startup Device Identity For Example: Data storage device "A" is switched from ID 0 to ID 2 and data storage device "B" is switched from ID 4 to ID 0.
Optionally, a second computing processor/computing device/logic device can be utilized... one for the "normal use" data storage device, and one for the "Internet accessible" data storage device.

Sheet 6 of 10
Figure F200.2
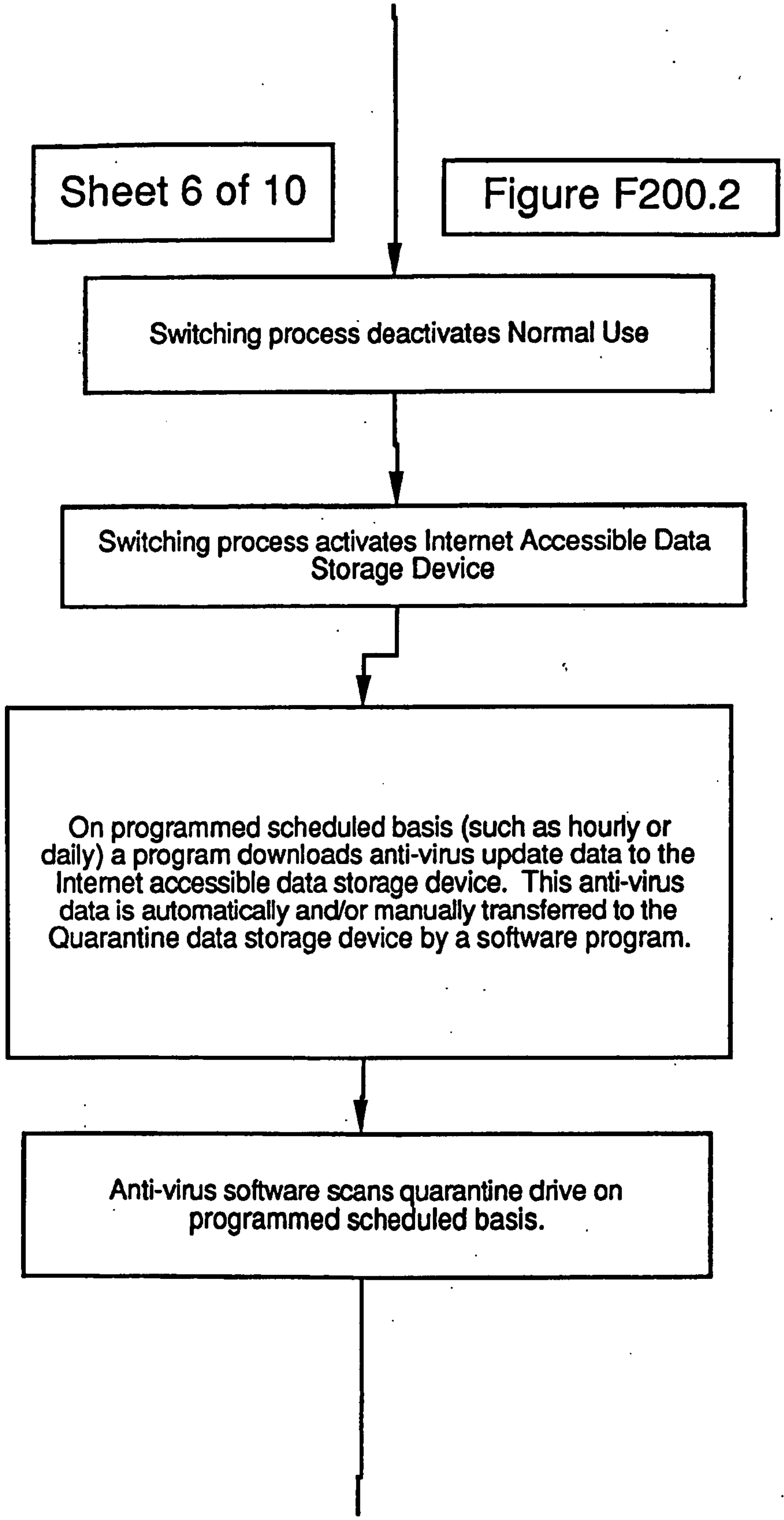

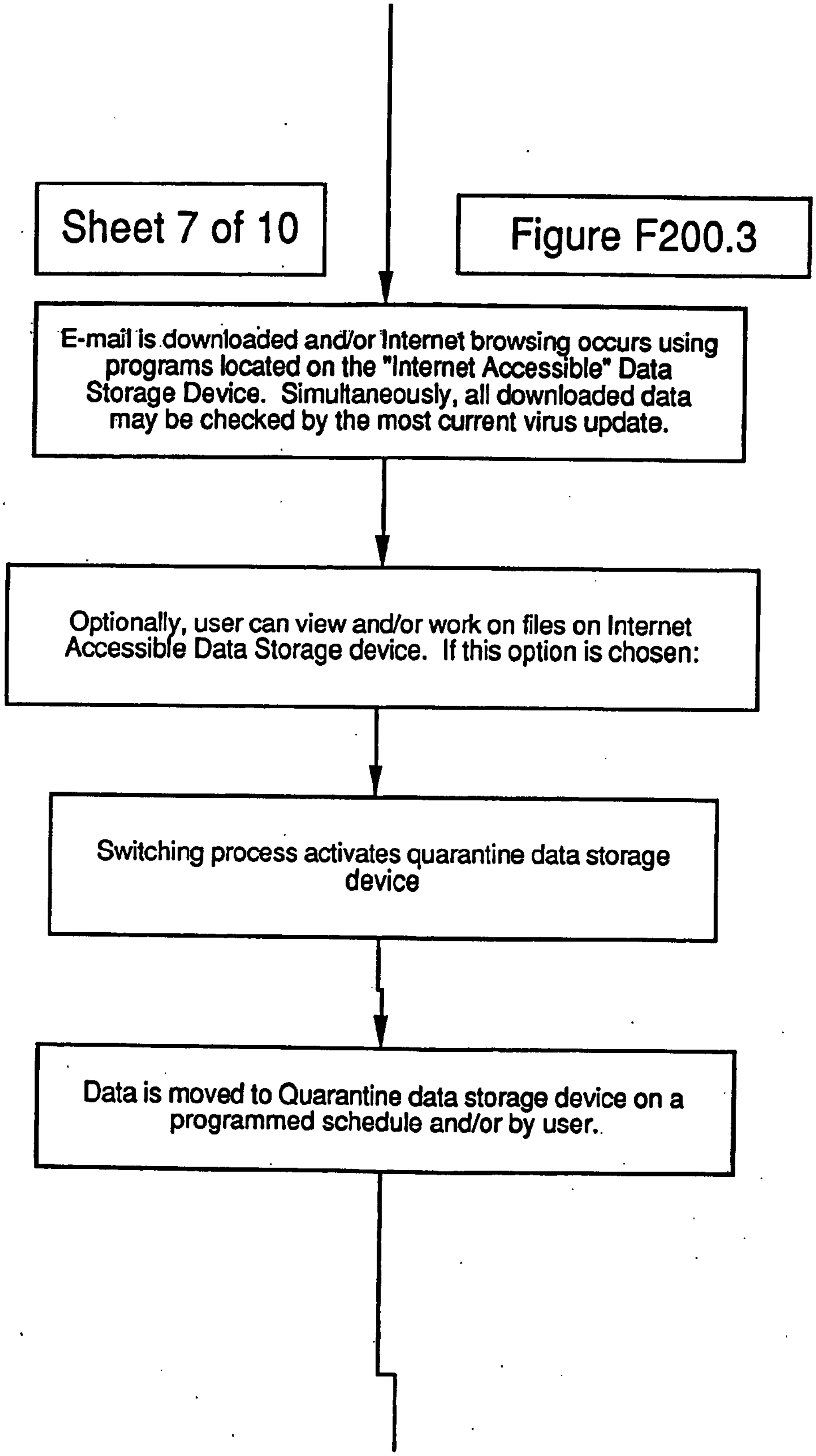
Sheet 7 of 10
Figure F200.3
E-mail is downloaded and/or Internet browsing occurs using programs located on the "Internet Accessible" Data Storage Device. Simultaneously, all downloaded data may be checked by the most current virus update.
Optionally, user can view and/or work on files on Internet Accessible Data Storage device. If this option is chosen:
Switching process activates quarantine data storage device
Data is moved to Quarantine data storage device on a programmed schedule and/or by user.

Sheet 8 of 10
Figure F200.4
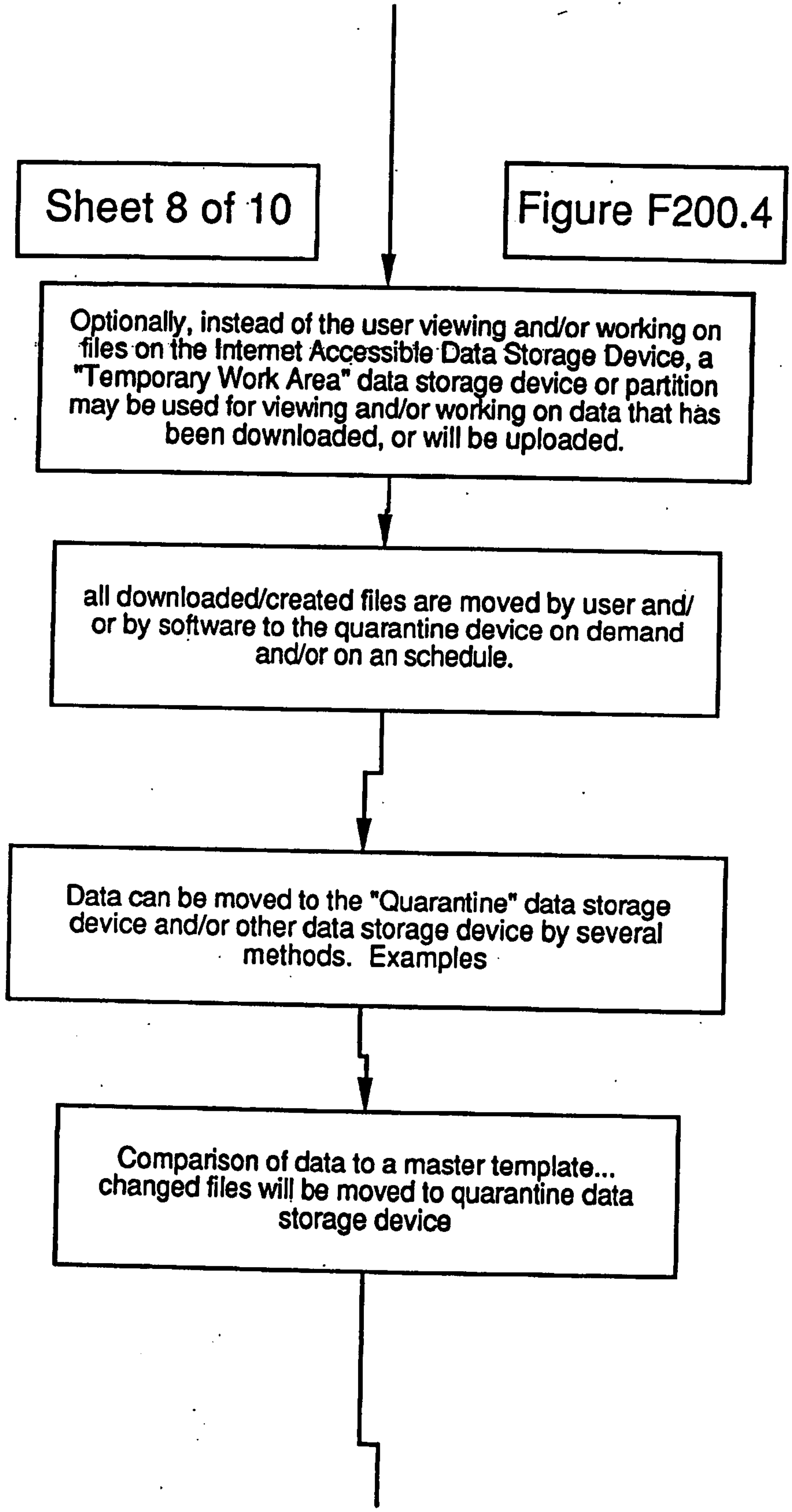

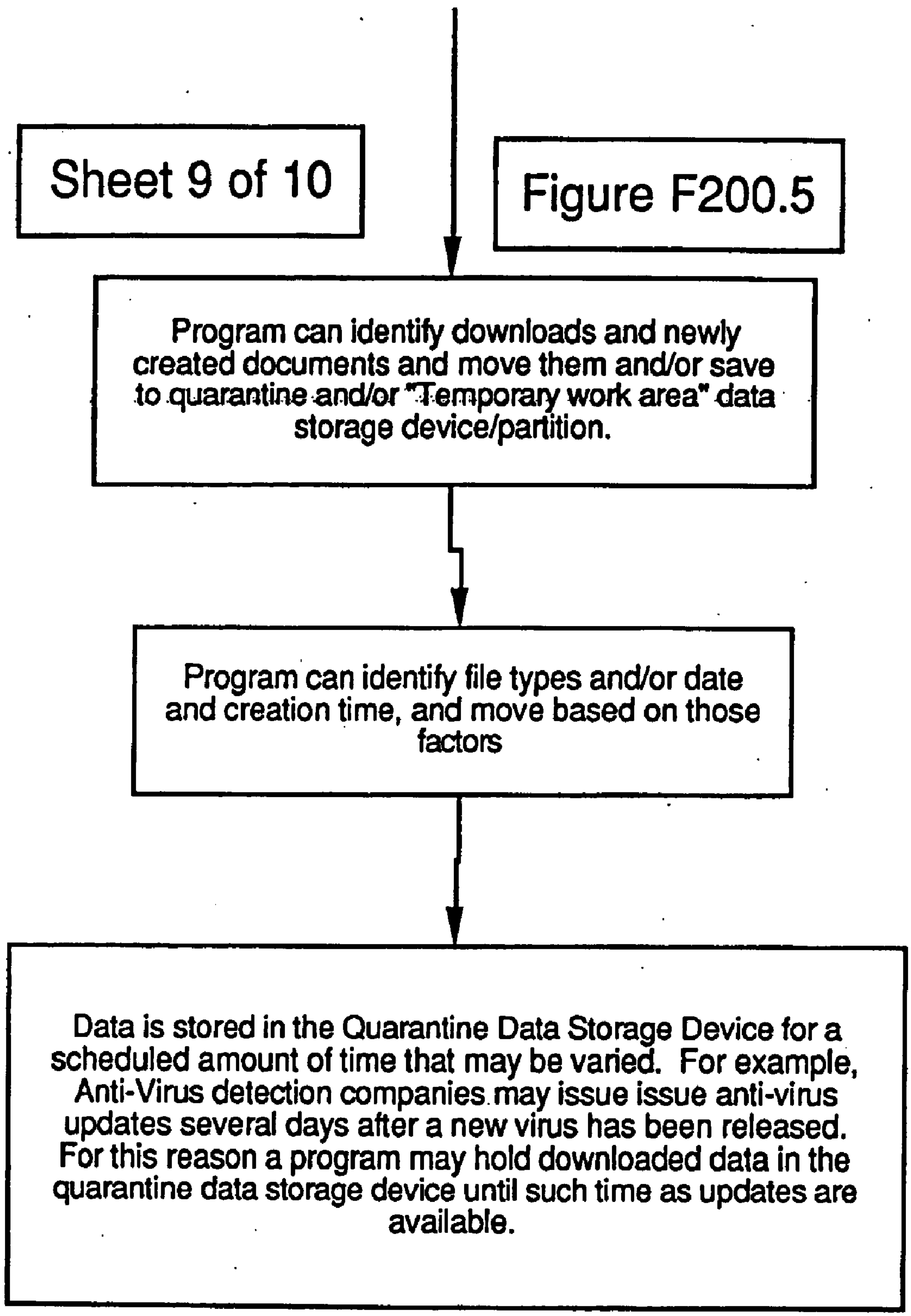
Sheet 9 of 10
Figure F200.5
Program can identify downloads and newly created documents and move them and/or save to quarantine and/or "Temporary work area" data storage device/partition.
Program can identify file types and/or date and creation time, and move based on those factors
Data is stored in the Quarantine Data Storage Device for a scheduled amount of time that may be varied. For example, Anti-Virus detection companies may issue issue anti-virus updates several days after a new virus has been released. For this reason a program may hold downloaded data in the quarantine data storage device until such time as updates are available.

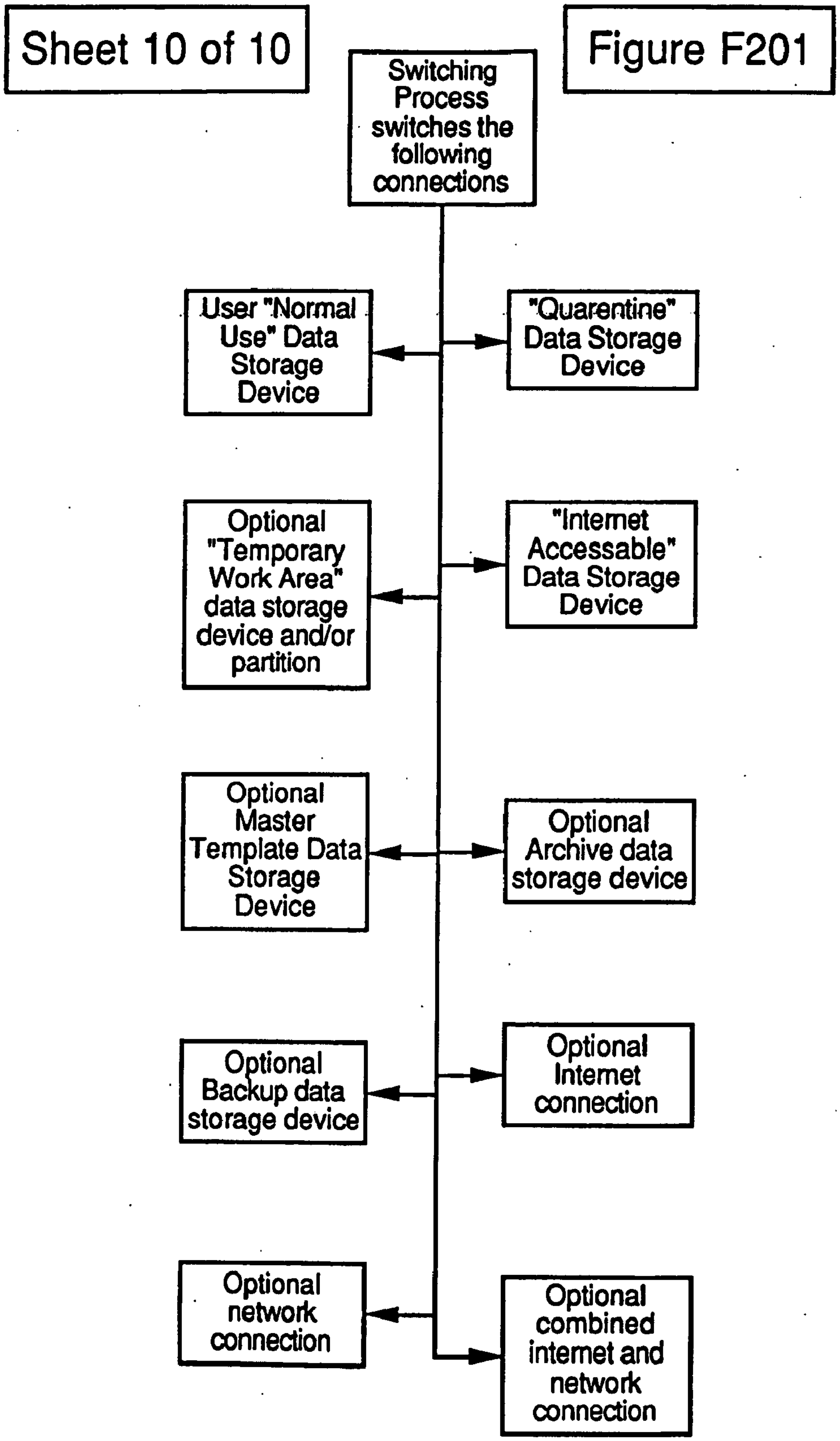
Sheet 10 of 10
Figure F201
Switching Process switches the following connections
User "Normal Use" Data Storage Device
"Quarentine" Data Storage Device
Optional "Temporary Work Area" data storage device and/or partition
"Internet Accessable" Data Storage Device
Optional Master Template Data Storage Device
Optional Archive data storage device
Optional Backup data storage device
Optional Internet connection
Optional network connection
Optional combined internet and network connection

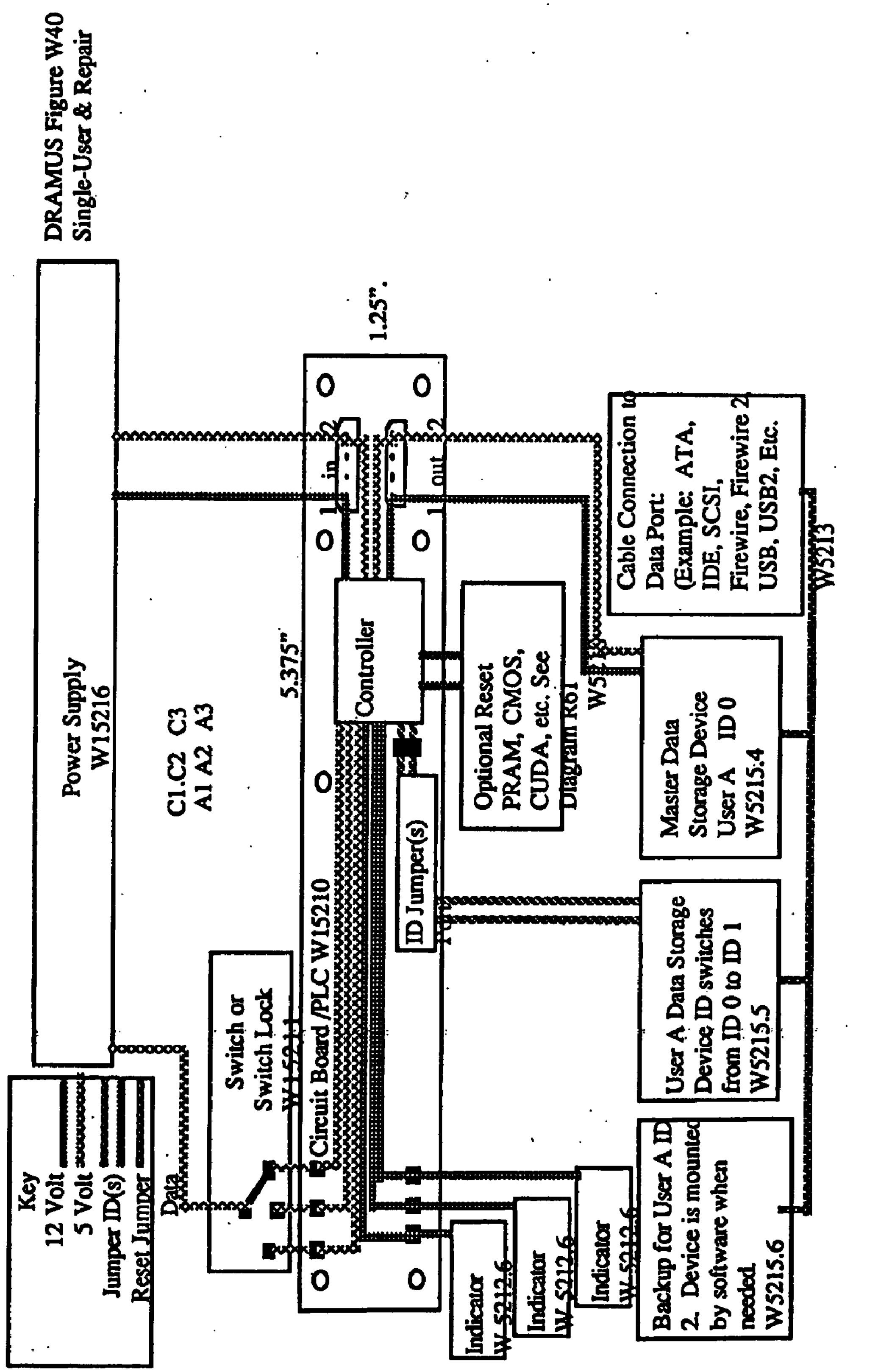
DRAMUS Figure W40
Single-User & Repair
Power Supply
W15216
C1.C2 C3
A1 A2 A3
5.375"
1.25".
Controller
Circuit Board /PLC W15210
Switch or
Switch Lock
Key
12 Volt
5 Volt
Jumper ID(s)
Reset Jumper
Data
in
out
Optional Reset
PRAM, CMOS,
CUDA, etc. See
Diagram R01
ID Jumper(s)
Cable Connection to
Data Port:
(Example: ATA,
IDE, SCSI,
Firewire, Firewire 2
USB, USB2, Etc.
Master Data
Storage Device
User A ID 0
W5215.4
User A Data Storage
Device ID switches
from ID 0 to ID 1
W5215.5
Backup for User A ID
2. Device is mounted
by software when
needed.
W5215.6
Indicator
W 5212.6
Indicator
W 5212.6
Indicator
W 5212.6
W5213

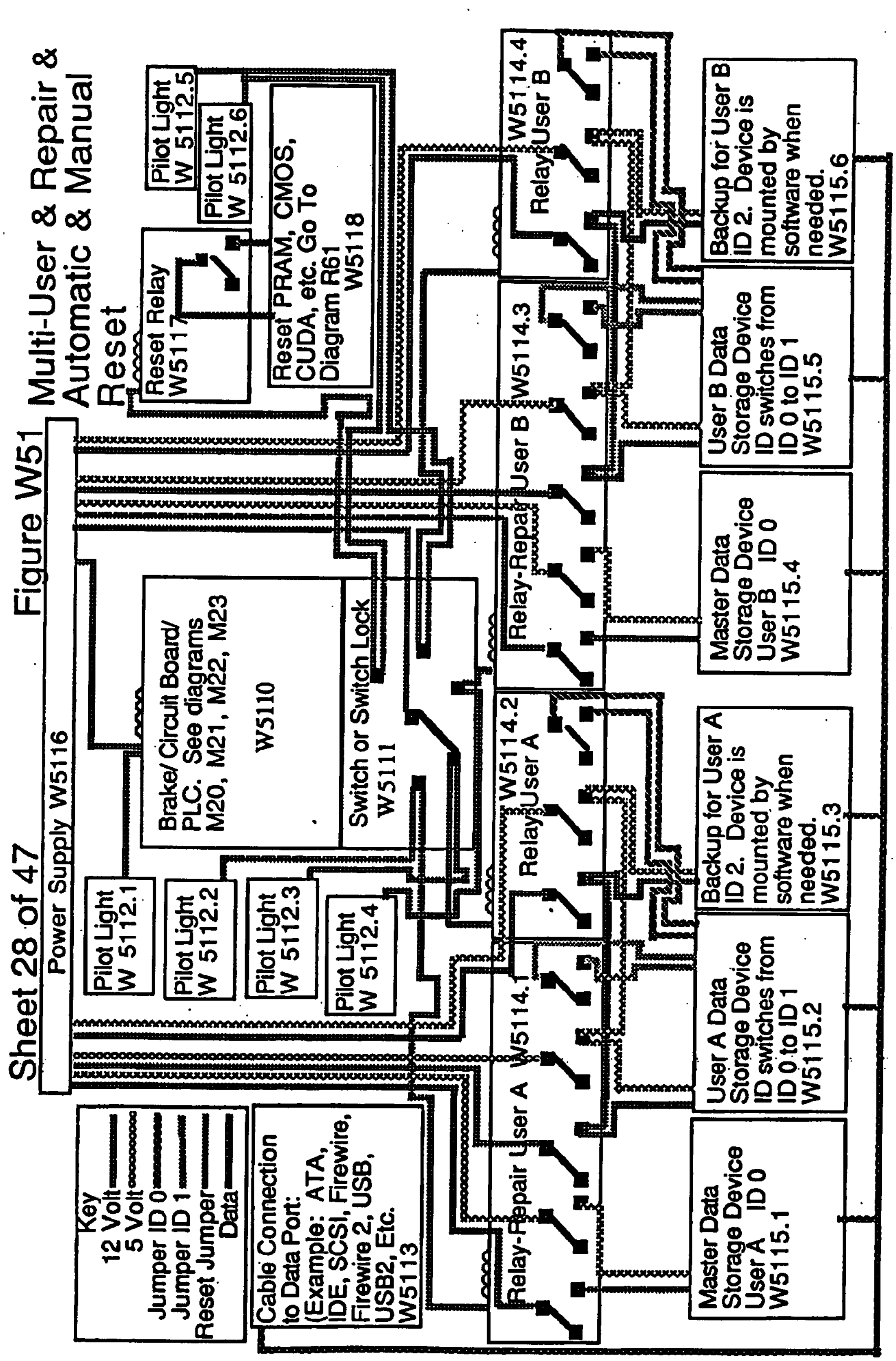
Sheet 28 of 47
Figure W51
Multi-User & Repair & Automatic & Manual Reset
Power Supply W5116
Pilot Light W 5112.1
Pilot Light W 5112.2
Pilot Light W 5112.3
Pilot Light W 5112.4
Pilot Light W 5112.5
Pilot Light W 5112.6
Brake/Circuit Board/ PLC. See diagrams M20, M21, M22, M23
W5110
Switch or Switch Lock W5111
Reset Relay W5117
Reset PRAM, CMOS, CUDA, etc. Go To Diagram R61 W5118
Key
12 Volt
5 Volt
Jumper ID 0
Jumper ID 1
Reset Jumper
Data
Cable Connection to Data Port: (Example: ATA, IDE, SCSI, Firewire, Firewire 2, USB, USB2, Etc. W5113
Relay-Repair User A W5114.1
Relay User A W5114.2
Relay-Repair User B W5114.3
Relay User B W5114.4
Master Data Storage Device User A ID 0 W5115.1
User A Data Storage Device ID switches from ID 0 to ID 1 W5115.2
Backup for User A ID 2. Device is mounted by software when needed. W5115.3
Master Data Storage Device User B ID 0 W5115.4
User B Data Storage Device ID switches from ID 0 to ID 1 W5115.5
Backup for User B ID 2. Device is mounted by software when needed. W5115.6

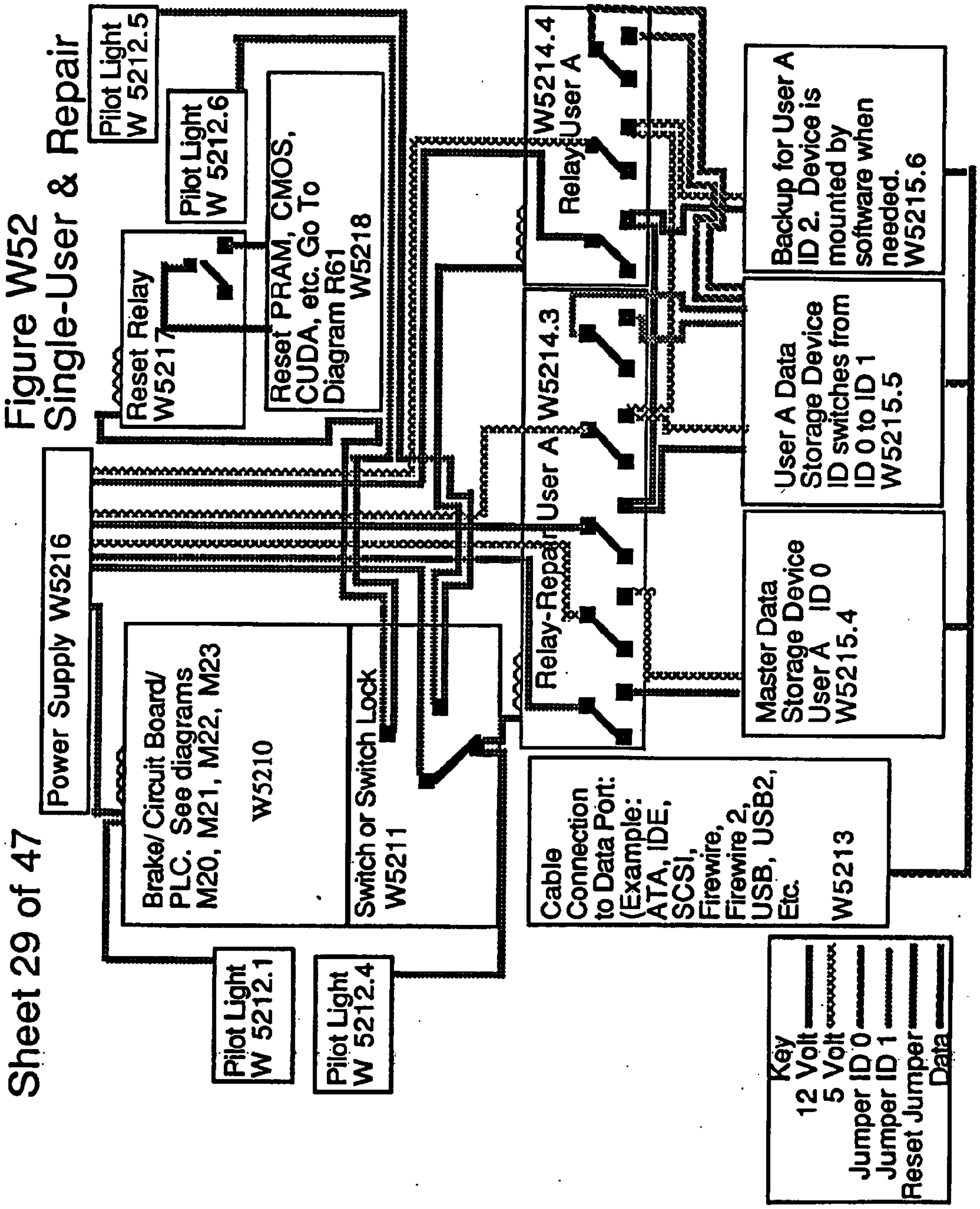
Sheet 29 of 47
Figure W52
Single-User & Repair
Pilot Light W 5212.5
Pilot Light W 5212.6
Reset PRAM, CMOS, CUDA, etc. Go To Diagram R61 W5218
Reset Relay W5217
Power Supply W5216
Brake/ Circuit Board/ PLC. See diagrams M20, M21, M22, M23
W5210
Switch or Switch Lock W5211
Pilot Light W 5212.1
Pilot Light W 5212.4
Relay User A W5214.4
User A W5214.3
Relay-Repair User A
Backup for User A ID 2. Device is mounted by software when needed. W5215.6
User A Data Storage Device ID switches from ID 0 to ID 1 W5215.5
Master Data Storage Device User A ID 0 W5215.4
Cable Connection to Data Port: (Example: ATA, IDE, SCSI, Firewire, Firewire 2, USB, USB2, Etc.
W5213
Key
12 Volt
5 Volt
Jumper ID 0
Jumper ID 1
Reset Jumper
Data

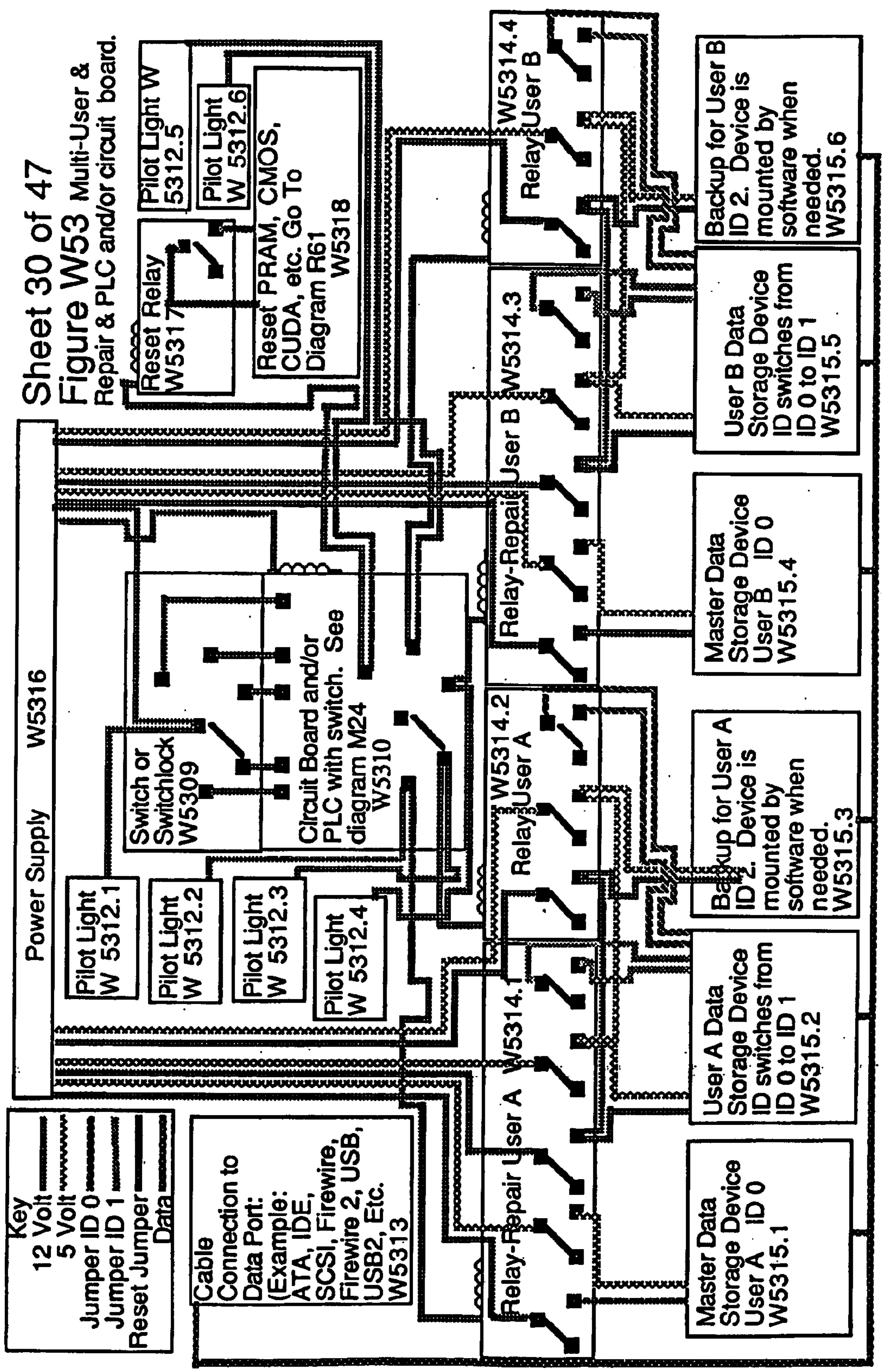
Sheet 30 of 47
Figure W53 Multi-User & Repair & PLC and/or circuit board.
Key
12 Volt
5 Volt
Jumper ID 0
Jumper ID 1
Reset Jumper
Data
Cable Connection to Data Port: (Example: ATA, IDE, SCSI, Firewire, Firewire 2, USB, USB2, Etc. W5313
Power Supply W5316
Pilot Light W 5312.1
Pilot Light W 5312.2
Pilot Light W 5312.3
Pilot Light W 5312.4
Pilot Light W 5312.5
Pilot Light W 5312.6
Switch or Switchlock W5309
Circuit Board and/or PLC with switch. See diagram M24 W5310
Reset Relay W5317
Reset PRAM, CMOS, CUDA, etc. Go To Diagram R61 W5318
Relay-Repair User A W5314.1
Relay User A W5314.2
Relay-Repair User B W5314.3
Relay User B W5314.4
Master Data Storage Device User A ID 0 W5315.1
User A Data Storage Device ID switches from ID 0 to ID 1 W5315.2
Backup for User A ID 2. Device is mounted by software when needed. W5315.3
Master Data Storage Device User B ID 0 W5315.4
User B Data Storage Device ID switches from ID 0 to ID 1 W5315.5
Backup for User B ID 2. Device is mounted by software when needed. W5315.6

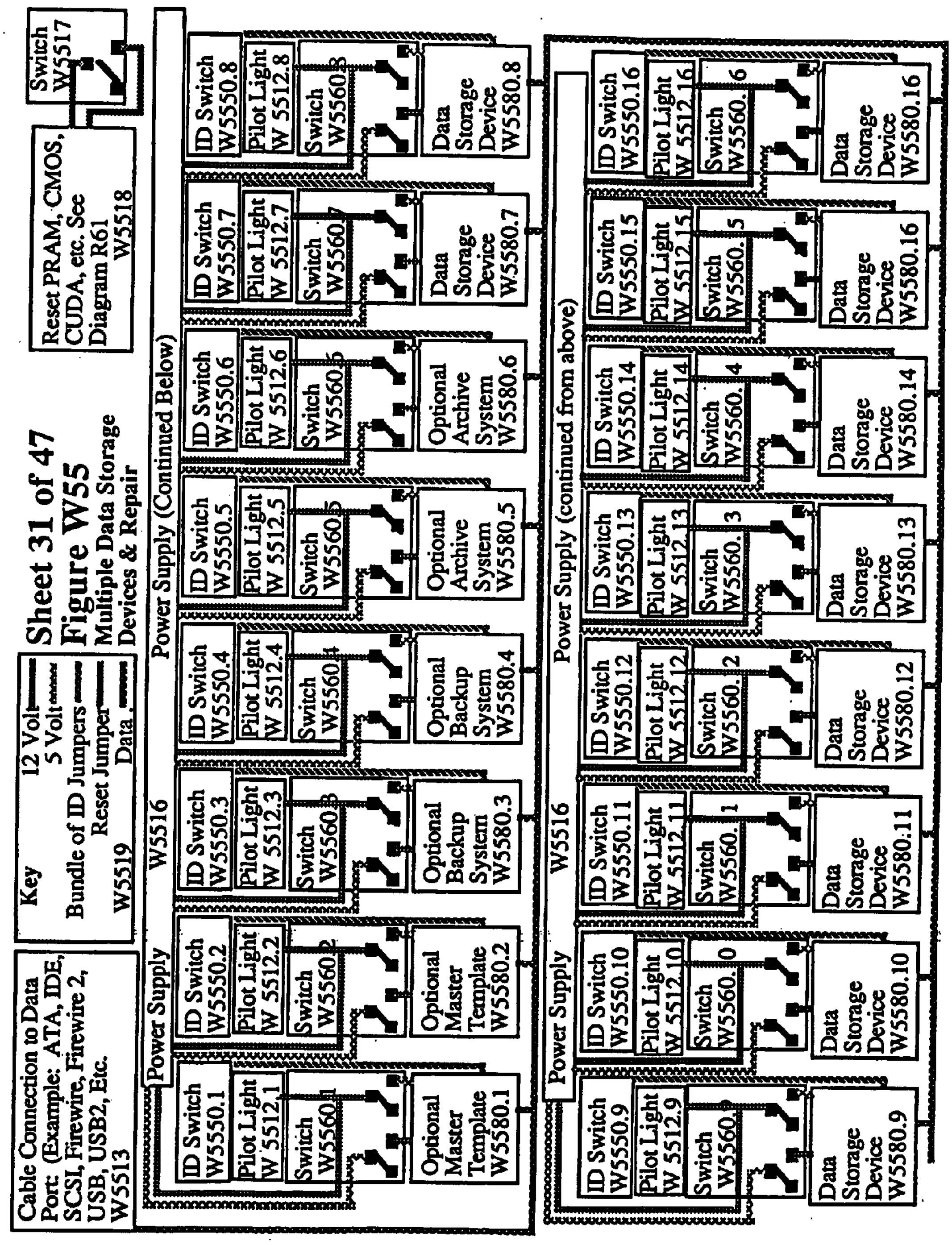
Sheet 31 of 47
Figure W55
Multiple Data Storage Devices & Repair
Key
12 Volt
5 Volt
Bundle of ID Jumpers
Reset Jumper
Data
W5519
Cable Connection to Data Port: (Example: ATA, IDE, SCSI, Firewire, Firewire 2, USB, USB2, Etc. W5513
Reset PRAM, CMOS, CUDA, etc. See Diagram R61 W5518
Switch W5517
Power Supply
W5516
Power Supply (Continued Below)
Power Supply (continued from above)
ID Switch W5550.1
Pilot Light W 5512.1
Switch W5560.1
Optional Master Template W5580.1
ID Switch W5550.2
Pilot Light W 5512.2
Switch W5560.2
Optional Master Template W5580.2
ID Switch W5550.3
Pilot Light W 5512.3
Switch W5560.3
Optional Backup System W5580.3
ID Switch W5550.4
Pilot Light W 5512.4
Switch W5560.4
Optional Backup System W5580.4
ID Switch W5550.5
Pilot Light W 5512.5
Switch W5560.5
Optional Archive System W5580.5
ID Switch W5550.6
Pilot Light W 5512.6
Switch W5560.6
Optional Archive System W5580.6
ID Switch W5550.7
Pilot Light W 5512.7
Switch W5560.7
Data Storage Device W5580.7
ID Switch W5550.8
Pilot Light W 5512.8
Switch W5560.8
Data Storage Device W5580.8
ID Switch W5550.9
Pilot Light W 5512.9
Switch W5560.9
Data Storage Device W5580.9
ID Switch W5550.10
Pilot Light W 5512.10
Switch W5560.10
Data Storage Device W5580.10
ID Switch W5550.11
Pilot Light W 5512.11
Switch W5560.11
Data Storage Device W5580.11
ID Switch W5550.12
Pilot Light W 5512.12
Switch W5560.12
Data Storage Device W5580.12
ID Switch W5550.13
Pilot Light W 5512.13
Switch W5560.13
Data Storage Device W5580.13
ID Switch W5550.14
Pilot Light W 5512.14
Switch W5560.14
Data Storage Device W5580.14
ID Switch W5550.15
Pilot Light W 5512.15
Switch W5560.15
Data Storage Device W5580.16
ID Switch W5550.16
Pilot Light W 5512.16
Switch W5560.16
Data Storage Device W5580.16

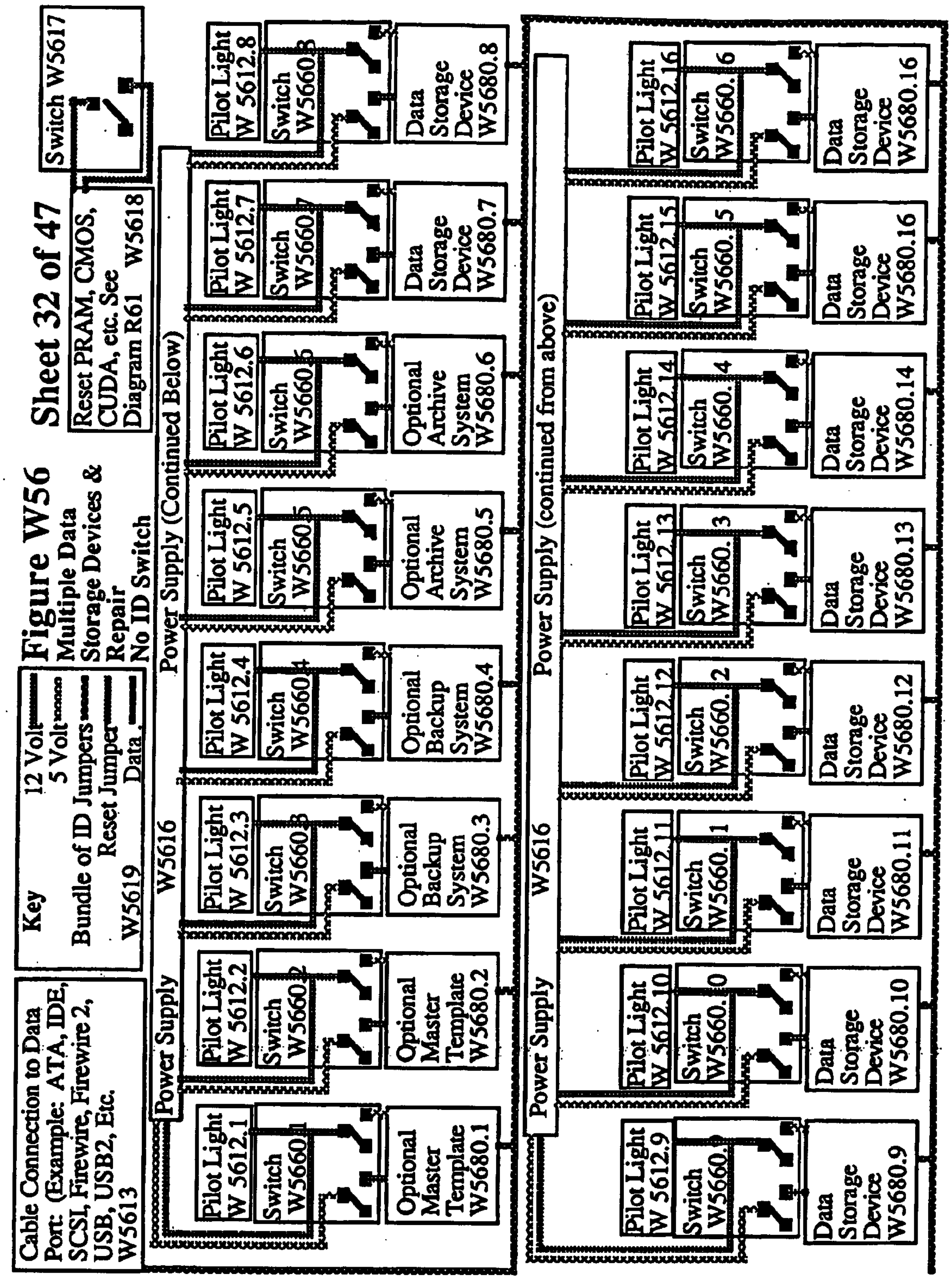
Sheet 32 of 47
Figure W56
Multiple Data Storage Devices & Repair
No ID Switch
Key
12 Volt
5 Volt
Bundle of ID Jumpers
Reset Jumper
Data
W5619
Cable Connection to Data Port: (Example: ATA, IDE, SCSI, Firewire, Firewire 2, USB, USB2, Etc.
W5613
Reset PRAM, CMOS, CUDA, etc. See Diagram R61 W5618
Switch W5617
Power Supply
W5616
Power Supply (Continued Below)
Power Supply (continued from above)
Pilot Light W 5612.1
Switch W5660.1
Optional Master Template W5680.1
Pilot Light W 5612.2
Switch W5660.2
Optional Master Template W5680.2
Pilot Light W 5612.3
Switch W5660.3
Optional Backup System W5680.3
Pilot Light W 5612.4
Switch W5660.4
Optional Backup System W5680.4
Pilot Light W 5612.5
Switch W5660.5
Optional Archive System W5680.5
Pilot Light W 5612.6
Switch W5660.6
Optional Archive System W5680.6
Pilot Light W 5612.7
Switch W5660.7
Data Storage Device W5680.7
Pilot Light W 5612.8
Switch W5660.8
Data Storage Device W5680.8
Pilot Light W 5612.9
Switch W5660.9
Data Storage Device W5680.9
Pilot Light W 5612.10
Switch W5660.10
Data Storage Device W5680.10
Pilot Light W 5612.11
Switch W5660.11
Data Storage Device W5680.11
Pilot Light W 5612.12
Switch W5660.12
Data Storage Device W5680.12
Pilot Light W 5612.13
Switch W5660.13
Data Storage Device W5680.13
Pilot Light W 5612.14
Switch W5660.14
Data Storage Device W5680.14
Pilot Light W 5612.15
Switch W5660.15
Data Storage Device W5680.16
Pilot Light W 5612.16
Switch W5660.16
Data Storage Device W5680.16

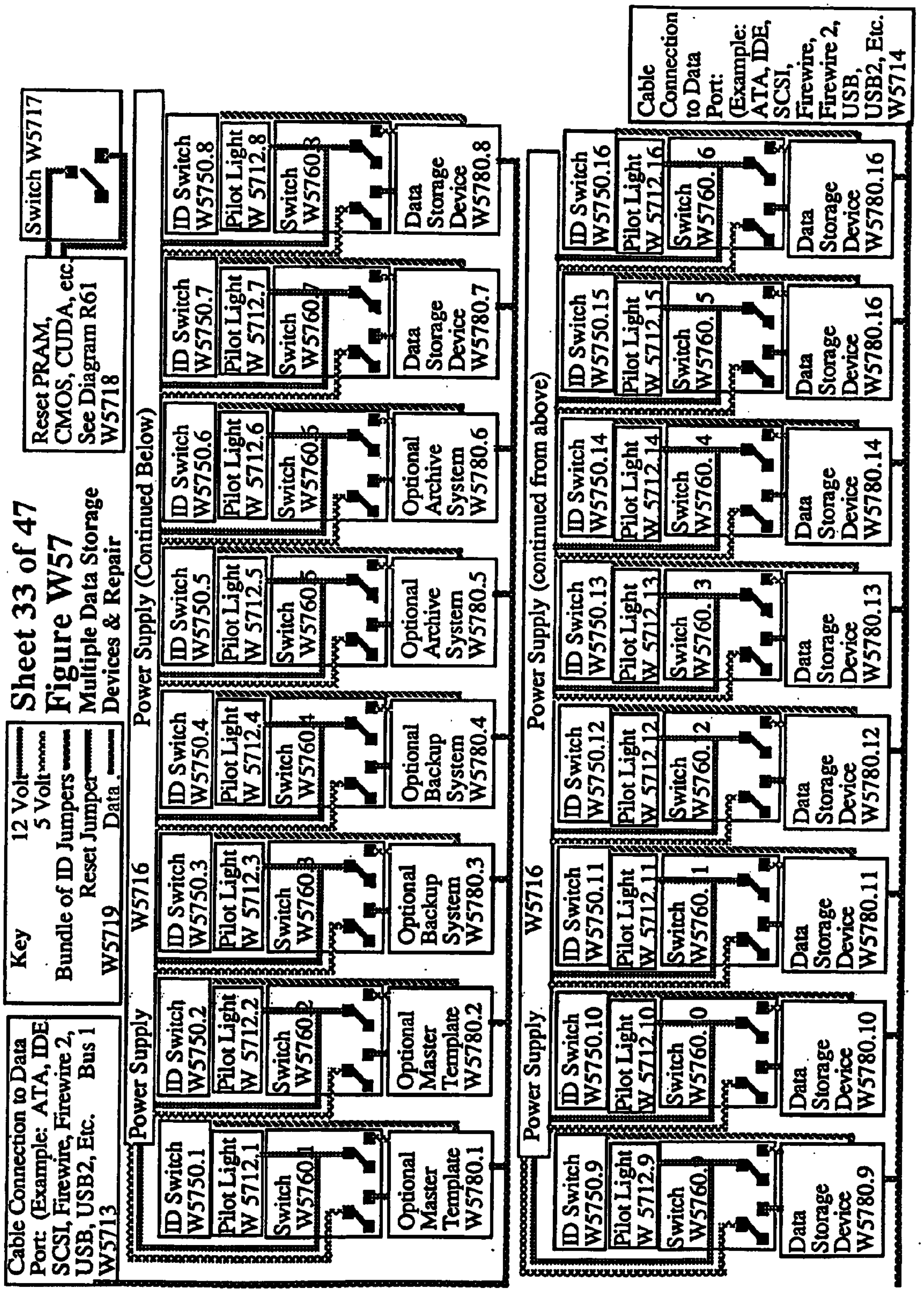
Sheet 33 of 47
Figure W57
Multiple Data Storage Devices & Repair
Key
12 Volt
5 Volt
Bundle of ID Jumpers
Reset Jumper
Data
W5719
Cable Connection to Data Port: (Example: ATA, IDE SCSI, Firewire, Firewire 2, USB, USB2, Etc. Bus 1 W5713
Reset PRAM, CMOS, CUDA, etc. See Diagram R61 W5718
Switch W5717
Power Supply
W5716
Power Supply (Continued Below)
ID Switch W5750.1
Pilot Light W 5712.1
Switch W5760.1
Optional Master Template W5780.1
ID Switch W5750.2
Pilot Light W 5712.2
Switch W5760.2
Optional Master Template W5780.2
ID Switch W5750.3
Pilot Light W 5712.3
Switch W5760.3
Optional Backup System W5780.3
ID Switch W5750.4
Pilot Light W 5712.4
Switch W5760.4
Optional Backup System W5780.4
ID Switch W5750.5
Pilot Light W 5712.5
Switch W5760.5
Optional Archive System W5780.5
ID Switch W5750.6
Pilot Light W 5712.6
Switch W5760.6
Optional Archive System W5780.6
ID Switch W5750.7
Pilot Light W 5712.7
Switch W5760.7
Data Storage Device W5780.7
ID Switch W5750.8
Pilot Light W 5712.8
Switch W5760.8
Data Storage Device W5780.8
Power Supply
W5716
Power Supply (continued from above)
ID Switch W5750.9
Pilot Light W 5712.9
Switch W5760.9
Data Storage Device W5780.9
ID Switch W5750.10
Pilot Light W 5712.10
Switch W5760.10
Data Storage Device W5780.10
ID Switch W5750.11
Pilot Light W 5712.11
Switch W5760.11
Data Storage Device W5780.11
ID Switch W5750.12
Pilot Light W 5712.12
Switch W5760.12
Data Storage Device W5780.12
ID Switch W5750.13
Pilot Light W 5712.13
Switch W5760.13
Data Storage Device W5780.13
ID Switch W5750.14
Pilot Light W 5712.14
Switch W5760.14
Data Storage Device W5780.14
ID Switch W5750.15
Pilot Light W 5712.15
Switch W5760.15
Data Storage Device W5780.16
ID Switch W5750.16
Pilot Light W 5712.16
Switch W5760.16
Data Storage Device W5780.16
Cable Connection to Data Port: (Example: ATA, IDE, SCSI, Firewire, Firewire 2, USB, USB2, Etc. W5714

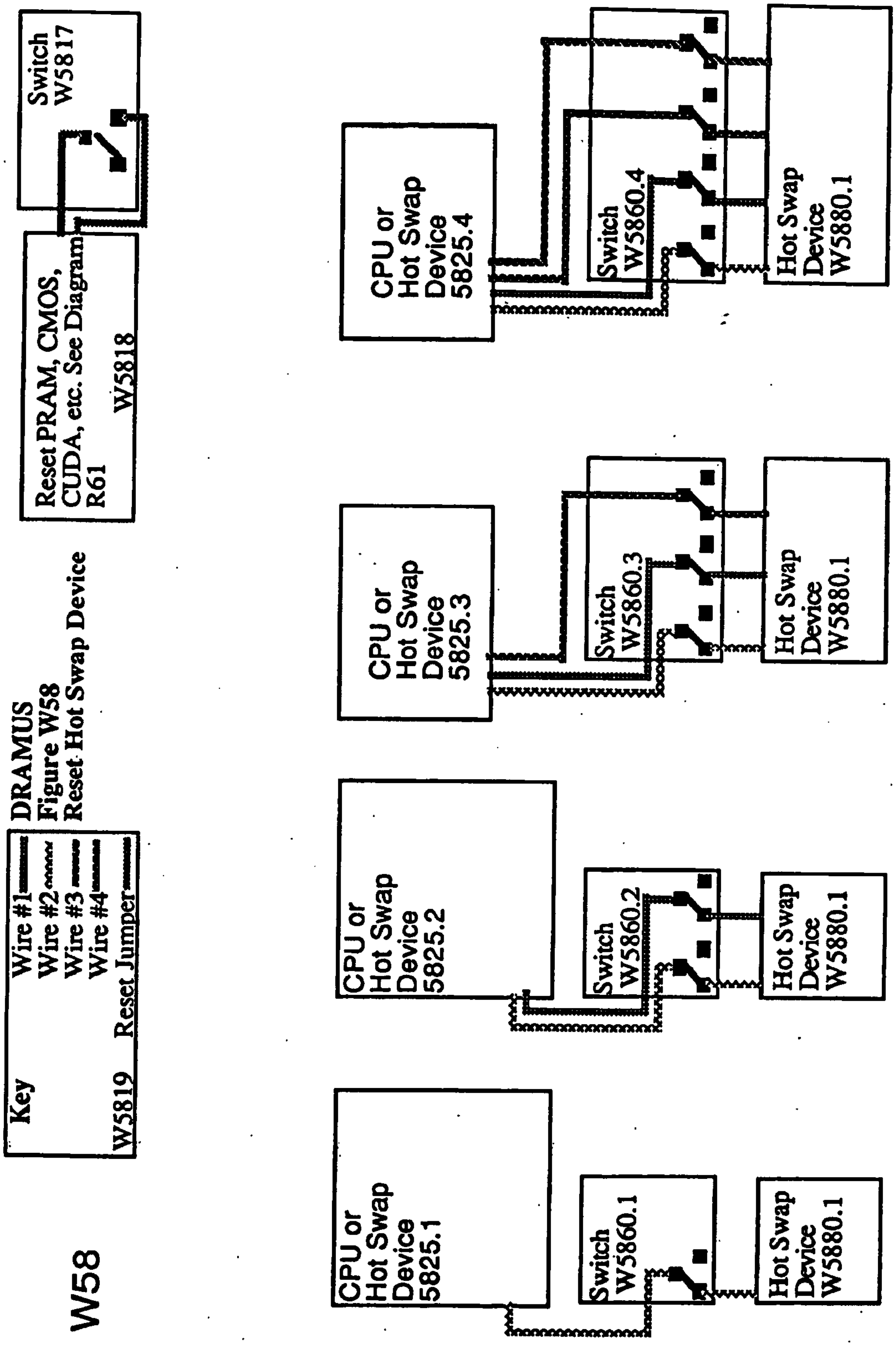
Figure W58

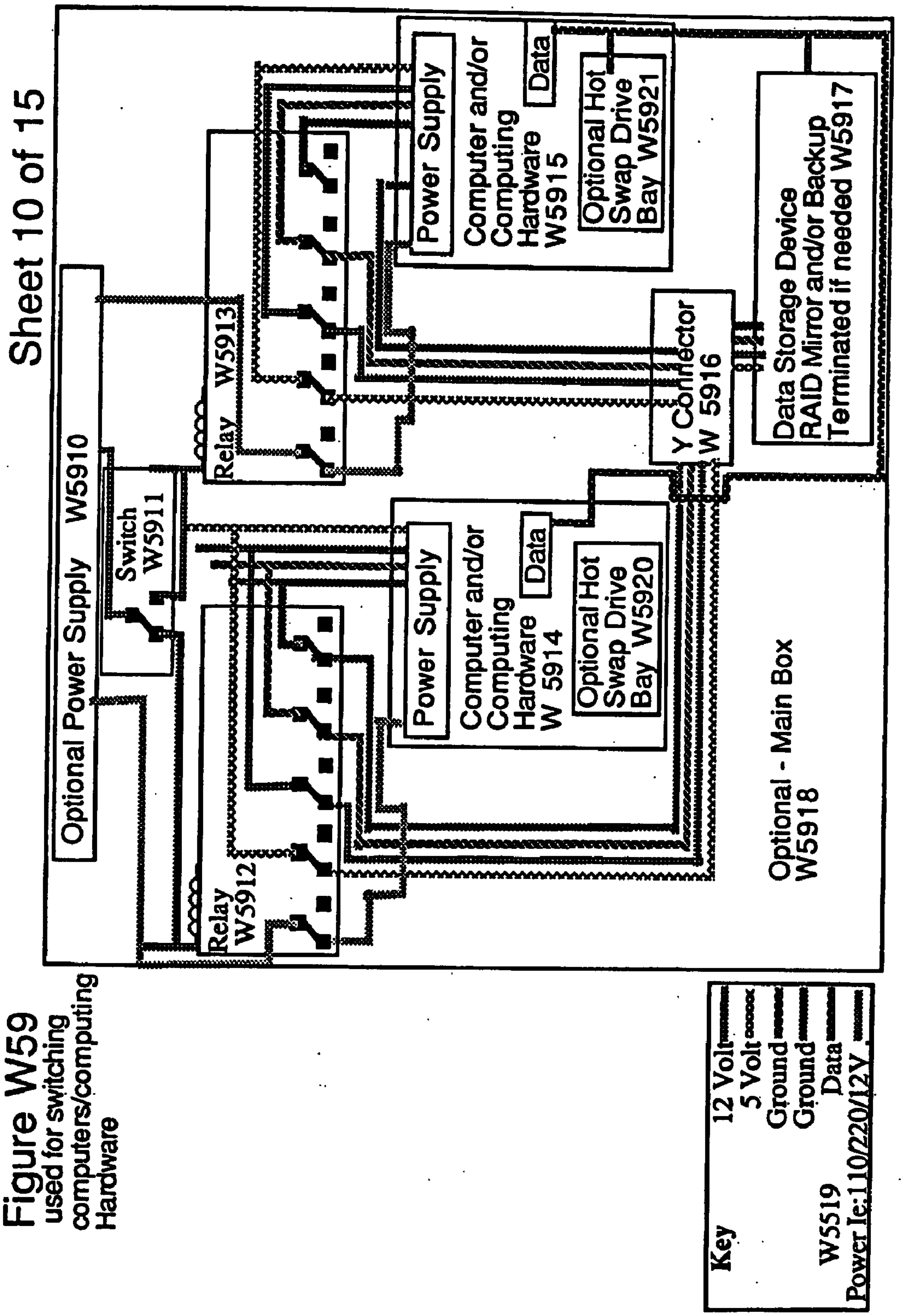
Figure W59
used for switching computers/computing Hardware

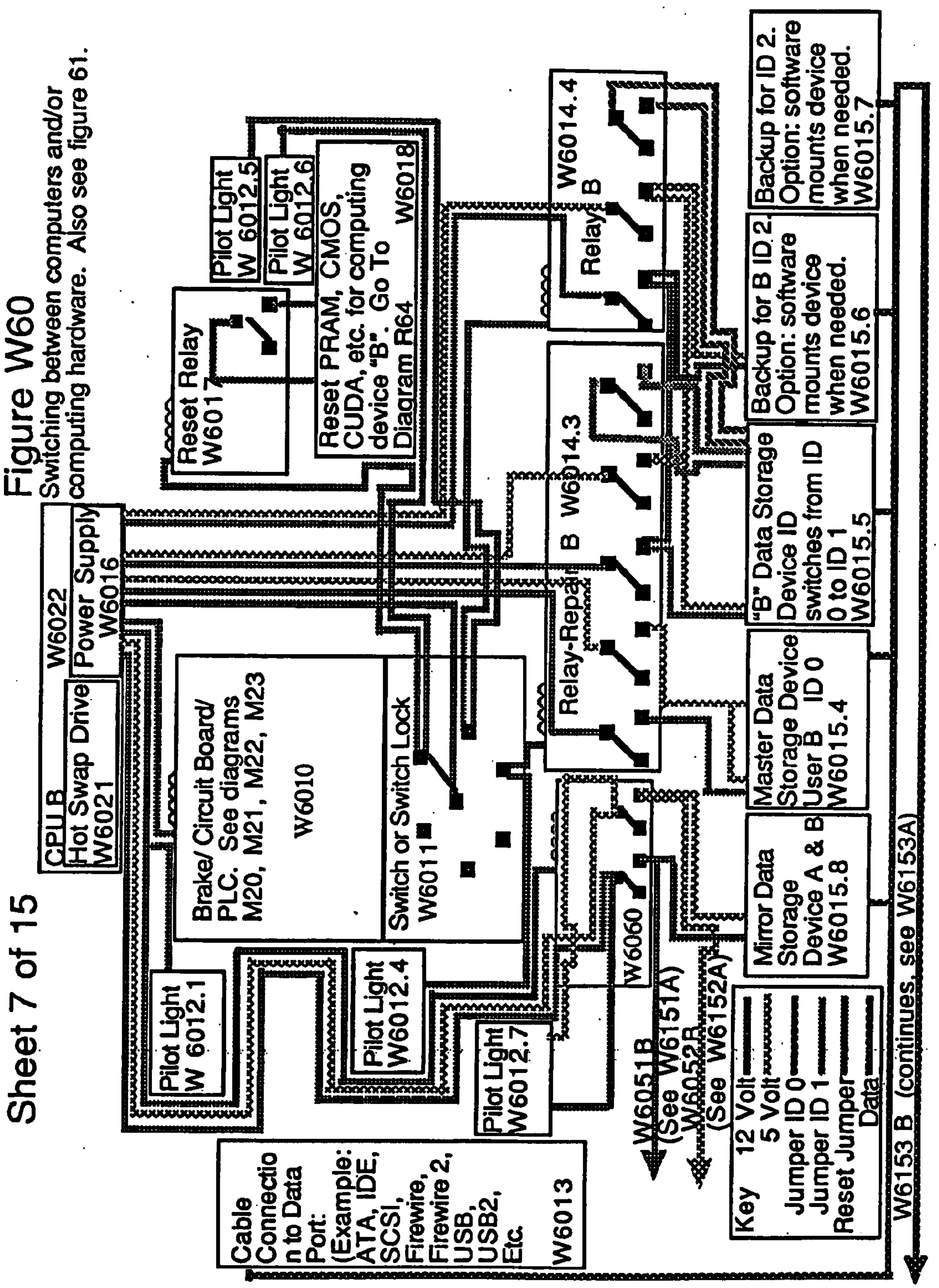
Sheet 7 of 15
Figure W60
Switching between computers and/or computing hardware. Also see figure 61.

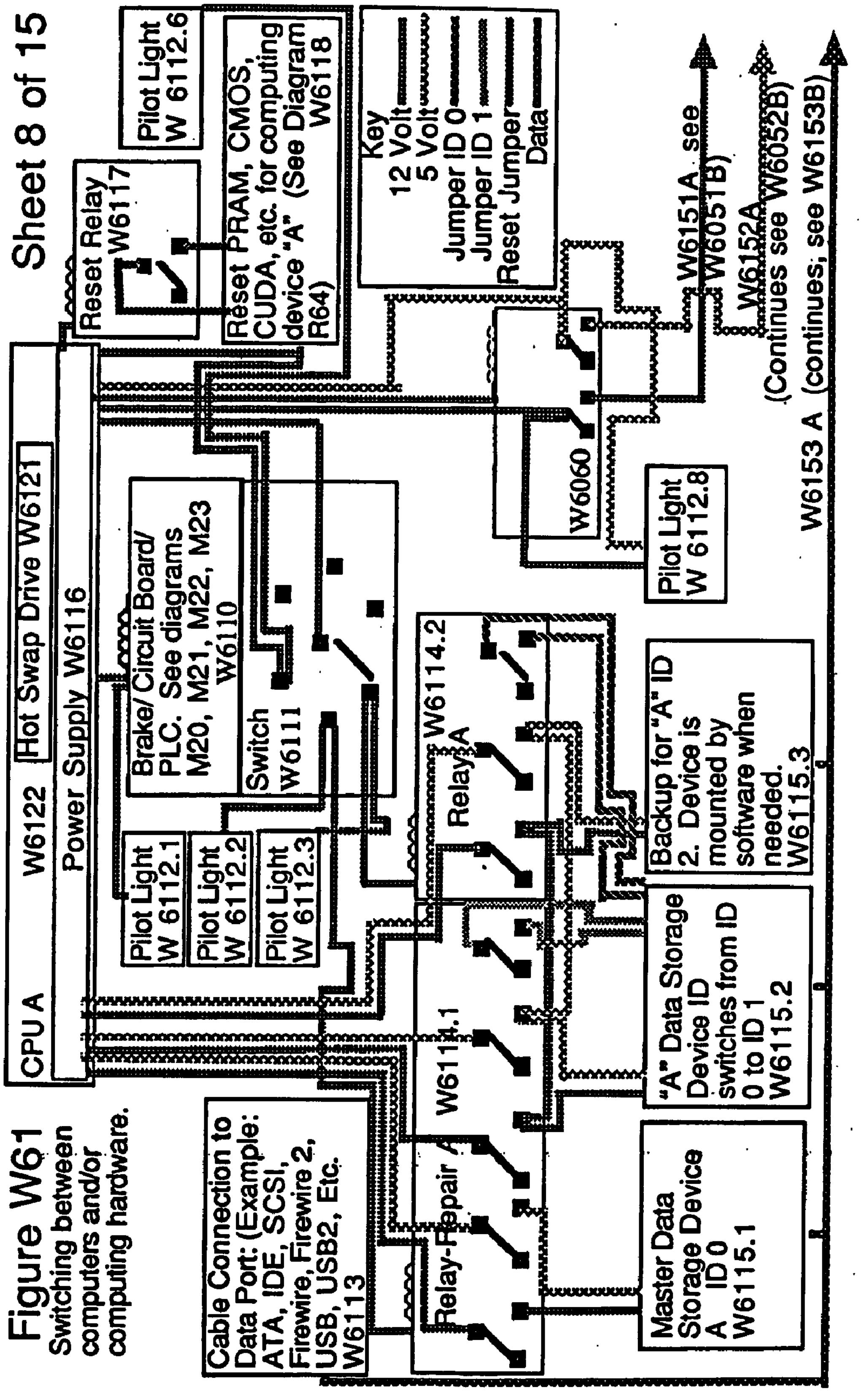
Figure W61
Switching between computers and/or computing hardware.

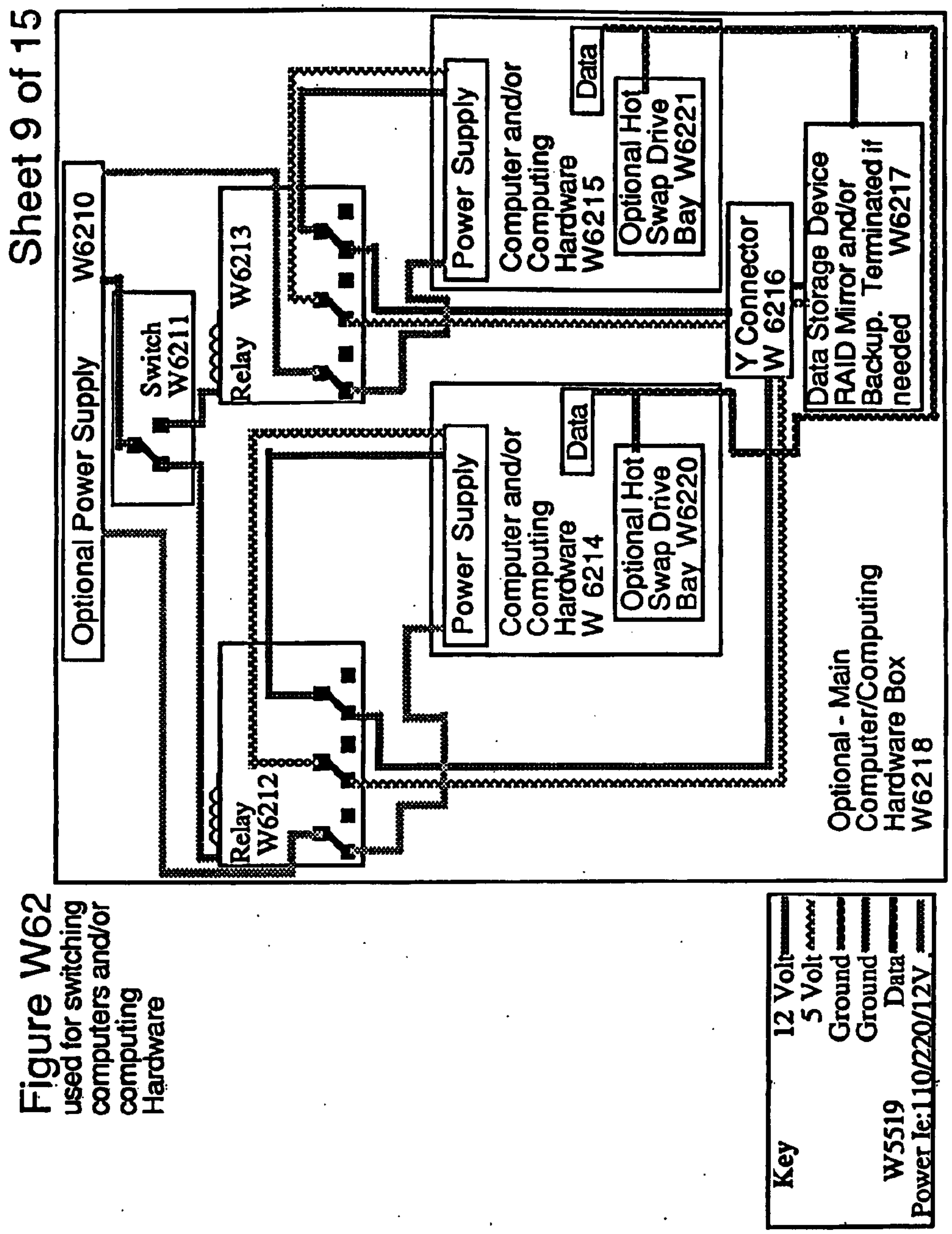
Sheet 9 of 15
Optional Power Supply W6210
Switch W6211
Relay W6213
Relay W6212
Power Supply
Computer and/or Computing Hardware W6215
Data
Optional Hot Swap Drive Bay W6221
Computer and/or Computing Hardware W 6214
Optional Hot Swap Drive Bay W6220
Y Connector W 6216
Data Storage Device RAID Mirror and/or Backup. Terminated if needed W6217
Optional - Main Computer/Computing Hardware Box W6218
Figure W62
used for switching computers and/or computing Hardware
Key
W5519
12 Volt
5 Volt
Ground
Ground
Data
Power Ie:110/220/12V

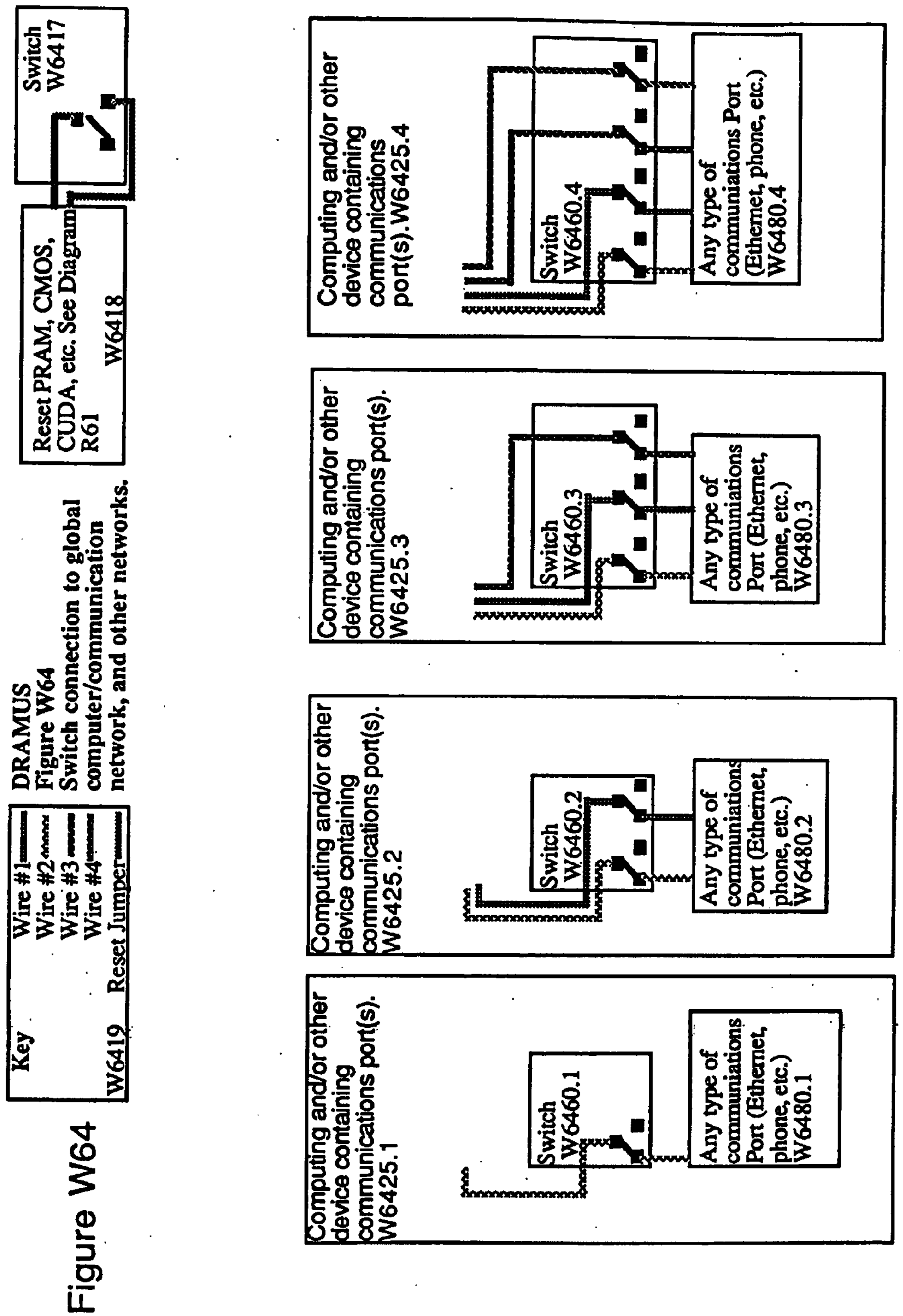
Figure W64

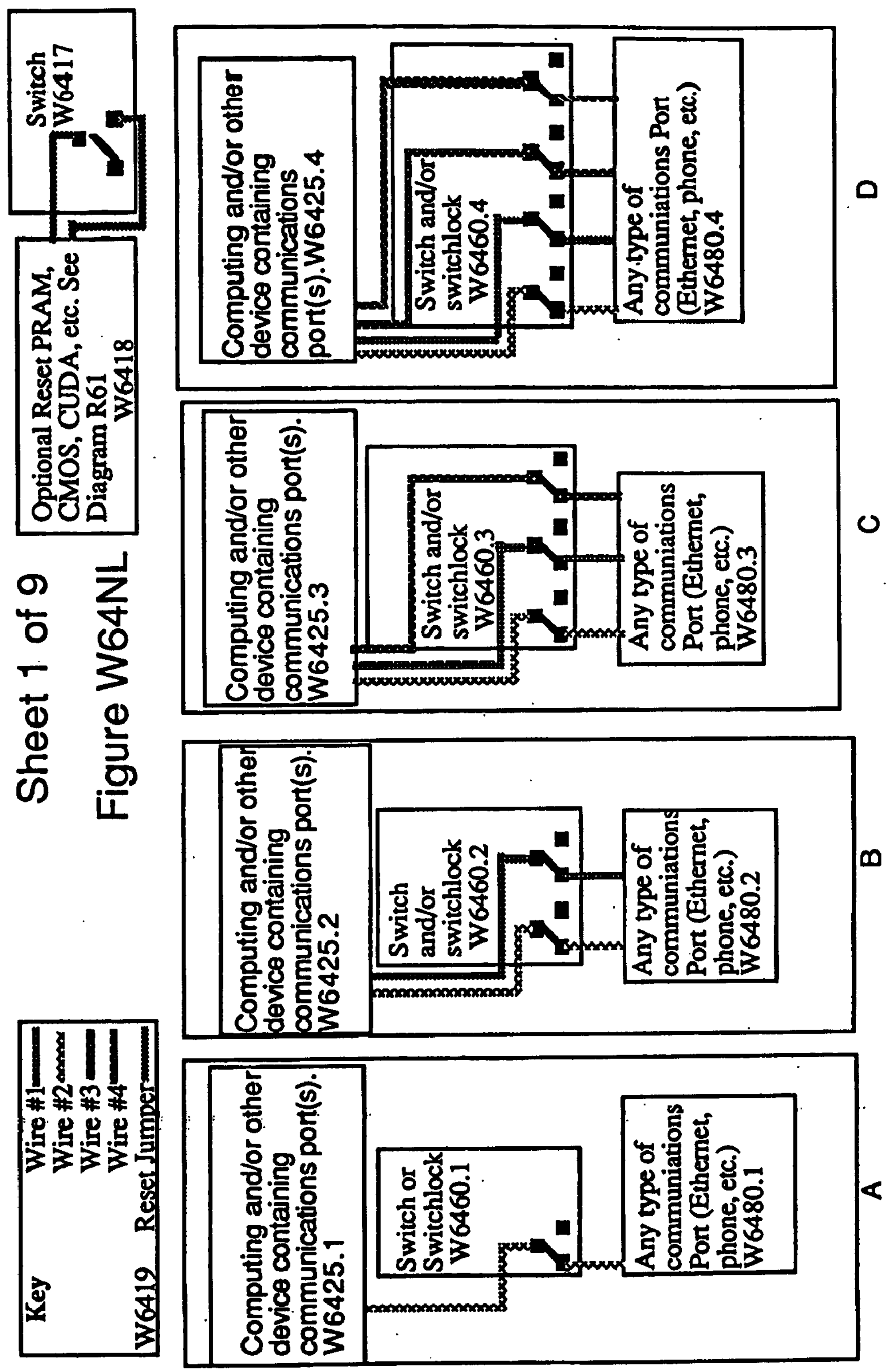
Sheet 1 of 9
Figure W64NL

Figure W 64.6 Sheet 10 of 10
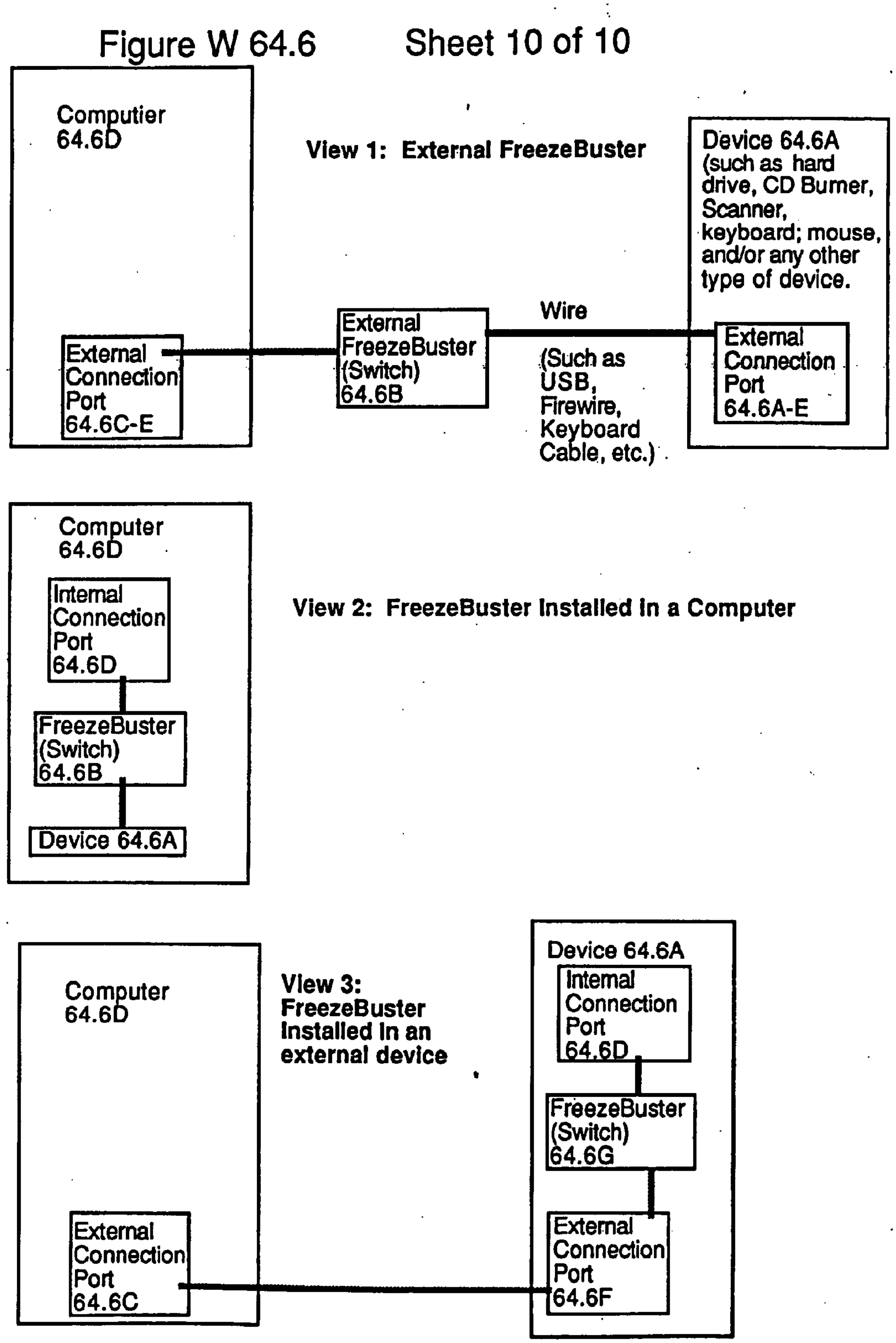

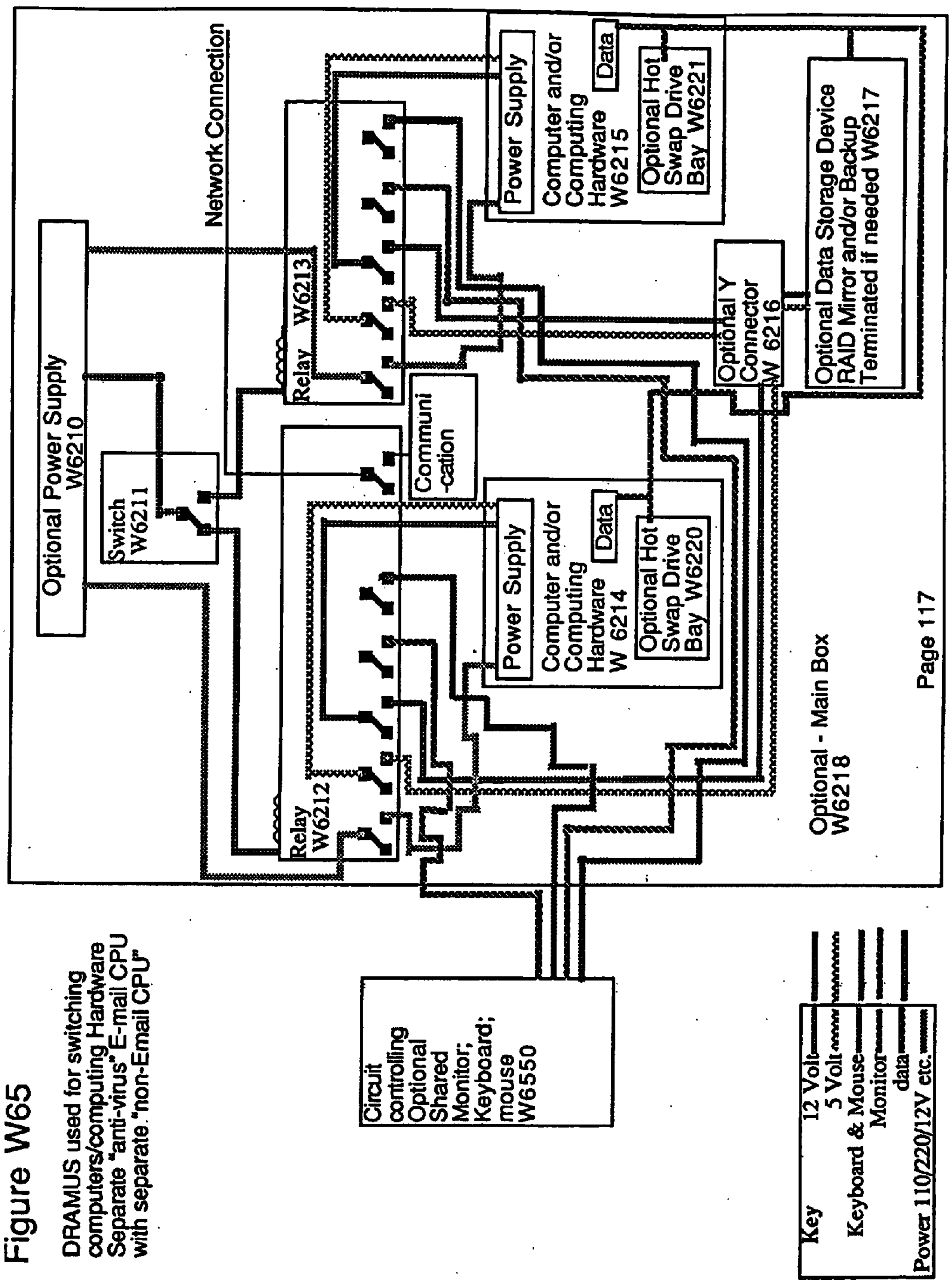
Figure W65
DRAMUS used for switching computers/computing Hardware Separate "anti-virus" E-mail CPU with separate "non-Email CPU"

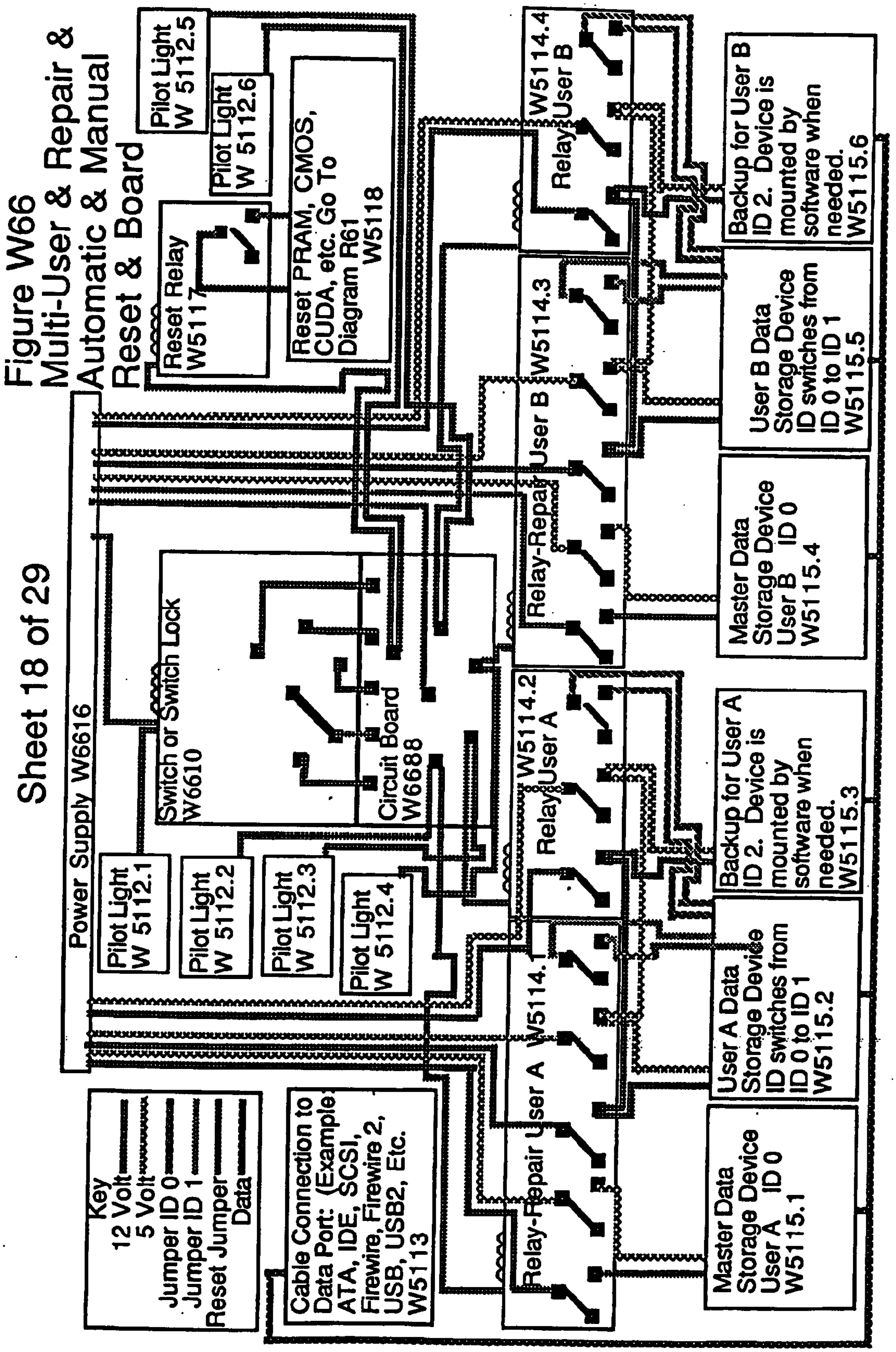
Sheet 18 of 29
Figure W66
Multi-User & Repair &
Automatic & Manual
Reset & Board
Power Supply W6616
Pilot Light W 5112.1
Pilot Light W 5112.2
Pilot Light W 5112.3
Pilot Light W 5112.4
Pilot Light W 5112.5
Pilot Light W 5112.6
Reset Relay W5117
Reset PRAM, CMOS, CUDA, etc. Go To Diagram R61 W5118
Switch or Switch Lock W6610
Circuit Board W6688
Relay-Repair User A W5114.1
Relay User A W5114.2
Relay-Repair User B W5114.3
Relay User B W5114.4
Master Data Storage Device User A ID 0 W5115.1
User A Data Storage Device ID switches from ID 0 to ID 1 W5115.2
Backup for User A ID 2. Device is mounted by software when needed. W5115.3
Master Data Storage Device User B ID 0 W5115.4
User B Data Storage Device ID switches from ID 0 to ID 1 W5115.5
Backup for User B ID 2. Device is mounted by software when needed. W5115.6
Key
12 Volt
5 Volt
Jumper ID 0
Jumper ID 1
Reset Jumper
Data
Cable Connection to Data Port: (Example: ATA, IDE, SCSI, Firewire, Firewire 2, USB, USB2, Etc. W5113

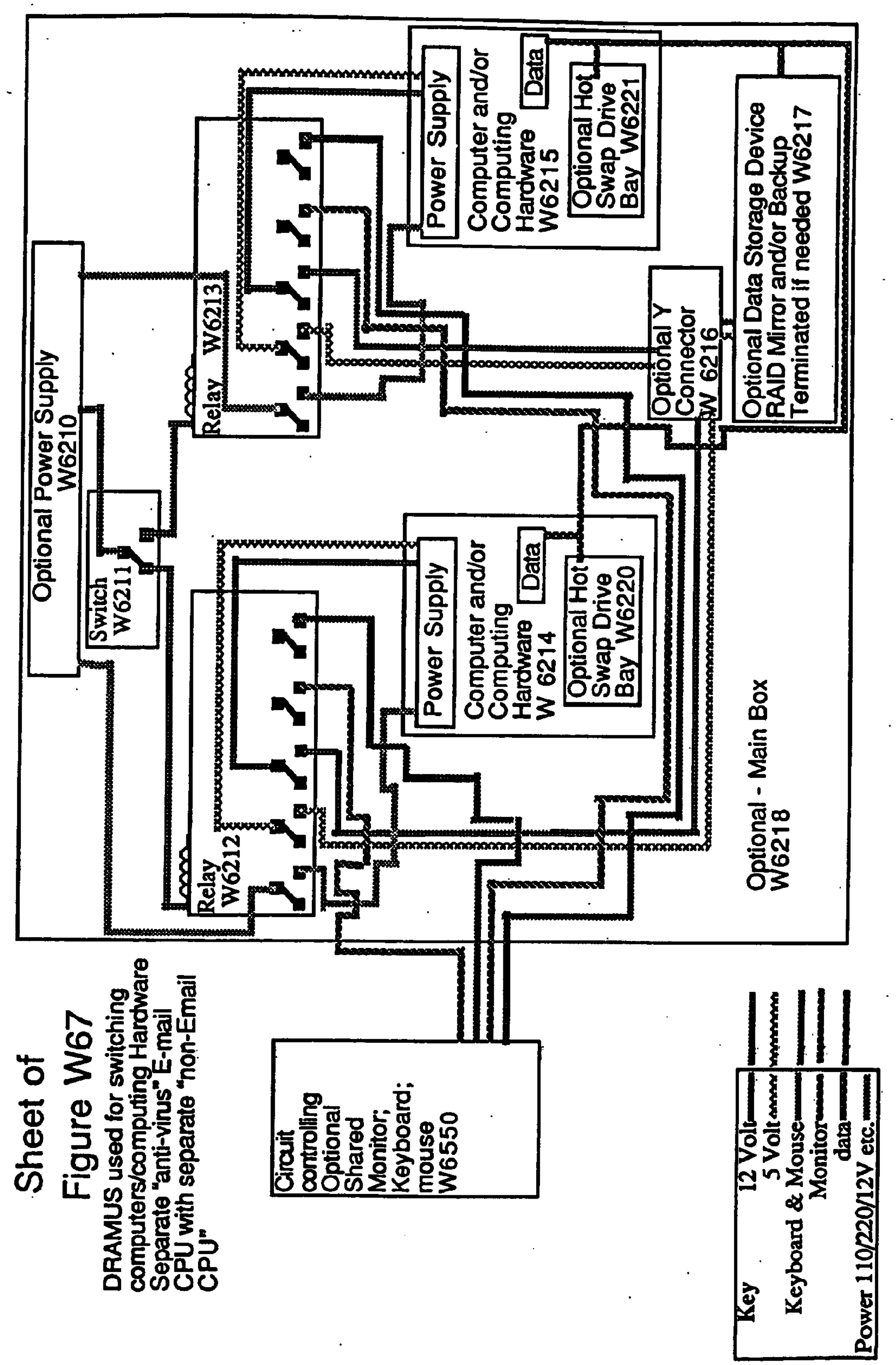
Sheet of Figure W67
DRAMUS used for switching computers/computing Hardware Separate "anti-virus" E-mail CPU with separate "non-Email CPU"

Figure W68

Sheet 19 of 29

Optional Circuit Board and Socket Assembly

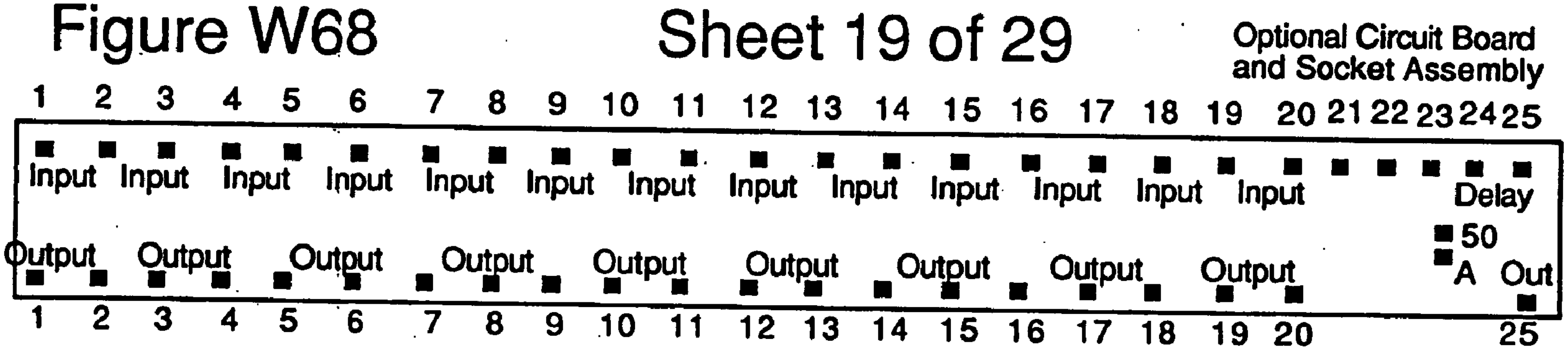

1) circuit 1
2) circuit 2
3) circuit 3
4) circuit 4
5) circuit 5
6) circuit 6

7) circuit 7
8) circuit 8
9) circuit 9
10) circuit 10

11) circuit 11
12) circuit 12
13) circuit 13
14) circuit 14
15) circuit 15
16) circuit 16

17) circuit 17
18) circuit 18
19) circuit 19
20) circuit 20

21) Power Control Indicator #21
22) Power Control Indicator #22
23) Power Control Indicator #23
24) Power Control Indicator #24
25) Power Control Indicator #25
26) time delay circuit
27) Data and power to LCD screen and/or data for computer monitor and/or to computer.
28) Power to board
40) delay start time for delay circuit
41) stop time for delay circuit
50) jumper "A"

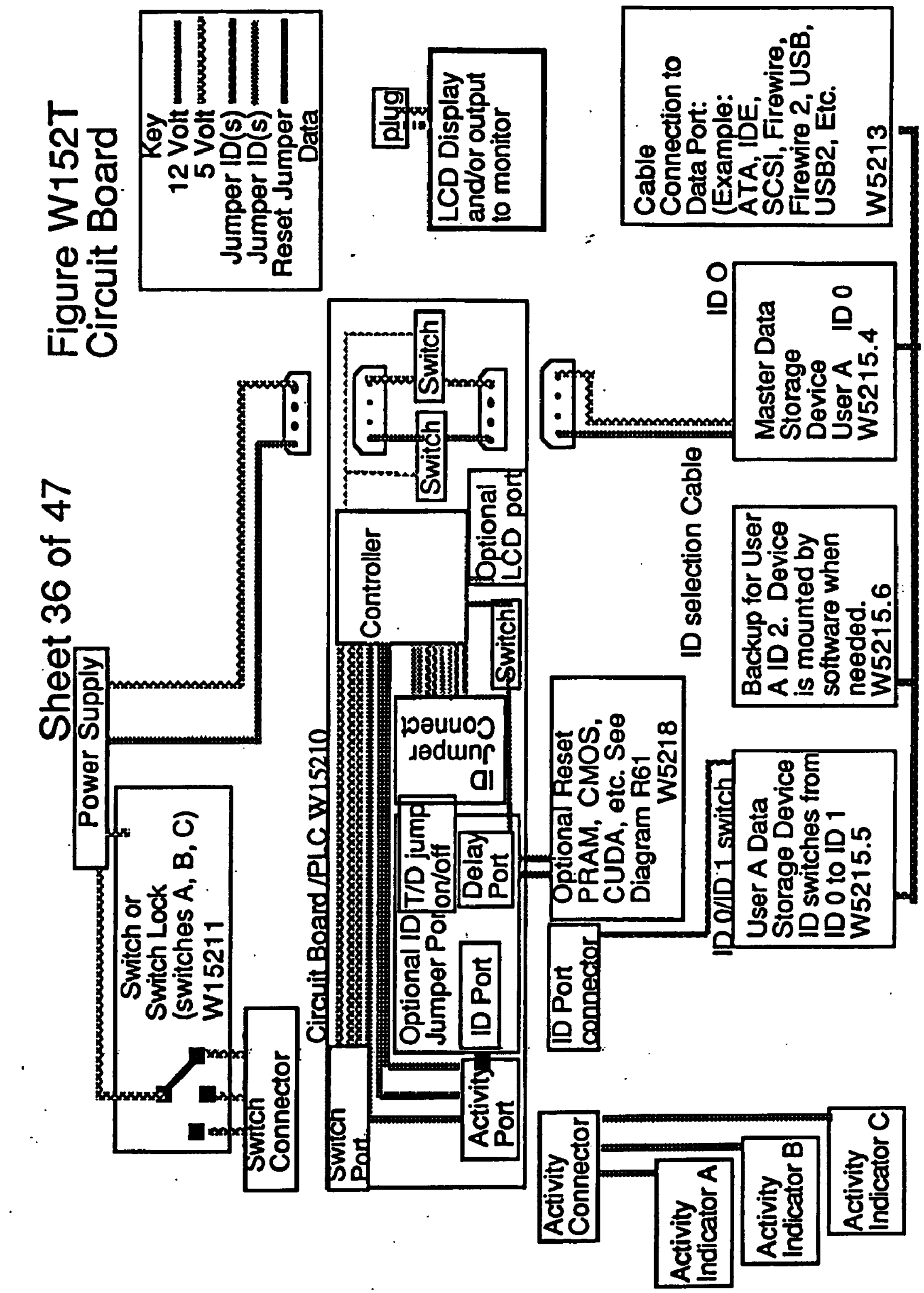
Sheet 36 of 47
Figure W152T
Circuit Board
Key
12 Volt
5 Volt
Jumper ID(s)
Jumper ID(s)
Reset Jumper
Data
plug
LCD Display and/or output to monitor
Cable Connection to Data Port: (Example: ATA, IDE, SCSI, Firewire, Firewire 2, USB, USB2, Etc.
W5213
ID 0
Master Data Storage Device User A ID 0 W5215.4
ID selection Cable
Backup for User A ID 2. Device is mounted by software when needed. W5215.6
User A Data Storage Device ID switches from ID 0 to ID 1 W5215.5
ID 0/ID 1 switch
Optional Reset PRAM, CMOS, CUDA, etc. See Diagram R61 W5218
ID Port connector
Activity Connector
Activity Indicator A
Activity Indicator B
Activity Indicator C
Power Supply
Switch or Switch Lock (switches A, B, C) W15211
Switch Connector
Circuit Board/PLC W15210
Controller
Optional LCD port
Switch
Switch
Switch
Switch
ID Jumper Connect
T/D jump on/off
Delay Port
Optional ID Jumper Po
ID Port
Activity Port
Switch Port

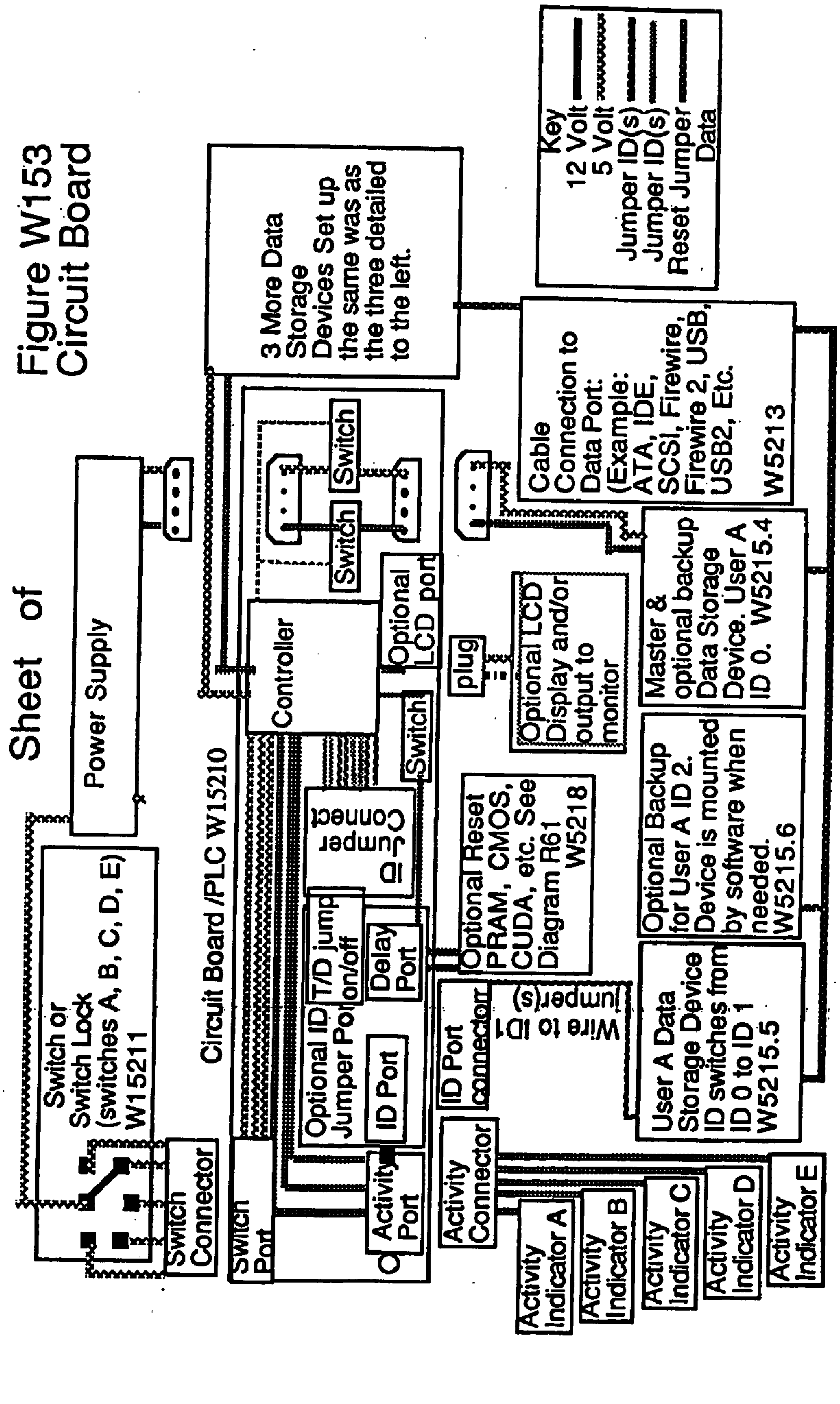
Figure W153
Circuit Board
Sheet of
Power Supply
Switch or Switch Lock (switches A, B, C, D, E) W15211
Switch Connector
Circuit Board /PLC W15210
Switch Port
Activity Port
Optional ID Jumper Port
ID Port
T/D jump on/off
Delay Port
ID Jumper Connect
Controller
Switch
Switch
Switch
Optional LCD port
3 More Data Storage Devices Set up the same was as the three detailed to the left.
plug
Optional LCD Display and/or output to monitor
Optional Reset PRAM, CMOS, CUDA, etc. See Diagram R61 W5218
ID Port connector
Wire to ID1 Jumper(s)
Activity Connector
Activity Indicator A
Activity Indicator B
Activity Indicator C
Activity Indicator D
Activity Indicator E
Cable Connection to Data Port: (Example: ATA, IDE, SCSI, Firewire, Firewire 2, USB, USB2, Etc. W5213
Master & optional backup Data Storage Device. User A ID 0. W5215.4
Optional Backup for User A ID 2. Device is mounted by software when needed. W5215.6
User A Data Storage Device ID switches from ID 0 to ID 1 W5215.5
Key
12 Volt
5 Volt
Jumper ID(s)
Jumper ID(s)
Reset Jumper
Data Circuit Board Single-User & Repair
Figure W160
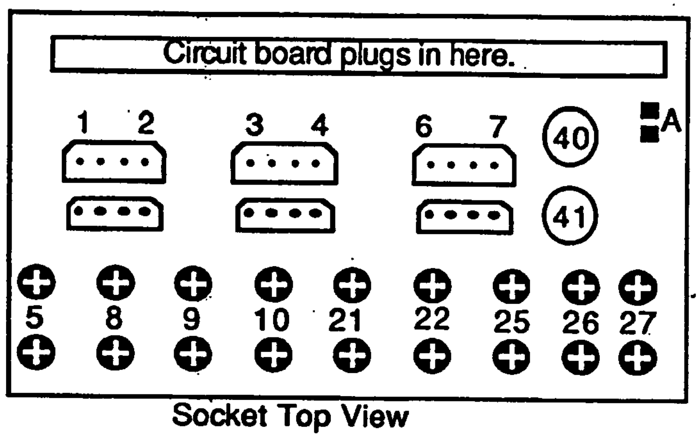
Socket Top View
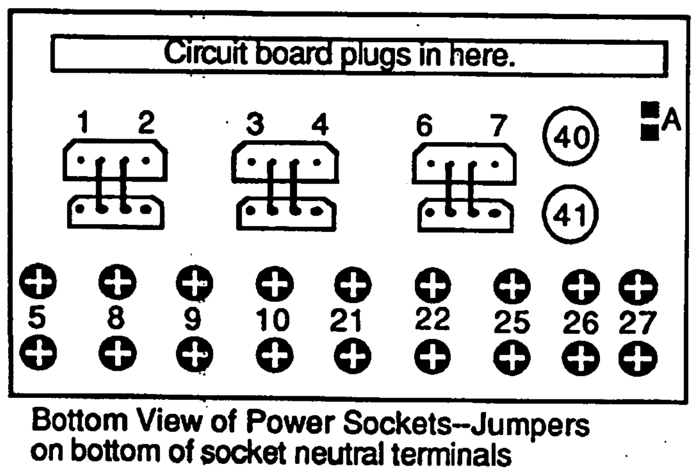
Bottom View of Power Sockets--Jumpers on bottom of socket neutral terminals

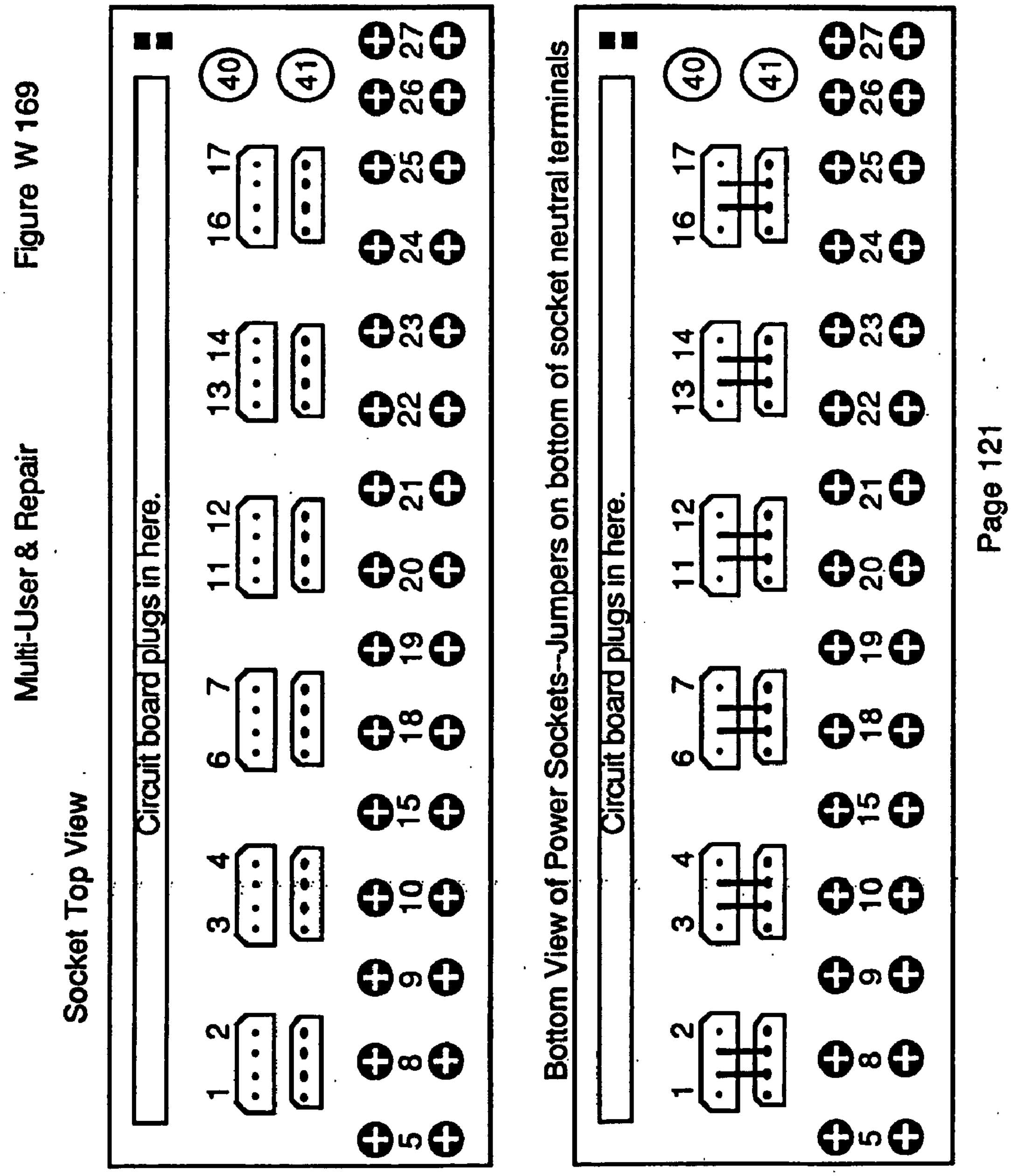
Multi-User & Repair
Figure W 169
Socket Top View
Circuit board plugs in here.
1 2 3 4 6 7 11 12 13 14 16 17
40
41
5 8 9 10 15 18 19 20 21 22 23 24 25 26 27
Bottom View of Power Sockets--Jumpers on bottom of socket neutral terminals
Circuit board plugs in here.
1 2 3 4 6 7 11 12 13 14 16 17
40
41
5 8 9 10 15 18 19 20 21 22 23 24 25 26 27
Page 121

Figure W170 REDUNDANT???

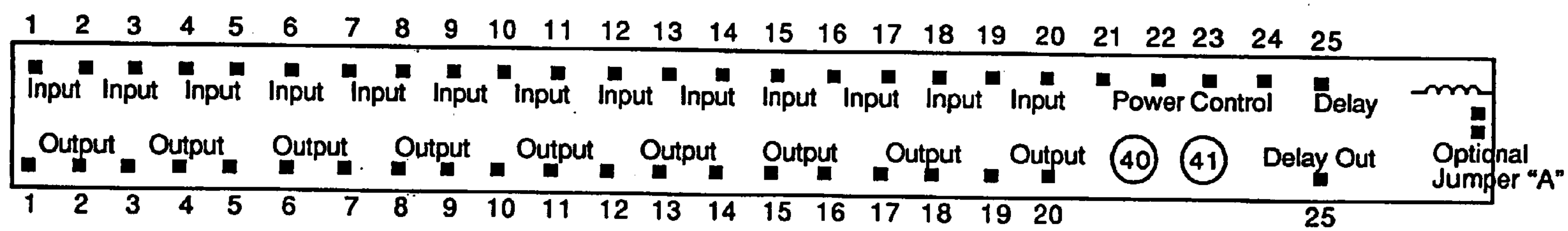

1) circuit 1
2) circuit 2
3) circuit 3
4) circuit 4
5) circuit 5
6) circuit 6

7) circuit 7
8) circuit 8
9) circuit 9
10) circuit 10

11) circuit 11
12) circuit 12
13) circuit 13
14) circuit 14
15) circuit 15
16) circuit 16

17) circuit 17
18) circuit 18
19) circuit 19
20) circuit 20

21) Power Control Indicator #21
22) Power Control Indicator #22
23) Power Control Indicator #23
24) Power Control Indicator #24
25) time delay circuit
40) delay start time for delay circuit
41) stop time for delay circuit BURPMU may need 4/22/01: Circuit board 7/15/2000

Sociket Top View

Neutrals bypass the Circuit board.... bottom view of neutrals

*Page 1* *Copyright Kenneth Largman and Anthony More 7/15/2000*

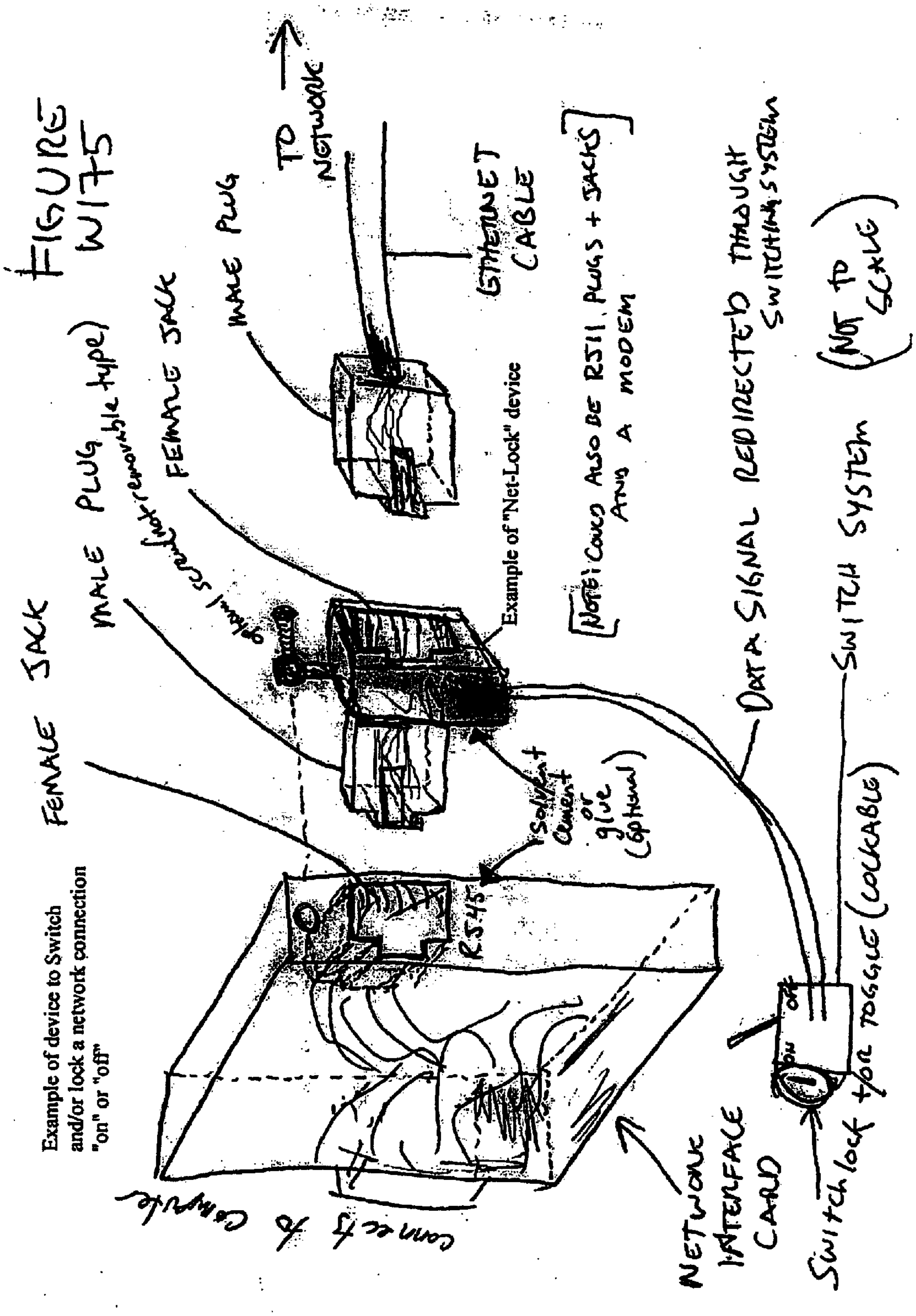
FIGURE W175
Example of device to Switch and/or lock a network connection "on" or "off"
connects to computer
NETWORK INTERFACE CARD
RJ45
FEMALE JACK
MALE PLUG
FEMALE JACK
MALE PLUG
ETHERNET CABLE
TO NETWORK
Example of "Net-Lock" device
solvent cement or glue (optional)
NOTE: COULD ALSO BE RJ11 PLUGS + JACKS AND A MODEM
DATA SIGNAL REDIRECTED THROUGH SWITCHING SYSTEM
SWITCH SYSTEM
SWITCHLOCK +/or TOGGLE (LOCKABLE)
ON
OFF
(NOT TO SCALE)

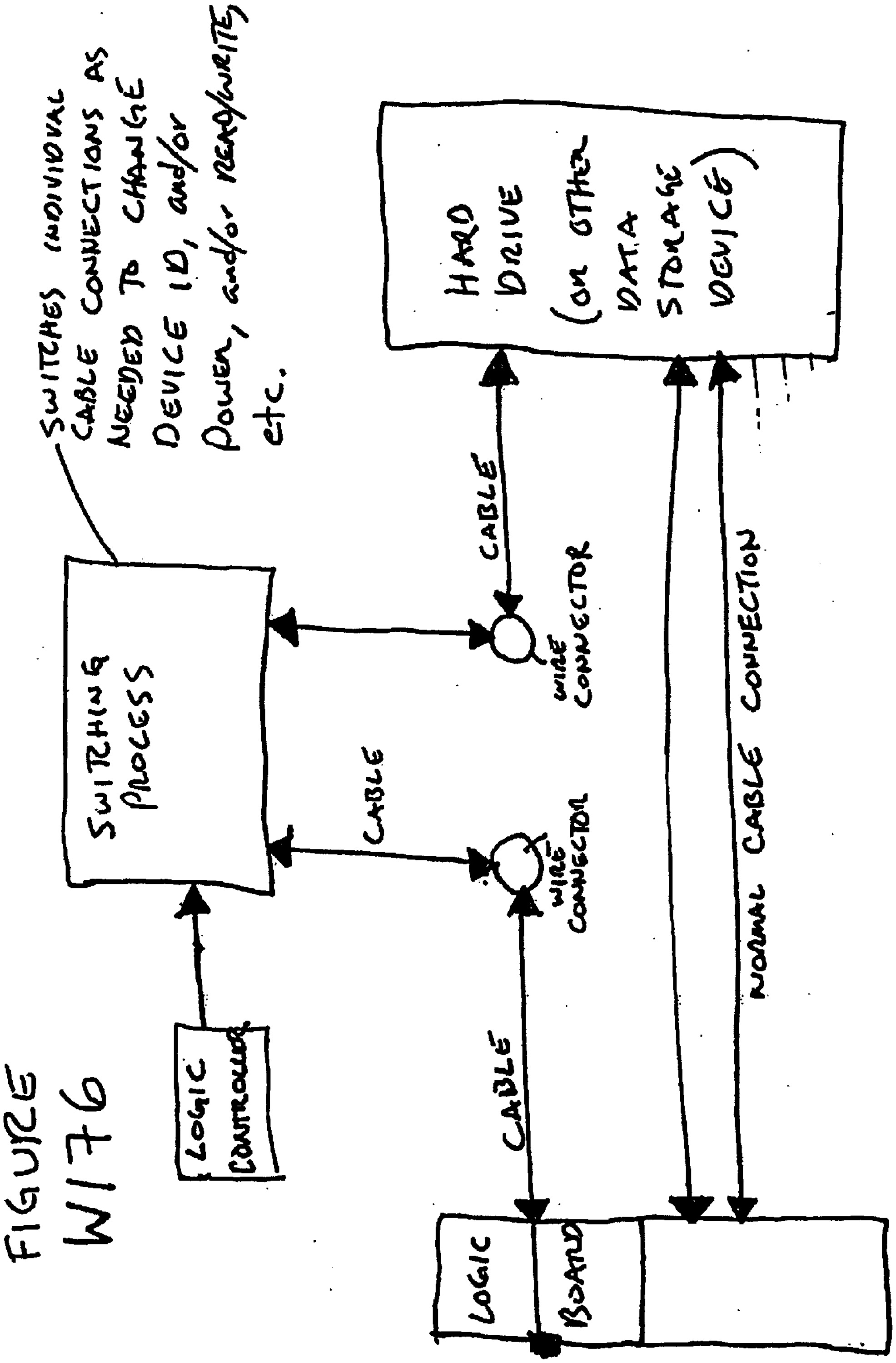
FIGURE W176

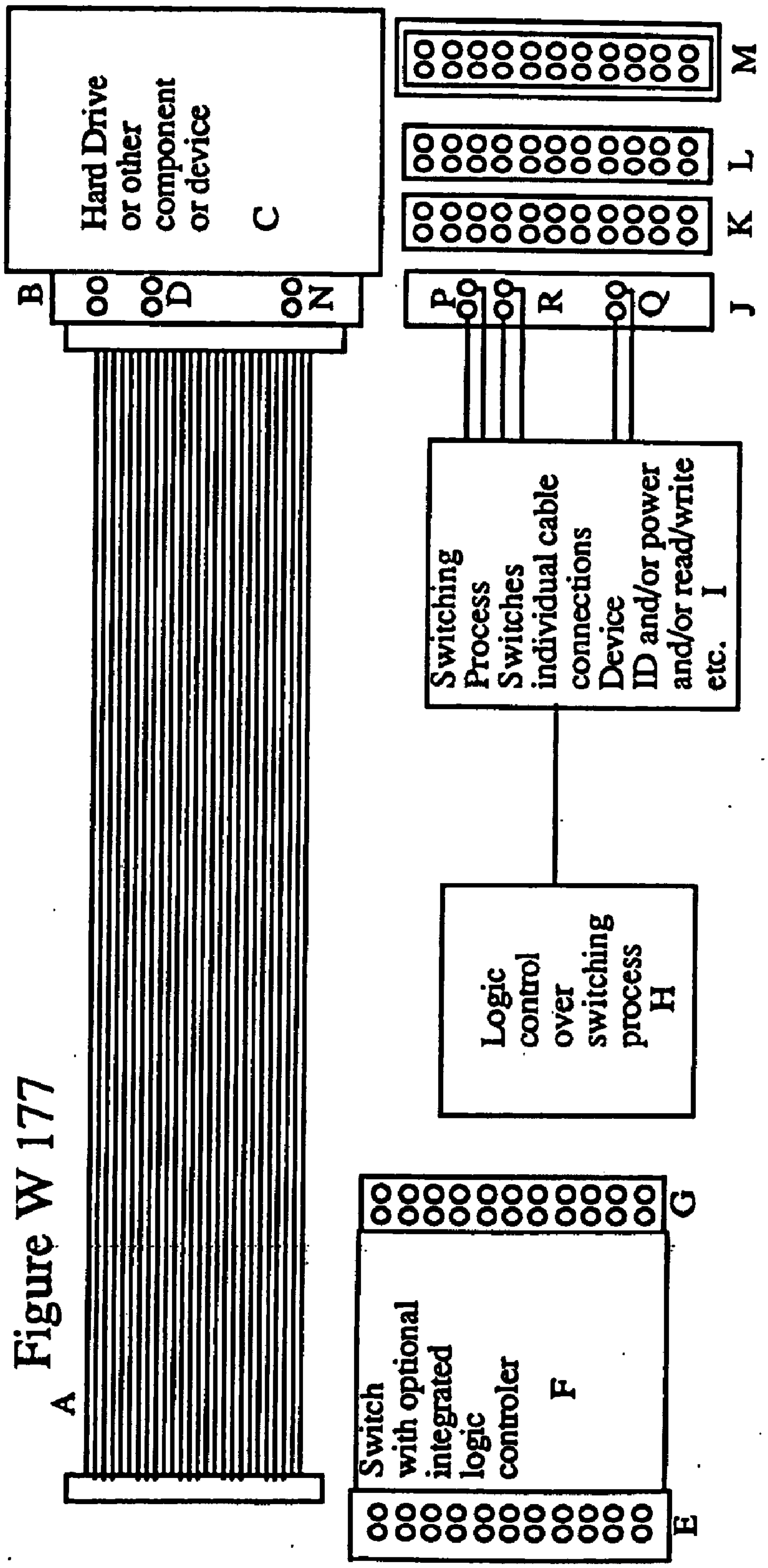
Figure W 177

Figure W 178
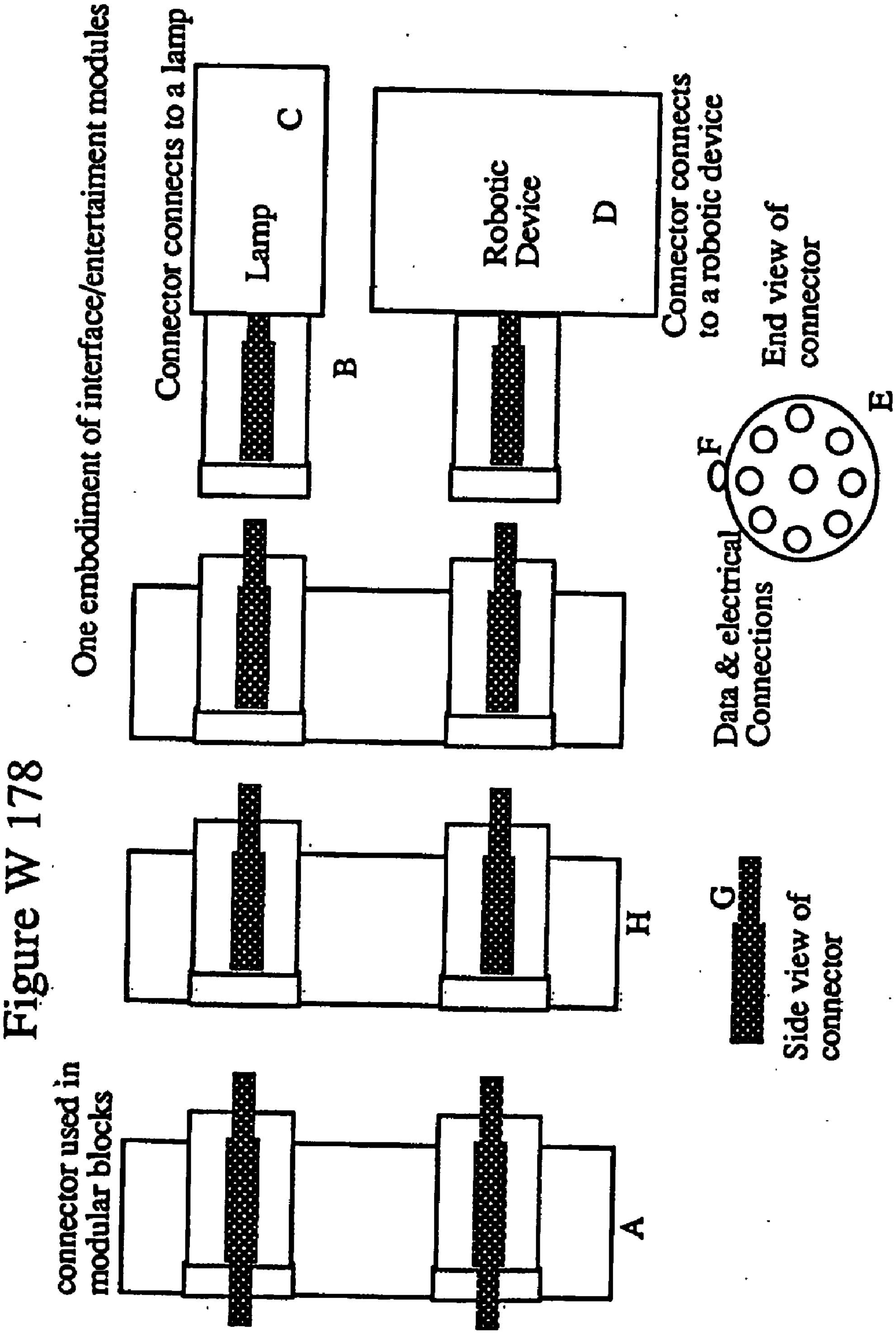

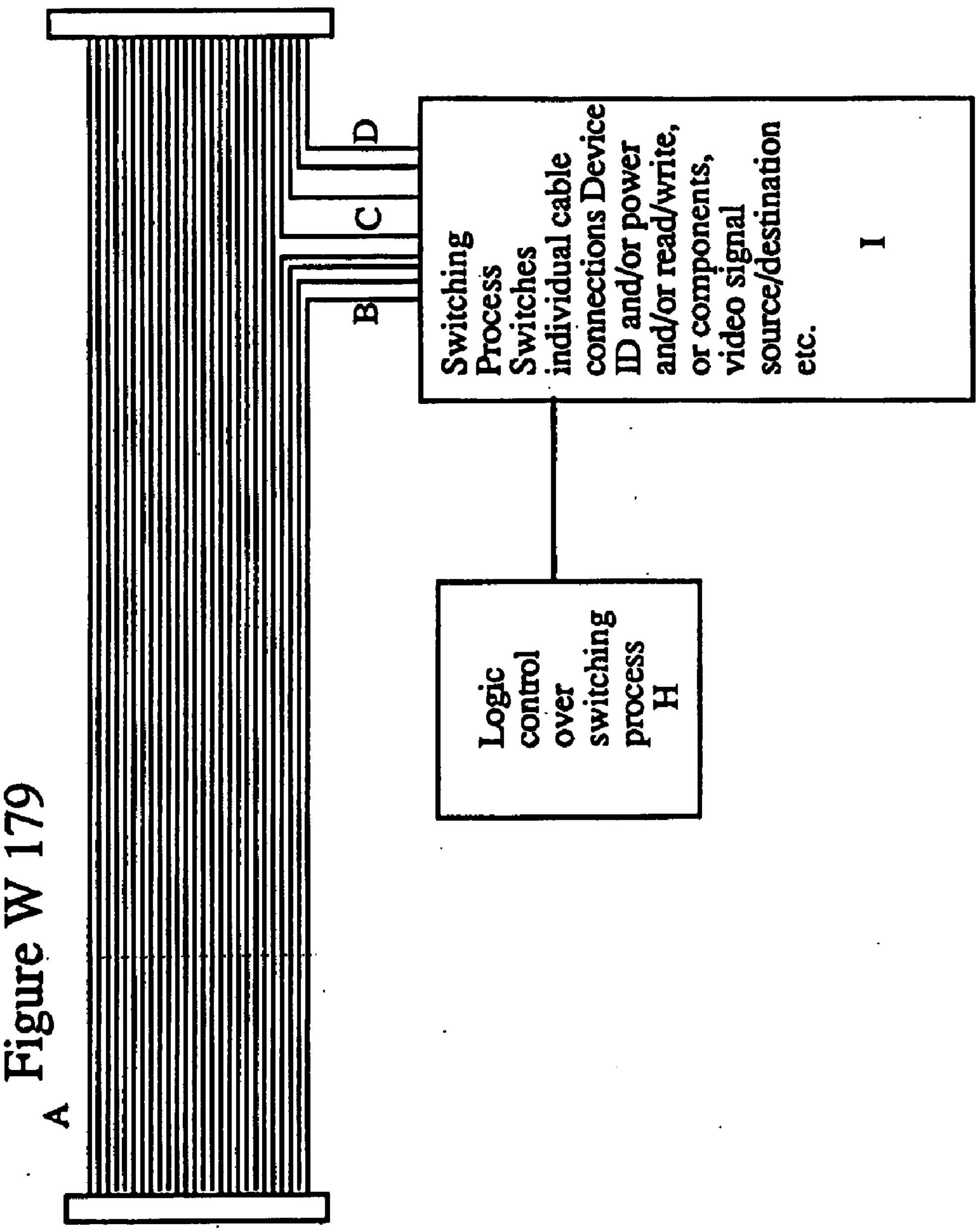
Figure W 179

WJ1
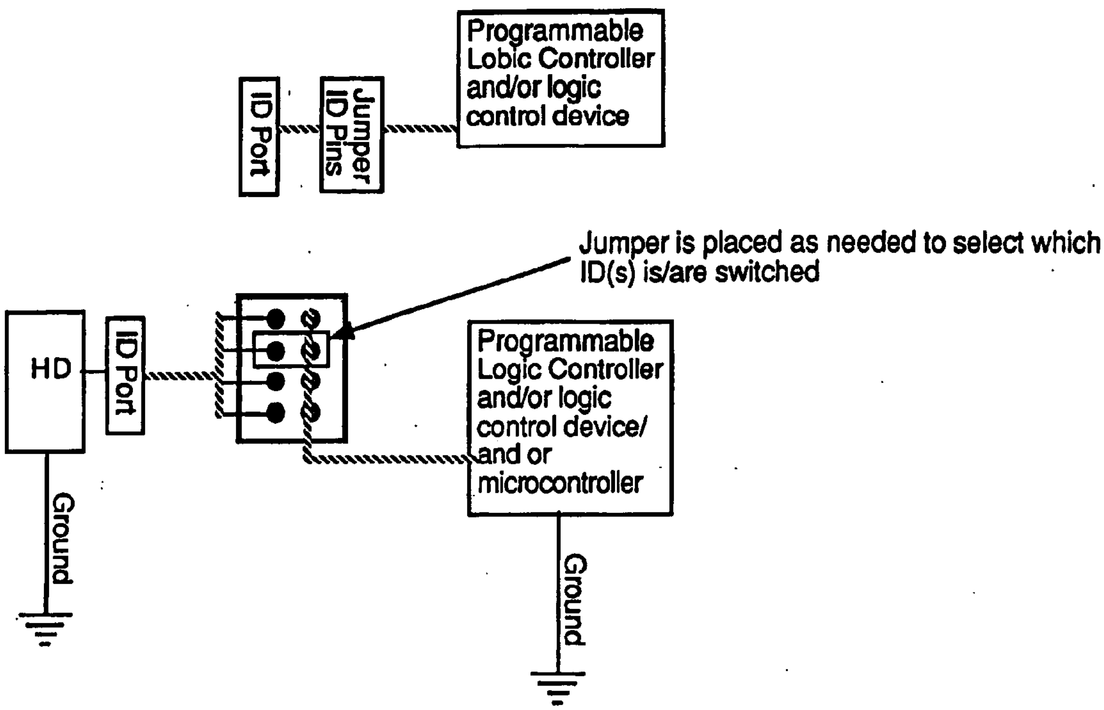
Pink are common on the circuit board. they connect to 1 IO pin of the microcontoller
Black connect to A0 A1 A2 A3 on hard drive.

WJ2
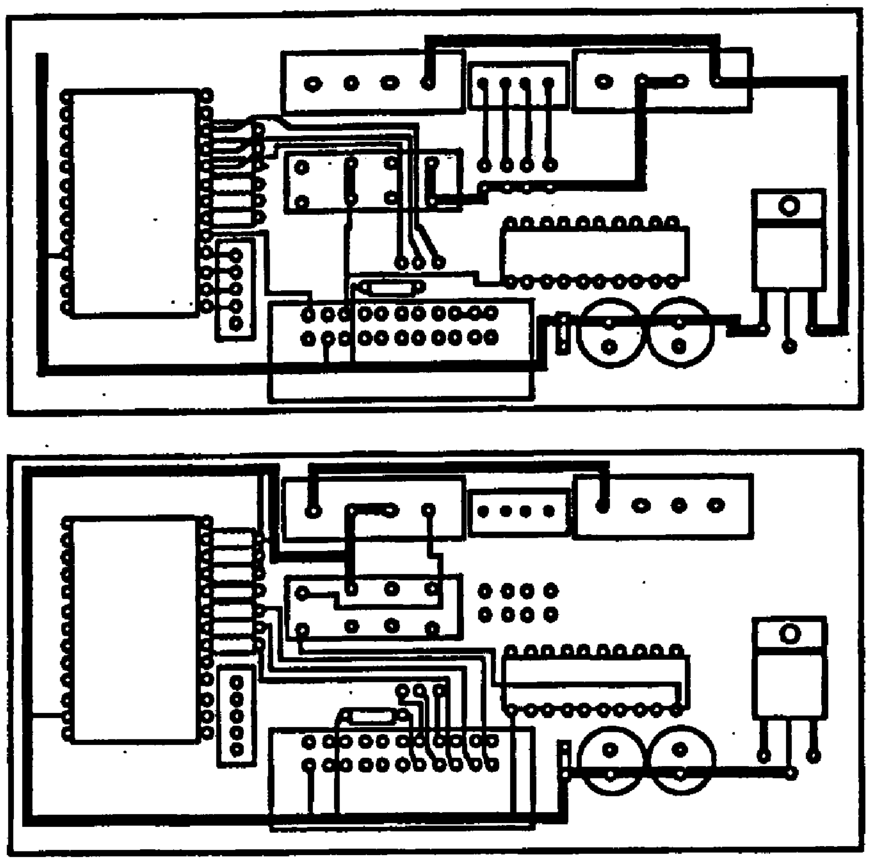

WJ3
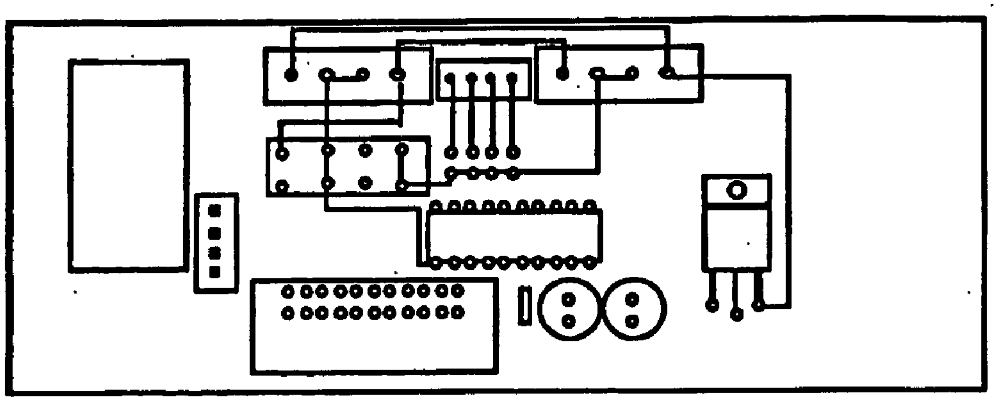

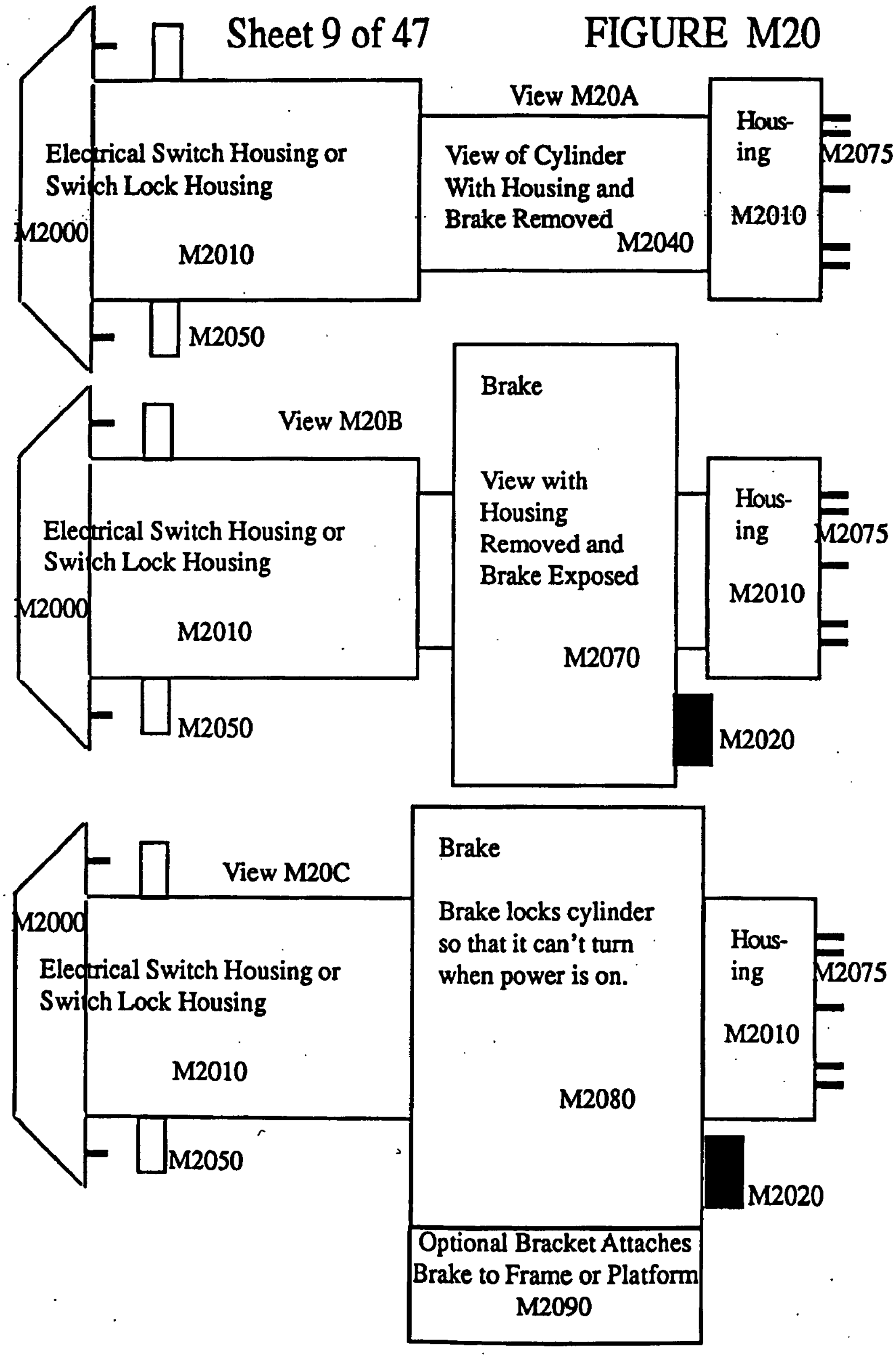
Sheet 9 of 47
FIGURE M20
View M20A
Electrical Switch Housing or Switch Lock Housing
M2000
M2010
View of Cylinder With Housing and Brake Removed
M2040
Hous-ing
M2010
M2075
M2050
View M20B
Brake
View with Housing Removed and Brake Exposed
M2070
Electrical Switch Housing or Switch Lock Housing
M2000
M2010
Hous-ing
M2010
M2075
M2050
M2020
View M20C
Brake
Brake locks cylinder so that it can't turn when power is on.
M2080
M2000
Electrical Switch Housing or Switch Lock Housing
M2010
Hous-ing
M2010
M2075
M2050
M2020
Optional Bracket Attaches Brake to Frame or Platform
M2090

Sheet 10 of 47
FIGURE M21
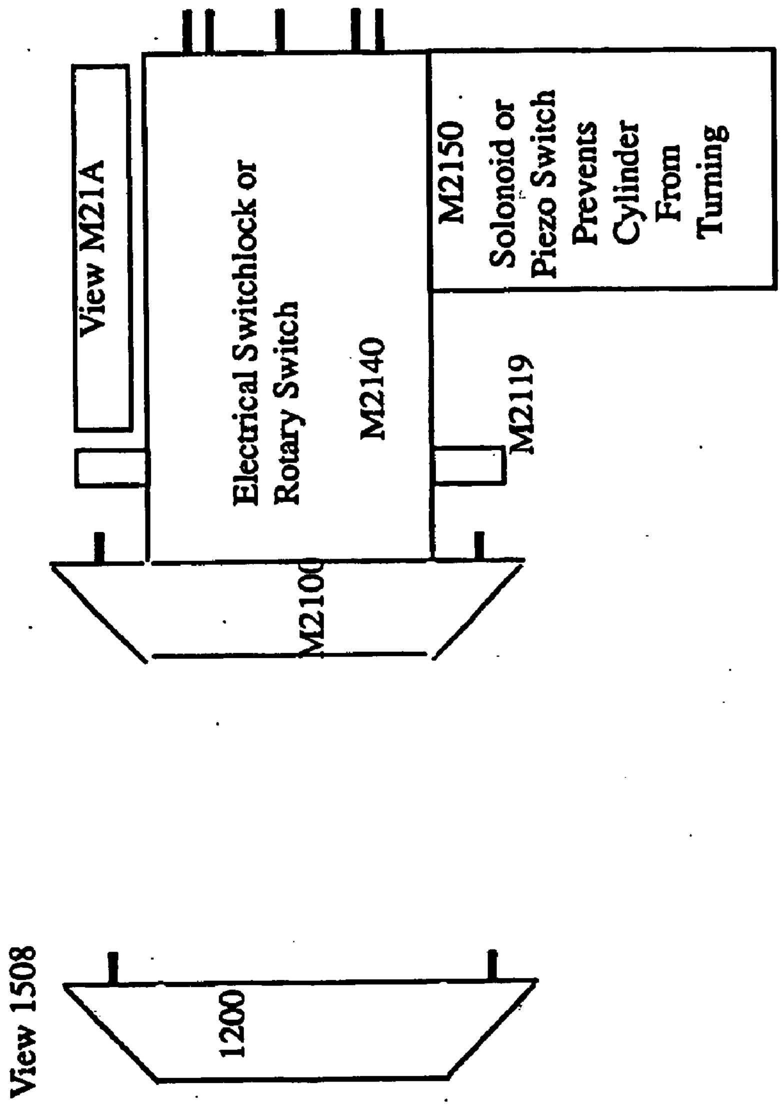

FIGURE M22
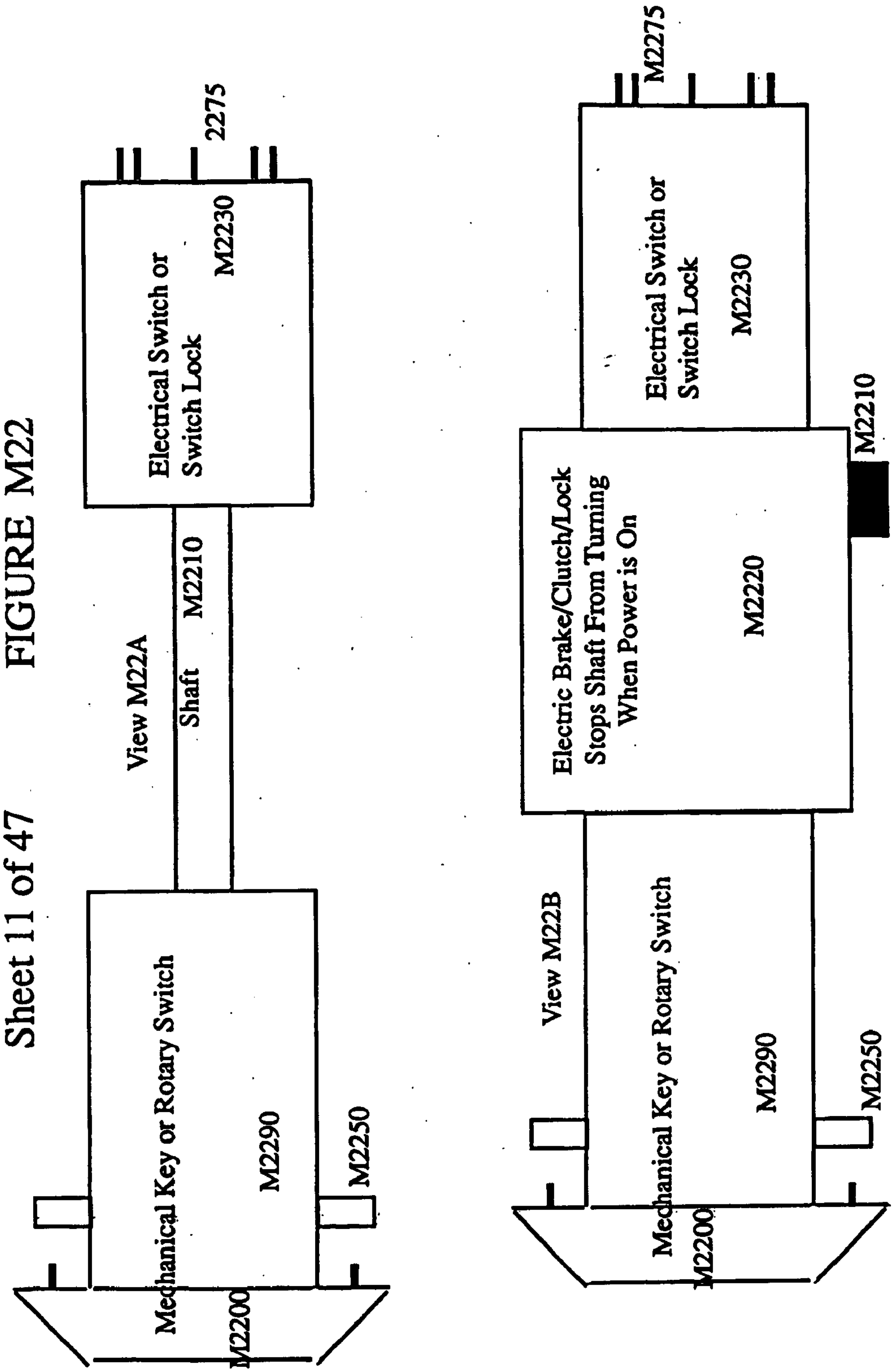

Sheet 12 of 47
FIGURE M23
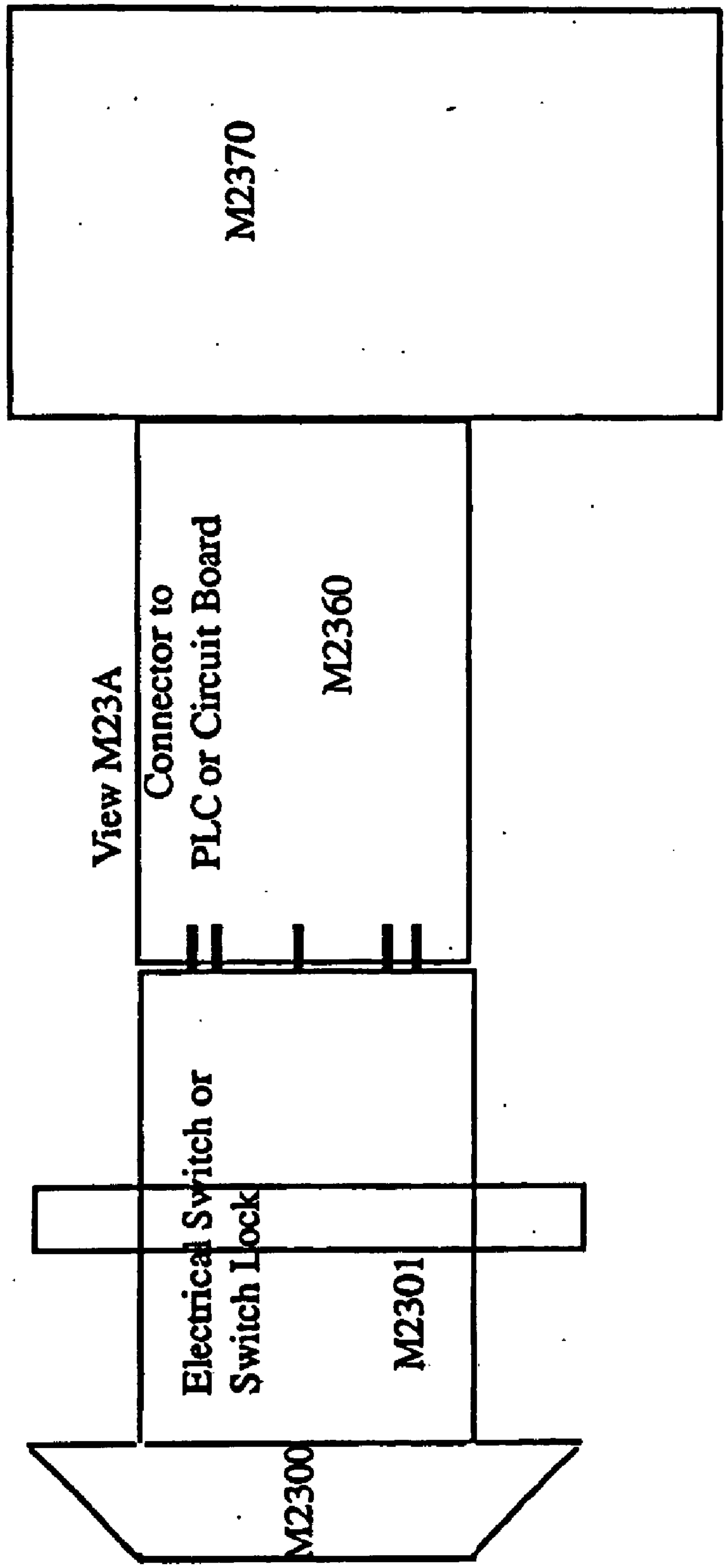

Sheet 9 of 9
FIGURE M24
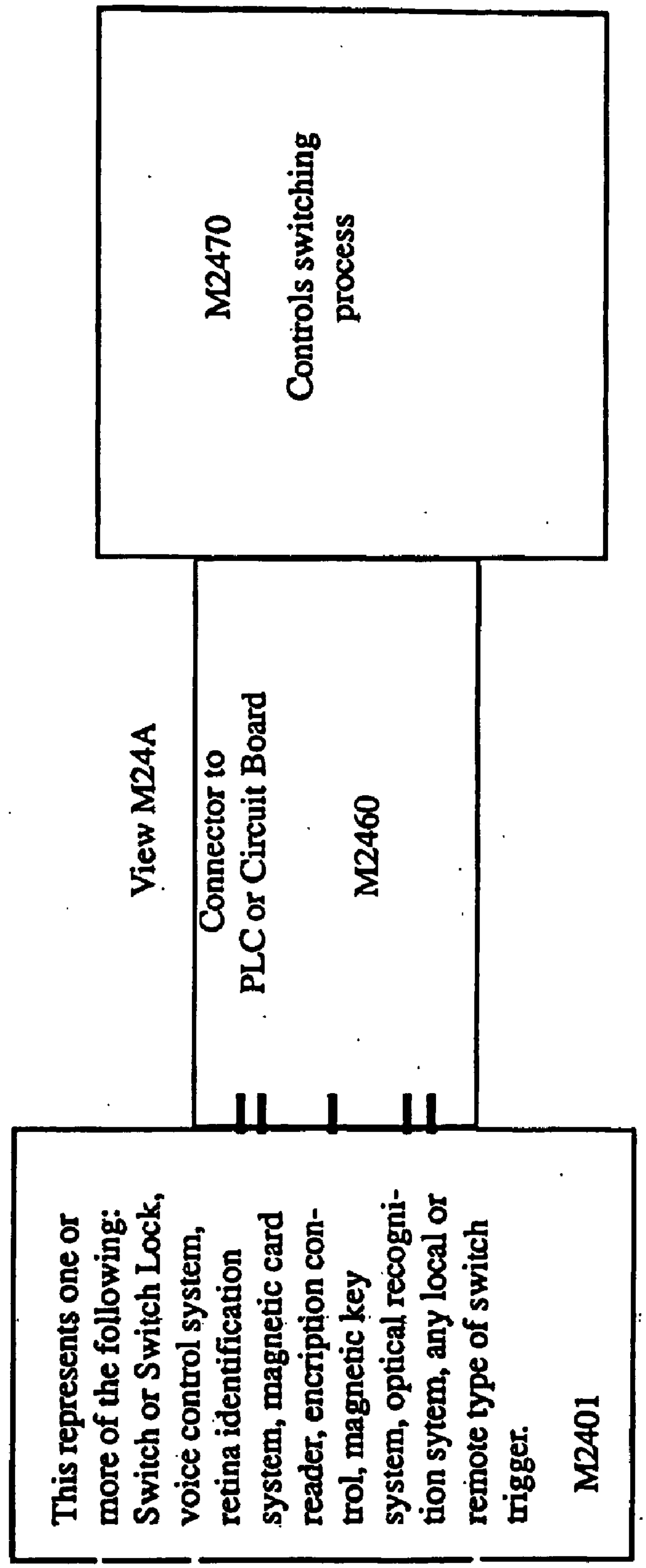

Figure E1
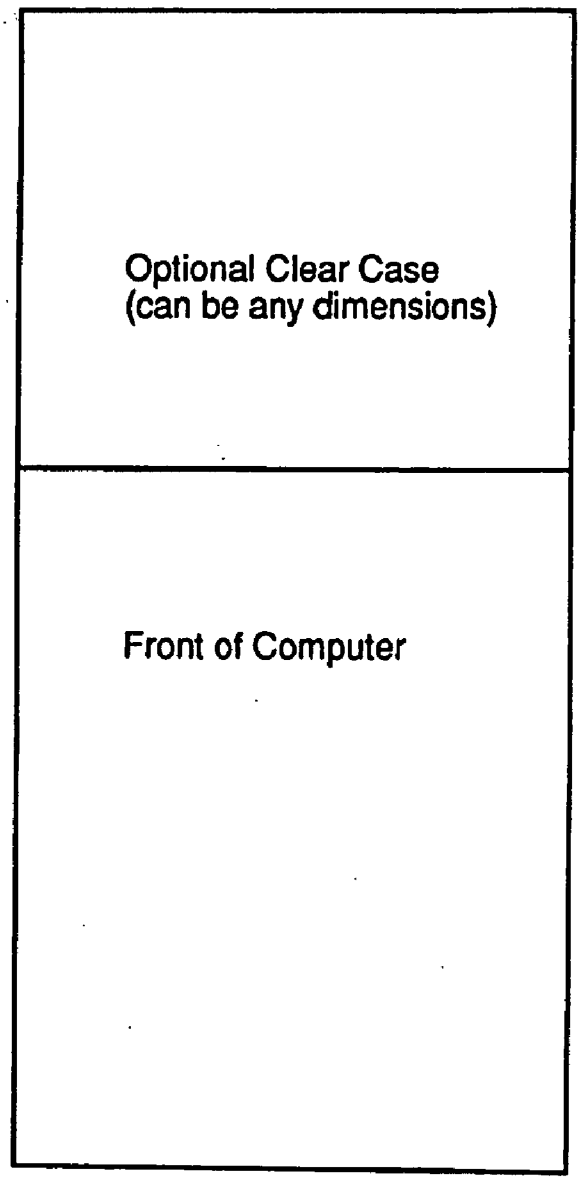

Figure E2
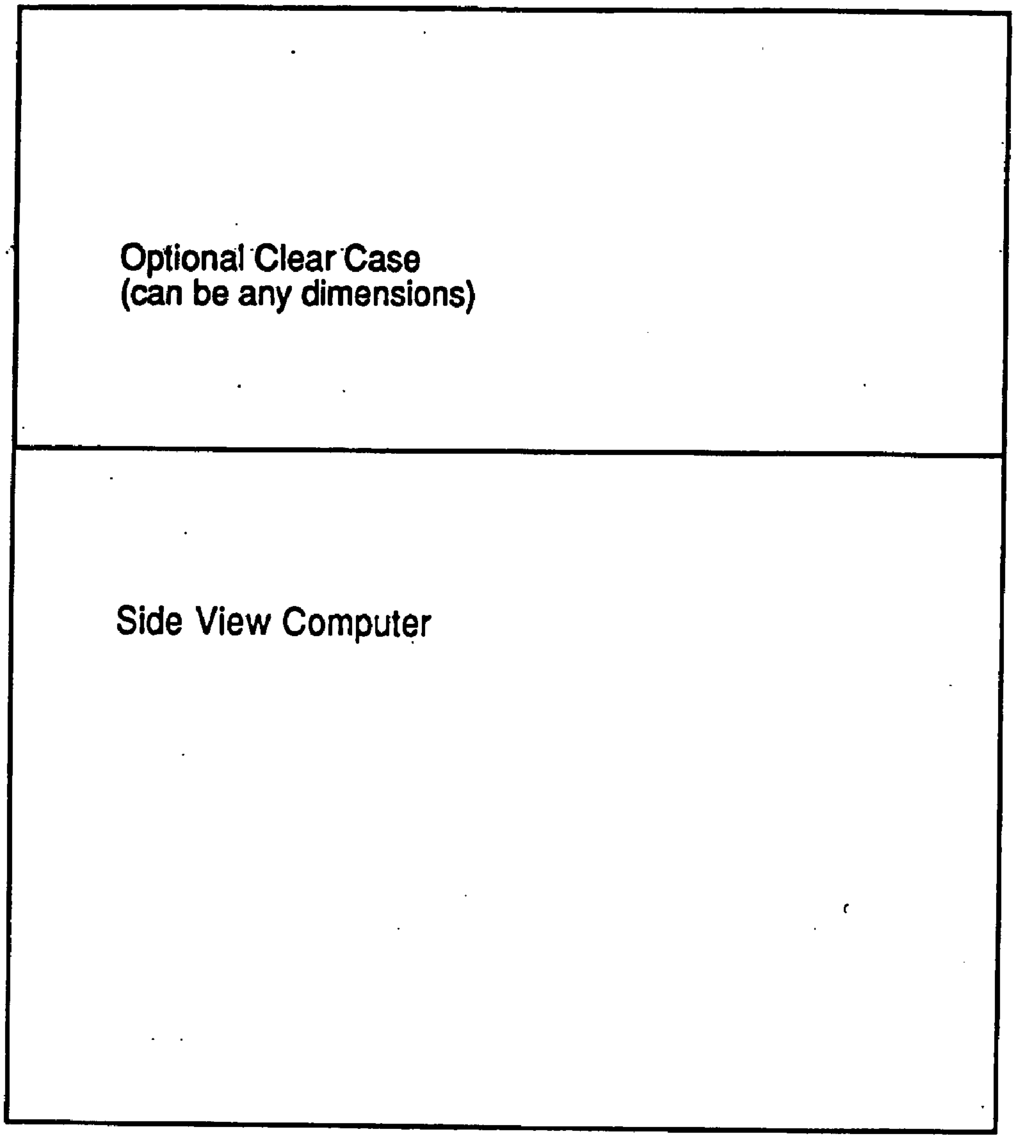

Figure E3
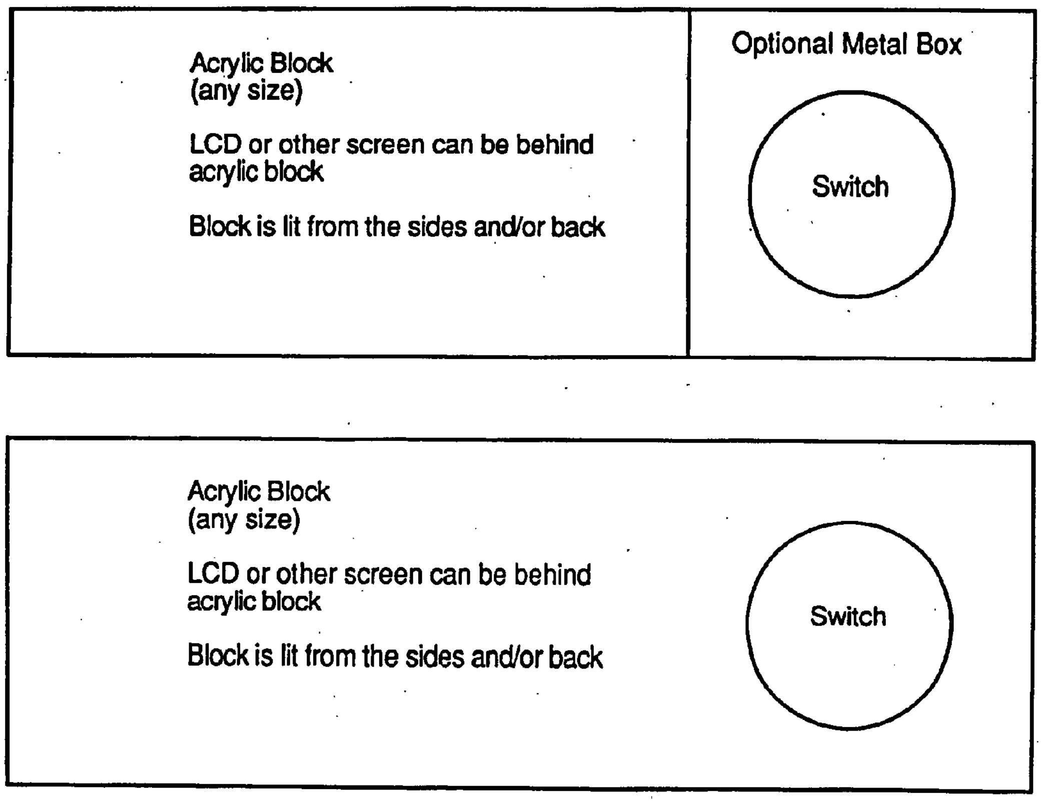

Figure E4
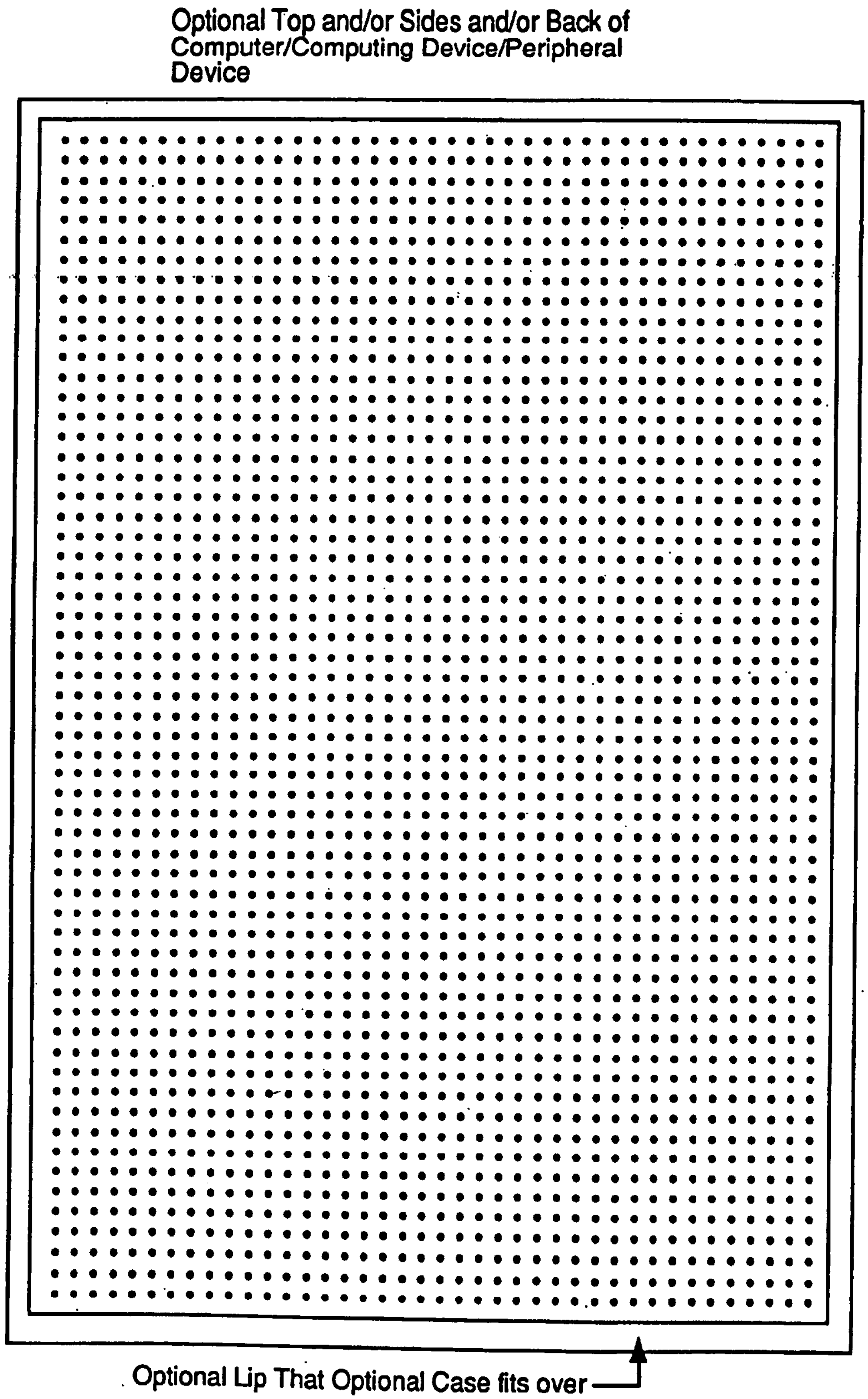

Figure E5
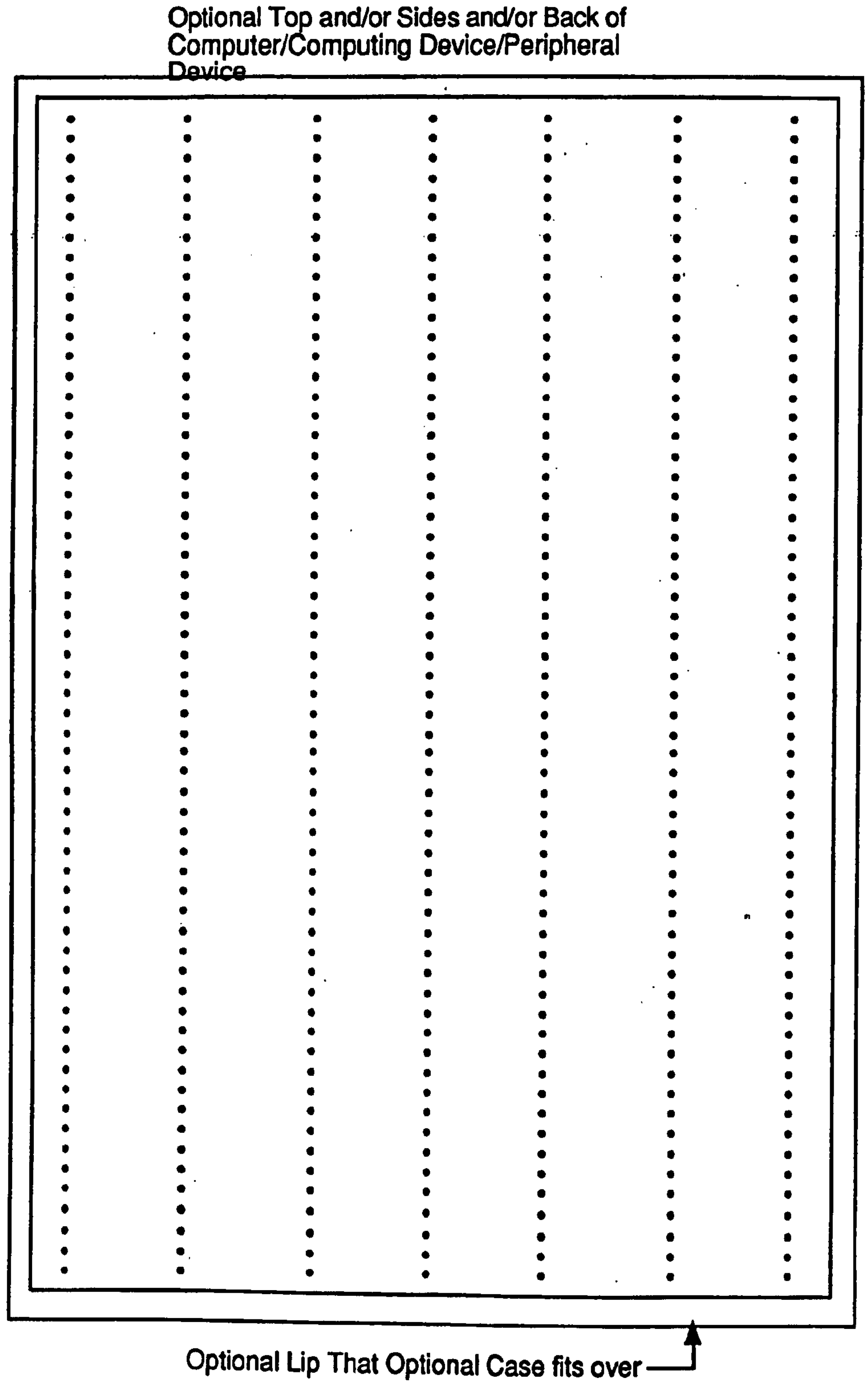

Figure E6
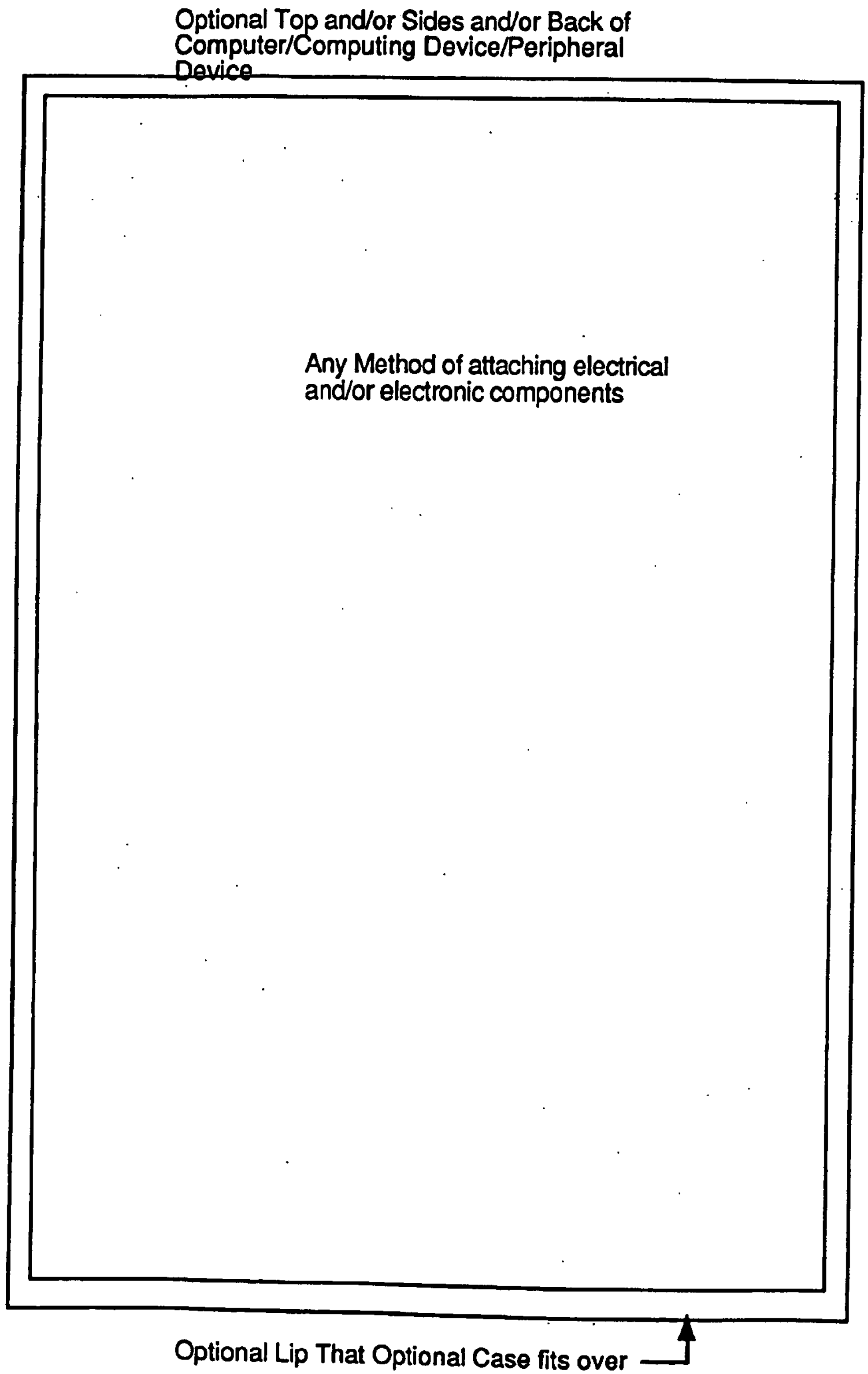

Figure E7
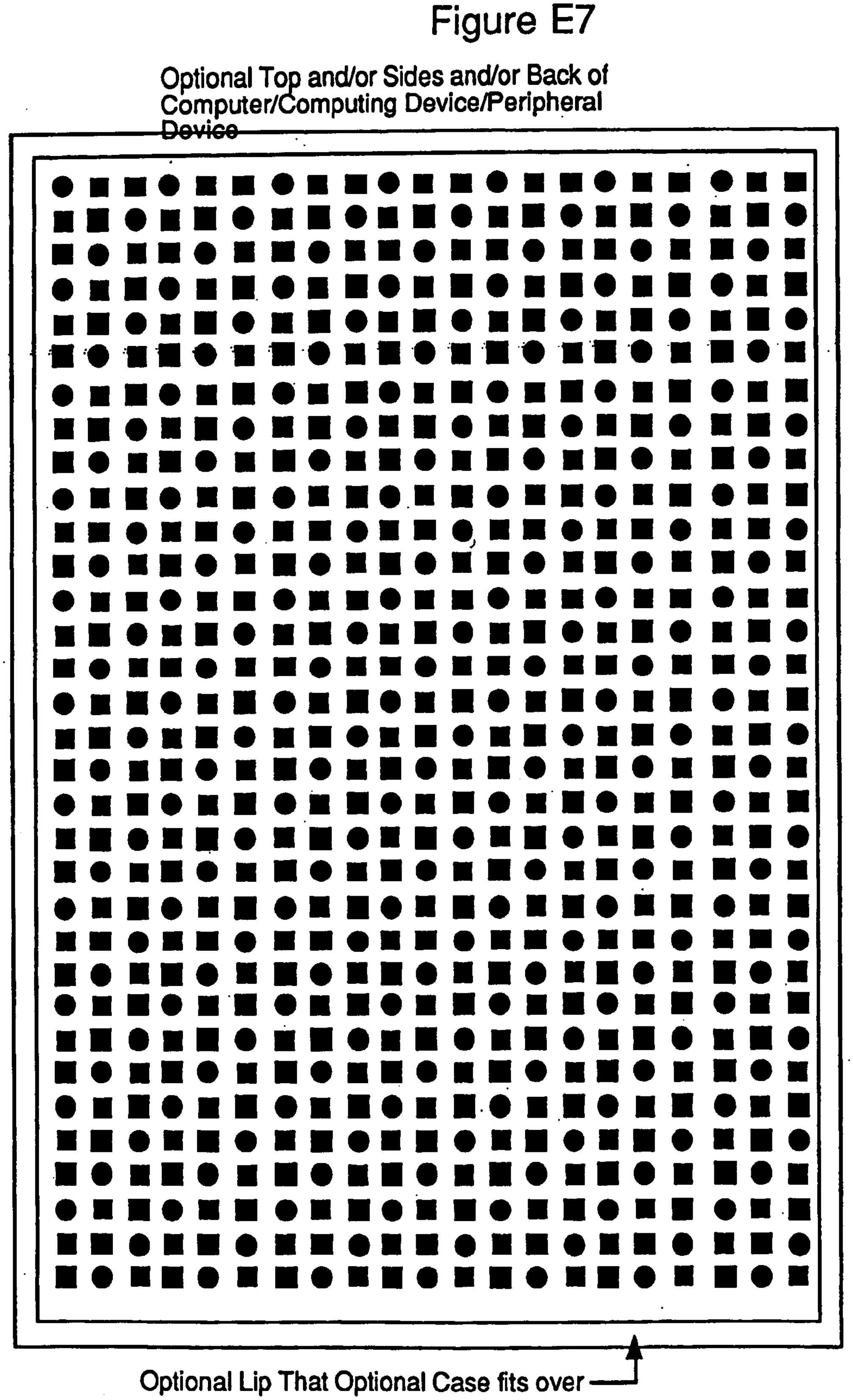

Figure E8
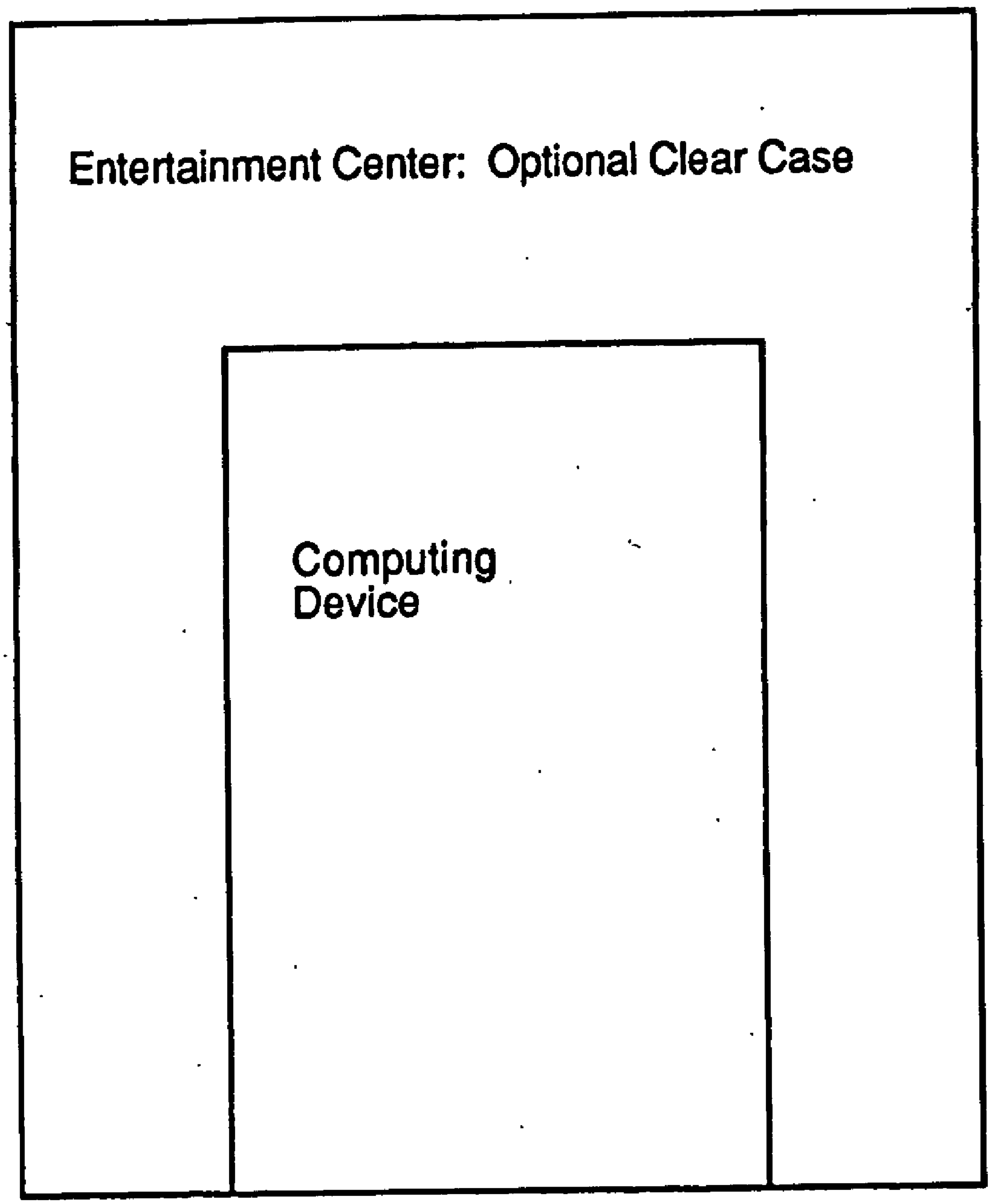

Figure E9
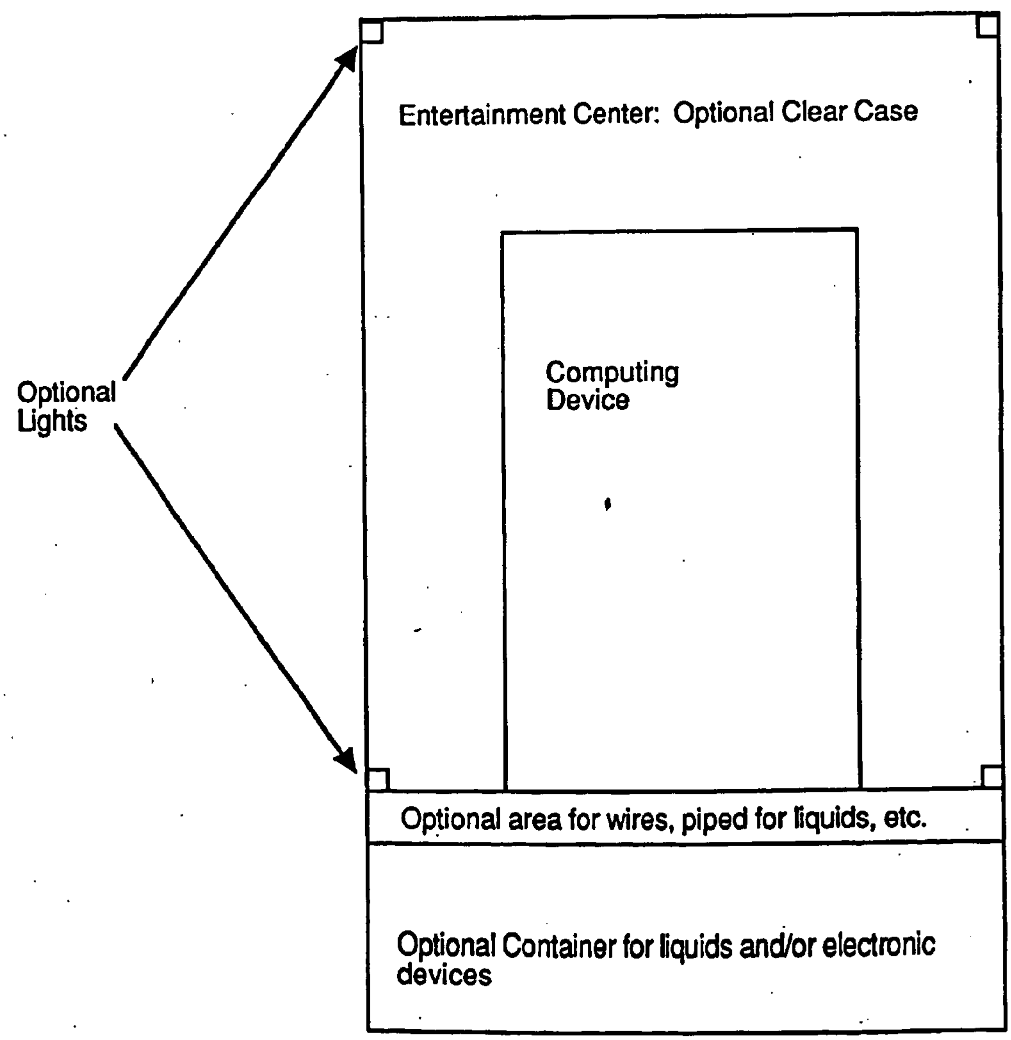

Figure E10
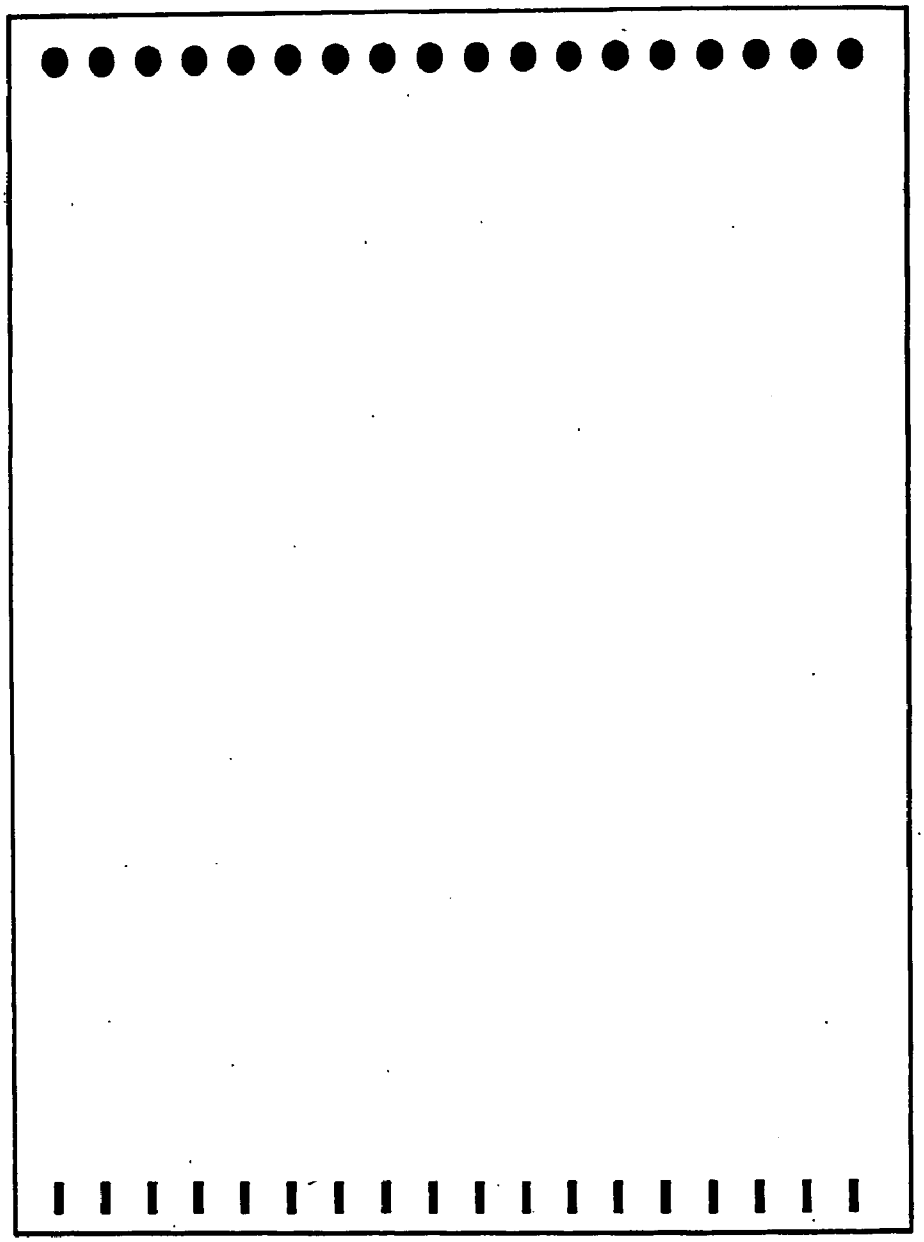
Optional Top and/or sides. Circuit board and/or device connector board plugs into power sources on top of computing device.

Figure E11
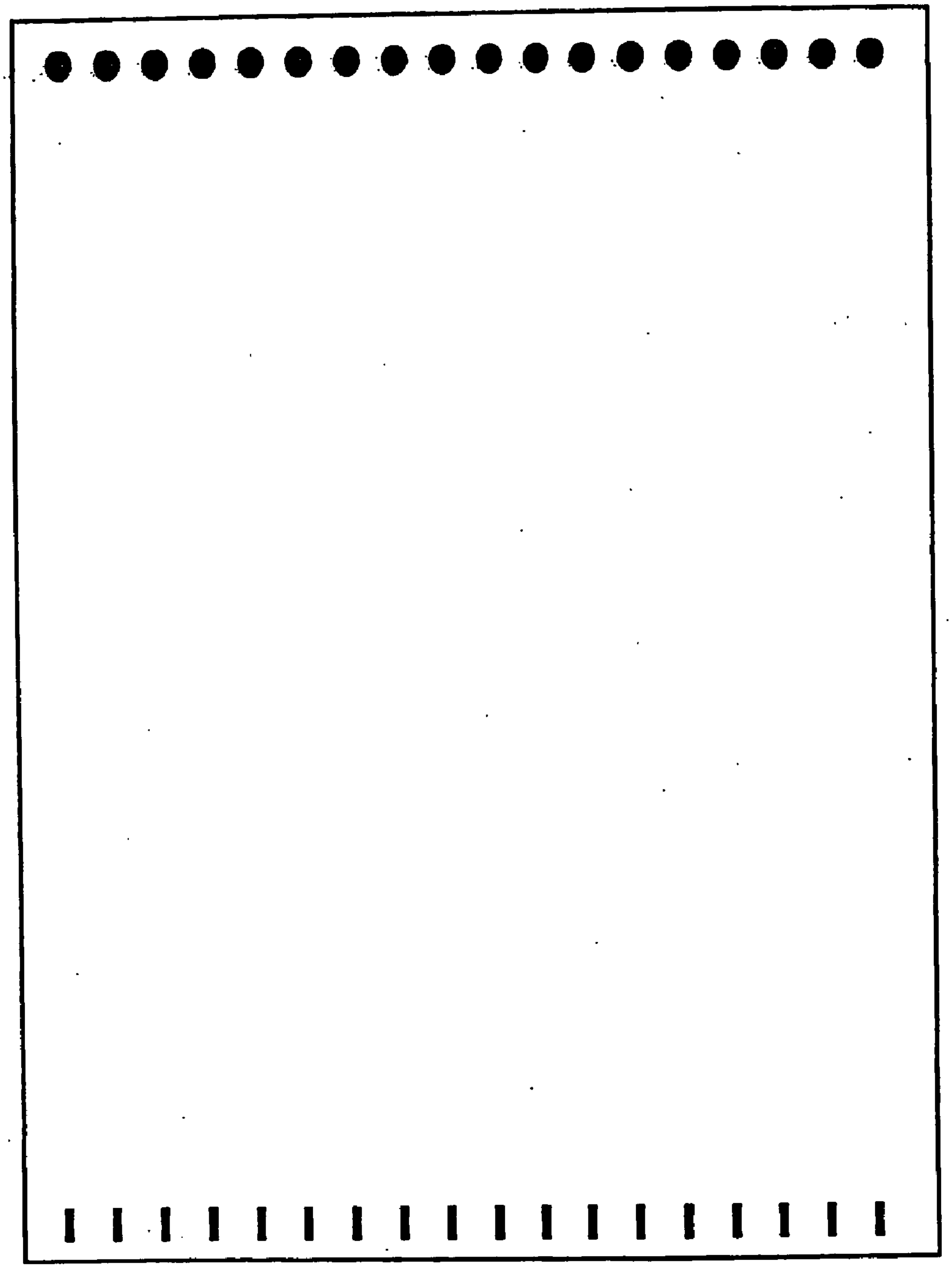
Optional Example circuit board (bottom View) and/or device connector board plugs. It plugs into power sources on top and/or sides of computing device. This is a functional design that only shows connections to power sources from computing device.

Figure E12
Optional Top and/or Sides and/or Back of Computer/Computing Device/Peripheral Device
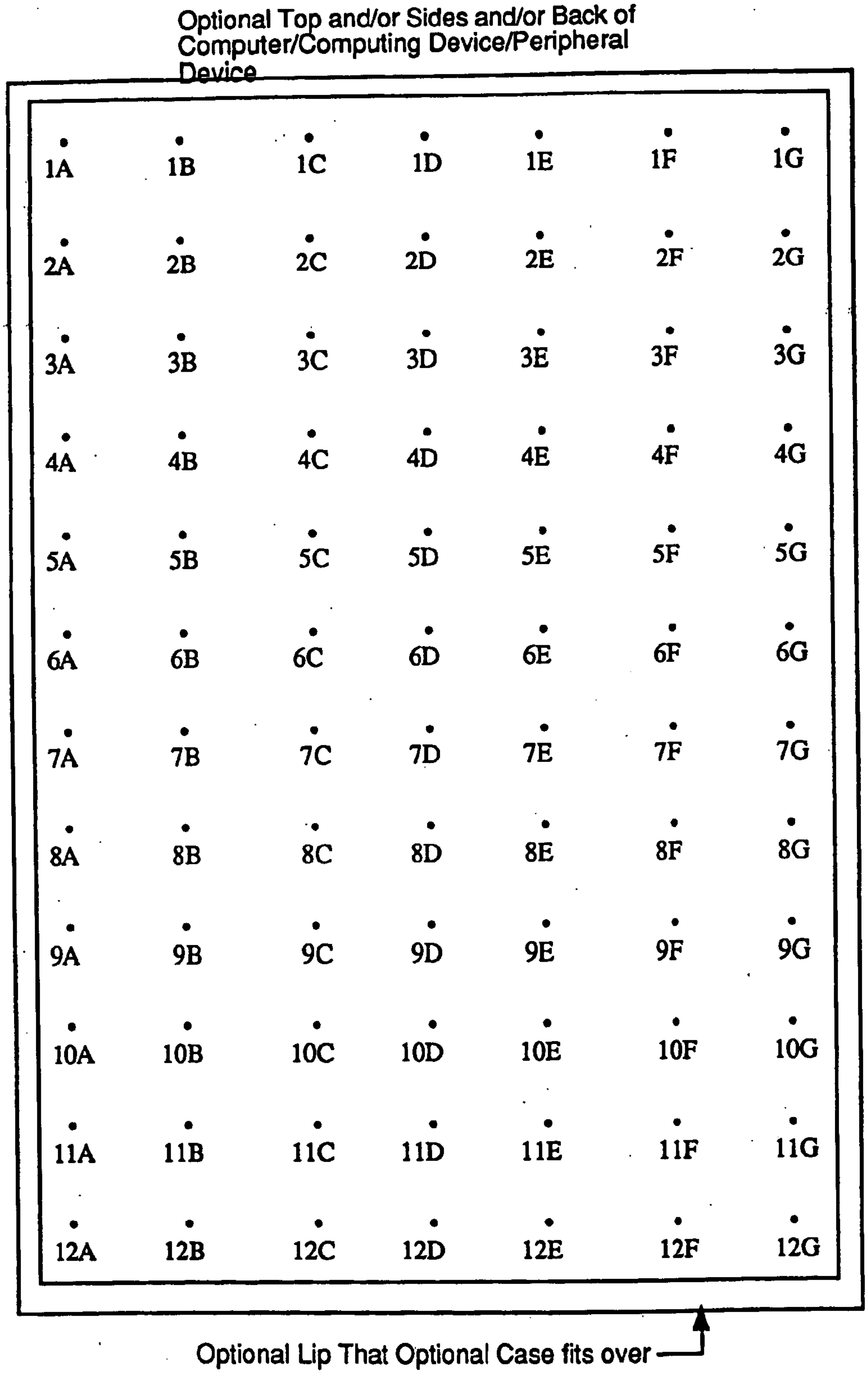
Optional Lip That Optional Case fits over
Numbers, letters, and/or symbols match top and bottom of board.
Wires hook wherever user wants to put them. Software controls circuits.

Figure E 14 Examples of optional LCD screen dialog.
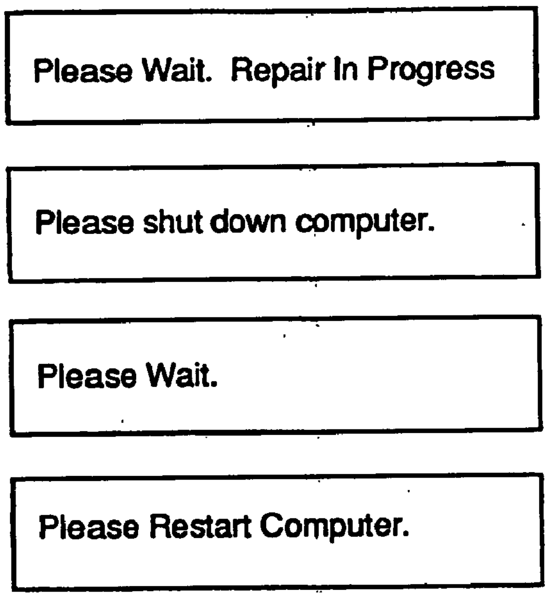
In addition to using an LCD screen, or in Lieu of using an LCD screen, dialog can be written directly to monitor, and/or communicated by other means of communication such as speech.

Figure E80 Optional interactive display and entertainment compone

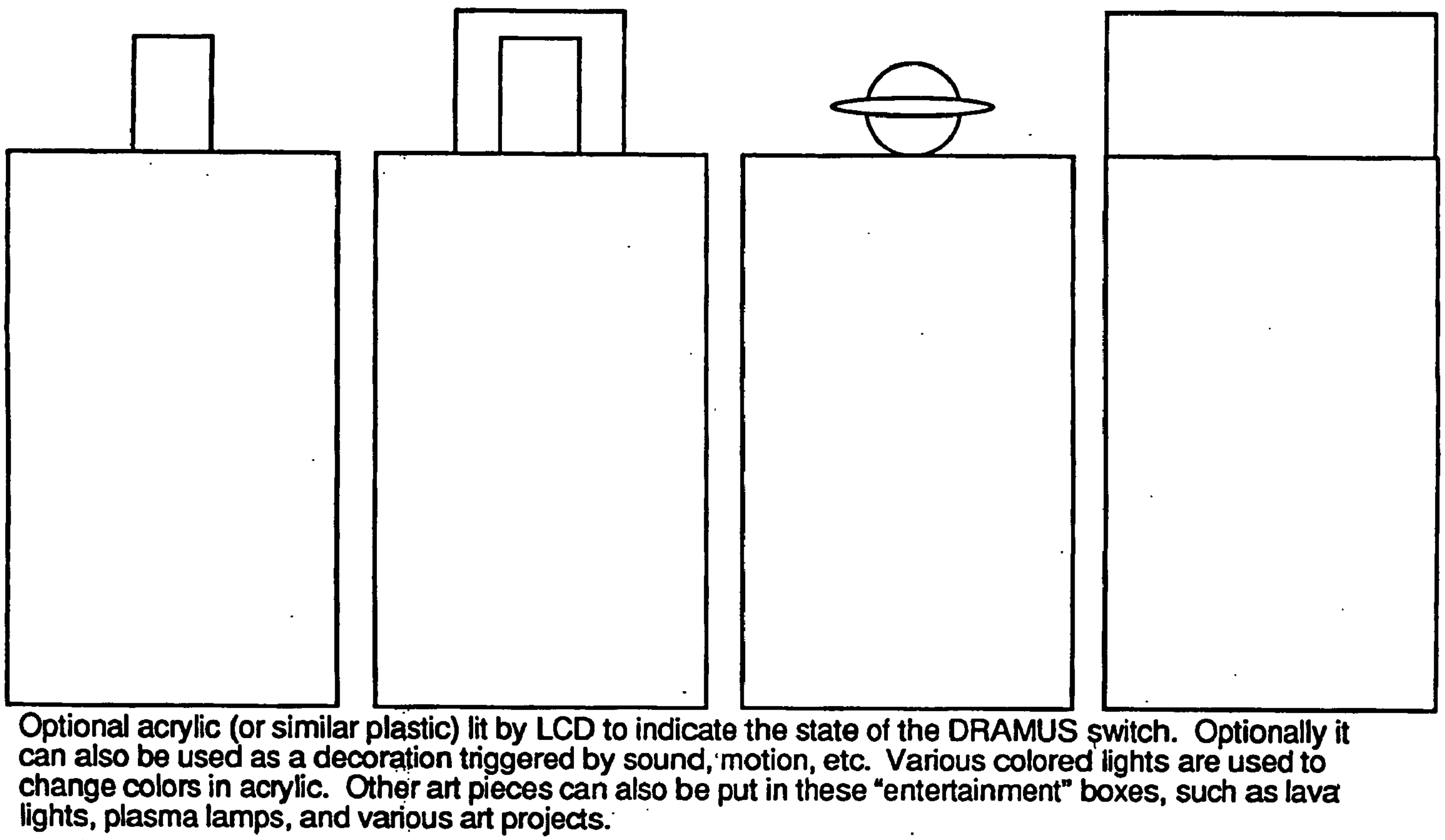

Optional acrylic (or similar plastic) lit by LCD to indicate the state of the DRAMUS switch. Optionally it can also be used as a decoration triggered by sound, motion, etc. Various colored lights are used to change colors in acrylic. Other art pieces can also be put in these "entertainment" boxes, such as lava lights, plasma lamps, and various art projects.

Figure E81
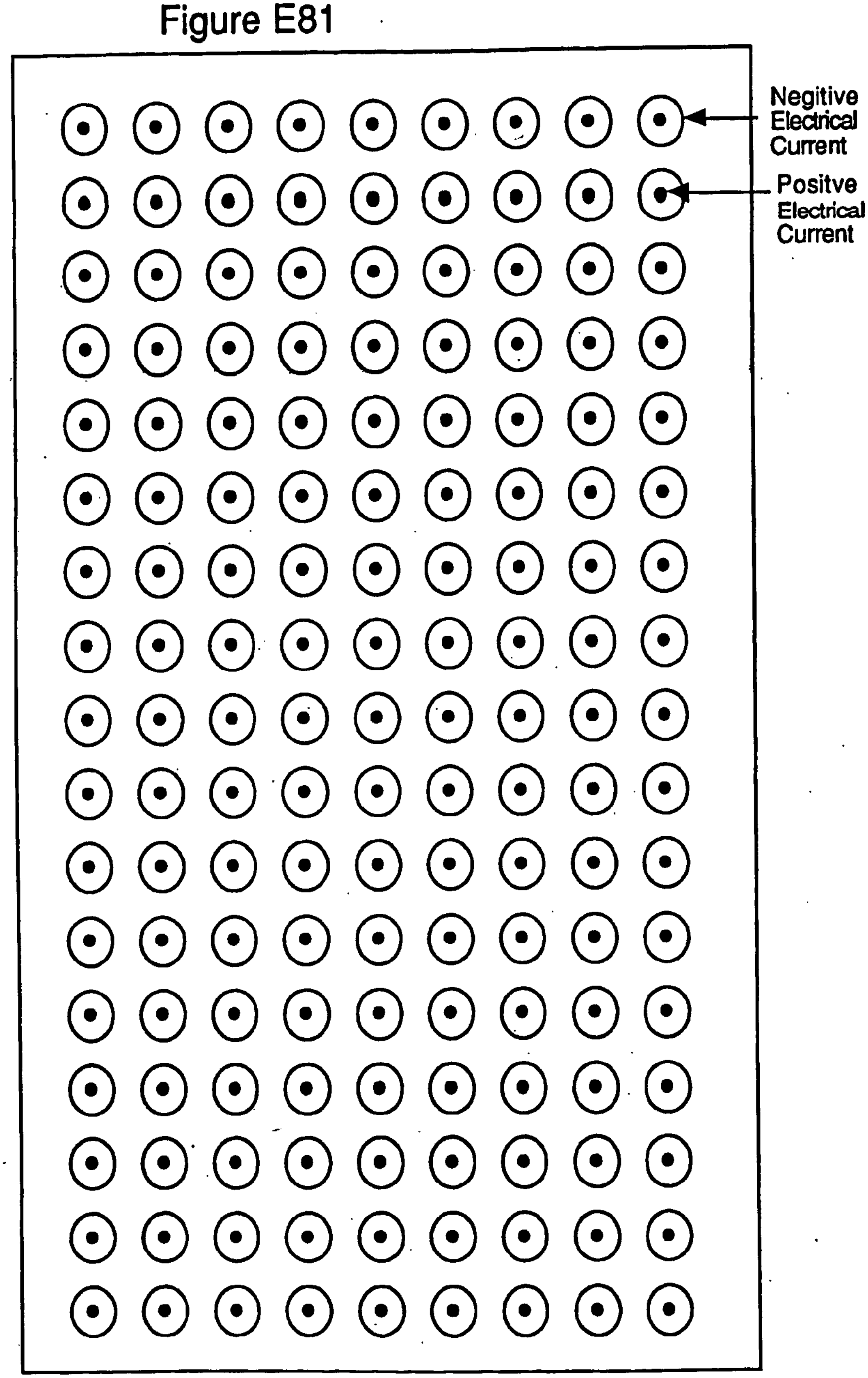

Figure E82

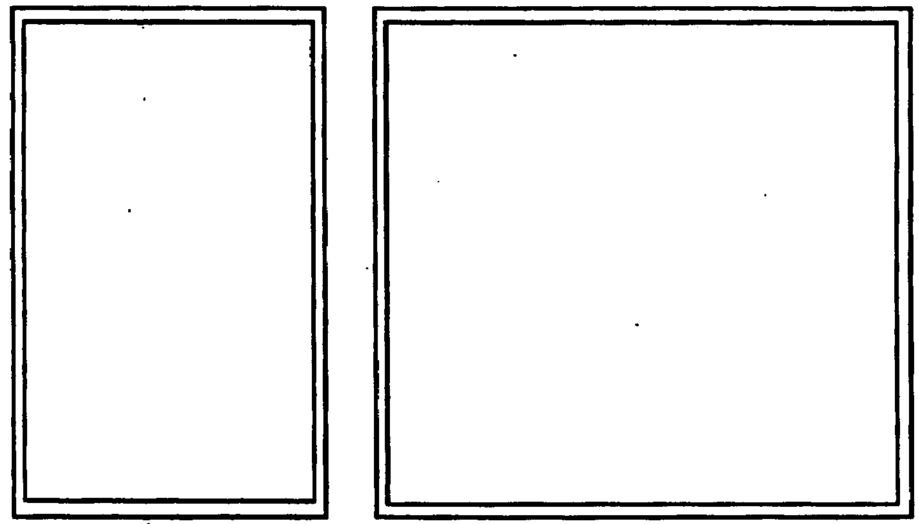

Optional Colored Transparent Acrylic Case Lit by LCD or other light source. A layer of white acrylic or similar material can be under the outer layer for the purpose of diffusing the light. Optionally, case can be clear and change color when computer functions change when different groups of colored LCDs go on depending on switching functions taking place, or sounds, motion or other triggers.

Figure E83
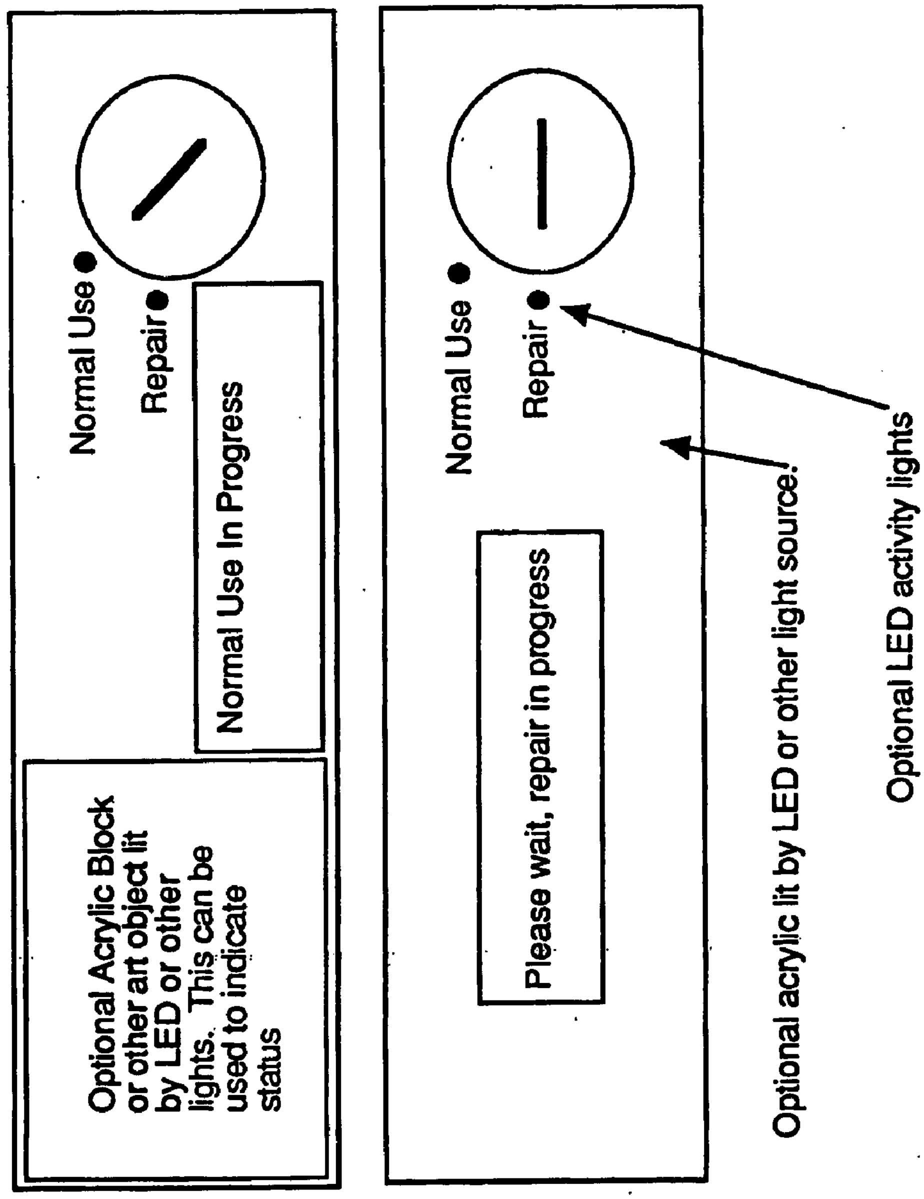

Figure L 70
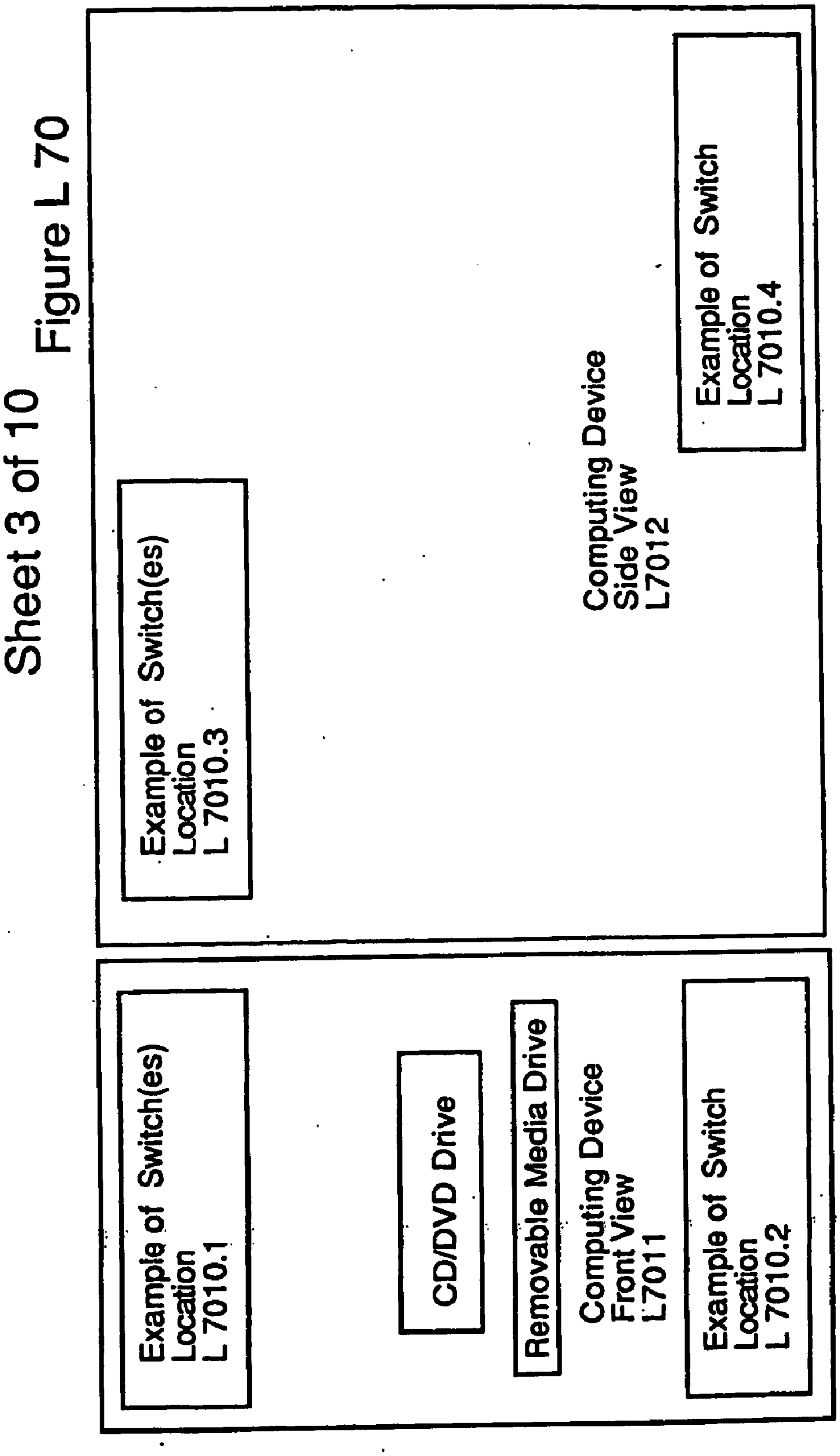

Figure L 71
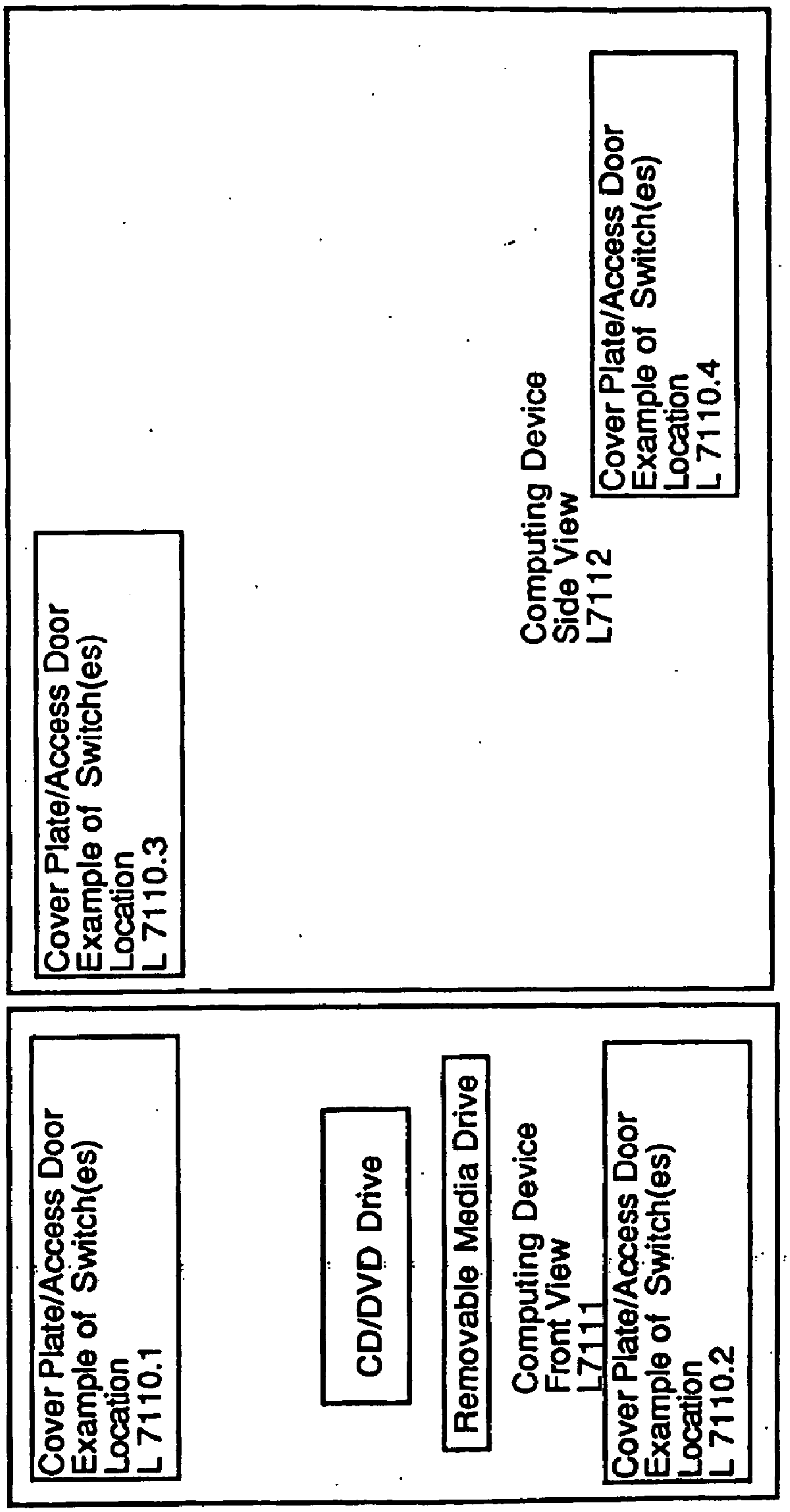

Figure L 72MU Sheet 24 of 29
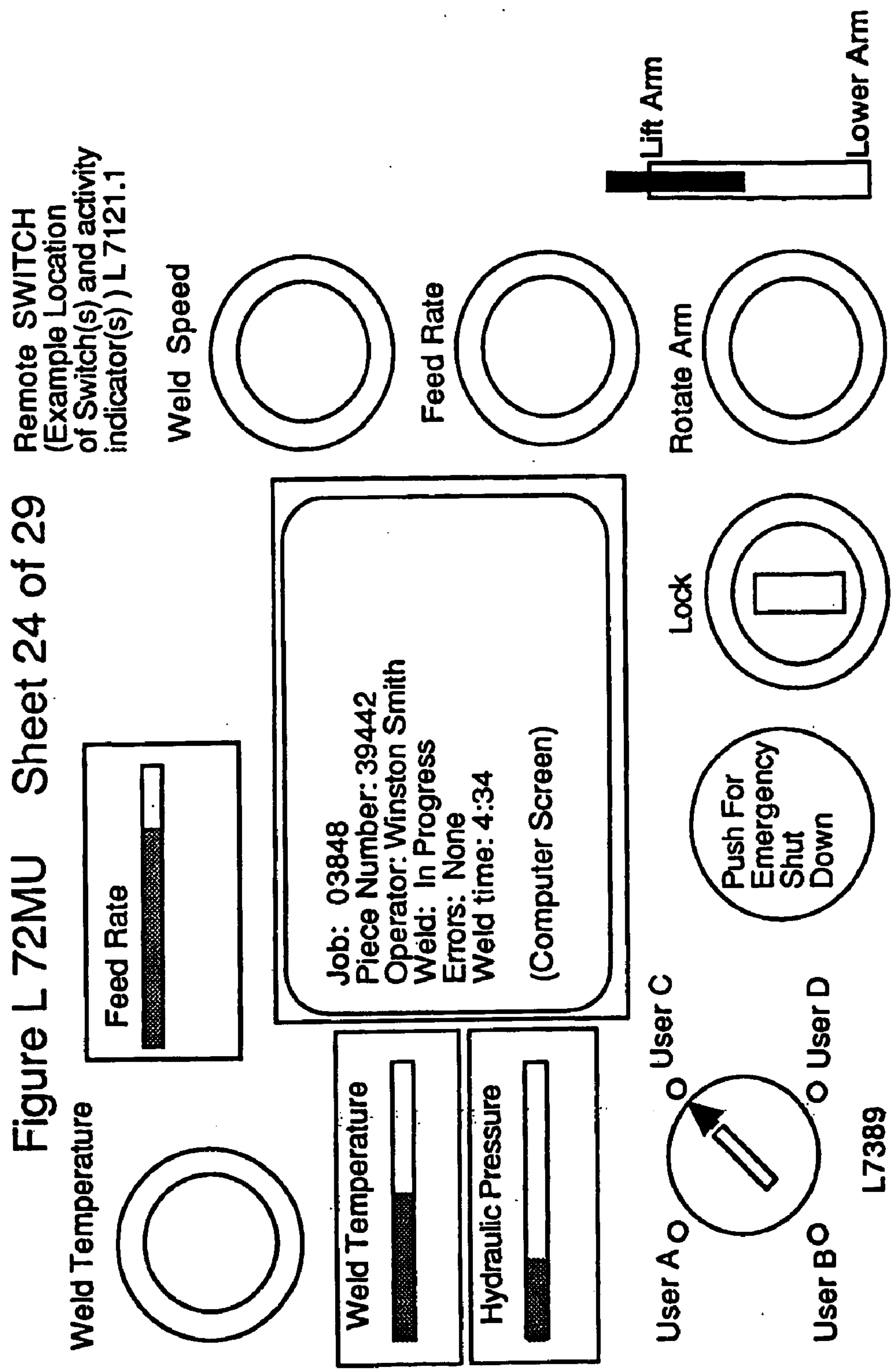

Figure L 72NL
Sheet 5 of 10
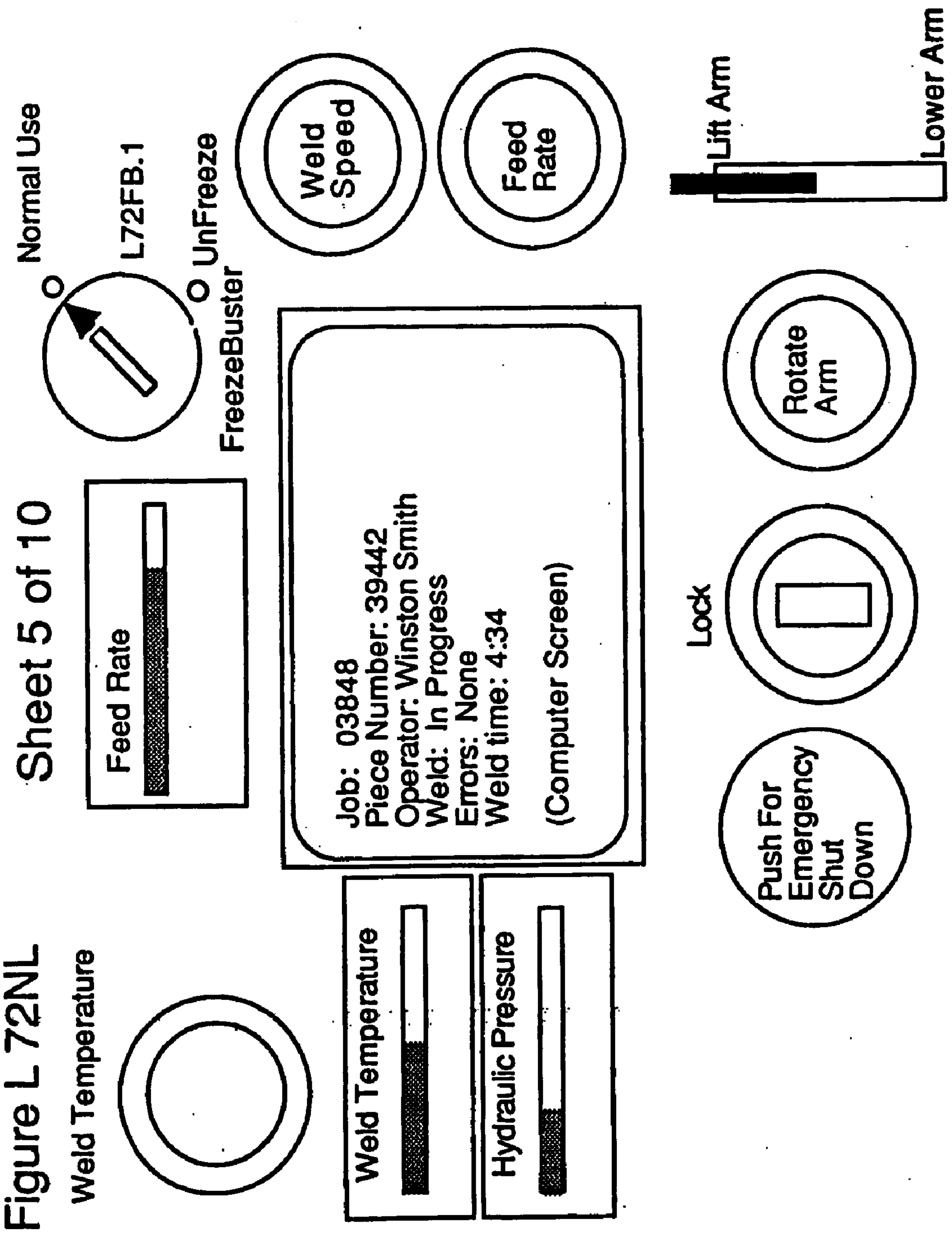

Sheet 41 of 47
Figure L 72S
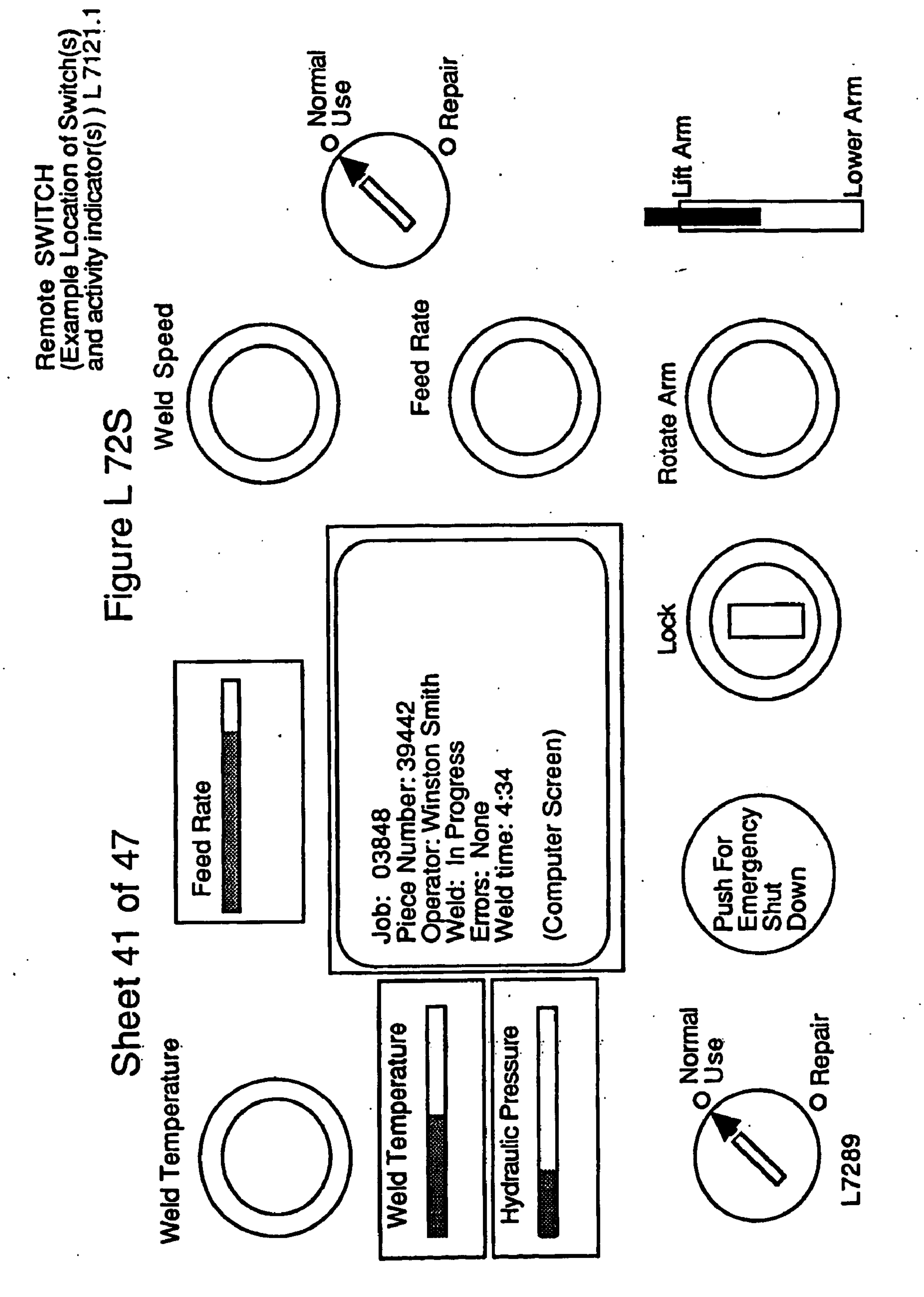

Sheet 14 of 15
Figure L 73
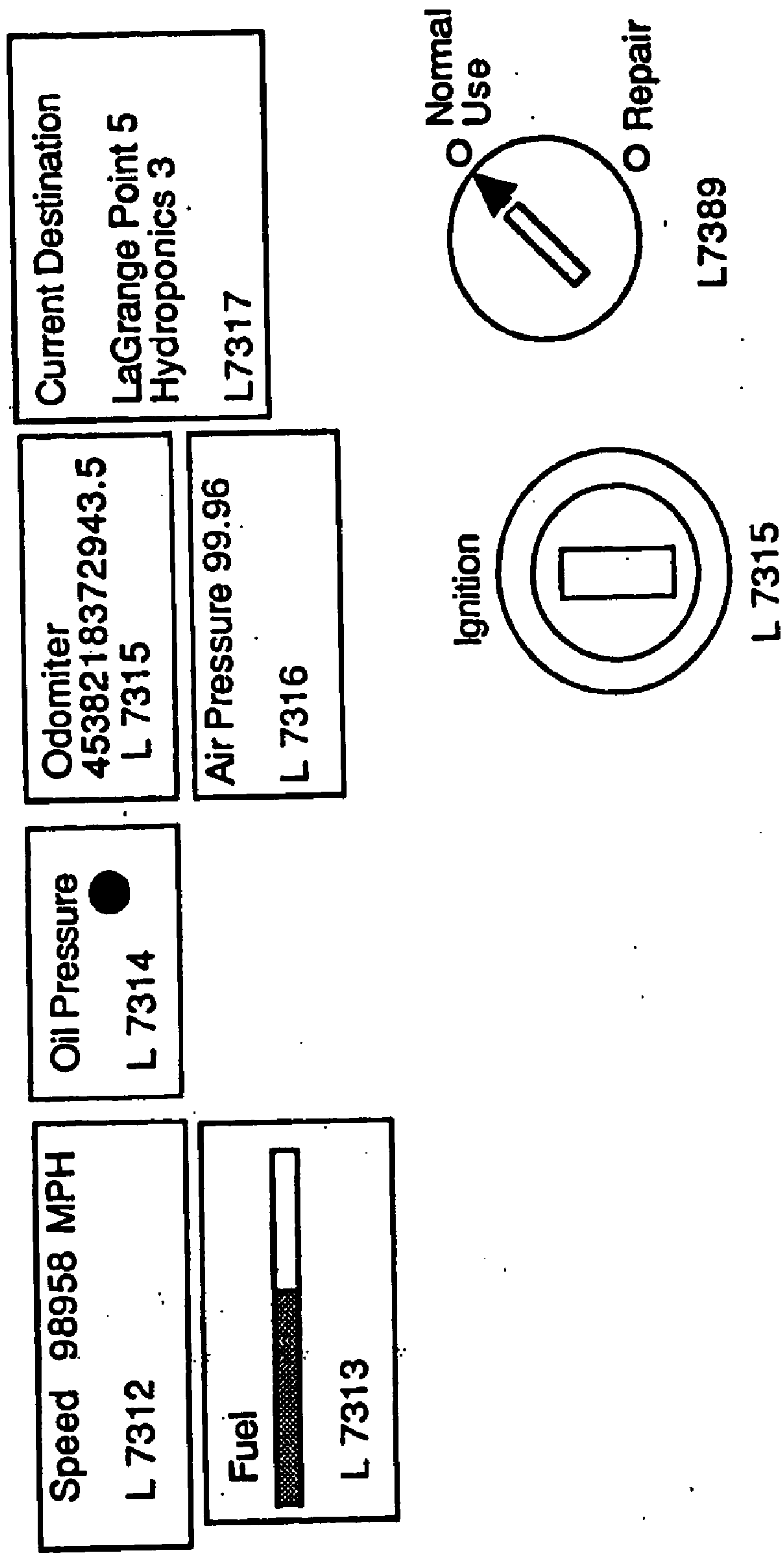

Figure L 73FB
Sheet 6 of 10
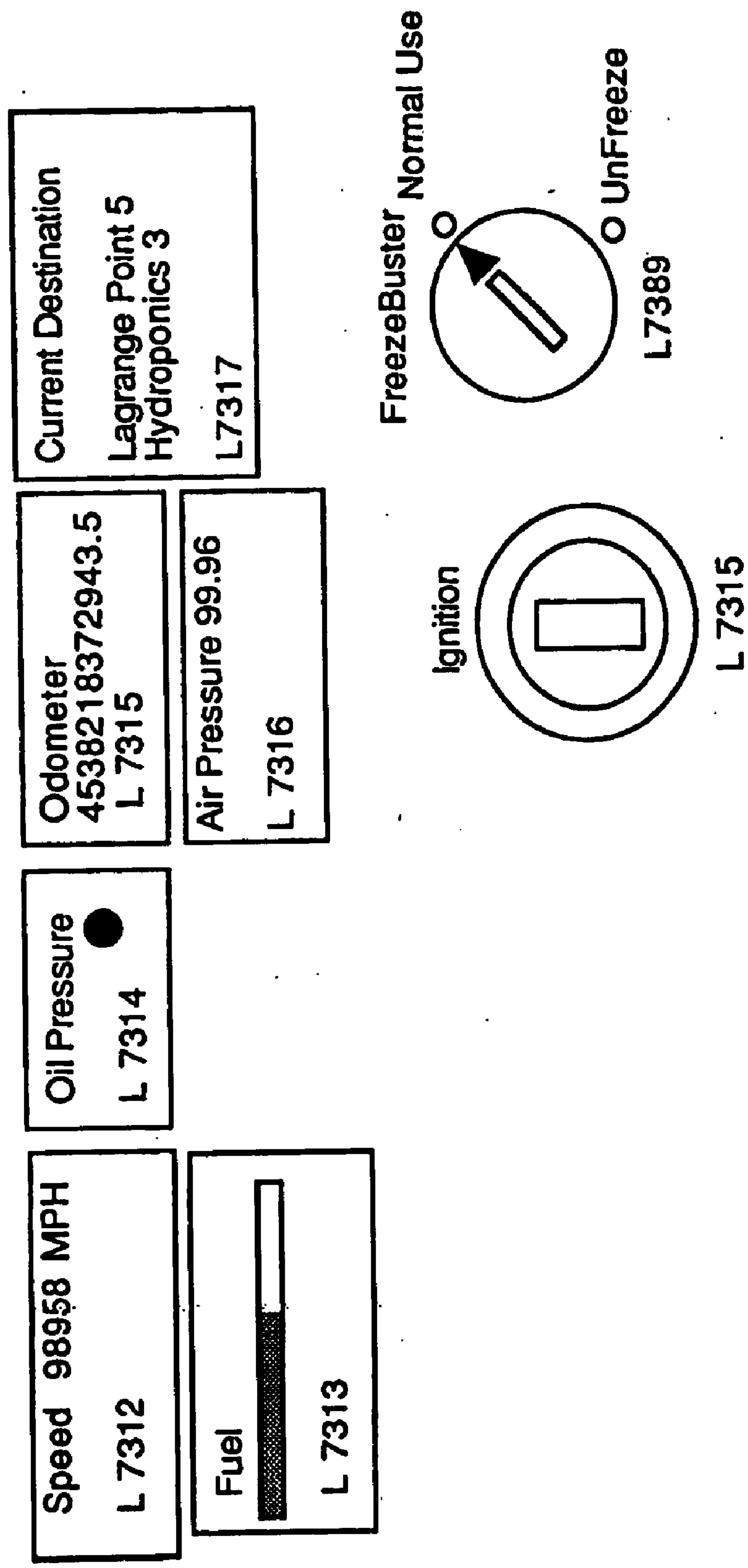

Sheet 25 of 29
Figure L 73MU
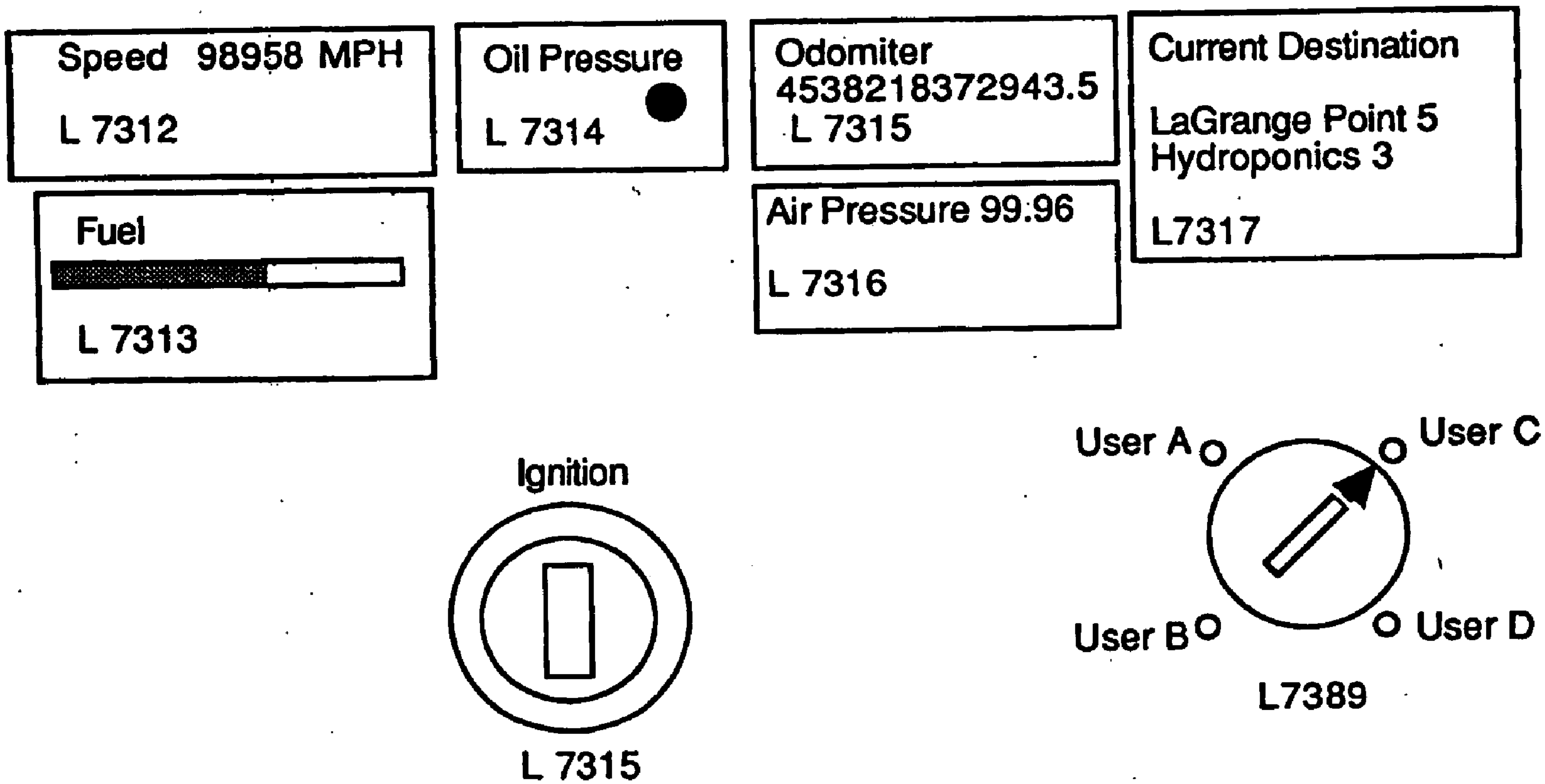

Sheet 6 of 9
Figure L 73NL
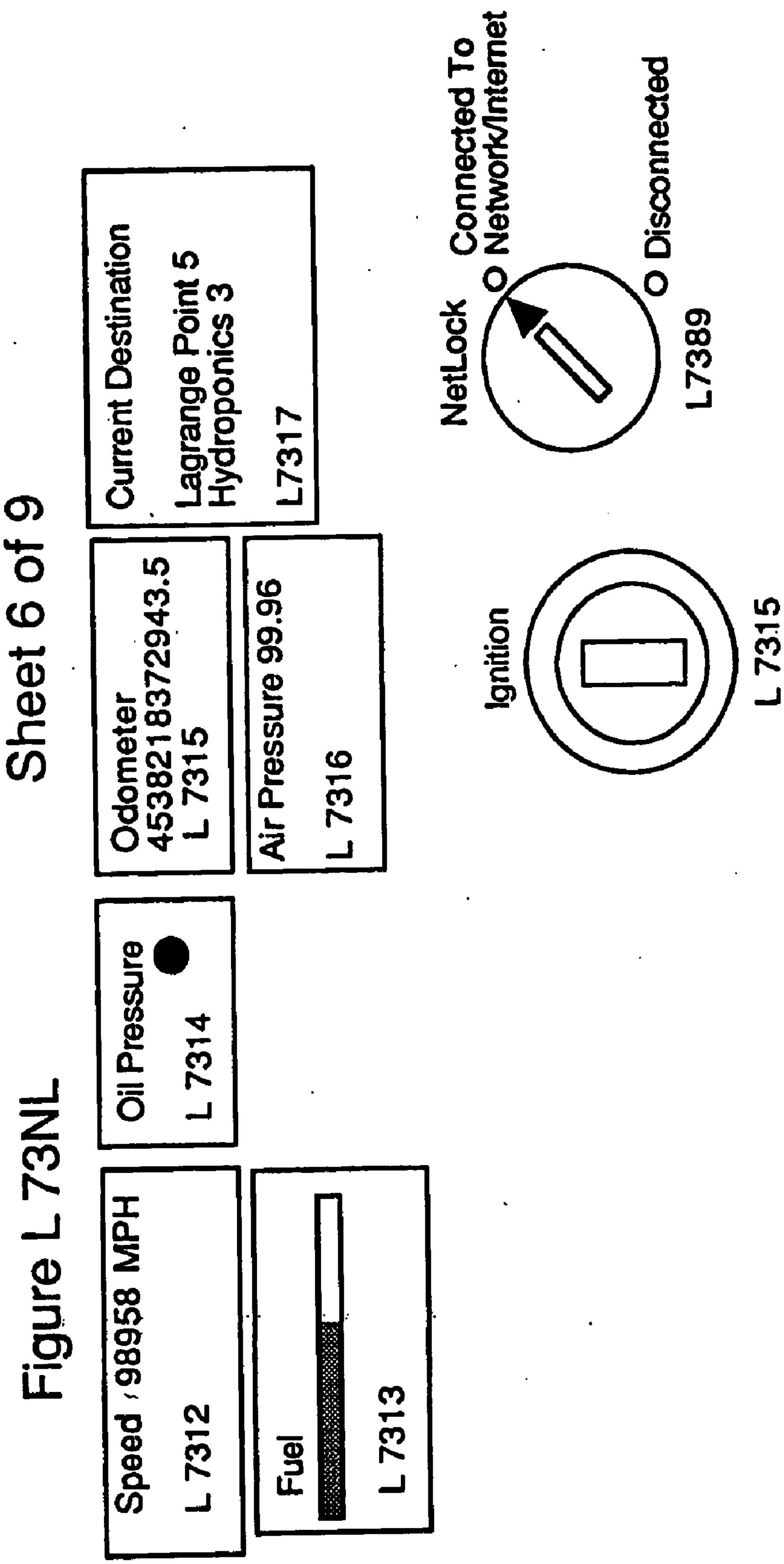

Figure L 74 Robotic Device Sheet 15 of 15
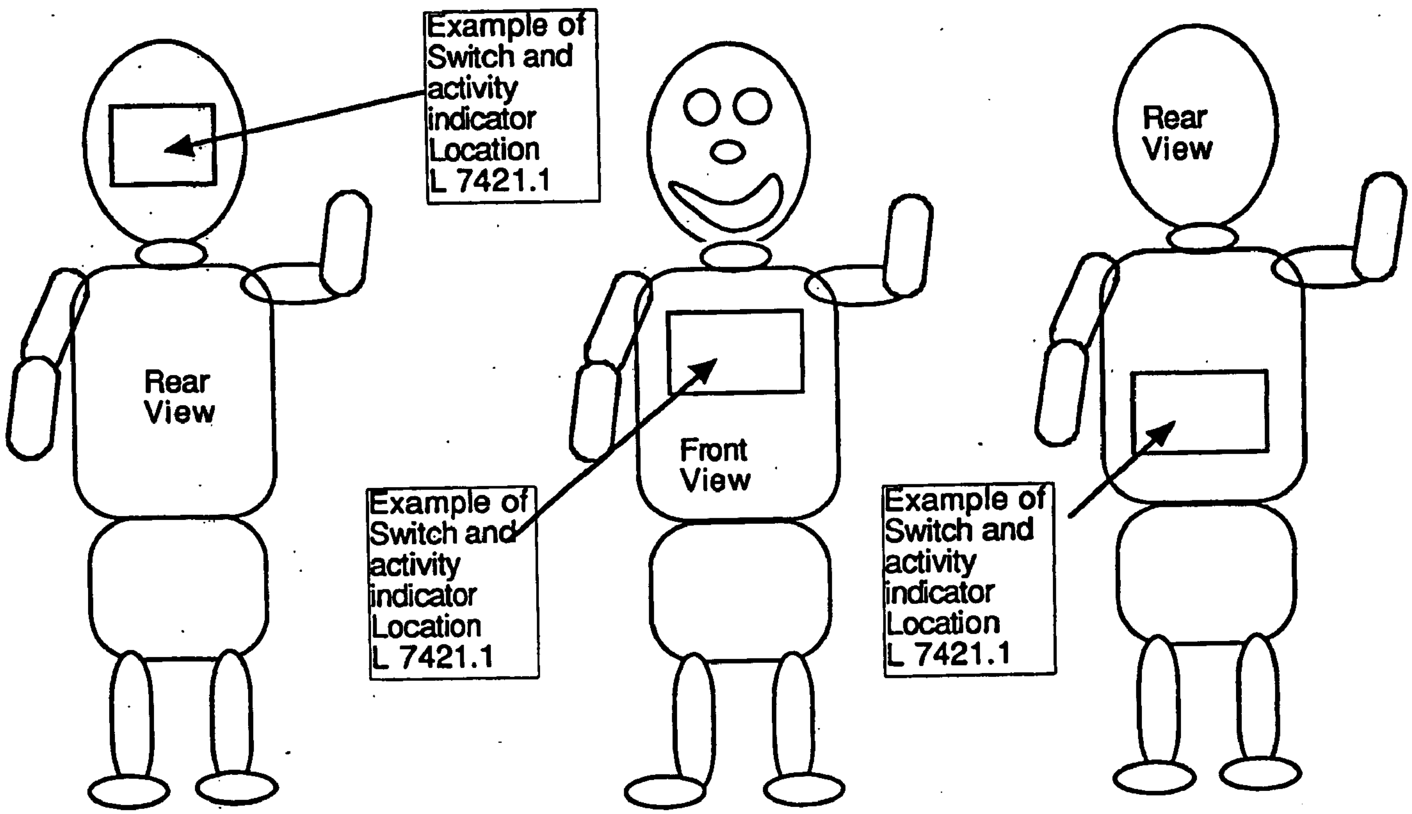

Figure L 75 Sheet 27 of 29
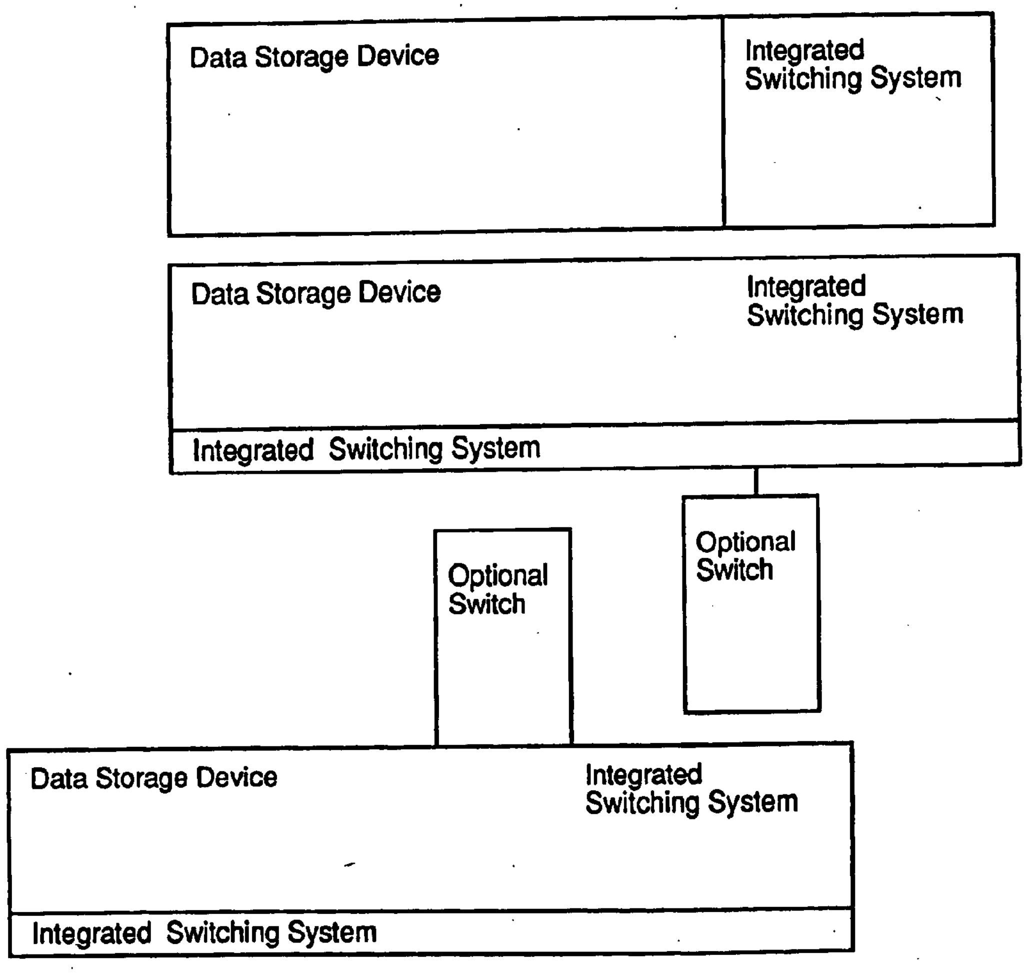

Figure L76 ROM
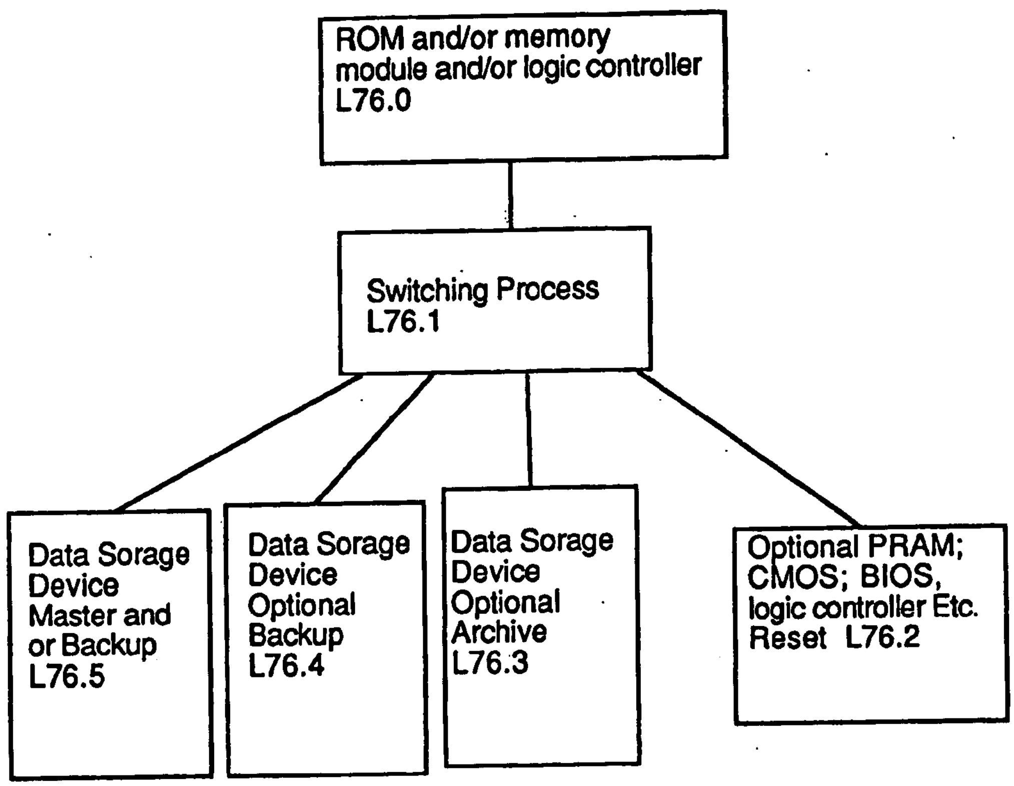

Figure L76.1 Another ROM Sheet 45 of 47
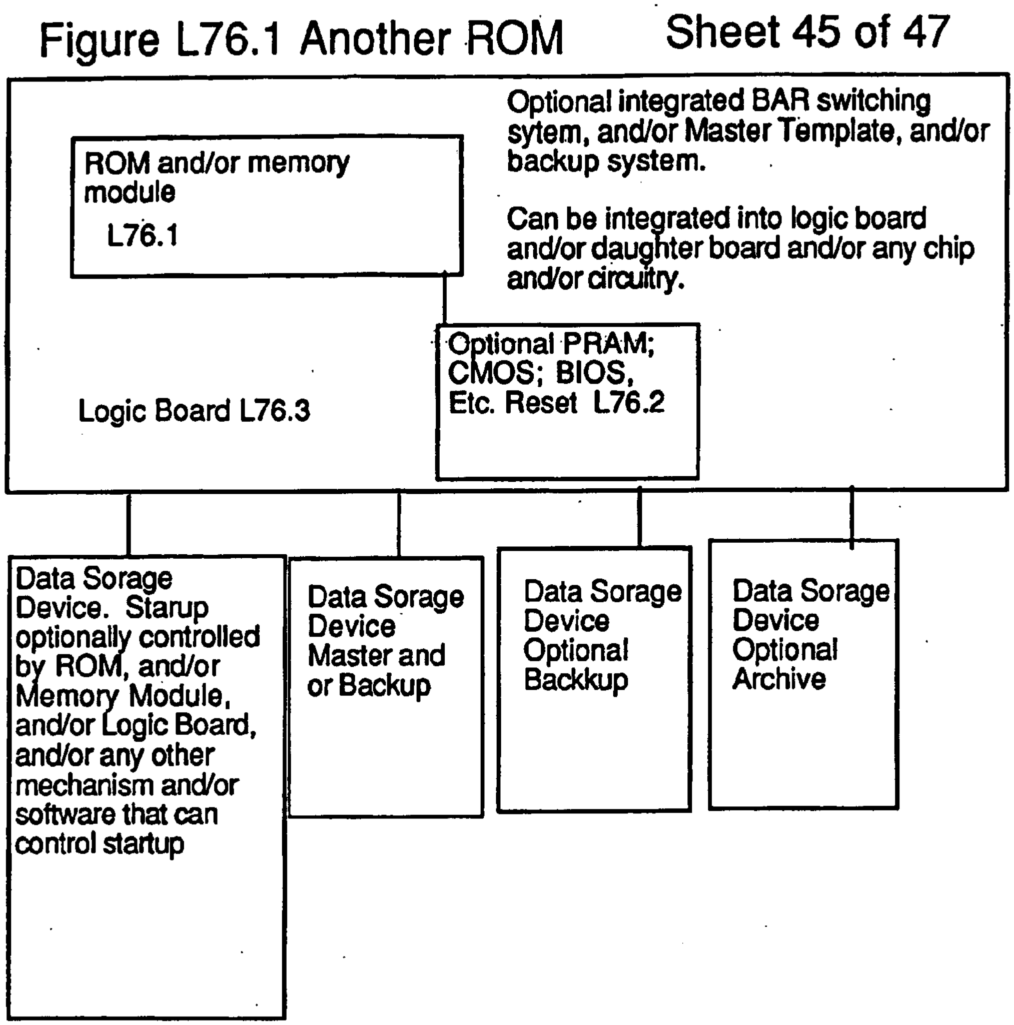

Figure L76CD
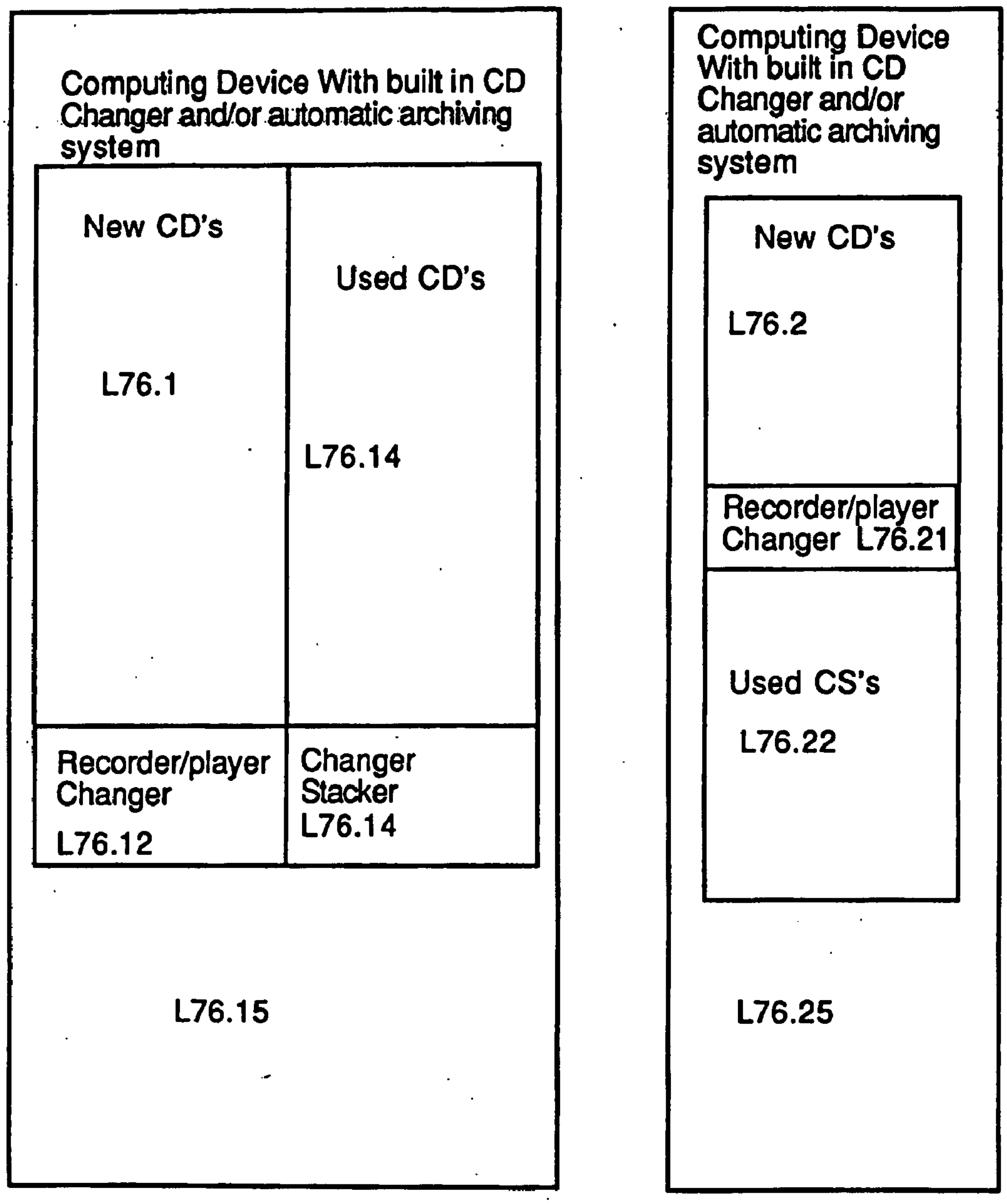

Figure L81 Sheet 28 of 29
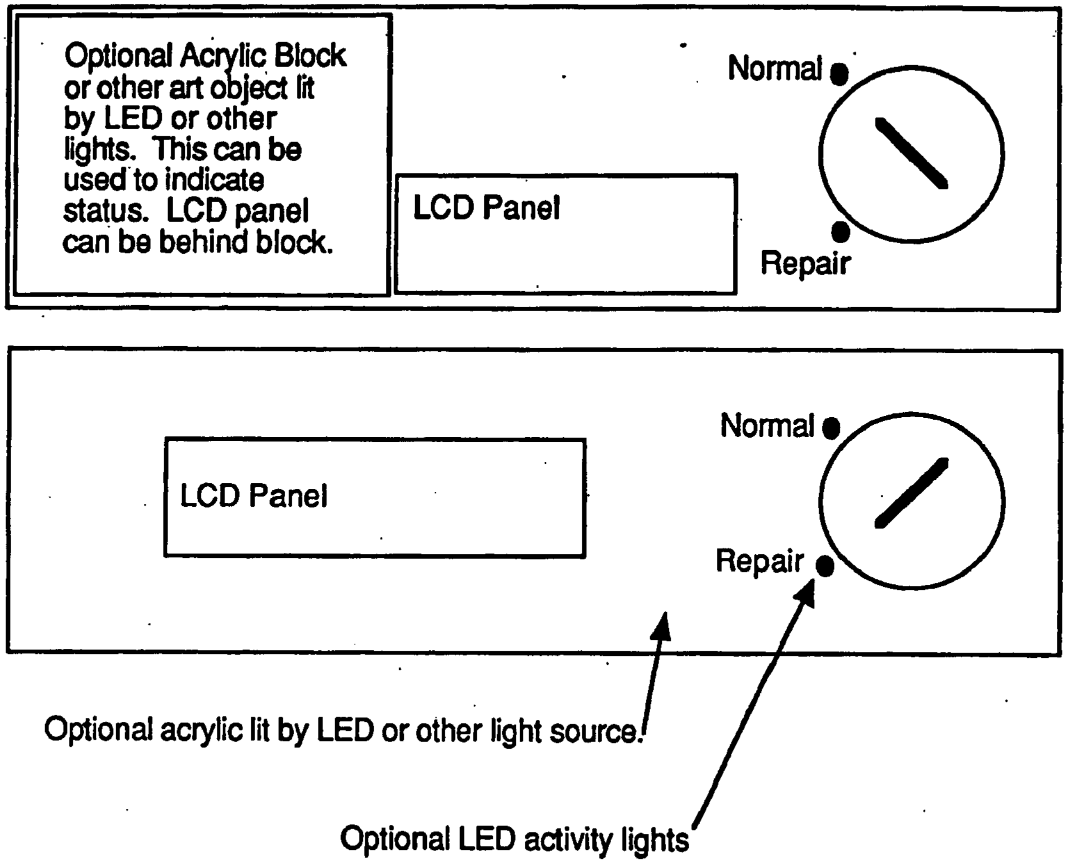

Figure L81FB Sheet 28 of 29
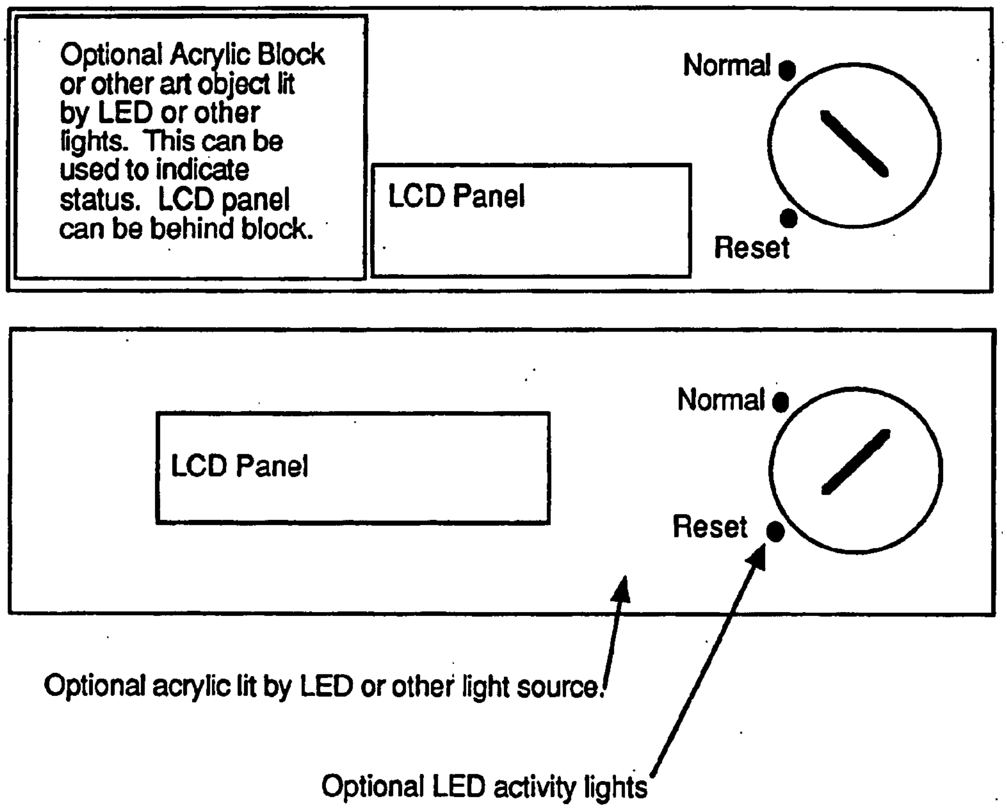

Figure L81MU Sheet 28 of 29
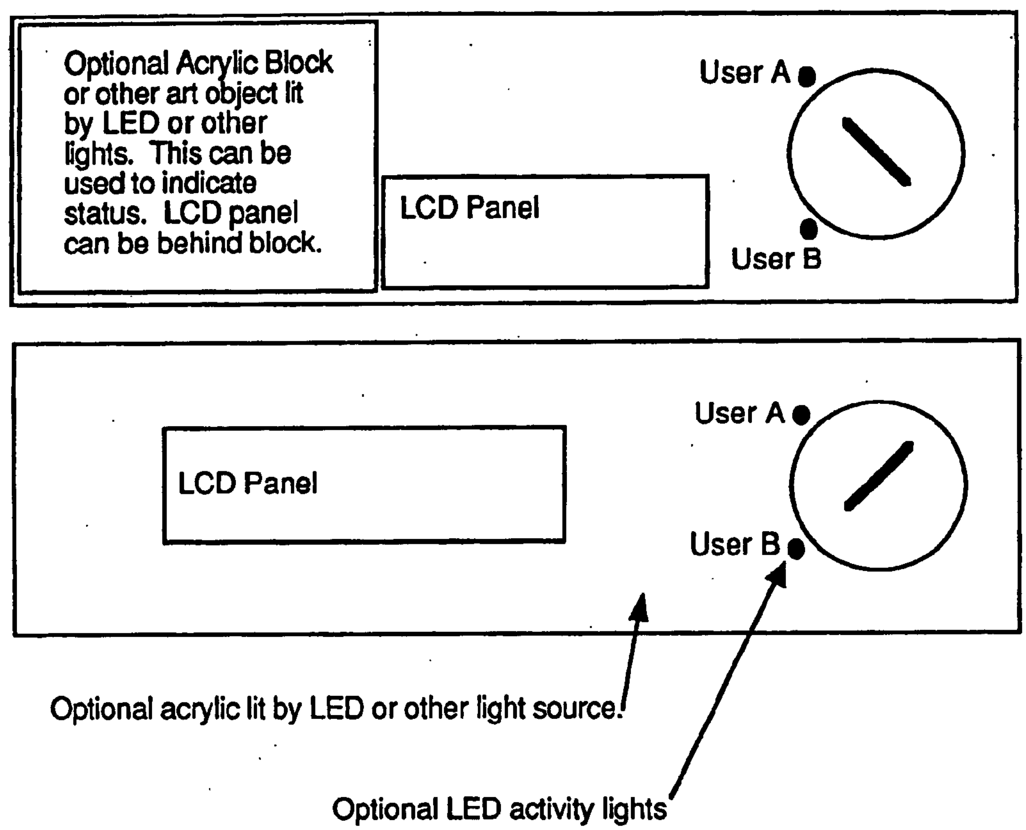

Figure L81NL Sheet 28 of 29
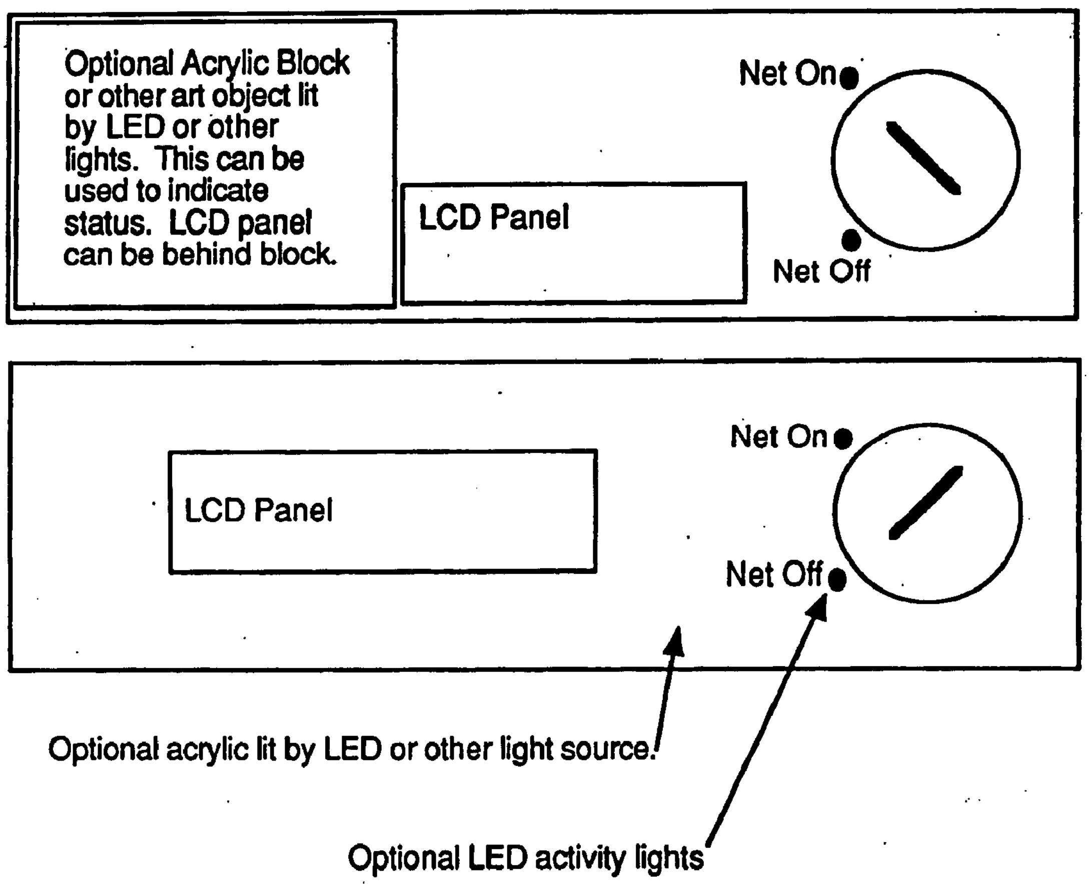

Sheet 29 of 29

Figure L83 Examples of optional LCD screen dialog.

| |
|---|
| Please Wait. Repair In Progress. |
| Please shut down computer. |
| Please Wait. |
| Please Restart Computer. |

In addition to using an LCD screen, or in Lieu of using an LCD screen, dialog can be written directly to monitor, and/or communicated by other means of communication such as speech.

Sheet 29 of 29

Figure L83MU Examples of optional LCD screen dialog.

Please Wait. Switching In Progress

Please shut down computer.

Please Wait.

Please Restart Computer.

In addition to using an LCD screen, or in Lieu of using an LCD screen, dialog can be written directly to monitor, and/or communicated by other means of communication such as speech.

Page 2 of 9
Figure L84
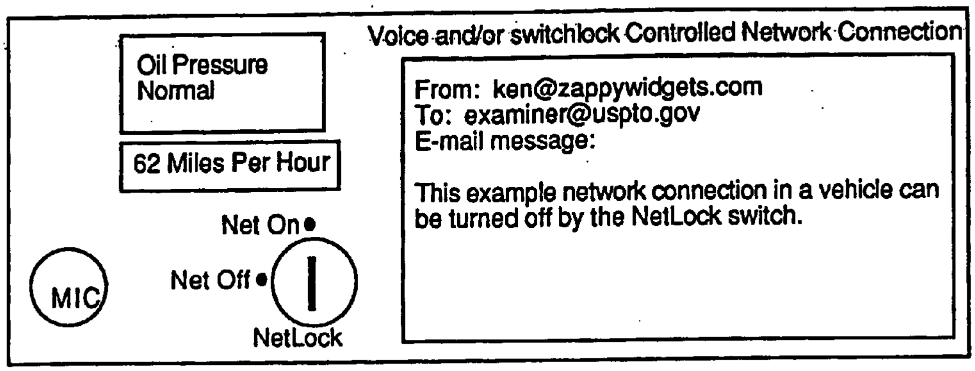

What is claimed is:

1. A method for a computer repairing itself to an operational status at any time during operation, the method comprising the computer-executed steps of:

booting from a first hard disk drive boot device disposed within a main computer hardware box of the computer;

then, in response to receiving a signal indicating a need for repair of the computer during the booting or during any operating state, booting from a second boot device; the second boot device being physically present within the main computer hardware box of the computer prior to receiving the signal indicating a need for repair; and then repairing software on the first hard disk drive boot device while booted from the second boot device and selectively either: (i) maintaining operation of the computer from the second boot device to restore operational status of the computer during repairing of the software on the first hard disk boot device, or (ii) changing to operation of the computer from the second boot device to the first boot device to restore operational status of the computer, wherein the signal is generated by a user altering the state of a physical switch different from an on-off switch of the computer and exposed on an exterior surface of the main computer hardware box of the computer; and at anytime prior to booting from the second boot device, installing software onto the second boot device and protecting the second boot device from further modification; the step of protecting the second boot device comprising one of: (a) switching the second boot device to a state of unavailability; and (b) switching the second boot device to a read only state.

2. A method for a computer repairing itself to an operational status at any time during operation, the method comprising the computer-executed steps of:

booting from a first hard disk drive boot device disposed within a main computer hardware box of the computer;

then, in response to receiving a signal indicating a need for repair of the computer during the booting or during any operating state, booting from a second hard disk drive boot device; the second hard disk drive boot device being physically present within the main computer hardware box of the computer prior to receiving the signal indicating a need for repair; and then repairing software on the first hard disk drive boot device while booted from the second hard disk drive boot device and selectively either: (i) maintaining operation of the computer from the second boot device to restore operational status of the computer during repairing of the software on the first hard disk device, or (ii) changing to operation of the computer from the second boot device to the first boot device to restore operational status of the computer;

wherein the signal is generated by a user altering the state of a physical switch different from an on-off switch of the computer and exposed on an exterior surface of the main computer hardware box of the computer; and at anytime prior to booting from the second hard disk drive boot device, installing software onto the second boot device and protecting the second boot device from further modification; the step of protecting comprising one of: (a) switching the second boot device to a state of unavailability; and (b) switching the second boot device to a read-only state.

3. The method of claim 2, wherein the step of repairing software comprises:

automatically repairing software on the first boot device.

4. The method of claim 3, wherein the step of automatically repairing software comprises:

automatically repairing software on the first boot device without further direction from the user.

5. The method of claim 3, wherein the step of automatically repairing software comprises:

repairing software on the first boot device according to preset preferences.

6. The method of claim 5, wherein the repairing according to preset preferences comprises:

repairing according to whether
- to recover data;
- to run a virus check;
- to reformat the first boot device;
- to revert to a backup; or
- to run diagnostics.

7. The method of claim 2, wherein the step of repairing software comprises:

reformatting the first boot device; and then copying software onto the first boot device.

8. The method of claim 2, wherein the step of repairing software comprises:

resetting parameters in a persistent memory; and then copying software onto the first boot device.

9. The method of claim 2, further comprising the step of:

directing a user to re-boot from the first boot device.

10. The method of claim 2, wherein before the step of booting from the second boot device, the following step is performed: installing software onto the second boot device.

11. The method of claim 10, wherein the step of installing software onto the second boot device comprises one method from the following set of methods:

a. installing software onto the second boot device;

b. copying installed software onto the second boot device;

c. copying installation software onto the second boot device; and d. writing onto the second boot device a version of an operating environment running as a result of the boot from the first boot device.

12. The method of claim 11, wherein the version of the operating environment comprises a template of an operating environment.

13. The method of claim 10, wherein after the step of installing and before the step of booting from the second boot device, the following step is performed:

updating the software installed onto the second boot device.

14. The method of claim 10, wherein after the step of installing and before the step of booting from the second boot device, the following step is performed:

protecting the second boot device from further modification.

15. The method of claim 2, wherein before the step of repairing software the following step is performed:

offering a user a choice of thoroughness of repair.

16. The method of claim 2, wherein before the step of booting from the second boot device, the following step is performed:

automatically monitoring an operating environment running as a result of the booting from the first boot device.

17. The method of claim 16, further comprising the step of:

detecting an undesirable change in the operating environment; and generating the signal indicating a need for repair in response to the detection.

18. The method of claim 2, wherein before the step of booting from the second boot device, the following step is performed:

automatically searching for boot devices.

19. A method for a computer repairing itself to an operational status at any time during operation, the method comprising the computer-executed steps of:

booting from a first hard disk drive boot device disposed within a main computer hardware box of the computer;

then, in response to receiving a signal indicating a need for repair of the computer during the booting or during any operating state, booting from a second hard disk drive boot device; the second hard disk drive boot device being physically present within the main computer hardware box of the computer prior to receiving the signal indicating a need for repair; and then repairing software on the first hard disk drive boot device while booted from the second hard disk drive boot device and selectively either: (i) maintaining operation of the computer from the second boot device to restore operational status of the computer during repairing of the software on the first hard disk device, or (ii) changing to operation of the computer from the second boot device to the first boot device to restore operational status of the computer;

wherein before the step of repairing software the following step is performed: offering a user a choice of thoroughness of repair selected from the set of repairs consisting of a quick repair that re-installs or copies template software without first re-formatting, a better repair that performs a high-level re-format before that copy or re-installation of software, and a best repair that performs a low-level re-format before copying over or re-installing software.

20. A computer that repairs itself to an operational status at any time during operation, the computer comprising:

a main computer hardware box;

a bootable first hard disk drive boot device disposed within the main computer hardware box;

a bootable second hard disk drive boot device, the bootable second hard disk drive having software installed onto the second boot device at anytime prior to booting from the second hard disk drive boot device that is protected from further modification by at least one of (a) switching the second boot device to a state of unavailability; or (b) switching the second boot device to a read-only state;

a switching logic responsive to receiving a signal indicating a need for repair of the computer during the booting or during any operating state, that controls booting of the computer from a second hard disk drive boot device; the second hard disk drive boot device being physically present within the main computer hardware box of the computer prior to receiving the signal indicating a need for repair; and means for repairing software on the first hard disk drive boot device while booted from the second hard disk drive boot device that selectively either: (i) maintains operation of the computer from the second boot device to restore operational status of the computer during repairing of the software on the first hard disk device, or (ii) changes to operation of the computer from the second boot device to the first boot device to restore operational status of the computer; and a switch, different from an on-off switch of the computer and exposed on an exterior surface of the main computer hardware box of the computer, adapted to generate the signal when operated by an external user to altering the state of the switch.

21. A method for a computer repairing itself to an operational status at any time during operation, the method comprising the computer-executed steps of:

booting from a first hard disk drive boot device disposed within a main computer hardware box of the computer;

then, in response to receiving a signal indicating a need for repair of the computer during the booting or during any operating state, booting from a second boot device; the second boot device being physically present within the main computer hardware box of the computer prior to receiving the signal indicating a need for repair; and then repairing software on the first hard disk drive boot device while booted from the second boot device and selectively either: (i) maintaining operation of the computer from the second boot device to restore operational status of the computer during repairing of the software on the first hard disk device, or (ii) changing to operation of the computer from the second boot device to the first boot device to restore operational status of the computer;

wherein before the step of repairing software the following step is performed: offering a user a choice of thoroughness of repair selected from the set of repairs consisting of a quick repair that re-installs or copies template software without first re-formatting, a better repair that performs a high-level re-format before that copy or re-installation of software, and a best repair that performs a low-level re-format before copying over or re-installing software.

* * * * *